US012725154B2

(12) United States Patent
Weinflash et al.

(10) Patent No.: US 12,725,154 B2
(45) Date of Patent: Sep. 1, 2026

(54) SECURE ELECTRONIC BILLING WITH REAL-TIME FUNDS AVAILABILITY

(71) Applicant: Early Warning Services, LLC, Scottsdale, AZ (US)

(72) Inventors: Laura Weinflash, Scottsdale, AZ (US); Lou Anne Alexander, Scottsdale, AZ (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 0 days.

(21) Appl. No.: 16/453,396

(22) Filed: Jun. 26, 2019

(65) Prior Publication Data

US 2019/0318354 A1 Oct. 17, 2019

Related U.S. Application Data

(63) Continuation-in-part of application No. 15/851,548, filed on Dec. 21, 2017, which is a (Continued)

(51) Int. Cl.
*G06Q 20/40* (2012.01)
*G06Q 20/14* (2012.01)

(52) U.S. Cl.
CPC ............. *G06Q 20/40* (2013.01); *G06Q 20/14* (2013.01)

(58) Field of Classification Search
CPC ............................... G06Q 20/40; G06Q 20/14

(Continued)

(56) References Cited

U.S. PATENT DOCUMENTS 2,011,032 A 8/1935 Blanchard
5,229,764 A 7/1993 Matchett et al.

(Continued)

FOREIGN PATENT DOCUMENTS

AU 4034997 3/1998
AU 1757201 5/2001

(Continued)

OTHER PUBLICATIONS

Titel: Payment Applications Make E-Commerce Mobile Author: Neal Leavitt Publication Date: Dec. 1, 2010 (Year: 2010).*

(Continued)

*Primary Examiner* — Bennett M Sigmond
*Assistant Examiner* — Yongsik Park
(74) *Attorney, Agent, or Firm* — BRYAN CAVE LEIGHTON PAISNER LLP

(57) ABSTRACT

A system including one or more processors and one or more non-transitory computer-readable media storing computing instructions configured to run on the one or more processors and perform various acts. The acts can include receiving, from a first entity, a first request to pay a second entity. The first request can include (a) an account identifier of an account of the first entity at the second entity, (b) a payment amount, and (c) a preauthorization by the first entity to pay the payment amount to the second entity. The acts also can include sending a second request to the second entity based on the first request. The acts additionally can include receiving, from the second entity, an invoice for the first entity for the payment amount. The acts further can include facilitating a real-time payment transaction from a first account of the first entity at a first financial institution to a second account of the second entity at a second financial institution without transmitting the invoice to the first entity, without receiving an authorization from the first entity to pay the invoice or the (Continued)

payment amount to the second entity after receiving the invoice from the second entity, and based on the preauthorization of the first request. Other embodiments are described.

20 Claims, 41 Drawing Sheets

Related U.S. Application Data continuation-in-part of application No. 15/640,896, filed on Jul. 3, 2017, now abandoned, which is a continuation-in-part of application No. 15/131,972, filed on Apr. 18, 2016, now Pat. No. 10,832,246, which is a continuation-in-part of application No. 14/665,861, filed on Mar. 23, 2015, now Pat. No. 10,878,387.

(60) Provisional application No. 62/690,305, filed on Jun. 26, 2018, provisional application No. 62/357,562, filed on Jul. 1, 2016, provisional application No. 62/222,773, filed on Sep. 23, 2015.

(58) Field of Classification Search
USPC ........................................................ 705/40
See application file for complete search history.

(56) References Cited

U.S. PATENT DOCUMENTS 5,265,007 A 11/1993 Barnhard, Jr. et al.
5,282,249 A 1/1994 Cohen et al.
5,283,829 A 2/1994 Anderson
5,329,589 A 7/1994 Fraser et al.
5,383,113 A 1/1995 Kight et al.
5,453,601 A 9/1995 Rosen
5,455,407 A 10/1995 Rosen
5,465,206 A 11/1995 Hilt et al.
5,481,609 A 1/1996 Cohen et al.
5,619,657 A 4/1997 Sudama et al.
5,642,419 A 6/1997 Rosen
5,649,117 A 7/1997 Landry
5,652,786 A 7/1997 Rogers
5,671,280 A 9/1997 Rosen
5,677,955 A 10/1997 Doggett et al.
5,699,528 A 12/1997 Hogan
5,703,344 A 12/1997 Bezy et al.
5,729,594 A 3/1998 Klingman
5,745,886 A 4/1998 Rosen
5,781,723 A 7/1998 Yee et al.
5,790,677 A 8/1998 Fox et al.
5,794,207 A 8/1998 Walker et al.
5,826,241 A 10/1998 Stein et al.
5,832,460 A 11/1998 Bednar et al.
5,848,161 A 12/1998 Luneau et al.
5,848,400 A 12/1998 Chang
5,870,473 A 2/1999 Boesch et al.
5,873,072 A 2/1999 Kight et al.
5,878,141 A 3/1999 Daly et al.
5,884,288 A 3/1999 Chang et al.
5,889,863 A 3/1999 Weber
5,903,721 A 5/1999 Sixtus
5,913,203 A 6/1999 Wong et al.
5,915,023 A 6/1999 Bernstein
5,920,847 A 7/1999 Kolling et al.
5,920,848 A 7/1999 Schutzer et al.
5,946,669 A 8/1999 Polk
5,956,700 A 9/1999 Andry
5,970,475 A 10/1999 Barnes et al.
5,978,840 A 11/1999 Nguyen et al.
5,983,208 A 11/1999 Haller et al.
5,987,132 A 11/1999 Rowney
5,987,140 A 11/1999 Rowney et al.
5,996,076 A 11/1999 Rowney et al.
5,999,625 A 12/1999 Bellare et al.
6,002,767 A 12/1999 Kramer
6,016,484 A 1/2000 Williams et al.
6,029,150 A 2/2000 Kravitz
6,032,133 A 2/2000 Hilt et al.
6,035,285 A 3/2000 Schlect et al.
6,039,250 A 3/2000 Ito et al.
6,044,362 A 3/2000 Neely
6,049,786 A 4/2000 Smorodinsky
6,058,380 A 5/2000 Anderson et al.
6,061,665 A 5/2000 Bahreman
6,070,150 A 5/2000 Remington et al.
6,072,870 A 6/2000 Nguyen et al.
6,078,907 A 6/2000 Lamm
6,081,790 A 6/2000 Rosen
6,085,168 A 7/2000 Mori et al.
6,112,181 A 8/2000 Shear et al.
6,119,101 A 9/2000 Peckover
6,119,106 A 9/2000 Versky et al.
6,119,107 A 9/2000 Polk
6,125,352 A 9/2000 Franklin et al.
6,128,603 A 10/2000 Dent et al.
6,138,107 A 10/2000 Elgamal
6,145,738 A 11/2000 Stinson et al.
6,167,378 A 12/2000 Webber, Jr.
6,173,272 B1 1/2001 Thomas et al.
6,236,981 B1 5/2001 Hill
6,246,996 B1 6/2001 Stein et al.
6,260,024 B1 7/2001 Shkedy
6,285,991 B1 9/2001 Powar
6,289,322 B1 9/2001 Kitchen et al.
6,292,211 B1 9/2001 Pena
6,292,789 B1 9/2001 Schutzer
6,304,857 B1 10/2001 Heindel et al.
6,304,860 B1 10/2001 Martin, Jr. et al.
6,311,170 B1 10/2001 Embrey
6,317,745 B1 11/2001 Thomas et al.
6,334,116 B1 12/2001 Ganesan et al.
6,381,582 B1 4/2002 Walker et al.
6,385,595 B1 5/2002 Kolling
6,411,942 B1 6/2002 Fujimoto
6,438,527 B1 8/2002 Powar
6,446,051 B1 9/2002 Gupta
6,488,203 B1 12/2002 Stoutenburg et al.
6,502,747 B1 1/2003 Stoutenburg et al.
6,578,015 B1 6/2003 Haseltine et al.
6,587,550 B2 7/2003 Council et al.
6,594,647 B1 7/2003 Randle et al.
6,609,114 B1 8/2003 Gressel et al.
6,647,376 B1 11/2003 Farrar et al.
6,678,664 B1 1/2004 Ganesan
6,754,640 B2 6/2004 Bozeman
6,839,687 B1 1/2005 Dent et al.
6,847,708 B1 1/2005 Abbasi et al.
6,868,391 B1 3/2005 Hultgren
6,882,986 B1 4/2005 Heinemann et al.
6,891,953 B1 5/2005 DeMello et al.
6,968,319 B1 11/2005 Remington et al.
6,996,542 B1 2/2006 Landry
7,003,480 B2 2/2006 Fox et al.
7,004,382 B2 2/2006 Sandru
7,010,512 B1 3/2006 Gillin et al.
7,031,939 B1 4/2006 Gallagher et al.
7,035,821 B1 4/2006 Smith, II et al.
7,039,951 B1 5/2006 Chaudhari et al.
7,051,001 B1 5/2006 Slater
7,089,208 B1 8/2006 Levchin et al.
7,098,783 B2 8/2006 Crichlow
7,103,261 B2 9/2006 Grecia
7,120,606 B1 10/2006 Ranzini et al.
7,120,608 B1 10/2006 Gallagher et al.
7,133,835 B1 11/2006 Fusz et al.
7,184,980 B2 2/2007 Allen-Rouman et al.
7,191,151 B1 3/2007 Nosek
7,200,551 B1 4/2007 Senez
7,206,938 B2 4/2007 Bender et al.
7,227,950 B2 6/2007 Faith et al.
7,240,031 B1 7/2007 Kight et al.

(56) References Cited

U.S. PATENT DOCUMENTS 7,249,098 B2 7/2007 Milberger et al.
7,254,235 B2 8/2007 Boudreault et al.
7,287,009 B1 10/2007 Liebermann
7,296,004 B1 11/2007 Garrison et al.
7,302,411 B2 11/2007 Ganesan et al.
7,319,855 B1 1/2008 Brune et al.
7,321,874 B2 1/2008 Dilip et al.
7,321,875 B2 1/2008 Dilip et al.
7,333,953 B1 2/2008 Banaugh et al.
7,343,014 B2 3/2008 Sovio et al.
7,349,871 B2 3/2008 Abrou et al.
7,353,203 B1 4/2008 Kriplani et al.
7,366,695 B1 4/2008 Allen-Rouman et al.
7,370,014 B1 5/2008 Vasavada et al.
7,376,587 B1 5/2008 Neofytides et al.
7,383,223 B1 6/2008 Dilip et al.
7,383,226 B2 6/2008 Kight et al.
7,389,917 B2 6/2008 Abraham et al.
7,392,223 B1 6/2008 Ganesan et al.
7,395,241 B1 7/2008 Cook et al.
7,398,252 B2 7/2008 Neofytides et al.
7,426,492 B1 9/2008 Bishop et al.
7,450,010 B1 11/2008 Gravelle et al.
7,451,114 B1 11/2008 Matsuda et al.
7,475,039 B2 1/2009 Remington et al.
7,475,808 B1 1/2009 Bishop et al.
7,478,066 B2 1/2009 Remington et al.
7,499,887 B2 3/2009 Boyle et al.
7,500,602 B2 3/2009 Gray
7,505,937 B2 3/2009 Dilip et al.
7,519,560 B2 4/2009 Lam et al.
7,526,650 B1 4/2009 Wimmer
7,532,122 B2 5/2009 Aull et al.
7,536,722 B1 5/2009 Saltz et al.
7,596,701 B2 9/2009 Varghese et al.
7,603,311 B1 10/2009 Yadav-Ranjan
7,606,734 B2 10/2009 Baig et al.
7,606,787 B2 10/2009 Keown et al.
7,610,245 B2 10/2009 Dent et al.
7,613,653 B2 11/2009 Milberger et al.
7,620,602 B2 11/2009 Jakstadt et al.
7,636,668 B1 * 12/2009 Alves .................... G06Q 10/06 705/2
7,644,037 B1 1/2010 Ostrovsky
7,653,591 B1 1/2010 Dabney
7,657,497 B2 2/2010 Nandy
7,677,438 B2 3/2010 DeJean et al.
7,685,067 B1 3/2010 Britto et al.
7,689,482 B2 3/2010 Lam et al.
7,693,791 B2 4/2010 Hahn-Carlson et al.
7,702,579 B2 4/2010 Neely et al.
7,707,082 B1 4/2010 Lapstun et al.
7,707,107 B2 4/2010 Gebb et al.
7,711,690 B1 5/2010 Garrison et al.
7,716,127 B2 5/2010 Gebb et al.
7,716,132 B1 5/2010 Spies et al.
7,720,754 B1 5/2010 Gutierrez-Sheris
7,720,756 B2 5/2010 Kavounas
7,734,543 B2 6/2010 Braco
7,752,130 B2 7/2010 Byrd et al.
7,756,785 B2 7/2010 Gebb et al.
7,756,786 B2 7/2010 Trende et al.
7,765,156 B2 7/2010 Staniar et al.
7,769,687 B2 8/2010 Gebb et al.
7,769,998 B2 8/2010 Lynch et al.
7,774,271 B1 8/2010 Edwards et al.
7,778,901 B2 8/2010 Ganesan et al.
7,783,567 B1 8/2010 Kleiman et al.
7,792,749 B2 9/2010 Ganesan
7,809,650 B2 10/2010 Bruesewitz et al.
7,840,520 B2 11/2010 Nandy
7,848,972 B1 12/2010 Sharma
7,856,384 B1 12/2010 Kulasooriya et al.
7,870,070 B2 1/2011 Meier et al.
7,873,573 B2 1/2011 Realini
7,877,325 B2 1/2011 Bishop et al.
7,885,869 B2 2/2011 Uehara et al.
7,899,744 B2 3/2011 Bishop et al.
7,904,385 B2 3/2011 Bishop et al.
7,908,214 B2 3/2011 Bishop et al.
7,925,585 B2 4/2011 Bishop et al.
7,937,312 B1 5/2011 Woolston
7,941,367 B2 5/2011 Bishop et al.
7,941,372 B2 5/2011 Bishop et al.
7,942,321 B2 5/2011 Linton et al.
7,945,491 B2 5/2011 Sharma
7,953,660 B2 5/2011 Ganesan et al.
7,958,030 B2 * 6/2011 Kemper ............... G06Q 20/102 705/40
7,958,049 B2 6/2011 Jamison et al.
7,962,406 B2 6/2011 Bishop et al.
7,962,407 B2 6/2011 Bishop et al.
7,962,408 B2 6/2011 Bishop et al.
7,970,706 B2 6/2011 Keene
7,979,348 B2 7/2011 Thomas et al.
7,979,349 B2 7/2011 Bishop et al.
7,996,307 B2 8/2011 Bishop et al.
7,996,310 B1 8/2011 Edwards et al.
8,001,612 B1 8/2011 Wieder
8,020,005 B2 9/2011 Mani et al.
8,041,606 B2 10/2011 Mascavage, III et al.
8,050,997 B1 11/2011 Nosek et al.
8,060,389 B2 11/2011 Johnson
8,069,113 B2 11/2011 Elterich
8,069,115 B2 11/2011 Schoenberg et al.
8,073,772 B2 12/2011 Bishop et al.
8,073,773 B2 12/2011 Kozee et al.
8,086,497 B1 12/2011 Oakes, III
8,103,584 B2 1/2012 Bishop et al.
8,103,585 B2 1/2012 Bishop et al.
8,109,435 B2 2/2012 Mayo et al.
8,112,354 B2 2/2012 Lalwani
8,121,894 B2 2/2012 Mason
8,121,945 B2 2/2012 Rackley et al.
8,123,124 B2 2/2012 Salazar et al.
8,126,793 B2 2/2012 Jones
8,165,934 B2 4/2012 Manista et al.
8,165,958 B1 4/2012 McLaughlin et al.
8,180,706 B2 5/2012 Bishop et al.
8,190,514 B2 5/2012 Bishop et al.
8,195,565 B2 6/2012 Bishop et al.
8,224,725 B2 7/2012 Grim, III et al.
8,229,850 B2 7/2012 Dilip et al.
8,234,212 B2 7/2012 Bishop et al.
8,244,609 B2 8/2012 Prakash et al.
8,249,965 B2 8/2012 Tumminaro
8,249,983 B2 8/2012 Dilip et al.
8,255,278 B1 8/2012 Young et al.
8,255,327 B2 8/2012 Kemper et al.
8,255,336 B2 8/2012 Dilip et al.
8,266,028 B2 9/2012 Bulman et al.
8,266,065 B2 9/2012 Dilip et al.
8,275,704 B2 9/2012 Bishop et al.
8,290,835 B2 10/2012 Homer et al.
8,290,862 B2 10/2012 Sheehan et al.
8,290,863 B2 10/2012 Sheehan et al.
8,290,865 B2 10/2012 Lawrence
8,310,346 B2 11/2012 Burbridge et al.
8,311,913 B2 11/2012 Marchetti et al.
8,311,914 B2 11/2012 Marchetti et al.
8,311,937 B2 11/2012 Marchetti et al.
8,311,942 B1 11/2012 Mason
8,321,341 B2 11/2012 Nandy
8,341,046 B2 12/2012 Marchetti et al.
8,342,407 B2 1/2013 Williams et al.
8,352,365 B1 1/2013 Goldberg et al.
8,370,265 B2 2/2013 Coulter et al.
8,370,639 B2 2/2013 Azar et al.
8,374,932 B2 2/2013 Marchetti et al.
8,380,177 B2 2/2013 Laracey
8,380,591 B1 2/2013 Kazenas et al.
8,380,622 B2 2/2013 Bushman et al.
8,401,939 B2 3/2013 Lam et al.
8,402,555 B2 3/2013 Grecia

(56) References Cited

U.S. PATENT DOCUMENTS 8,407,124 B2 3/2013 Uehara et al.
8,407,141 B2 3/2013 Mullen et al.
8,417,628 B2 4/2013 Poplawski et al.
8,423,460 B2 4/2013 Kay et al.
8,433,629 B2 4/2013 Murtaugh et al.
8,458,086 B2 6/2013 Bishop et al.
8,458,774 B2 6/2013 Ganesan
8,467,766 B2 6/2013 Rackley et al.
8,484,104 B1 7/2013 Hurlbutt et al.
8,498,914 B2 7/2013 Hazelhurst
8,521,657 B2 8/2013 Kuebert et al.
8,527,413 B2 9/2013 Heller
8,532,021 B2 9/2013 Tumminaro
8,533,079 B2 9/2013 Sharma
8,533,860 B1 9/2013 Grecia
8,549,601 B2 10/2013 Ganesan
8,560,417 B2 10/2013 Mullen et al.
8,596,527 B2 12/2013 Bishop et al.
8,606,640 B2 12/2013 Brody et al.
8,615,457 B2 12/2013 Mullen et al.
8,634,559 B2 1/2014 Brown et al.
8,646,685 B2 2/2014 Bishop et al.
8,666,865 B2 3/2014 Mullen et al.
8,706,641 B2 4/2014 Bruesewitz et al.
8,713,325 B2 4/2014 Ganesan
8,719,905 B2 5/2014 Ganesan
8,738,526 B2 5/2014 Nosek et al.
8,745,699 B2 6/2014 Ganesan
8,751,347 B2 6/2014 Mullen et al.
8,751,381 B2 6/2014 Musser et al.
8,768,838 B1 7/2014 Hoffman
8,769,784 B2 7/2014 Ganesan et al.
8,775,306 B2 7/2014 Nosek et al.
8,788,389 B1 7/2014 Fernandes
8,789,153 B2 7/2014 Ganesan
8,794,509 B2 8/2014 Bishop et al.
8,806,592 B2 8/2014 Ganesan
8,814,039 B2 8/2014 Bishop et al.
8,820,633 B2 9/2014 Bishop et al.
8,887,247 B2 11/2014 Ganesan
8,887,308 B2 11/2014 Grecia
8,893,237 B2 11/2014 Ganesan
8,938,787 B2 1/2015 Turgeman
8,992,306 B2 3/2015 Iddings
9,235,831 B2 1/2016 Rolf
9,392,008 B1 7/2016 Michel et al.
D769,296 S 10/2016 Grecia
9,626,664 B2 4/2017 Bouey et al.
9,633,348 B2 4/2017 Rolf
9,691,056 B2 6/2017 Bouey et al.
9,697,517 B1 7/2017 Chambers
9,704,152 B1 7/2017 Rolf
9,805,601 B1 10/2017 Fields et al.
9,928,490 B1 3/2018 Vancini
9,965,760 B2 5/2018 Leber
9,996,878 B1 6/2018 Fox
D826,955 S 8/2018 Grecia
10,049,349 B1 8/2018 Grassadonia et al.
10,078,821 B2 9/2018 Bouey et al.
10,318,936 B2 6/2019 Muthu et al.
D857,054 S 8/2019 Grecia
D857,712 S 8/2019 Grecia
10,395,223 B2 8/2019 Muthu et al.
10,395,247 B2 8/2019 Gilliam, III et al.
10,410,217 B1 9/2019 Duke et al.
10,438,175 B2 10/2019 Finch et al.
10,607,217 B2 3/2020 Anderson
10,755,282 B1 8/2020 Duke et al.
10,762,477 B2 9/2020 Finch et al.
10,830,605 B1 11/2020 Chintakindi et al.
10,832,248 B1 11/2020 Kramme
10,878,387 B2 12/2020 Weinflash
11,010,766 B1 5/2021 Duke et al.
11,037,167 B1 6/2021 Duke et al.
11,042,877 B2 6/2021 Wolfs et al.
11,055,722 B1 7/2021 Duke et al.
11,151,522 B2 10/2021 Bartrim et al.
11,151,523 B2 10/2021 Bartrim et al.
11,157,884 B2 10/2021 Bartrim et al.
11,282,074 B2 3/2022 Kassemi
11,334,947 B1 5/2022 Fellowes et al.
11,373,182 B2 6/2022 Gilliam, III et al.
11,810,200 B1 11/2023 Meyer et al.
12,423,663 B1 9/2025 Reed
2001/0049724 A1 12/2001 Marcus
2002/0007320 A1 1/2002 Hogan et al.
2002/0013768 A1 1/2002 Ganesan
2002/0023054 A1 2/2002 Gillespie
2002/0029193 A1 3/2002 Ranjan et al.
2002/0046185 A1 4/2002 Villart et al.
2002/0052852 A1 5/2002 Bozeman
2002/0091635 A1 7/2002 Dilip et al.
2002/0128932 A1 9/2002 Yung et al.
2002/0143634 A1 10/2002 Kumar et al.
2002/0152156 A1 10/2002 Tyson-Quah
2002/0194080 A1 12/2002 Lourie
2002/0194119 A1 12/2002 Wright et al.
2002/0194503 A1 12/2002 Faith et al.
2003/0014316 A1 1/2003 Jaalinoja et al.
2003/0078884 A1 4/2003 Bauman
2003/0097331 A1 5/2003 Cohen
2003/0115151 A1 6/2003 Wheeler et al.
2003/0126094 A1 7/2003 Fisher et al.
2003/0130919 A1 7/2003 Templeton et al.
2003/0165328 A1 9/2003 Grecia
2003/0216996 A1 11/2003 Cummings et al.
2003/0220875 A1 11/2003 Lam et al.
2003/0220876 A1 11/2003 Burger et al.
2003/0233317 A1 12/2003 Judd
2003/0236728 A1 12/2003 Sunderji et al.
2004/0030645 A1 2/2004 Monaghan
2004/0034594 A1 2/2004 Thomas et al.
2004/0089711 A1 5/2004 Sandru
2004/0138955 A1 7/2004 Song et al.
2004/0139014 A1 7/2004 Song et al.
2004/0158522 A1 8/2004 Brown et al.
2004/0167854 A1 8/2004 Knowles et al.
2004/0193522 A1 9/2004 Binet et al.
2004/0230489 A1 11/2004 Goldthwaite et al.
2004/0259626 A1 12/2004 Akram et al.
2005/0008148 A1 1/2005 Jacobson
2005/0010523 A1 1/2005 Myklebust et al.
2005/0010786 A1 1/2005 Michener et al.
2005/0065891 A1 3/2005 Lee et al.
2005/0069135 A1 3/2005 Brickell
2005/0071283 A1 3/2005 Randle et al.
2005/0080716 A1 4/2005 Belyi et al.
2005/0125347 A1 6/2005 Akialis et al.
2005/0137948 A1 6/2005 Kissner et al.
2005/0144452 A1 6/2005 Lynch et al.
2005/0149455 A1 7/2005 Bruesewitz et al.
2005/0187873 A1 8/2005 Labrou
2005/0203959 A1 9/2005 Muller et al.
2005/0240527 A1 10/2005 Goldman
2005/0246292 A1 11/2005 Sarcanin
2005/0273842 A1 12/2005 Wright et al.
2005/0274793 A1 12/2005 Cantini et al.
2005/0289030 A1 12/2005 Smith
2005/0289061 A1 12/2005 Kulakowski
2006/0000892 A1 1/2006 Bonalle
2006/0014532 A1 1/2006 Seligmann
2006/0022048 A1 2/2006 Johnson
2006/0080243 A1 4/2006 Kemper et al.
2006/0080727 A1 4/2006 Hammons et al.
2006/0085314 A1 4/2006 Grim, III et al.
2006/0085357 A1 4/2006 Pizarro
2006/0106717 A1 5/2006 Randle et al.
2006/0116949 A1 6/2006 Wehunt et al.
2006/0116960 A1 6/2006 Gillin et al.
2006/0149632 A1 7/2006 Bhatti et al.
2006/0149635 A1 7/2006 Bhatti et al.
2006/0161772 A1 7/2006 Talstra et al.
2006/0165060 A1 7/2006 Dua
2006/0212401 A1 9/2006 Ameerally et al.

(56) References Cited

U.S. PATENT DOCUMENTS

2006/0224470 A1 10/2006 Ruano et al.
2006/0229960 A1 10/2006 Edelson
2006/0258397 A1 11/2006 Kaplan et al.
2006/0280339 A1 12/2006 Cho
2006/0282381 A1 12/2006 Ritchie
2006/0287004 A1 12/2006 Fuqua
2006/0287963 A1 12/2006 Steeves et al.
2007/0012757 A1 1/2007 Mayo et al.
2007/0046456 A1 3/2007 Edwards et al.
2007/0061590 A1 3/2007 Boye et al.
2007/0106892 A1 5/2007 Engberg
2007/0108269 A1 5/2007 Benco et al.
2007/0136167 A1 6/2007 Dilip et al.
2007/0136168 A1 6/2007 Dilip et al.
2007/0136169 A1 6/2007 Dilip et al.
2007/0156726 A1 7/2007 Levy
2007/0168281 A1 7/2007 Bishop et al.
2007/0174189 A1 7/2007 Bishop et al.
2007/0174214 A1 7/2007 Welsh et al.
2007/0179885 A1 8/2007 Bird et al.
2007/0198264 A1 8/2007 Chang
2007/0198405 A1 8/2007 Bishop et al.
2007/0198406 A1 8/2007 Bishop et al.
2007/0203821 A1 8/2007 DuFour
2007/0230371 A1 10/2007 Tumminaro
2007/0233615 A1 10/2007 Tumminaro
2007/0236330 A1 10/2007 Cho et al.
2007/0244811 A1 10/2007 Tumminaro
2007/0250440 A1 10/2007 Paulsen et al.
2007/0255620 A1 11/2007 Tumminaro et al.
2007/0255652 A1 11/2007 Tumminaro et al.
2007/0255653 A1 11/2007 Tumminaro et al.
2007/0255662 A1 11/2007 Tumminaro
2008/0010685 A1 1/2008 Holtzman et al.
2008/0011825 A1 1/2008 Giordano et al.
2008/0015982 A1 1/2008 Sokolic et al.
2008/0015985 A1 1/2008 Abhari et al.
2008/0015994 A1 1/2008 Bonalle et al.
2008/0032741 A1 2/2008 Tumminaro
2008/0033880 A1 2/2008 Fiebiger et al.
2008/0040171 A1 2/2008 Albers
2008/0046362 A1 2/2008 Easterly
2008/0082454 A1 4/2008 Dilip et al.
2008/0082828 A1 4/2008 Jennings et al.
2008/0086403 A1 4/2008 Dilip et al.
2008/0086426 A1 4/2008 Dilip et al.
2008/0091596 A1 4/2008 Labaton
2008/0091606 A1 4/2008 Grecia
2008/0097873 A1 4/2008 Cohen et al.
2008/0097899 A1 4/2008 Jackson et al.
2008/0109392 A1 5/2008 Nandy
2008/0120129 A1 5/2008 Seubert et al.
2008/0127319 A1 5/2008 Galloway et al.
2008/0140564 A1 6/2008 Tal et al.
2008/0141033 A1 6/2008 Ginter et al.
2008/0147536 A1 6/2008 Breen
2008/0162295 A1 7/2008 Bedier
2008/0167962 A1 7/2008 Lawe
2008/0177661 A1 7/2008 Mehra
2008/0189209 A1 8/2008 Loomis et al.
2008/0208737 A1 8/2008 Dilip et al.
2008/0208742 A1 8/2008 Arthur et al.
2008/0208743 A1 8/2008 Arthur et al.
2008/0210751 A1 9/2008 Kim
2008/0210752 A1 9/2008 March
2008/0222048 A1 9/2008 Higgins et al.
2008/0222199 A1 9/2008 Tiu et al.
2008/0227471 A1 9/2008 Dankar et al.
2008/0238610 A1 10/2008 Rosenberg
2008/0242274 A1 10/2008 Swanburg et al.
2008/0244271 A1 10/2008 Yu
2008/0244277 A1 10/2008 Orsini et al.
2008/0249936 A1 10/2008 Miller et al.
2008/0255993 A1 10/2008 Blinbaum
2008/0294563 A1 11/2008 Boutahar et al.
2008/0306872 A1 12/2008 Felsher
2008/0313264 A1 12/2008 Pestoni
2008/0313714 A1 12/2008 Fetterman et al.
2008/0319887 A1 12/2008 Pizzi et al.
2009/0006861 A1 1/2009 Bemmel
2009/0006920 A1 1/2009 Munson et al.
2009/0018909 A1 1/2009 Grecia
2009/0030843 A1 1/2009 Hoffman et al.
2009/0043705 A1* 2/2009 Bishop .................. G06Q 20/10 705/42
2009/0048885 A1 2/2009 Bishop et al.
2009/0048886 A1 2/2009 Bishop et al.
2009/0048887 A1 2/2009 Bishop et al.
2009/0048951 A1 2/2009 Bishop et al.
2009/0048952 A1 2/2009 Bishop et al.
2009/0048963 A1 2/2009 Bishop et al.
2009/0048966 A1 2/2009 Bishop et al.
2009/0048968 A1 2/2009 Bishop et al.
2009/0048969 A1 2/2009 Bishop et al.
2009/0048971 A1 2/2009 Hathaway et al.
2009/0068982 A1 3/2009 Chen et al.
2009/0070272 A1 3/2009 Jain
2009/0076956 A1 3/2009 Bishop et al.
2009/0076957 A1 3/2009 Bishop et al.
2009/0076958 A1 3/2009 Bishop et al.
2009/0083181 A1 3/2009 Bishop et al.
2009/0083541 A1 3/2009 Levine
2009/0089193 A1 4/2009 Paintin
2009/0089205 A1 4/2009 Bayne
2009/0089209 A1 4/2009 Bixler et al.
2009/0099961 A1* 4/2009 Ogilvy ................ G06Q 20/322 235/379
2009/0112658 A1 4/2009 Mullen et al.
2009/0112659 A1 4/2009 Mullen et al.
2009/0112660 A1 4/2009 Mullen et al.
2009/0112661 A1 4/2009 Mullen et al.
2009/0112662 A1 4/2009 Mullen et al.
2009/0112747 A1 4/2009 Mullen et al.
2009/0119190 A1 5/2009 Realini
2009/0119207 A1 5/2009 Grecia
2009/0119212 A1 5/2009 Liu et al.
2009/0125323 A1 5/2009 Lakshmanan et al.
2009/0125426 A1 5/2009 Bishop et al.
2009/0125446 A1 5/2009 Saunders et al.
2009/0132392 A1 5/2009 Davis et al.
2009/0132423 A1 5/2009 Liu
2009/0138388 A1 5/2009 Bishop et al.
2009/0150269 A1 6/2009 Bishop et al.
2009/0150270 A1 6/2009 Bishop et al.
2009/0150271 A1 6/2009 Bishop et al.
2009/0150288 A1 6/2009 Bishop et al.
2009/0157518 A1 6/2009 Bishop et al.
2009/0157519 A1 6/2009 Bishop et al.
2009/0164324 A1 6/2009 Bishop et al.
2009/0164325 A1 6/2009 Bishop et al.
2009/0164326 A1 6/2009 Bishop et al.
2009/0164327 A1 6/2009 Bishop et al.
2009/0164328 A1 6/2009 Bishop et al.
2009/0164329 A1 6/2009 Bishop et al.
2009/0164330 A1 6/2009 Bishop et al.
2009/0164331 A1 6/2009 Bishop et al.
2009/0192873 A1 7/2009 Marble
2009/0204457 A1 8/2009 Buhrmann et al.
2009/0204815 A1 8/2009 Dennis et al.
2009/0228365 A1 9/2009 Tomchek et al.
2009/0265241 A1 10/2009 Bishop et al.
2009/0265249 A1 10/2009 Bishop et al.
2009/0265250 A1 10/2009 Bishop et al.
2009/0265252 A1 10/2009 Fletcher
2009/0271277 A1 10/2009 Bishop et al.
2009/0271278 A1 10/2009 Bishop et al.
2009/0271303 A1 10/2009 Wang et al.
2009/0282259 A1 11/2009 Skorik et al.
2009/0287564 A1 11/2009 Bishop et al.
2009/0287565 A1 11/2009 Bishop et al.
2009/0287601 A1 11/2009 Tumminaro et al.
2009/0289106 A1 11/2009 Bishop et al.
2009/0299841 A1 12/2009 Bishop et al.
2009/0307072 A1 12/2009 Morales-Lema

(56) References Cited

U.S. PATENT DOCUMENTS

2009/0319425 A1 12/2009 Tumminaro et al.
2009/0327099 A1 12/2009 Patel et al.
2009/0327133 A1 12/2009 Aharoni et al.
2010/0010906 A1 1/2010 Grecia
2010/0030687 A1 2/2010 Panthaki et al.
2010/0031022 A1 2/2010 Kramer
2010/0042537 A1 2/2010 Smith et al.
2010/0042539 A1 2/2010 Dheer et al.
2010/0057622 A1 3/2010 Faith et al.
2010/0063935 A1 3/2010 Thomas et al.
2010/0070405 A1 3/2010 Joa
2010/0094765 A1 4/2010 Nandy
2010/0100480 A1 4/2010 Altman et al.
2010/0100899 A1 4/2010 Bradbury et al.
2010/0106611 A1 4/2010 Paulsen et al.
2010/0115610 A1 5/2010 Tredoux et al.
2010/0127822 A1 5/2010 Devadas
2010/0131415 A1 5/2010 Sartipi
2010/0138243 A1 6/2010 Carroll
2010/0161736 A1 6/2010 Picknelly
2010/0185868 A1 7/2010 Grecia
2010/0198645 A1 8/2010 Heiss et al.
2010/0198729 A1 8/2010 Kavounas
2010/0269166 A1 10/2010 Awad et al.
2010/0274678 A1 10/2010 Rolf et al.
2010/0274729 A1 10/2010 Holm et al.
2010/0293090 A1 11/2010 Domenikos et al.
2010/0306107 A1 12/2010 Nahari
2010/0312700 A1 12/2010 Coulter et al.
2010/0320266 A1 12/2010 White
2011/0055078 A1 3/2011 Nandy
2011/0055083 A1 3/2011 Grinhute
2011/0066523 A1 3/2011 Harrison
2011/0066551 A1 3/2011 Bruesewitz et al.
2011/0078078 A1 3/2011 Meier et al.
2011/0099382 A1 4/2011 Grecia
2011/0110508 A1 5/2011 LaFreniere et al.
2011/0112945 A1 5/2011 Cullen, III et al.
2011/0112954 A1 5/2011 Bruesewitz et al.
2011/0131130 A1 6/2011 Griffin et al.
2011/0145149 A1 6/2011 Valdes et al.
2011/0161211 A1 6/2011 Zhang et al.
2011/0161233 A1 6/2011 Tieken
2011/0173116 A1 7/2011 Yan et al.
2011/0173122 A1 7/2011 Singhal
2011/0184868 A1 7/2011 Acerte et al.
2011/0191160 A1 8/2011 Blackhurst et al.
2011/0196782 A1 8/2011 Allen et al.
2011/0202407 A1 8/2011 Buhrmann et al.
2011/0202415 A1 8/2011 Casares
2011/0202982 A1 8/2011 Alexander et al.
2011/0247058 A1 10/2011 Kisters
2011/0251869 A1 10/2011 Shekhter
2011/0251952 A1 10/2011 Kelly et al.
2011/0258111 A1 10/2011 Raj et al.
2011/0264543 A1 10/2011 Taveau et al.
2011/0264583 A1 10/2011 Cooper et al.
2011/0270749 A1* 11/2011 Bennett ................ G06Q 20/102 705/40
2011/0276473 A1 11/2011 Blok
2011/0276479 A1 11/2011 Thomas
2011/0282778 A1 11/2011 Wright et al.
2011/0288946 A1 11/2011 Baiya et al.
2011/0295746 A1* 12/2011 Thomas ............... G06Q 20/385 705/42
2011/0313921 A1 12/2011 Dheer et al.
2011/0320347 A1 12/2011 Tumminaro et al.
2012/0005749 A1 1/2012 Zoldi et al.
2012/0016731 A1 1/2012 Smith et al.
2012/0018511 A1 1/2012 Hammad
2012/0041876 A1 2/2012 Nosek et al.
2012/0066121 A1 3/2012 Shahbazi et al.
2012/0084201 A1 4/2012 Ostrovsky
2012/0089508 A1 4/2012 Lindbom et al.
2012/0095912 A1* 4/2012 James .................. G06Q 20/027 705/40
2012/0109802 A1 5/2012 Griffin et al.
2012/0116953 A1 5/2012 Klein et al.
2012/0130853 A1 5/2012 Petri et al.
2012/0130898 A1 5/2012 Snyder et al.
2012/0151220 A1 6/2012 Grecia
2012/0173409 A1 7/2012 Hu
2012/0173417 A1 7/2012 Lohman et al.
2012/0173610 A1 7/2012 Bleau et al.
2012/0203695 A1 8/2012 Morgan et al.
2012/0203700 A1 8/2012 Ornce et al.
2012/0209766 A1 8/2012 Kitchen et al.
2012/0215688 A1 8/2012 Musser
2012/0231814 A1 9/2012 Calman et al.
2012/0260322 A1 10/2012 Logan
2012/0265687 A1 10/2012 Dilip et al.
2012/0278239 A1 11/2012 Nosek et al.
2012/0284154 A1 11/2012 Creighton et al.
2012/0284175 A1 11/2012 Wilson et al.
2012/0290453 A1 11/2012 Manista et al.
2013/0018791 A1 1/2013 Mendocino et al.
2013/0018793 A1 1/2013 Wong et al.
2013/0024360 A1 1/2013 Ballout
2013/0036000 A1 2/2013 Giordano et al.
2013/0036048 A1 2/2013 Campos et al.
2013/0046559 A1 2/2013 Coleman
2013/0054452 A1 2/2013 Au et al.
2013/0060708 A1 3/2013 Oskolkov et al.
2013/0073455 A1 3/2013 McLaughlin et al.
2013/0073462 A1 3/2013 Zanzot et al.
2013/0080333 A1* 3/2013 Kamotskyy ........ G06Q 20/3672 705/41
2013/0080368 A1 3/2013 Nandy
2013/0085936 A1 4/2013 Law et al.
2013/0097078 A1 4/2013 Wong et al.
2013/0103576 A1 4/2013 Ackley
2013/0110658 A1 5/2013 Lyman et al.
2013/0110678 A1 5/2013 Vigier et al.
2013/0110724 A1 5/2013 Edwards
2013/0117178 A1 5/2013 Mullen et al.
2013/0124364 A1 5/2013 Mittal
2013/0124405 A1 5/2013 Hamzeh
2013/0124406 A1 5/2013 Poplawski et al.
2013/0138557 A1 5/2013 Mullen et al.
2013/0151384 A1 6/2013 Mullen et al.
2013/0159070 A1 6/2013 Salamone
2013/0179281 A1 7/2013 White et al.
2013/0179352 A1 7/2013 Dwyre et al.
2013/0185214 A1 7/2013 Azen et al.
2013/0197998 A1 8/2013 Buhrmann et al.
2013/0212010 A1 8/2013 Mullen et al.
2013/0226627 A1 8/2013 Kubovcik et al.
2013/0226801 A1 8/2013 Lyons et al.
2013/0232071 A1 9/2013 Dilip et al.
2013/0232075 A1 9/2013 Monaghan et al.
2013/0238488 A1 9/2013 Bouey et al.
2013/0238489 A1 9/2013 Bouey et al.
2013/0238490 A1 9/2013 Bouey et al.
2013/0238491 A1 9/2013 Bouey et al.
2013/0238492 A1 9/2013 Muthu et al.
2013/0246280 A1 9/2013 Kirsch
2013/0262296 A1 10/2013 Thomas et al.
2013/0262311 A1 10/2013 Buhrmann et al.
2013/0268839 A1 10/2013 Lefebvre et al.
2013/0282588 A1 10/2013 Hruska
2013/0293363 A1 11/2013 Plymouth et al.
2013/0297501 A1 11/2013 Monk et al.
2014/0006184 A1 1/2014 Godsey
2014/0006281 A1 1/2014 Leber
2014/0032691 A1 1/2014 Barton et al.
2014/0040069 A1 2/2014 Tomasofsky et al.
2014/0046820 A1 2/2014 Sunderji et al.
2014/0058862 A1 2/2014 Celkonas
2014/0059693 A1 2/2014 Stecher
2014/0067677 A1 3/2014 Ali et al.
2014/0070001 A1 3/2014 Sanchez et al.
2014/0081783 A1 3/2014 Paranjape et al.
2014/0114838 A1 4/2014 Nunes et al.

(56) References Cited

U.S. PATENT DOCUMENTS

| | | | |
|---|---|---|---|
| 2014/0122325 | A1 | 5/2014 | Zoldi et al. |
| 2014/0143146 | A1 | 5/2014 | Passanha et al. |
| 2014/0164246 | A1 | 6/2014 | Thomas et al. |
| 2014/0164541 | A1 | 6/2014 | Marcellino |
| 2014/0187205 | A1 | 7/2014 | Dankar et al. |
| 2014/0188586 | A1 | 7/2014 | Carpenter et al. |
| 2014/0188697 | A1 | 7/2014 | Bruesewitz et al. |
| 2014/0188728 | A1 | 7/2014 | Dheer et al. |
| 2014/0195425 | A1 | 7/2014 | Campos et al. |
| 2014/0244493 | A1* | 8/2014 | Kenyon ................. G06Q 20/36 705/41 |
| 2014/0244515 | A1 | 8/2014 | Garfinkle et al. |
| 2014/0304778 | A1 | 10/2014 | Grecia |
| 2014/0310142 | A1 | 10/2014 | Mak |
| 2014/0337230 | A1 | 11/2014 | Bacastow |
| 2014/0351137 | A1 | 11/2014 | Chisholm |
| 2014/0365350 | A1 | 12/2014 | Shvarts |
| 2014/0372308 | A1 | 12/2014 | Sheets |
| 2015/0026057 | A1 | 1/2015 | Calman et al. |
| 2015/0026061 | A1 | 1/2015 | Siegel et al. |
| 2015/0039498 | A1* | 2/2015 | Weiss ..................... G06Q 20/14 705/40 |
| 2015/0046181 | A1 | 2/2015 | Adjaoute |
| 2015/0046216 | A1 | 2/2015 | Adjaoute |
| 2015/0046224 | A1 | 2/2015 | Adjaoute |
| 2015/0052045 | A1 | 2/2015 | De Luca et al. |
| 2015/0066738 | A1 | 3/2015 | Tian et al. |
| 2015/0073975 | A1 | 3/2015 | Bomhofen et al. |
| 2015/0073977 | A1 | 3/2015 | Ghosh et al. |
| 2015/0081324 | A1 | 3/2015 | Adjaoute |
| 2015/0089568 | A1 | 3/2015 | Sprague et al. |
| 2015/0112866 | A1* | 4/2015 | Muthu ................. G06Q 20/385 705/44 |
| 2015/0186994 | A1 | 7/2015 | He |
| 2015/0193776 | A1 | 7/2015 | Douglas et al. |
| 2015/0235207 | A1 | 8/2015 | Murphy, Jr. et al. |
| 2015/0278773 | A1 | 10/2015 | Rolf et al. |
| 2015/0332273 | A1 | 11/2015 | Bruno |
| 2015/0348030 | A1 | 12/2015 | Cauwenberghs et al. |
| 2016/0034932 | A1 | 2/2016 | Sion et al. |
| 2016/0078443 | A1 | 3/2016 | Tomasofsky et al. |
| 2016/0078444 | A1 | 3/2016 | Tomasofsky et al. |
| 2016/0092872 | A1 | 3/2016 | Prakash et al. |
| 2016/0104133 | A1 | 4/2016 | Davis et al. |
| 2016/0140538 | A1 | 5/2016 | Einhorn |
| 2016/0188317 | A1 | 6/2016 | Hilliar et al. |
| 2016/0203490 | A1 | 7/2016 | Gupta et al. |
| 2016/0253663 | A1 | 9/2016 | Clark et al. |
| 2016/0267280 | A1 | 9/2016 | Mansour et al. |
| 2016/0283918 | A1 | 9/2016 | Weinflash |
| 2016/0300206 | A1 | 10/2016 | Novac et al. |
| 2016/0300207 | A1 | 10/2016 | Novac et al. |
| 2016/0300225 | A1 | 10/2016 | Novac et al. |
| 2016/0300226 | A1 | 10/2016 | Novac et al. |
| 2016/0321625 | A1 | 11/2016 | Gilliam, III et al. |
| 2016/0343043 | A1 | 11/2016 | Hicks et al. |
| 2017/0024719 | A1 | 1/2017 | Finch et al. |
| 2017/0024744 | A1 | 1/2017 | Finch et al. |
| 2017/0024828 | A1 | 1/2017 | Michel et al. |
| 2017/0039534 | A1 | 2/2017 | Smythe |
| 2017/0103399 | A1 | 4/2017 | Napsky et al. |
| 2017/0193514 | A1 | 7/2017 | Chen |
| 2017/0200143 | A1 | 7/2017 | Rolf |
| 2017/0200155 | A1 | 7/2017 | Fourez et al. |
| 2017/0221056 | A1 | 8/2017 | Karpenko et al. |
| 2017/0262842 | A1 | 9/2017 | Subbarayan et al. |
| 2017/0300881 | A1 | 10/2017 | Weinflash et al. |
| 2017/0308887 | A1 | 10/2017 | Rolf |
| 2017/0344960 | A1 | 11/2017 | Garlick et al. |
| 2017/0344964 | A1 | 11/2017 | Garlick et al. |
| 2017/0344983 | A1 | 11/2017 | Muftic |
| 2018/0039990 | A1 | 2/2018 | Lindemann |
| 2018/0041503 | A1 | 2/2018 | Lindemann |
| 2018/0046994 | A1 | 2/2018 | Maenpaa et al. |
| 2018/0191501 | A1 | 7/2018 | Lindemann |
| 2018/0191695 | A1 | 7/2018 | Lindemann |
| 2019/0012647 | A1 | 1/2019 | Bouey et al. |
| 2019/0034930 | A1 | 1/2019 | Wolfs et al. |
| 2019/0043052 | A1 | 2/2019 | Ledford et al. |
| 2019/0095919 | A1 | 3/2019 | Legault et al. |
| 2019/0102840 | A1 | 4/2019 | Perl et al. |
| 2019/0164156 | A1 | 5/2019 | Lindemann |
| 2019/0287180 | A1 | 9/2019 | Vartanian |
| 2019/0318354 | A1 | 10/2019 | Weinflash et al. |
| 2019/0340590 | A1 | 11/2019 | Davey et al. |
| 2019/0394041 | A1 | 12/2019 | Jain et al. |
| 2020/0118089 | A1 | 4/2020 | Bartrim et al. |
| 2020/0118090 | A1 | 4/2020 | Bartrim et al. |
| 2020/0118091 | A1 | 4/2020 | Bartrim et al. |
| 2020/0175786 | A1 | 6/2020 | Bongers |
| 2020/0202337 | A1 | 6/2020 | Shteynberg et al. |
| 2020/0211028 | A1 | 7/2020 | Uju |
| 2020/0356997 | A1 | 11/2020 | Barnhardt et al. |
| 2020/0364720 | A1 | 11/2020 | Lally et al. |
| 2021/0073816 | A1 | 3/2021 | Detchemendy et al. |
| 2021/0326938 | A1 | 10/2021 | Wandji |
| 2021/0374748 | A1 | 12/2021 | Wolfs et al. |
| 2021/0398113 | A1 | 12/2021 | Bernert et al. |
| 2022/0027992 | A1 | 1/2022 | Blevins |
| 2022/0044313 | A1 | 2/2022 | Cox et al. |
| 2022/0058593 | A1 | 2/2022 | Chokshi et al. |
| 2022/0101319 | A1 | 3/2022 | Gilliam, III et al. |
| 2022/0129902 | A1 | 4/2022 | Edwards et al. |
| 2022/0327515 | A1 | 10/2022 | Pandya et al. |
| 2023/0214811 | A1 | 7/2023 | White et al. |

FOREIGN PATENT DOCUMENTS

| | | | |
|---|---|---|---|
| AU | 8870801 | | 4/2002 |
| AU | 2002252137 | | 9/2002 |
| BR | PI0710021 | | 8/2011 |
| BR | PI0710089 | | 8/2011 |
| CA | 2229012 | | 3/1997 |
| CA | 2239875 | | 6/1997 |
| CA | 2323500 | | 9/1999 |
| CA | 2329348 | | 11/1999 |
| CA | 2316090 | | 2/2001 |
| CA | 2402353 | | 9/2001 |
| CA | 2423048 | | 3/2002 |
| CA | 2437949 | | 8/2002 |
| CA | 2436319 | | 2/2004 |
| CA | 2647602 | | 3/2008 |
| CA | 2647636 | | 3/2008 |
| CN | 101454794 | | 6/2009 |
| CN | 101454795 | | 6/2009 |
| CN | 208035358 | U | 11/2018 |
| EP | 865010 | | 9/1998 |
| EP | 820620 | | 3/1999 |
| EP | 998731 | | 5/2000 |
| EP | 1107198 | | 6/2001 |
| EP | 1184823 | | 3/2002 |
| EP | 1208513 | | 5/2002 |
| EP | 1400053 | | 3/2004 |
| EP | 1416455 | | 5/2004 |
| EP | 1504393 | | 2/2005 |
| EP | 2008237 | | 12/2008 |
| EP | 2013842 | | 1/2009 |
| EP | 2266083 | | 12/2010 |
| EP | 2304678 | | 4/2011 |
| EP | 2344994 | | 7/2011 |
| EP | 2387772 | | 11/2011 |
| EP | 2407918 | | 1/2012 |
| EP | 2407919 | | 1/2012 |
| EP | 2438562 | | 4/2012 |
| GB | 2297856 | | 8/1996 |
| GB | 2384084 | | 7/2003 |
| GB | 2454614 | | 5/2009 |
| JP | 09282367 | | 10/1997 |
| JP | H11265413 | | 9/1999 |
| JP | 2000311209 | | 11/2000 |
| JP | 2002049872 | | 2/2002 |
| JP | 2002298041 | | 10/2002 |
| JP | 2003308437 | | 10/2003 |
| JP | 2004192437 | | 7/2004 |

(56) References Cited

FOREIGN PATENT DOCUMENTS

| | | | | |
|---|---|---|---|---|
| JP | 2004532448 | | 10/2004 | |
| JP | 2005512173 | | 4/2005 | |
| JP | 2006285329 | | 10/2006 | |
| JP | 2007128192 | | 5/2007 | |
| JP | 2008102914 | | 5/2008 | |
| JP | 2008262601 | | 10/2008 | |
| JP | 2014132474 | | 7/2014 | |
| KR | 1020120075590 | | 7/2012 | |
| KR | 1020140099676 | | 8/2014 | |
| KR | 101457750 | B1 | 11/2014 | |
| MX | 2008012503 | | 12/2008 | |
| MX | 2008012504 | | 5/2009 | |
| NL | 1018913 | | 3/2003 | |
| SE | 9703800 | | 4/1999 | |
| TW | 200919343 | | 5/2009 | |
| WO | 1997002539 | | 1/1997 | |
| WO | 1997016798 | | 5/1997 | |
| WO | 1999024891 | | 5/1999 | |
| WO | 1999034311 | | 7/1999 | |
| WO | 1999046720 | | 9/1999 | |
| WO | 2000055793 | | 9/2000 | |
| WO | 2000058876 | | 10/2000 | |
| WO | 2001033522 | | 5/2001 | |
| WO | 2001055984 | | 8/2001 | |
| WO | 2001067364 | | 9/2001 | |
| WO | 2002025534 | | 3/2002 | |
| WO | 2002025605 | | 3/2002 | |
| WO | 2002035429 | | 5/2002 | |
| WO | 2002069561 | | 9/2002 | |
| WO | 2002073483 | | 9/2002 | |
| WO | 2003091849 | | 11/2003 | |
| WO | WO-2004099910 | A2 * | 11/2004 | ............. G06Q 30/04 |
| WO | 2005004026 | | 1/2005 | |
| WO | 2005057455 | | 6/2005 | |
| WO | 2007116368 | | 10/2007 | |
| WO | 2008011102 | | 1/2008 | |
| WO | 2008027620 | | 3/2008 | |
| WO | 2008027621 | | 3/2008 | |
| WO | 2008110791 | | 9/2008 | |
| WO | 2009058526 | | 5/2009 | |
| WO | 2009097215 | | 8/2009 | |
| WO | 2009114876 | | 9/2009 | |
| WO | 2009152184 | | 12/2009 | |
| WO | 2009158420 | | 12/2009 | |
| WO | 2010039101 | | 4/2010 | |
| WO | 2010082960 | | 7/2010 | |
| WO | 2010083113 | | 7/2010 | |
| WO | 2010138358 | | 12/2010 | |
| WO | 2010138359 | | 12/2010 | |
| WO | 2010138611 | | 12/2010 | |
| WO | 2010138613 | | 12/2010 | |
| WO | 2010138615 | | 12/2010 | |
| WO | 2010141662 | | 12/2010 | |
| WO | 2011008625 | | 1/2011 | |
| WO | 2011137082 | | 11/2011 | |
| WO | 2011163525 | | 12/2011 | |
| WO | 2012075187 | | 6/2012 | |
| WO | 2012151660 | A1 | 11/2012 | |
| WO | 2013076436 | A1 | 5/2013 | |
| WO | WO-2015154119 | A1 * | 10/2015 | ........... G06Q 20/085 |
| WO | 2017011596 | | 1/2017 | |
| WO | 2017014815 | | 1/2017 | |

OTHER PUBLICATIONS

NoPass, "No Password Login | Touch ID Fingerprint iPhone App," available at https://web.archive.org/web/20150328095715/http://www.nopassapp.com/, Mar. 28, 2015.

Constant Contact Tech Blog, "iOS Security: How Apple Protects Data on iOS Devices—Part 1," available at https://web.archive.org/web/20150403175348/https://techblog.constantcontact.com/software-development/ios-security/, Dec. 8, 2014.

NoPass, "Register," available at https://web.archive.org/web/20141222172212/http://www.nopassapp.com/register/, Dec. 22, 2014.

NoPass, "Login," available at https://web.archive.org/web/20141222170523/http://www.nopassapp.com/login/, Dec. 22, 2014.

Apple, "iOS Security," available at https://web.archive.org/web/20140226213513/http://images.apple.com/iphone/business/docs/IOS_Security_Feb14.pdf, Feb. 2014.

EBay Developers Program, "eBay Web Services XML API Guide," 2005.

Federal Financial Institutions Examination Council (Wholesale Payment System, https://ithandbook.ffiec.gov/media/274899/ffiec_itbooklet_wholesalepaymentsystems.pdf, Section 4, Jul. 2004.

Oldfield et al., "The Place of Risk Management in Financial Institutions," The Wharton School, Financial Institutional Center, University of Pennsylvania, 1995.

International Search Report for PCT/US2016/042163, dated Sep. 26, 2016.

International Search Report and Written Opinion for PCT/US2016/026000, dated Jul. 13, 2016.

International Search Report and Written Opinion for PCT/US11/33828, dated Jul. 12, 2011, 11 pages.

International Search Report for PCT/US10/36231, dated Nov. 8, 2010, 8 pages.

International Search Report for PCT/US10/36233, dated Jul. 28, 2010, 7 pages.

International Search Report for PCT/US10/36229, dated Jul. 28, 2010, 12 pages.

International Search Report for PCT/US10/35465, dated Jul. 13, 2010, 7 pages.

International Search Report for PCT/US09/48490, dated Jul. 31, 2009, 1 page.

"Greg's diary", Aug. 2009, available at http://www.lemis.com/grog/diary-aug2009.php?dirdate=20090807&imagesizes=11111111111111111113#Photo-19.

Trusted Computing Platform Alliance (TCPA), Main Specification Version 1. 1b, Published by the Trusted Computing Group, 2003, 332 pages.

Benson, Carol Coye, "Faster, Better, Cheaper—Like it or Not," http://paymentsviews.com/2013/03/13/faster-better-cheaper-like-it-or-not/, Mar. 13, 2013.

Fiserv, Inc., "Popmoney(R): Instant Payments—Now You Can Deliver Funds in Real Time," Feb. 6, 2014 [retrieved online from https://www.fiserv.com/resources/Popmoney_Instant_Payments_2_06_2014.pdf on Aug. 7, 2015].

Gayle C. Avery, Ellen Baker; Reframing the Infomated Household-Workplace; Information & Organization, 2002, vol. 12, Aug. 2001.

Mark Bernkopf; Electronic Cash and Monetary Policy; First Monday, vol. 1, No. 1-6, May 1996.

Electronic Payment Systems in European Countries; Country Synthesis Report; Böhle, Rader, Riehm, Institut far Technikfolgenabschatzung and Systemanalyse for the European Science and Technology Observatory Network (ESTO); Final Version, Sep. 1999.

Mark E. Budnitz; Electronic Money in the 1990s: A Net Benefit or Merely a Trade-Off?; 9 Ga. St. U. L. Rev. 747, 1992-1993.

Chida, Mambo, Shizuya; Digital Money—A Survey; Received Jun. 15, 2001; Revised Aug. 21, 2001; Interdisciplinary Information Sciences. vol. 7, No. 2, pp. 135-165 (2001).

Harold L. Frohman, William R. Ledder; Defense Transportation's EDI Program: A Security Risk Assessment; PL205LN5; Logistics Management Institute; May 1993.

Aryya Gangopadhyay; Managing Business with Electronic Commerce: Issues & Trends; Idea Group Publishing (2002).

Hans van der Heijden; Factors Affecting the Successful Introduction of Mobile Payment Systems; Vrije Universiteit Amsterdam; 15th Bled Electronic Commerce Conference eReality; Constructing the eEconomy; Bled, Solvenia, Jun. 17-19, 2002.

Lorin M. Hitt and Frances X. Frei; Do Better Customers Utilize Electronic Distribution Channels? The Case of PC Banking; Dec. 2001.

Eun Kim, Petra Schubert, Dorian Seltz and Bumtae Kim; The EBMG Reference Model on Electronic Markets: The Korean Case of JODAL (2007).

(56) References Cited

OTHER PUBLICATIONS

Glenbrook Partners; PayPal in the Air!—A look at PayPal Mobile; Payment News; Glenbrook eCommerce Market Analysis Reports (2006).
Sangjo Oh, Heejin Lee, Sherah Kurnia, Robert B. Johnston, Ben Lim; A Stakeholder Perspective on Successful Electronic Payment Systems Diffusion; Proceedings of the 39th Hawaii International Conference on Systems Sciences, 2006.
John R. Palumbo; Naval Postgraduate School, Monterey, California; Thesis, Financial Transaction Mechanisms for World Wide Web Applications, Mar. 1996.
Tua-Fu Pao; Naval Postgraduate School, Monterey, California; Thesis, Security Management of Electronic Data Interchange; Jun. 1993.
Tobern P. Pedersen; Electronic Payments of Small Amounts; Aarhus University (1998).
Eveline Franco Veloso; The Business Revolution through B2B Market Tone and its Impacts over the Financial System gong into 21st Century; The Institute of Brazilian Business and Management Issues; XII Minerva Program—Fall 2000, 2000.
Alladi Venkatesh and Nicholas Vitalari; Households and Technology: The Case of Home Computers-Some Conceptual and Theoretical Issues; originally appeared in M.L. Roberts and L. Wortzel (eds.) Marketing to the Changing Household, Ballinger Publishing, 1985, pp. 187-203.
A. Vilmos and S. Narnouskos; SEMOPS: Design of a New Payment Service; International Workshop on Mobile Commerce Technologies & Applications (MCTA 2003), In proceedings of the 14th International Conference DEXA 2003, Sep. 1-5, 2003, Prague, Czech Republic.
Raja Mohn Rosli bin Raja Zulkifli; Building a World Class Infrastructure to Support E-Commerce in Malaysia; 1997 Telekom Malaysia, 1997.
Chang, et al., "Smart Phone for Mobile Commerce," Computer Standards & Interfaces 31.4, pp. 740-747, 2009.
NACHA (Business-to-Business EIPP: Presentment Models and Payment Options, http:/euro.ecom.cmu.edu/resources/elibrary/epay/B2BPaymentOptions.pdf, 2001), (Year: 2001).
International Trade Administration (export.gov), "Chapter 1: Methods of Payment in International Trade," https://2016.export.gov/tradefinanceguide/eg_main_043221.asp, Nov. 7, 2012 (Year: 2012).
The PayPal Account, Chapter 2, link.springer.com, Apr. 30, 2007.
Provident Bank, Universal Payment Identification Code (UPIC) guide (Year: 2016).
Gajek, Sebastian, et al., "TruWallet: Trustworthy and Migratable Wallet-Based Web Authentication," Proceedings of the 2009 ACM Workshop on Scalable Trusted Computing, 2009, (Year: 2009).
Peters, M., "3 Reasons a Digital World Requires Digital Payments—Why franchisees should consider integrated software for payment processing," Franchising World, pp. 32-33 Nov. 2018.
Hosseini, Z.Z. and Barkhordari, E., "Enhancement of Security with the Help of Real Time Authentication and One Time Password in e-Commerce Transactions," The 5th Conference on Information and Knowledge Technology, Shiraz, Iran, 2013, pp. 268-273 2013.
PayPal introduces global payments platform PayPal X, Nov. 5, 2009, https://thepayers.com/online-payments/paypal-introduces-global-payments-platform-paypal-x--739940# (The Payers, Year: 2009).
Westland et al., "Secure Digital Payments," in Global Electronic Commerce: Theory and Case Studies, MIT Press, 1999, pp. 465-528. (Secure) (Year: 1999) 1999.
Wang, Xin & Xu, Xiaomin & Feagan, Lance & Huang, Sheng & Jiao, Limei & Zhao, Wei. (2018). Inter-Bank Payment System on Enterprise Blockchain Platform. 2018 IEE 11th International Conference on Cloud Computing (Cloud), San Franscico, CA, USA, 2018, pp. 614-621 (Interbank) (Year: 2018) 10.1109/CLOUD.2018.00085. 2018.
Flake, S. et al., Real-Time Billing as a Service. Sep. 1, 2014. (Year: 2014).

* cited by examiner

FIG. 39
3900
VISA®
3910
Sending $100
to Visa
3920
On January 25, 2016
3930
Cancel payment
3940

SECURE ELECTRONIC BILLING WITH REAL-TIME FUNDS AVAILABILITY

CROSS-REFERENCE TO RELATED APPLICATIONS

This application is a continuation-in-part of U.S. patent application Ser. No. 15/851,548, filed on Dec. 21, 2017, which is a continuation-in-part of U.S. patent application Ser. No. 15/640,896, filed Jul. 3, 2017, which is a continuation-in-part of U.S. patent application Ser. No. 15/131,972, filed Apr. 18, 2016, which is a continuation-in-part of U.S. patent application Ser. No. 14/665,861, filed Mar. 23, 2015. U.S. patent application Ser. No. 15/131,972 claims the benefit of U.S. Provisional Application No. 62/222,773, filed Sep. 23, 2015. U.S. patent application Ser. No. 15/640,896 claims the benefit of U.S. Provisional Application No. 62/357,562, filed Jul. 1, 2016. This application claims the benefit of U.S. Provisional Application No. 62/690,305, filed Jun. 26, 2018. U.S. patent application Ser. Nos. 15/851,548, 15/640,896, 15/131,972, and 14/665,861, and U.S. Provisional Application Nos. 62/690,305, 62/357,562, and 62/222,773, are incorporated herein by reference in their entirety.

TECHNICAL FIELD

This disclosure relates generally to transaction processing, and relates more particularly to secure electronic billing with real-time funds availability.

BACKGROUND

In conventional payment methods, after a biller sends a bill to a customer, the customer can initiate a payment to the biller through different methods, such as through the customer's financial institution, a consolidated bill-pay provider, or the biller's financial institution, for example. These conventional methods, however, generally do not allow the biller to have immediate access to the payment funds in real-time after the customer has initiated the payment to the biller, and generally are predicated on a bill being sent to the customer.

BRIEF DESCRIPTION OF THE DRAWINGS

To facilitate further description of the embodiments, the following drawings are provided in which.

Figure 1:
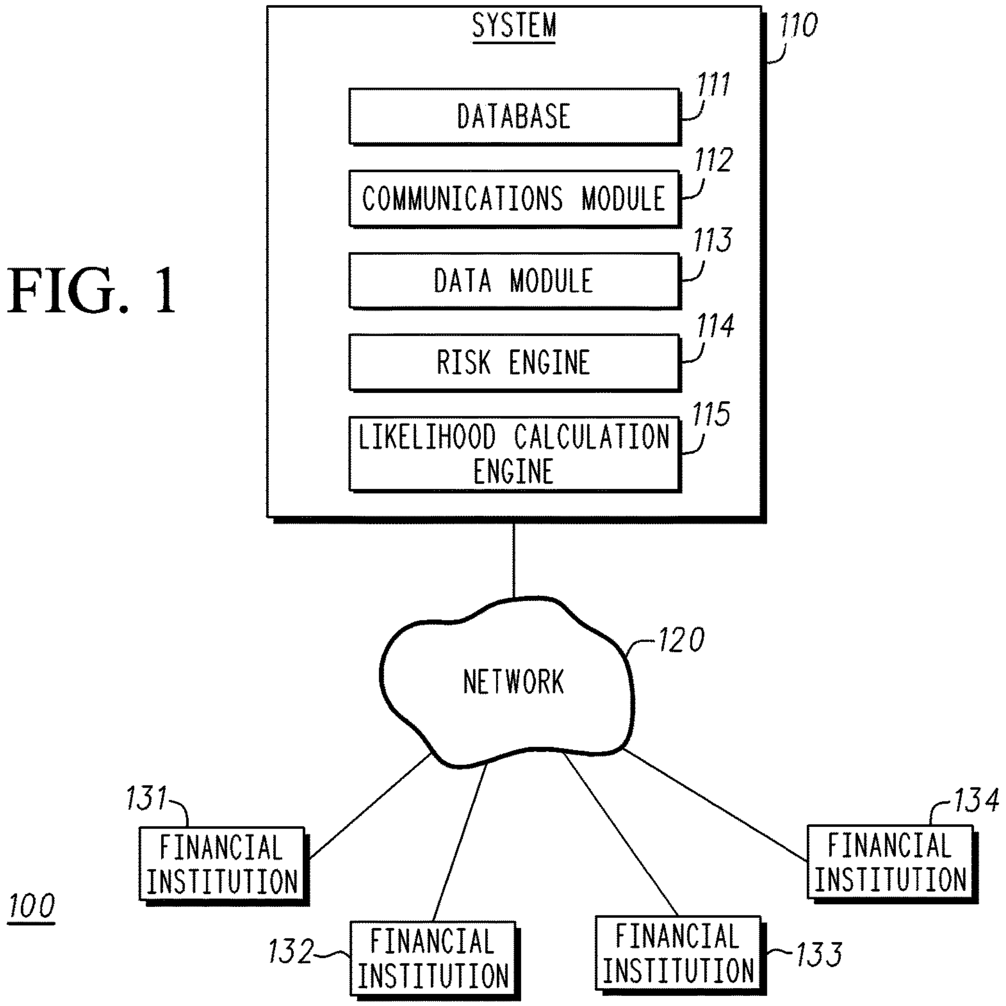
FIG. 1 illustrates a block diagram of a system that can be employed for real-time determination of funds availability for check and ACH items, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms “first,” “second,” “third,” “fourth,” and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms “include,” and “have,” and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms “left,” “right,” “front,” “back,” “top,” “bottom,” “over,” “under,” and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms “couple,” “coupled,” “couples,” “coupling,” and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. “Electrical coupling” and the like should be broadly understood and include electrical coupling of all types. The absence of the word “removably,” “removable,” and the like near the word “coupled,” and the like does not mean that the coupling, etc. in question is or is not removable.

As defined herein, two or more elements are “integral” if they are comprised of the same piece of material. As defined herein, two or more elements are “non-integral” if each is comprised of a different piece of material.

As defined herein, “approximately” can, in some embodiments, mean within plus or minus ten percent of the stated value. In other embodiments, “approximately” can mean within plus or minus five percent of the stated value. In further embodiments, “approximately” can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, two minutes, or five minutes.

DESCRIPTION OF EXAMPLES OF EMBODIMENTS

In some conventional systems, when a first financial institution receives a payment item from a payee, such as a check or an ACH item, to be paid from a payor's account maintained by a second financial institution, the first financial institution generally does not interact with the second financial institution to determine whether to accept the transaction and/or make the funds for the payment item immediately available to the payee. Instead, the first financial institution generally makes that determination based on information about the payee, such as the payee's credit history and/or information about the payee's account(s) (e.g., account balances) maintained by the first financial institution. In some instances, the first financial institution may seek information about the payor's account maintained by the second financial institution through a third-party fraud-prevention service, which generally provides information about whether the account is open and in good status, has had recent activity for not-sufficient funds (NSF) or other return activity, or had a stop payment order. The fraud-prevention service generally derives this information based on overnight batch data received from financial institutions, which in some cases can include the second financial institution.

In various conventional payment methods, after a biller sends a bill to a customer, the customer can initiate a payment to the biller through various different methods, such as through the customer's financial institution, a consolidated bill-pay provided, or the biller's financial institution, for example. These conventional methods, however, generally do not allow the biller to have immediate access to the payment funds in real-time after the customer has initiated the payment to the biller.

Figure 8:
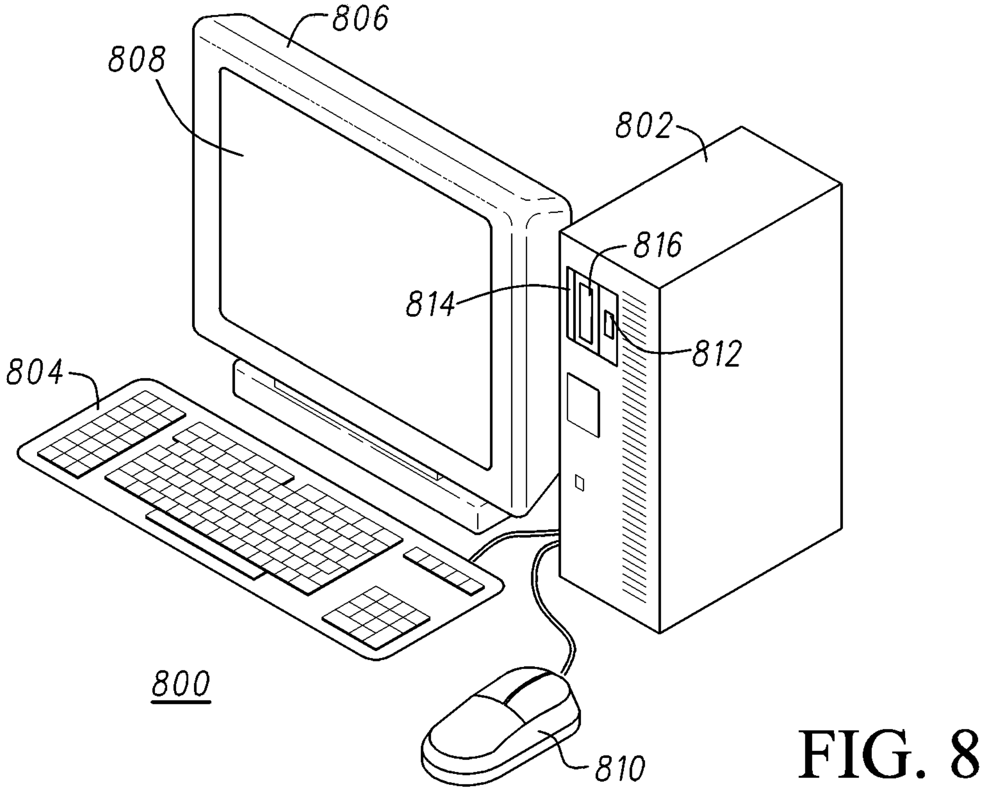
FIG. 8 illustrates a computer that is suitable for implementing an embodiment of the system of FIG. 1 and/or the system of FIG. 2.

Turning to the drawings, FIG. 1 illustrates a block diagram of a system 100 that can be employed for real-time determination of funds availability for check and ACH items, according to an embodiment. System 100 is merely exemplary and embodiments of the system are not limited to the embodiments presented herein. The system can be employed in many different embodiments or examples not specifically depicted or described herein. In some embodiments, certain elements or modules of system 100 can perform various procedures, processes, and/or activities. In other embodiments, the procedures, processes, and/or activities can be performed by other suitable elements or modules of system 100. In some embodiments, system 100 can include a system 110. System 110 can be a computer system, such as computer system 800, as shown in FIG. 8 and described below, and can each be a single computer, a single server, or a cluster or collection of computers or servers, or a cloud of computers or servers. In several embodiments, system 110 can include a database 111. In a number of embodiments, system 110 can include one or more modules, such as a communications module 112, a data module 113, a risk engine 114, and/or a likelihood calculation engine 115, which are described below in further detail.

In many embodiments, system 110 can be in data communication through a network 120 with financial institutions, such as financial institutions 131, 132, 133, and/or 134. Network 120 can be the Internet or another suitable computer data network. In certain embodiments, each of financial institutions 131-134 can include a computer system, such as computer system 800, as shown in FIG. 8 and described below, and can each be a single computer, a single server, or a cluster or collection of computers or servers, or a cloud of computers or servers. In many embodiments, the financial institutions (e.g., 131-134) can be depository financial institutions, such as savings banks, credit unions, savings and loan associations, etc. In other embodiments, other forms of financial institutions and/or other entities can be connected to system 110 through network 120.

In a number of embodiments, system 110 can regularly receive information from financial institutions, such as financial institutions 131-134, about accounts maintained by the financial institutions (e.g., 131-134). In various embodiments, the information received from the financial institutions can be stored in database 111. For example, in many embodiments, each of financial institutions (e.g., 131-134) can provide overnight batch data to system 110, which can include information about whether accounts are open and in good status, what balances are available in the open accounts, whether accounts have had recent not sufficient funds (NSF) or other activity, and/or whether accounts have had a stop payment order. In a number of embodiments, system 110 can use the data provided by the financial institutions to provide fraud-prevention services to financial institutions (e.g., 131-134). For example, if a payee attempts to cash a check at financial institution 131 for a check drawn on a payor's account maintained at financial institution 132, financial institution 131 can inquire with system 110 about information regarding the payor's account at financial institution 132.

In the same or other embodiments, system 110 can provide for interaction between the financial institutions (e.g., 131-134). For example, in many embodiments, system 110 can provide protocols for a financial institution (e.g., 131) to communicate with another one of the financial institutions (e.g., 132) through system 110 to obtain additional information about whether the other financial institution (e.g., 132) that is specified as responsible for paying a payment item is likely to pay the payment item. In some embodiments, the payment item can be a check. In other embodiments, the payment item can be an ACH item. For example, a check can be drawn on an account at the other financial institution (e.g., 132), or an ACH item can specific an account at the other financial institution (e.g., 132) for payment, and financial institution 132 can be deemed responsible for paying the payment item using the specified account. In a number of embodiments, the interactions between the financial institutions (e.g., 131-134) through system 110 can be limited to inquiries regarding checks or ACH items, and not include inquiries regarding payment card transactions (e.g., debit card, credit card, etc.). In other embodiments, the interactions between the financial institutions (e.g., 131-134) through system 110 can include payment card transactions.

In some embodiments, system 110 can determine whether to route an inquiry from a financial institution (e.g., 131) receiving a payment item to another financial institution (e.g., 132) specified by the payment item as responsible for paying the payment item. The determination can be based on one or more factors, as described below in further detail. In several embodiments, the financial institution (e.g., 132) that is specified by the payment item as responsible for paying the payment item can respond with information regarding a likelihood of that financial institution (e.g., 132) paying the payment item. In other embodiments, information regarding a likelihood of that financial institution (e.g., 132) to pay the payment item, such as information provided regularly (e.g., twice daily, hourly, half-hourly, on each transaction, etc.), can be provided to system 110 by that financial institution (e.g., 132). In many embodiments, the financial institution (e.g., 131) that received the payment item can receive the information regarding the likelihood of payment by the financial institution (e.g., 132) that is specified by the payment item as responsible for paying the payment item, and can use that information and/or other information provided by system 110 to determine whether to approve or deny the transaction. In many embodiments, system 110 can facilitate real-time determination of funds availability on a scale of many financial institutions (e.g., greater than 5, 10, 20, 50, 100, 500, 1000, 10,000, or more financial institutions) and can facilitate many such transactions (e.g., greater than 100, 1,000, 10,000, 100,000, 1,000,000, 10,000,000, or more per day) through system 110.

In certain embodiments, system 110 can provide interaction between the financial institutions (e.g., 131-134) for providing credit push notifications. For example, in many embodiments, system 110 can provide protocols for a financial institution (e.g., 131) to communicate with another one of the financial institutions (e.g., 132) through system 110 to notify the other financial institution (e.g., 132) of a credit push payment. In some embodiments, for example, a customer can initiate notification of an ACH credit transaction at financial institution 131 (which can be an originating depository financial institution (ODFI)) to credit an account of a recipient at financial institution 132 (which can be a receiving depository financial institution (RDFI)), which can result in a memo post to the account of the recipient at financial institution 132 in real-time. In many embodiments, the credit push transaction can be cleared through conventional batch processing (e.g., nightly or interim day batch processing), and the notification can be sent from financial institution 131 through system 110 to financial institution 132 in real-time, which can beneficially provide financial institution 132 with information about future credits to be posted to the account of the recipient at financial institution 132. In many embodiments, system 110 can store the transaction, such as in database 111. Additional details regarding real-time payment transactions are shown in FIGS. 10-28 and described below.

Figure 2:
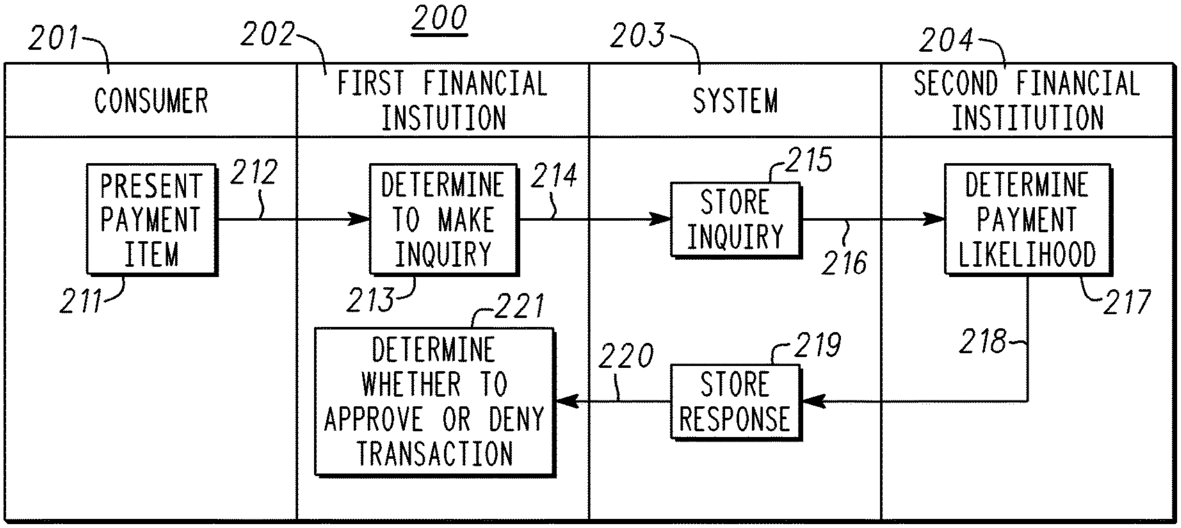
FIG. 2 illustrates an exemplary workflow for real-time determination of funds availability sent from a first financial institution through a system with a second financial institution determining a payment likelihood and without the system making a routing decision, according to various embodiments.

Turning ahead in the drawings, FIG. 2 illustrates an exemplary workflow 200 for real-time determination of funds availability sent from a first financial institution 202 through a system 203 with a second financial institution 204 determining a payment likelihood and without system 203 making a routing decision, according to various embodiments. Workflow 200 is merely exemplary and is not limited to the embodiments presented herein. Workflow 200 can be employed in many different embodiments or examples not specifically depicted or described herein. In some embodiments, the procedures, the processes, and/or the activities of workflow 200 can be performed in the order presented. In other embodiments, the procedures, the processes, and/or the activities of workflow 200 can be performed in any suitable order. In still other embodiments, one or more of the procedures, the processes, and/or the activities of workflow 200 can be combined or skipped. System 203 can be similar or identical to system 110 (FIG. 1).

In some embodiments, workflow 200 can begin with an activity 211 of an entity, such as consumer 201, presenting a payment item to a first financial institution 202 for a transaction. For example, consumer 201 can present a check for $500 to be cashed at a financial institution, such as first financial institution 202. The check can be drawn by a payor against an account of the payor at another financial institution, such as second financial institution 204. In many embodiments, consumer 201 can be the payee, endorsee, or bearer of the check. As another example, consumer 201 can make an online purchase at an online retailer by using checking or savings account information for an account maintained at a financial institution, such as second financial institution 204, and the online retailer can be the originator that presents an ACH payment item based on the checking or savings account information to an originating depository financial institution (ODFI). In various embodiments, consumer 201, the originator, and/or the payor can use the payment item to attempt to effect a transfer of funds (e.g., make a payment, receive a payment, make a deposit, and/or cash the payment item) and/or to determine an availability of funds to be transferred using the payment item. For example, the originator can request that the ACH payment item be screened through the ODFI.

In many embodiments, workflow 200 can continue with an activity 212 of the payment item being received by first financial institution 202. For example, first financial institution 202 can receive a physical check or information regarding the payment item. For example, the payment item can be received through an automated teller machine (ATM), a teller, mail, an online transaction, an online request, remote deposit capture (RDC), lock box, in-store, check processor, or another channel. In other embodiments, first financial institution 202 can be replaced by the originator (such as a merchant) or a payment processor, which can interact directly with system 203. In some embodiments, first financial institution 202 can be a processor or a third party acting on behalf of the ODFI. In a number of embodiments, the second entity can be a processor or a third party acting on behalf of the RDFI.

In some embodiments, workflow 200 can continue with an activity 213 of first financial institution 202 determining whether to make an inquiry to system 203 and/or storing the determination. In some embodiments, first financial institution 202 can automatically send an inquiry to system 203 after receiving a payment item. In other embodiments, first financial institution 202 can make an internal risk decision based on one or more factors, such as the relationship between first financial institution 202 and the requestor (e.g., consumer 201 or the originator who provided the payment item to first financial institution 202). For example, the requestor can have one or more accounts at first financial institution 202. The internal risk decision can be based on the account balances of the requestor at first financial institution 202, return activity of the requestor at first financial institution 202, a date of the payment item, a payment amount of the payment item, and/or a relationship history of deposits of the requestor at first financial institution 202. In addition, or alternatively, the internal risk decision can be based on a relationship history of the payor with first financial institution 202. First financial institution 202 can store the internal risk decision.

In many embodiments, workflow 200 can continue with an activity 214 of first financial institution 202 sending an inquiry to system 203, and/or system 203 receiving the inquiry from financial institution 202. In a number of embodiments, the inquiry can be sent from first financial institution 202 to system 203 in real-time after activity 212 of first financial institution 202 receiving the payment item. In several embodiments, the inquiry can include information from the payment item identifying the account of the payor, the financial institution (e.g., second financial institution 204) maintaining the account of the payor, information regarding the requestor, the channel through which the request was made, the type of transaction, and/or other information. For example, in some embodiments, the inquiry can include: (1) the routing number (e.g. American Bankers Association (ABA) routing transit number (RTN)) specified by the payment item; (2) the account number specified by the payment item; (3) if the payment item is a check, a serial number of the check; (4) an account transaction ("trans") code specified by the payment item; (5) a dollar amount specified by the payment item; (6) an identifier for the originator, requestor, and/or first financial institution 202; (7) one or more channel indicators (e.g., ATM, a teller, mail, an online transaction, the identity of the online device, the location of the online device, RDC, lock box, in-store, check processor, and/or another channel); (8) an identifier of what the requestor has requested with the transaction (e.g., cash, deposit, or payment); (9) an identifier of the type (e.g., check, ACH item, Standard for Financial Services Messaging (ISO (International Organization for Standardization) 20022), certified check, payment cards (debit card, credit card), etc.); (10) transaction identifier (ID) or sequence number for the transaction (which can be generated by system 203); (11) an account number of the requestor, payee, and/or depositor; and/or other suitable information. For example, in some embodiments, the inquiry can include a debit card number for a debit card associated with the account of the payor. In some embodiments, the debit card number can be included in the inquiry in lieu of the routing number and/or the account number. In a number of embodiments, the inquiry can include a transaction business date. In certain embodiments, the inquiry can include a primary client ID or other ID, a transaction ID, and/or an item ID for the payment item.

In certain embodiments, the inquiry can include an identifier linked to the account of the payor. In some embodiments, an identifier can be included in the inquiry in lieu of the routing number and/or the account number. For example, the identifier can include a tokenized or masked token, which can be an identifier which can be linked to the account of the payor. In some embodiments, the token can be a temporary (e.g., one-time use, or limited-time use) identifier. In a number of embodiments, the token include an encrypted identifier. In some embodiments, the identifier in the inquiry can include an email address of the payor, a phone number of the payor, a device ID of the payor, the name of the payor, a debit card number of the payor, a transaction business date, a transaction ID, an item ID, and/or a client ID. In a number of embodiments, such as when the account number and/or routing number is tokenized, the inquiry can include a tokenized service manager ID.

In many embodiments, workflow 200 can continue with an activity 215 of system 203 storing the inquiry sent from first financial institution 202. The inquiry can be stored in database 111 (FIG. 1), and can include a timestamp of when the inquiry was received at system 203. In some embodiments when the inquiry includes an identifier, system 203 can determine the account number and/or routing number from the identifier.

In many embodiments, workflow 200 can continue with an activity 216 of system 203 sending an inquiry to second financial institution 204, and/or second financial institution 204 receiving the inquiry from system 203. In a number of embodiments, the inquiry can be sent from system 203 to second financial institution 204 in real-time after activity 214 of system 203 receiving the inquiry. In many embodiments, the inquiry sent to second financial institution 204 in activity 216 can be similar or identical to the inquiry received by system 203 in activity 214. In some embodiments, such as when the inquiry of activity 214 includes an identifier, the inquiry of activity 216 can include the account number and/or routing number from the identifier. In other embodiments, activity 216 can include the identifier in lieu of the account number and/or routing number, and second financial institution 204 can determine the account number and/or routing number from the identifier.

In several embodiments, workflow 200 can continue with an activity 217 of second financial institution 204 determining and/or saving a payment likelihood. In various embodiments, determining the payment likelihood can be based at least in part on current information of the payor's account maintained by second financial institution 204 and/or information provided to second financial institution 204 in the inquiry. In many embodiments, the financial institutions (e.g., second financial institution 204) that participate in services offered through system 203 and provide payment likelihood for real-time determination of funds availability can have agreed to common consortium rules to be used when determining a payment likelihood. The common consortium rules can advantageously provide consistency across determinations made and information provided by different financial institutions. In some embodiments, the providers of system 203 can dictate the consortium rules to the financial institutions (e.g., second financial institution 204) that provide payment likelihood information.

In several embodiments, the consortium rules can address information that an inquirer (e.g., first financial institution 202) might want to know in determining whether to approve or deny a transaction, such as current account status and sufficiency of funds to cover the payment item, risk of fraud, money laundering, and/or other factors. Second financial institution 204, which is specified as responsible for paying the payment item, can beneficially have current detailed information regarding the payor and/or the payor's account maintained by second financial institution 204. For example, in some embodiments, activity 217 of second financial institution 204 determining the payment likelihood can be based on one or more rules, such as: (1) determining whether the payor's account is currently open (e.g., based on intraday status, if the account is opened or closed during the day of the inquiry); (2) determining whether the current balance and/or available balance (e.g., the current balance adjusted by pending transactions that have not yet cleared) of the payor's account is greater than the amount specified by the payment item (e.g., is greater than or equal to the payment amount, is greater than the payment amount by a predetermined amount (e.g., is the balance at least $200 greater than the payment amount), or is greater than the payment amount by a factor of the payment amount (e.g. is the balance at least 150% of the payment amount)); (3) determining whether the payment amount is in a range of historical spending amounts by the payor (e.g., determining whether the payment amount is consistent with the payor's spending habits); (4) determining whether there is a likelihood of a deposit to be made into the account (e.g., on the day of the inquiry) that would make the payor's account able to cover the payment item, or expected withdrawals that would make the payor's account unable to cover the payment item; (5) determining whether the payment item is consistent with a pattern, if any, between the payee and the payor; (6) determining whether other payment items have been drawn on and/or presented for clearing against the payor's account (e.g., other pending charges) that would affect whether the payor's account could cover the payment item; (7) determining whether there is a risk of fraud based on activity that matches a fraudulent pattern or is inconsistent with the payor's spending habits; (8) determining whether there is a risk of fraud based on how recently the payor's account was opened; (9) determining whether there is a risk of fraud based on the channel used to present the payment; (10) determining whether there is a likelihood of money laundering based on transaction payment amounts, and/or the identities of the payor and/or payee; (11) if the payment item is a check, determining if the account is uses the Positive Pay verification service, and if so, verifying that the check is on the list provided by the payor and if the check has already been paid; (12) if the payment item is a check, determining whether the serial number of the check is in pattern (e.g., whether the serial number of the check is not within the range of serial numbers in one or more checkbooks that have been used recently for the payor's account); (13) if the payment item is a check, determining whether the check is a duplicate of an already-paid check; (14) if the payment item is a check, determining whether the check is likely a counterfeit, such as based on a statistical analysis; and/or other suitable rules.

In a number of embodiments, the rules can be used to determine a likelihood of whether or not the payment item will clear the payor's account at second financial institution 204. For example, in some embodiments, second financial institution 204 can determine a payment likelihood indicator, which can be whether or not second financial institution 204 guarantees payment of the payment item (e.g., either guarantees payment or does not guarantee payment) or whether or not second financial 204 is likely to pay the payment item (e.g., either is likely to pay or is not likely to pay). In the same or other embodiments, second financial institution 204 can determine a payment likelihood score, and the payment likelihood indicator can include the payment likelihood score. In some embodiments, the payment likelihood score can be a numeric score (e.g., 0-100), an alphabetic score (e.g., A-Z), a color score (e.g., red, yellow, or green), or another suitable type of score. In some embodiments, the payment likelihood indicator can include an expiration date/time. For example, the guarantee can have an expiration date/time after which the guarantee or payment likelihood indicator will expire.

In a number of embodiments, the payment likelihood indicator can include reason indicators (e.g., reason codes, explanations, attributes, etc.) that explain the reasons for the payment likelihood indicator. For example, the reasons can include: (1) that the payment item is not found on Positive Pay; (2) that the item is a possible duplicate; (3) that the account is closed; (4) that there has been fraud or the payment item is likely to be fraud on the account; (5) that the payment item is likely to be a counterfeit; (6) that the payment amount specified by the payment item is greater than the current and/or available balance of the payor's account; (6) that the payor's account is overdrawn or has an NSF status; (7) that the account has a sufficient balance; (8) that payment item is or is not in pattern (e.g., payment amount is consistent with transaction history, that the serial number is in the range of serial numbers in one or more checkbooks that have been used recently for the payor's account, etc.); (9) that the expected balance is or is not sufficient, based on expected deposits and/or payments; (10) that the payment is or is not in pattern for transactions between the payor and the payee; (11) that the item is on Positive Pay and is verified; and/or other suitable reasons.

In many embodiments, workflow 200 can continue with an activity 218 of second financial institution 204 sending a response to system 203, and/or system 203 receiving the response from second financial institution 204. In a number of embodiments, the response can be sent from second financial institution 204 to system 203 in real-time after activity 216 of second financial institution 204 receiving the inquiry. In several embodiments, the response can include the payment likelihood indicator that was determined in activity 217. In some embodiments, the response can include information from the inquiry and/or information determined by second financial institution 204. For example, in a number of embodiments, the response can include: (1) the routing number (e.g. ABA RTN) specified by the payment item; (2) the account number specified by the payment item; (3) if the payment item is a check, a serial number of the check; (4) an account transaction ("trans") code specified by the payment item; (5) a dollar amount specified by the payment item; (6) an identifier for the originator, requestor, and/or first financial institution 202; (7) one or more channel indicators (e.g., ATM, a teller, mail, an online transaction, the identity of the online device, the location of the online device, RDC, lock box, in-store, check processor, and/or another channel); (8) an identifier of what the requestor has requested with the transaction (e.g., cash, deposit, or payment); (9) an identifier of the type (e.g., check, ACH item, Standard for Financial Services Messaging (ISO (International Organization for Standardization) 20022), certified check, payment cards (debit card, credit card), etc.); (10) transaction identifier (ID) or sequence number for the transaction (which can be generated by system 203); (11) the account number of the requestor, payee, and/or depositor; (12) the date and/or time(s) of the inquiry/inquiries (e.g., based on the timestamp stored in activity 215 and/or the time the determination of the payment likelihood in activity 217); (13) the payment likelihood indicator (e.g., whether or not guaranteed to pay (which can include a guarantee expiration date/time), whether or not likely to pay; and/or the payment likelihood score); (14) the reason indicators for the payment likelihood indicator; and/or other suitable information.

In many embodiments, workflow 200 can continue with an activity 219 of system 203 storing the response sent from second financial institution 204 in activity 218. The inquiry can be stored in database 111 (FIG. 1), and can include a timestamp of when the response was received at system 203.

In some embodiments, workflow 200 can continue with an activity 220 of system 203 sending a response to first financial institution 202, and/or first financial institution 202 receiving the response from system 203. In a number of embodiments, the response can be sent from system 203 to first financial institution 202 in real-time after activity 218 of system 203 receiving the response. In many embodiments, the response sent to first financial institution 202 in activity 220 can be similar or identical to the response received by system 203 in activity 218.

In several embodiments, workflow 200 can continue with an activity 221 of first financial institution 202 determining whether to approve or deny the transaction, actually approving or denying the transaction, storing the approval or denial, and/or notifying consumer 201 of such approval or denial. In various embodiments, first financial institution 202 can determine whether to approve or deny the transaction based at least in part on the response received by first financial institution 202 in activity 220. By incorporating insight from second financial institution 204, first financial institution 202 can advantageously make a more informed decision in determining the availability of funds for the payment item and in determining whether to approve or deny the transaction. For example, if the response includes a guarantee of payment or an indication or likelihood of payment by second financial institution 204, first financial institution 202 can approve the transaction. If the response includes the payment likelihood score, first financial institution 202 can determine whether the score indicates a low enough risk that first financial institution 202 can be comfortable with the risk of approving the transaction.

Figure 3:
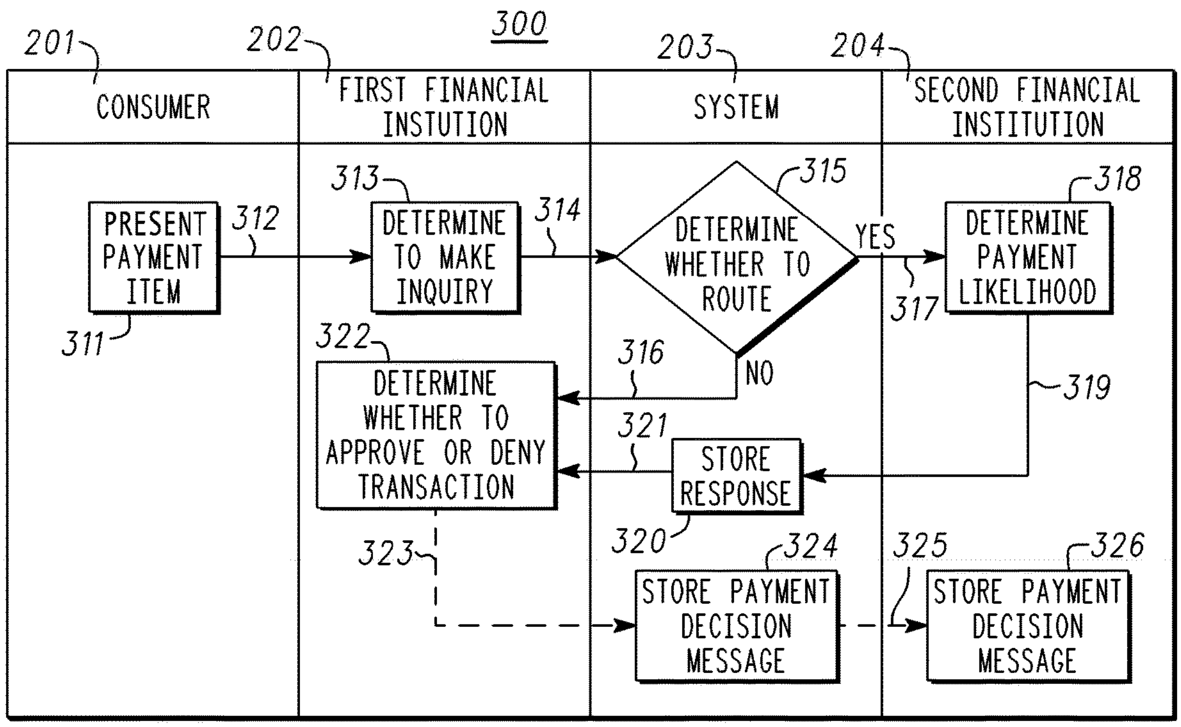
FIG. 3 illustrates an exemplary workflow for real-time determination of funds availability sent from the first financial institution of FIG. 2 through the system of FIG. 2 with the system of FIG. 2 making a routing decision of whether to have the second financial institution of FIG. 2 determine a payment likelihood, according to various embodiments.

Turning ahead in the drawings, FIG. 3 illustrates an exemplary workflow 300 for real-time determination of funds availability sent from first financial institution 202 through system 203 with system 203 making a routing decision of whether to have second financial institution 204 determine a payment likelihood, according to various embodiments. Workflow 300 is merely exemplary and is not limited to the embodiments presented herein. Workflow 300 can be employed in many different embodiments or examples not specifically depicted or described herein. In some embodiments, the procedures, the processes, and/or the activities of workflow 300 can be performed in the order presented. In other embodiments, the procedures, the processes, and/or the activities of workflow 300 can be performed in any suitable order. In still other embodiments, one or more of the procedures, the processes, and/or the activities of workflow 300 can be combined or skipped. Workflow 300 can be similar to workflow 200 (FIG. 2), and various activities of workflow 300 can be similar or identical to various activity of workflow 200 (FIG. 2).

In some embodiments, workflow 300 can begin with an activity 311 of an entity, such as consumer 201, presenting a payment item for a transaction. Activity 311 can be similar or identical to activity 211 (FIG. 2).

In many embodiments, workflow 300 can continue with an activity 312 of the payment item being received by first financial institution 202. Activity 312 can be similar or identical to activity 212 (FIG. 2).

In some embodiments, workflow 300 can continue with an activity 313 of first financial institution 202 determining whether to make an inquiry to system 203 and/or storing the determination. Activity 313 can be similar or identical to activity 213 (FIG. 2).

In many embodiments, workflow 300 can continue with an activity 314 of first financial institution 202 sending an inquiry to system 203, and/or system 203 receiving the inquiry from first financial institution 202. Activity 314 can be similar or identical to activity 214 (FIG. 2).

In a number of embodiments, workflow 300 can continue with an activity 315 of determining whether to route the inquiry to second financial institution 204 and/or storing the determination. In many embodiments, the routing decision can be based at least in part on a risk of non-payment of the payment item by the second entity. In many embodiments, the routing decision can be based on information received from financial institutions (e.g., 131-134 (FIG. 1), which can include first financial institution 202 and/or second financial institution 204), such as overnight batch data regarding whether accounts are open and in good status, what balances are available in the open accounts, whether accounts have had recent NSF or other activity, whether accounts had a stop payment order, and/or other suitable information. In some embodiments, system 203 can store the inquiry from first financial institution 202 received in activity 314 with or without a timestamp of when the inquiry was received by system 203, and system 203 can use database 111 (FIG. 1) to store the inquiry. In a number of embodiments, the routing decision can be based at least in part on other inquiries received earlier in the same day that are similar to the inquiry received in activity 314. In some embodiments, the financial institutions (e.g., 131-134 (FIG. 1), first financial institution 202, and/or second financial institution 204) can provide additional information to system 203 on a periodic or regular basis (e.g., daily, twice daily, hourly, half-hourly, on every transaction, etc.), which can be received by system 203 before receiving the inquiry in activity 314, which can be more up-to-date than overnight batch data, and which can be used by system 203 in some embodiments to determine the routing decision.

In several embodiments, the routing decision can be based on whether second financial institution 204 is setup to participate in online back-office validation to determine payment likelihood, and/or can be based on rules that determine a risk of non-payment, based on information made available to system 203 from the financial institutions (e.g., 131-134 (FIG. 1), first financial institution 202, and/or second financial institution 204) before receiving the inquiry in activity 314, based on earlier inquiries through system 203 (similar to the inquiry received in activity 314), and/or based on the inquiry received in activity 314. In some embodiments, when system 203 applies the rules to determines the risk of non-payment and the routing decision, system 203 can generate decision information, which can be returned to first financial institution 202 and/or sent to second financial institution 204.

In various embodiments, system 203 can determine whether the payment item is drawn on an invalid account. If the account specified by the payment item is not found, system 203 can generate decision information indicating that the account was not found and can determine not to route the inquiry to second financial institution 204.

In many embodiments, system 203 can determine whether the account specified by the payment item is open. If the account is closed, and has been closed for more than a predetermined amount of time (e.g., 7 days), system 203 can generate decision information that the account is closed and determine not to route the inquiry to second financial institution 204. In some embodiments, if the account has been closed for less than a predetermined amount of time (e.g., 7 days), system 203 can generate decision information that the account has been recently closed and can determine to route the inquiry to second financial institution 204.

In several embodiments, system 203 can determine, if the payment item is an ACH item, whether the account specified by the payment item has a “Post no Debits” status. If the account has a “Post no Debits” status, system 203 can generate decision information indicating that the account has a “Post no Debits” status and can determine not to route the inquiry to second financial institution 204.

In various embodiments, system 203 can determine, if the payment item is a check, whether the account specified by the payment item has a stop payment on the item. For example, the stop payment can be based on a three-field match of routing number, account number, and serial number, or a four-field match of routing number account number, serial number, and payment amount. If the account has a stop payment status, system 203 can generate decision information indicating that the account has a stop payment status and can determine not to route the inquiry to second financial institution 204.

In some embodiments, system 203 can determine, if the payment item is a check, whether the account specified by the payment item uses Positive Pay verification. In some embodiments, if the account uses Positive Pay verification, system 203 can generate decision information indicating that the account has uses Positive Pay verification. In some embodiments, system 203 can determine not to route the inquiry to second financial institution 204. In other embodiments, system 203 can determine to route the inquiry to second financial institution 204 for Positive Pay verification.

In many embodiments, system 203 can determine, if the payment item is a check, whether the check is likely a duplicate. If the check is likely a duplicate, system 203 can generate decision information indicating that the check is likely a duplicate and can determine not to route the inquiry to second financial institution 204.

In many embodiments, system 203 can determine, if the payment item is a check, whether the check is likely a counterfeit. If the check is likely a counterfeit, system 203 can generate decision information indicating that the check is likely a counterfeit and can determine not to route the inquiry to second financial institution 204.

In many embodiments, system 203 can determine whether the payment item is likely part of a money-laundering scheme. For example, system 203 can determine whether the payment item is likely part of a money-laundering scheme based on the payment amount of the payment item and/or other transactions, and/or the payee and/or payor for the payment item. If the payment item is likely part of a money-laundering scheme, system 203 can generate decision information indicating that the payment item is likely part of a money-laundering scheme and can determine not to route the inquiry to second financial institution 204.

In many embodiments, system 203 can determine whether the payment item is likely fraudulent. For example, system 203 can determine whether the payment item is likely fraudulent based on the channel used, whether the channel used is a new device, the authentication used in the channel, the location of the channel, whether the payor's account was recently opened, and/or whether the payment is consistent with transaction patterns for the payor and/or payee. If the payment item is likely fraudulent, system 203 can generate decision information indicating that the payment item is likely fraudulent and can determine not to route the inquiry to second financial institution 204.

In some embodiments, if system 203 has been provided with account balances (e.g., nightly, or more frequently), system 203 can determine whether the payment amount specified by the payment item is greater than the latest balance information received by system 203. In some embodiments, system 203 can generate decision information indicating that the payment item is likely unable to be covered by the payor's account and can determine not to route the inquiry to second financial institution 204.

In various embodiments, system 203 can determine whether the payment amount for the payment item is greater than or less than a predetermined amount. For certain financial institutions, and/or for certain accounts at certain financial institutions, the financial institution (e.g., either first financial institution 202 or second financial institution 204) might not want to have the inquiry routed to second financial institution 204 if the payment amount if below a predetermined amount (e.g., a payment amount below $10, $50, or $100). In such cases, system 203 can generate decision information indicating that the payment item is below a certain amount and determine not to route the inquiry to second financial institution 204.

In a number of embodiments, system 203 can determine whether second financial institution is setup to participate in online validation to determine payment likelihood. If second financial institution is not setup to participate in online validation, system 203 can generate decision information indicating that second financial institution 204 is not setup to participate in online validation, and can determine not to route the inquiry to second financial institution 204.

In many embodiments, if system 203 has determined to not route the inquiry to second financial institution 204, system 203 can instead respond to first financial institution 202. In such cases, workflow 300 can continue with an activity 316 of system 203 sending a response to first financial institution 202, and/or first financial institution 202 receiving the response from system 203. In a number of embodiments, the response can be sent from system 203 to first financial institution 204 in real-time after activity 314 of system 203 receiving the inquiry. In many embodiments, the response sent to first financial institution 202 in activity 316 can include information from the inquiry and/or the decision information generated by system 203 in activity 315.

If system 203 has determined to route the inquiry to second financial institution 204, workflow 300 can continue with an activity 317 of system 203 sending an inquiry to second financial institution 204, and/or second financial institution 204 receiving the inquiry from system 203. Activity 317 can be similar or identical to activity 216 (FIG. 2). In some embodiments, the inquiry sent to second financial institution 204 in activity 317 can include the decision information, such as the determination of the risk of non-payment, generated by system 203 in activity 315, and/or the information received by system 203 from first financial institution 202 in activity 314. In other embodiments, the decision information generated by system 203 in activity 315 can be sent to second financial institution 204 in a separate informational message sent before or after the inquiry sent by system 203 to second financial institution 204 in activity 317. In yet other embodiments, after receiving the inquiry in activity 317, second financial institution 204 can send a request for additional information to system 203, and system 203 in response can send an informational message to second financial institution 204 than includes the decision information generated by system 203 in activity 315. In yet other embodiments, second financial institution 204 can proceed to determine the payment likelihood (described below) without the information generated by system 203 in activity 315.

In several embodiments, workflow 300 can continue with an activity 318 of second financial institution 204 determining a payment likelihood and/or storing the determination. Activity 318 can be similar or identical to activity 217 (FIG. 2). In various embodiments, determining the payment likelihood can be based at least in part on current information of the payor's account maintained by second financial institution 204, information provided to second financial institution 204 in the inquiry, and/or the decision information generated by system 203 in activity 315. In many embodiments, the information available to second financial institution 204 can be different than the information available to system 203. For example, the information available to second financial institution 204 can be current information, as opposed to information from the previous night, and/or one or more previous intra-day updates, which can beneficially allow second financial institution 204 to make decisions based on more current information. In some embodiments, system 203 can have information about the payor and/or payee at other financial institutions (e.g., 131-134 (FIG. 1)), which can beneficially allow system 203 to determine risks using aggregated information that is not otherwise available to second financial institution 204. As such, the information provided by system 203 to second financial institution 204 in certain embodiments, such as the decision information generated by system 203 in activity 315, can advantageously enhance the ability of second financial institution 204 to more accurately determine the payment likelihood, such as whether not to guarantee payment, whether or not to determine that payment is likely, and/or to accurately determine a payment likelihood score.

In many embodiments, workflow 300 can continue with an activity 319 of second financial institution 204 sending a response to system 203, and/or system 203 receiving the response from second financial institution 204. Activity 319 can be similar or identical to activity 218 (FIG. 2).

In various embodiments, workflow 300 can continue with an activity 320 of system 203 storing the response sent from second financial institution 204 in activity 319. Activity 320 can be similar or identical to activity 219 (FIG. 2).

In some embodiments, activity 320 can include system 203 further determining a payment likelihood based on the payment likelihood determined by and received from second financial institution 204 and also based on additional information available to system 203. In these embodiments, system 203 might have information that second financial institution 204 does not have, and therefore, system 203 can refine or further determine the payment likelihood that was originally made by second financial institution 204, and system 203 can store the refined determination. For example, as explained above with respect to activity 315, system 203 may have additional financial information about the payor's other bank accounts at other financial institutions that second financial institution 204 does not have. Similarly, system 203 may have financial information about second financial institution 204 that is not part of the response in activity 319 but that system 203 can use to refine or further determine the payment likelihood.

In some embodiments, workflow 300 can continue with an activity 321 of system 203 system 203 sending a response to first financial institution 202, and/or first financial institution 202 receiving the response from system 203. Activity 321 can be similar or identical to activity 220 (FIG. 2). In some embodiments, the decision information generated by system 203 in activity 315 can be added to the response to first financial institution 202, and/or other risk factors, such as whether the account was recently opened.

In several embodiments, workflow 300 can continue after activity 316 or activity 321 with an activity 322 of first financial institution 202 determining whether to approve or deny the transaction, actually approving or denying the transaction, storing the approval or denial, and/or notifying consumer 201 of such approval or denial. Activity 322 can be similar or identical to activity 221 (FIG. 2). By incorporating insight from second financial institution 204 (e.g., the payment likelihood decision determined in activity 318) and/or system 203 (e.g., the decision information generated in activity 315), first financial institution 202 can advantageously make a more informed decision in determining the availability of funds for the payment item and in determining whether to approve or deny the transaction.

In some embodiments, workflow 300 can optionally continue after activity 322 with an activity 323 of first financial institution 202 sending a payment decision message to system 203, and/or system 203 receiving a payment decision message from first financial institution 202. In a number of embodiments, the payment decision message can include information regarding whether first financial institution 202 accepted or denied the transaction. In some embodiments, the payment decision message can be sent from first financial institution 202 in real-time after activity 316 or activity 321 of system 203 receiving the response.

In many embodiments, workflow 300 can continue with an activity 324 of system 203 storing the payment decision message sent from first financial institution 202 in activity 323. The payment decision message can be stored in database 111 (FIG. 1), and can include a timestamp of when the payment decision message was received at system 203.

In some embodiments, workflow 300 can further optionally continue with an activity 325 of system 203 sending a payment decision message to second financial institution 204, and/or second financial institution 204 receiving the payment decision message from system 203. In a number of embodiments, the payment decision message can be sent from system 203 to second financial institution 204 in real-time after activity 323 of system 203 receiving the payment decision message in activity 323. In many embodiments, the payment decision message sent to second financial institution 204 in activity 325 can be similar or identical to the payment decision message received by system 203 in activity 323.

In some embodiments, workflow 300 can further optionally continue with an activity 326 of second financial institution 204 storing the payment decision message sent from system 203 in activity 325. Second financial institution 204 also can store a timestamp of when the payment decision message was received at second financial institution 204.

In various embodiments, the information in the payment decision message sent to system 203 and/or second financial institution 204 from first financial institution 202 can beneficially be used by system 203 and/or second financial institution 204 to determine risks in future transactions. In many embodiments, second financial institution 204 can use the information in the payment decision message to update a pending account status of the payor's account. In some embodiments, workflow 200 (FIG. 2) can similarly include sending a payment decision message to system 203 and/or second financial institution 204 such that activities 323, 324, 325, and 326 also can be part of workflow 200 (FIG. 2) by occurring after activity 221 (FIG. 2).

Figure 4:
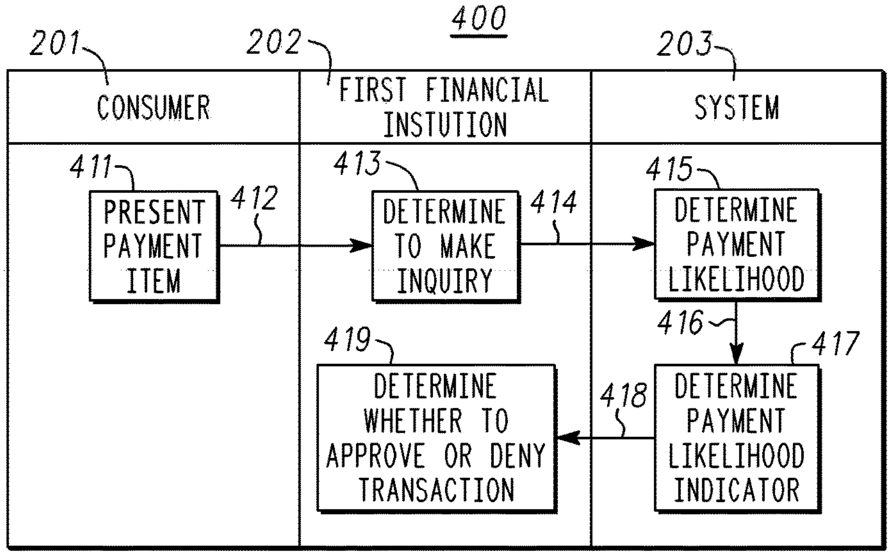
FIG. 4 illustrates an exemplary workflow for real-time determination of funds availability sent from the first financial institution of FIG. 2 to the system of FIG. 2 for determining a payment likelihood, according to various embodiments.

Turning ahead in the drawings, FIG. 4 illustrates an exemplary workflow 400 for real-time determination of funds availability sent from first financial institution 202 to system 203 for determining a payment likelihood, according to various embodiments. Workflow 400 is merely exemplary and is not limited to the embodiments presented herein. Workflow 400 can be employed in many different embodiments or examples not specifically depicted or described herein. In some embodiments, the procedures, the processes, and/or the activities of workflow 400 can be performed in the order presented. In other embodiments, the procedures, the processes, and/or the activities of workflow 400 can be performed in any suitable order. In still other embodiments, one or more of the procedures, the processes, and/or the activities of workflow 400 can be combined or skipped. Workflow 400 can be similar to workflow 200 (FIG. 2) and/or workflow 300 (FIG. 3), and various activities of workflow 400 can be similar or identical to various activity of workflow 200 (FIG. 2) and/or workflow 300 (FIG. 3).

In some embodiments, workflow 400 can begin with an activity 411 of an entity, such as consumer 201, presenting a payment item for a transaction. Activity 411 can be similar or identical to activity 211 (FIG. 2) and/or activity 311 (FIG. 3).

In many embodiments, workflow 400 can continue with an activity 412 of the payment item being received by first financial institution 202. Activity 412 can be similar or identical to activity 212 (FIG. 2) and/or activity 312 (FIG. 3).

In some embodiments, workflow 400 can continue with an activity 413 of determining whether to make an inquiry to system 203 and/or storing the determination. Activity 413 can be similar or identical to activity 213 (FIG. 2) and/or activity 313 (FIG. 3).

In many embodiments, workflow 400 can continue with an activity 414 of first financial institution 202 sending an inquiry to system 203, and/or system 203 receiving the inquiry from first financial institution 202. Activity 414 can be similar or identical to activity 214 (FIG. 2) and/or activity 314 (FIG. 3).

In a number of embodiments, workflow 400 can continue with an activity 415 of system 203 determining a payment likelihood. Activity 415 can be similar to activity 217 (FIG. 2), activity 315 (FIG. 3), and/or activity 318 (FIG. 3). In some embodiments, system 203 can store the inquiry from first financial institution 202 received in activity 414 with or without a timestamp of when the inquiry was received by system 203, and system 203 can store the inquiry and/or timestamp in database 111 (FIG. 1). In a number of embodiments, system 203 can apply one or more of the rules applied in making the routing decision in activity 315 (FIG. 3) to determine a risk of non-payment, and/or system 203 can generate decision information, such as the decision information generated in activity 315 (FIG. 3), by applying the rules. System 203 can determine a payment likelihood based on the decision information and/or through applying rules, such as the common consortium rules used to determine a payment likelihood in activity 217 (FIG. 2) and/or activity 318 (FIG. 3). In some embodiments, a financial institution that is specified in a payment item as responsible for paying the payment item can provide information regularly (e.g., twice daily, hourly, half-hourly, on each transaction, etc.) to system 203 so as to allow system 203 to determine the payment likelihood, rather than the financial institution determining the payment likelihood (as done by second financial institution 204 in activity 217 (FIG. 2) and activity 318 (FIG. 3)). In some embodiments, the financial institution can provide less, as much, or more information to system 203 as is used by second financial institution 204 to determine the payment likelihood in activity 217 (FIG. 2) and/or activity 318 (FIG. 3).

In a number of embodiments, workflow 400 can continue with an activity 416 of system 203 providing the payment likelihood information and/or decision information generated in activity 415 to be stored in system 203.

In several embodiments, workflow 400 can continue with an activity 417 of system 203 storing the payment likelihood information and/or decision information generated in activity 415 with or without a timestamp when the determination was made, in system 203, and system 203 can store the information and/or timestamp in database 111 (FIG. 1).

In many embodiments, workflow 400 can continue with an activity 418 of system 203 sending a response to system first financial institution 202, and/or first financial institution 202 receiving the response from system 203. Activity 417 can be similar to activity 218 (FIG. 2), activity 220 (FIG. 2), activity 319 (FIG. 3), and/or activity 321 (FIG. 3). The response can include the decision information and/or the payment response likelihood information, as determined in activity 415, and/or other risk factors, such as whether the account was recently opened.

In several embodiments, workflow 400 can continue with an activity 419 of first financial institution 202 determining whether to approve or deny the transaction, actually approving or denying the transaction, storing the approval or denial, and/or notifying consumer 201 of such approval or denial. Activity 422 can be similar or identical to activity 221 (FIG. 2) and/or activity 322 (FIG. 3). In some embodiments, workflow 400 can optionally send the payment decision information to system 203, as described in activities 323 and 324 in FIG. 3.

Figure 5:
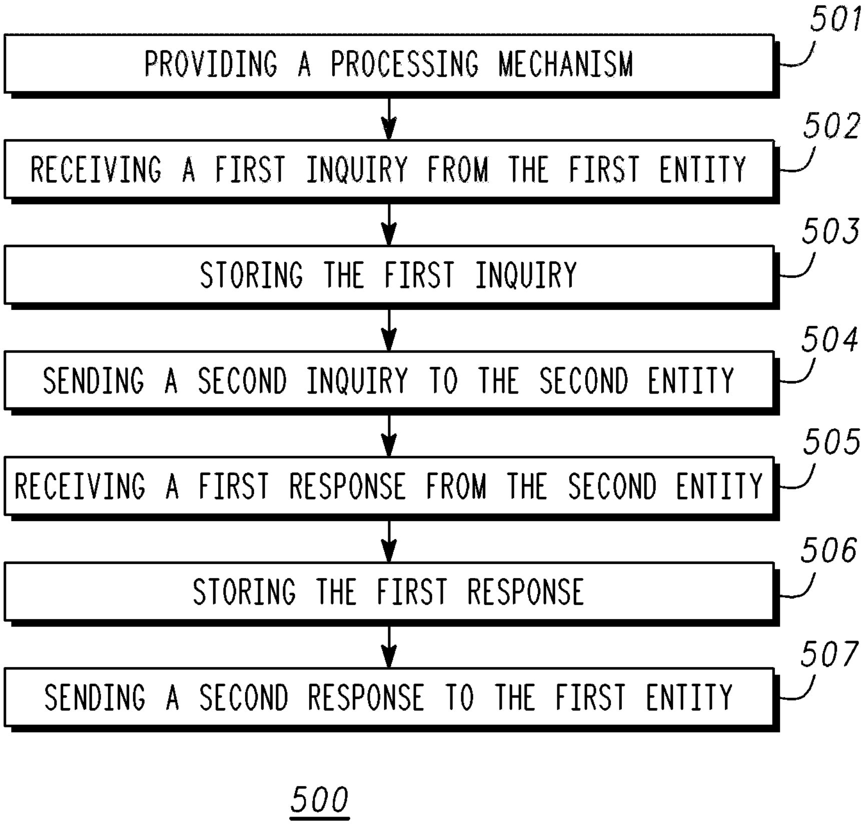
FIG. 5 illustrates an exemplary flow chart for a method to facilitate determining an availability of funds for a payment item, according to an embodiment.

Turning ahead in the drawings, FIG. 5 illustrates a flow chart for a method 500 to facilitate determining an availability of funds for a payment item, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. Method 500 can be similar or identical to the acts performed by system 203 (FIGS. 2-4) in workflow 200 (FIG. 2). In many embodiments, the payment item can include one of a check or an ACH item.

Referring to FIG. 5, method 500 can include a block 501 of providing a processing mechanism in data communication through a network with a first entity and a plurality of depository financial institutions. The first entity can be similar or identical to first financial institution 202 (FIGS. 2-4). The processing mechanism can be similar or identical to system 110 (FIG. 1) and/or system 203 (FIGS. 2-4). The network can be similar or identical to network 120 (FIG. 1). The depository financial institutions can be similar or identical to financial institutions 131-134 (FIG. 1), first financial institution 202 (FIGS. 2-4), and/or second financial institution 204 (FIGS. 2-3). In some embodiments, the plurality of depository financial institutions can include a second entity. The second entity can be similar or identical to second financial institution 204 (FIGS. 2-3). In some embodiments, the second entity can be specified by the payment item as being responsible for paying the payment item. In many embodiments, the first entity can be different from the second entity. In some embodiments, the payment item can be a check, the first entity can be a depository financial institution receiving the check for deposit, and the second entity can be a depository financial institution against which the check has been drawn. In other embodiments, the payment item can be an ACH item, the first entity can be an originating depository financial institution (ODFI) for the ACH item, and the second entity can be a receiving depository financial institution (RDFI) for the ACH item. In a number of embodiments, the first entity can be a payment processor, and the second entity can be a financial institution.

In many embodiments, method 500 additionally can include a block 502 of receiving a first inquiry at the processing mechanism through the network from the first entity. The first inquiry can be similar or identical to the inquiry sent from first financial institution 202 (FIGS. 2-4) to system 203 (FIGS. 2-4) in activity 214 (FIG. 2). In various embodiments, the first inquiry can be received from the first entity in real-time after the first entity receives the payment item. For example, the first entity can receive the payment item similarly or identically to first financial institution 202 (FIGS. 2-4) receiving the payment item in activity 212 (FIG. 2).

In some embodiments, method 500 further can include a block 503 of storing the first inquiry received from the first entity along with a first timestamp that indicates when the first inquiry was received from the first entity. Block 503 of storing the first inquiry can be similar or identical to activity 215 (FIG. 2) of system 203 (FIGS. 2-4) storing the inquiry sent from first financial institution 202 (FIGS. 2-4).

In many embodiments, method 500 additionally can include a block 504 of sending a second inquiry from the processing mechanism through the network to the second entity in real-time after receiving the first inquiry. The second inquiry can be similar or identical to the inquiry sent from system 203 (FIGS. 2-4) to second financial institution 204 (FIGS. 2-3) in activity 216 (FIG. 2), and block 504 can be similar or identical to activity 216 (FIG. 2). In various embodiments, the second inquiry can be based at least in part on the first inquiry. In some embodiments, the first and/or second inquiries can include a routing number of the second entity that is specified by the payment item; an account number of the account maintained by the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and/or, if the payment item is a check, a serial number of the check. In a number of embodiments, the first inquiry can include an identifier linked to the account maintained by the second entity that is specified by the payment item.

In some embodiments, method 500 further can include a block 505 of receiving a first response at the processing mechanism through the network from the second entity. The first response can be similar or identical to the response sent from second financial institution 204 (FIGS. 2-3) to system 203 (FIGS. 2-4) in activity 218 (FIG. 2), and block 505 can be similar or identical to activity 281 (FIG. 2). In various embodiments, the first response can be sent by the second entity in real-time in response to receiving the second inquiry.

In many embodiments, method 500 additionally can include a block 506 of storing the first response received from the second entity along with a second timestamp that indicates when the first response was received from the second entity. Block 506 of storing the first response can be similar or identical to activity 219 (FIG. 2) of system 203 (FIGS. 2-4) storing the response sent from second financial institution 204 (FIGS. 2-3).

In some embodiments, method 500 further can include a block 507 of sending a second response from the processing mechanism through the network to the first entity in real-time after receiving the first response. The second response can be similar or identical to the response sent from system 203 (FIGS. 2-4) to first financial institution 202 (FIGS. 2-4) in activity 220 (FIG. 2), and block 507 can be similar to activity 220 (FIG. 2). In various embodiments, the second response can be sent within 30 seconds of receiving the first inquiry. In some embodiments, the second response can be based at least in part on the first response. In some embodiments, the first and/or second responses each can include a payment likelihood indicator provided by the second entity that indicates a likelihood of the second entity to pay the payment item. The payment likelihood indicator can be similar or identical to the payment likelihood indicator determined by second financial institution 204 (FIGS. 2-3) in activity 217 (FIG. 2). In various embodiments, the payment likelihood indicator can be based at least in part on a current status and a current available balance of an account maintained by the second entity that is specified by the payment item for payment of the payment item. In a number of embodiments, the payment likelihood indicator in the first and/or second responses can include an indication of whether or not the second entity guarantees payment of the payment item. In many embodiments, the payment likelihood indicator in the first and/or second responses can include a score. The score can be similar or identical to the payment likelihood score determined by second financial institution 204 (FIGS. 2-3) in activity 217 (FIG. 2). In various embodiments, the first and/or second responses each can further include one or more reason indicators to explain the payment likelihood indicator provided by the second entity. The reason indicators can be similar or identical to the reason indicators determined by second financial institution 204 (FIGS. 2-3) in activity 217 (FIG. 2).

Figure 6:
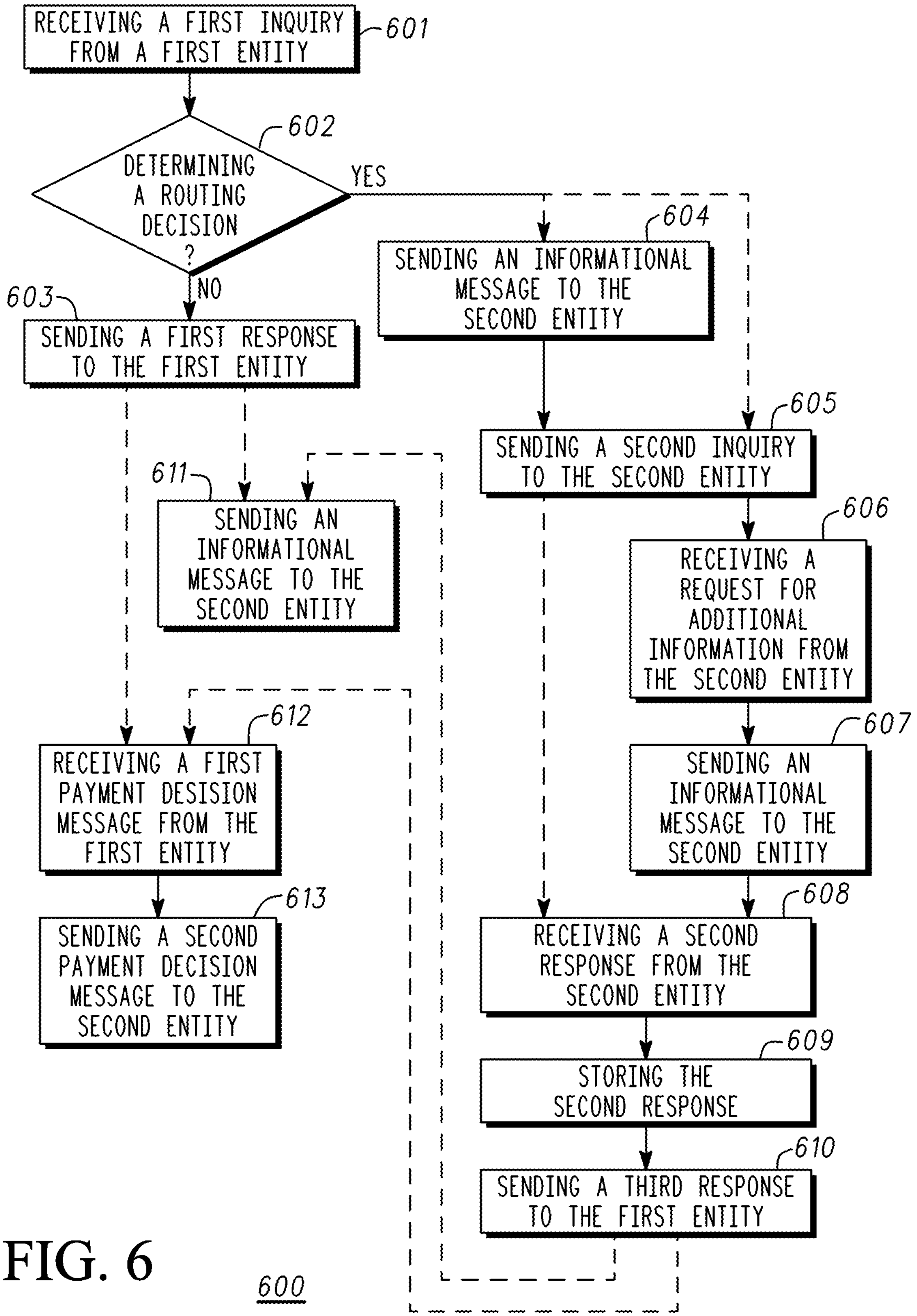
FIG. 6 illustrates an exemplary flow chart for a method to facilitate determining an availability of funds for a payment item, according to an embodiment.

Turning ahead in the drawings, FIG. 6 illustrates a flow chart for a method 600 to facilitate determining an availability of funds for a payment item, according to an embodiment. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. Method 600 can be similar or identical to the acts performed by system 203 (FIGS. 2-4) in workflow 300 (FIG. 3). In many embodiments, the payment item can include one of a check or an ACH item.

Referring to FIG. 6, method 600 can include a block 601 of receiving a first inquiry through a network from a first entity. The first entity can be similar or identical to first financial institution 202 (FIGS. 2-4). The network can be similar or identical to network 120 (FIG. 1). The first inquiry can be similar or identical to the inquiry sent from first financial institution 202 (FIGS. 2-4) to system 203 (FIGS. 2-4) in activity 314 (FIG. 3), and block 610 can be similar or identical to activity 315 (FIG. 3). In a number of embodiments, the first inquiry can be received from the first entity in real-time after the first entity receives the payment item. For example, the first entity can receive the payment item similarly or identical to first financial institution 202 (FIGS. 2-4) receiving the payment item in activity 312 (FIG. 3).

In many embodiments, method 600 additionally can include a block 602 of determining a routing decision of whether or not to route the first inquiry to a second entity. Block 602 of determining the routing decision can be similar or identical to activity 315 (FIG. 3) of system 203 (FIGS. 2-4) determining whether to route the inquiry to second financial institution 204 (FIGS. 2-3). The second entity can be similar or identical to second financial institution 204 (FIGS. 2-3). In many embodiments, the first entity can be different from the second entity. In various embodiments, the second entity can be a depository financial institution that is specified by the payment item as responsible for paying the payment item. In a number of embodiments, the routing decision can be based at least in part on a risk of non-payment of the payment item by the second entity. In some embodiments, the payment item can be a check, the first entity can be a depository financial institution receiving the check for deposit, and the second entity can be a depository financial institution against which the check has been drawn. In other embodiments, the payment item can be an ACH item, the first entity can be an originating depository financial institution (ODFI) for the ACH item, and the second entity can be a receiving depository financial institution (RDFI) for the ACH item.

In several embodiments, determining the routing decision can include determining the routing decision based at least on part on account data received from a plurality of financial institutions for accounts maintained by the financial institutions. The financial institutions can be similar or identical to financial institutions 131-134 (FIG. 1), first financial institution 202 (FIGS. 2-4), and/or second financial institution 204 (FIGS. 2-3). In various embodiments, the account data can be received before receiving the first inquiry. In many embodiments, the plurality of financial institutions can include the second entity. In some embodiments, the payment item can specify for payment a first account of the accounts. In a number of embodiments, the first account can be maintained by the second entity. In some embodiments, the account data can include first account data for the first account.

In various embodiments, determining the routing decision further can include determining the routing decision such that the routing decision is to not route the first inquiry to the second entity when it is determined, based on the first account data, that the first account is not valid. In many embodiments, determining the routing decision further can include determining the routing decision such that the routing decision is to not route the first inquiry to the second entity when it is determined, based on the first account data, that the first account has been closed for a predetermined amount of time. In a number of embodiments, determining the routing decision further can include determining the routing decision such that the routing decision is to not route the first inquiry to the second entity when the payment item comprises an ACH item and it is determined, based on the first account data, that the first account has a post no debits status. In some embodiments, determining the routing decision further can include determining the routing decision such that the routing decision is to not route the first inquiry to the second entity when the payment item comprises a check and it is determined, based on the first account data, that the first account has a stop payment on the check. In several embodiments, determining the routing decision further can include determining the routing decision such that the routing decision is to not route the first inquiry to the second entity when the payment item comprises a check and it is determined, based on the first account data, the first account uses positive pay verification. In various embodiments, determining the routing decision further can include determining the routing decision such that the routing decision is to not route the first inquiry to the second entity when it is determined, based on the first account data, the payment item is likely a duplicate. In many embodiments, determining the routing decision further can include determining the routing decision such that the routing decision is to not route the first inquiry to the second entity when, based on the first account data, a payment amount of payment item is determined to be below a predetermined threshold amount.

In some embodiments, method 600 further can include, if the routing decision is to not route the first inquiry to the second entity, a block 603 of sending a first response through the network to the first entity in real-time after receiving the first inquiry. Block 603 can be similar or identical to activity 316 (FIG. 3), and the first response can be similar or identical to the response sent from system 203 (FIGS. 2-4) to first financial institution 202 (FIGS. 2-4) in activity 316 (FIG. 3). In some embodiments, sending the first response to the first entity can include sending the first response such that the first response includes information derived in determining the routing decision. For example, the information can be similar or identical to the decision information generated by system 203 (FIGS. 2-4) in activity 315 (FIG. 3).

In certain embodiments, method 600 can optionally include, if the routing decision is to route the first inquiry to the second entity, a block 604 of sending an informational message through the network to the second entity in real-time after receiving the first inquiry. In some embodiments, the informational message can include information derived from determining the routing decision. For example, the information can be similar or identical to the decision information generated by system 203 (FIGS. 2-4) in activity 315 (FIG. 3), and block 604 can be similar or identical to activity 317 (FIG. 3).

In many embodiments, method 600 additionally can include, if the routing decision is to route the first inquiry to the second entity, after block 602 or block 604, a block 605 of sending a second inquiry through the network to the second entity in real-time after receiving the first inquiry. The second inquiry can be similar or identical to the inquiry sent from system 203 (FIGS. 2-4) to second financial institution 204 (FIGS. 2-3) in activity 317 (FIG. 3), and block 605 can be similar to activity 317 (FIG. 3). In various embodiments, the second inquiry can be based at least in part on the first inquiry. In some embodiments, the first and/or second inquiries can include a routing number of the second entity that is specified by the payment item; an account number of the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and/or, if the payment item is a check, a serial number of the check. In some embodiments, sending the second inquiry to the second entity can include sending the second inquiry such that the second inquiry further includes information derived from determining the routing decision. For example, the information can be similar or identical to the decision information generated by system 203 (FIGS. 2-4) in activity 315 (FIG. 3).

In certain embodiments, method 600 can optionally include, such as in some embodiments when block 604 was skipped, a block 606 of receiving a request for additional information through the network from the second entity.

In certain embodiments, method 600 can further optionally include, after block 606, a block 607 of sending an informational message through the network to the second entity in real-time after receiving the request for additional information. The informational message can include information derived from determining the routing decision. For example, the information can be similar or identical to the decision information generated by system 203 (FIGS. 2-4) in activity 315 (FIG. 3). Blocks 606 and 607 can be similar to activity 317 (FIG. 3).

In many embodiments, method 600 additionally can include, after block 605 or block 607, a block 608 of receiving a second response through the network from the second entity. The first response can be similar or identical to the response sent from second financial institution 204 (FIGS. 2-3) to system 203 (FIGS. 2-4) in activity 319 (FIG. 3), and block 608 can be similar or identical to activity 319 (FIG. 3). In various embodiments, the first response can be sent by the second entity in real-time in response to receiving the second inquiry.

In some embodiments, method 600 further can include a block 609 of storing the second response received from the second entity along with a timestamp that indicates when the second response was received from the second entity. Block 609 of storing the second response can be similar or identical to activity 320 (FIG. 3) of system 203 (FIGS. 2-4) storing the response sent from second financial institution 204 (FIGS. 2-3).

In many embodiments, method 600 additionally can include a block 610 of sending a third response through the network to the first entity in real-time after receiving the second response. The third response can be similar or identical to the response sent from system 203 (FIGS. 2-4) to first financial institution 202 (FIGS. 2-4) in activity 321 (FIG. 3), and block 610 can be similar or identical to activity 321 (FIG. 3). In various embodiments, the third response can be based at least in part on the second response. In some embodiments, the second and/or third responses can include a payment likelihood indicator provided by the second entity that indicates a likelihood of the second entity to pay the payment item. The payment likelihood indicator can be similar or identical to the payment likelihood indicator determined by second financial institution 204 (FIGS. 2-3) in activity 318 (FIG. 3). In various embodiments, the payment likelihood indicator can be based at least in part on a current status and a current available balance of an account maintained by the second entity that is specified by the payment item for payment of the payment item. In some embodiments, the one or more processing modules (e.g., system 203 (FIGS. 2-4) can be in data communication through the network with a plurality of financial institutions that have each agreed to apply common standards for determining the payment likelihood indicator. The financial institutions can be similar or identical to financial institutions 131-134 (FIG. 1), first financial institution 202 (FIGS. 2-4), and/or second financial institution 204 (FIGS. 2-3). The common standards can be similar or identical to the common consortium rules described above in connection with activity 318 (FIG. 3). In several embodiments, the second entity can be any one of the plurality of financial institutions, as specified by the payment item. In some embodiments, sending the third response to the first entity can include sending the third response such that the third response further includes information derived from determining the routing decision. For example, the information can be similar or identical to the decision information generated by system 203 (FIGS. 2-4) in activity 315 (FIG. 3).

In a number of embodiments, the payment likelihood indicator in the second and/or third responses can include an indication of whether or not the second entity guarantees payment of the payment item. In many embodiments, the payment likelihood indicator in the second and/or third responses can include a score. The score can be similar or identical to the payment likelihood score determined by second financial institution 204 (FIGS. 2-3) in activity 217 (FIG. 2). In various embodiments, the second and/or third responses each can further include one or more reason indicators to explain the payment likelihood indicator provided by the second entity. The reason indicators can be similar or identical to the reason indicators determined by second financial institution 204 (FIGS. 2-3) in activity 217 (FIG. 2). In various embodiments, one of the first response or the third response can be sent within 30 seconds of receiving the first inquiry.

In certain embodiments, method 600 optionally can include, after block 603 or block 610, a block 611 of sending an informational message through the network to the second entity including information derived from determining the routing decision. For example, the information can be similar or identical to the decision information generated by system 203 (FIGS. 2-4) in activity 315 (FIG. 3).

In certain embodiments, method 600 optionally can include, after block 603 or block 610, a block 612 of receiving a first payment decision message through the network from the first entity that indicates whether the first entity paid the payment item. For example, the first payment decision message can be similar to the payment decision message received by system 203 (FIGS. 2-4) in activity 323 (FIG. 3), and block 612 can be similar or identical to activity 323 (FIG. 3).

In certain embodiments, method 600 can include, after block 612, a block 613 of sending a second payment decision message through the network to the second entity, the second payment decision message being based at least in part on the first payment decision message. For example, the second payment decision message can be similar to the payment decision message sent by system 203 (FIGS. 2-4) in activity 325 (FIG. 3), and block 613 can be similar or identical to activity 325 (FIG. 3). In many embodiments, sending the second payment decision message to the second entity can include sending the second payment message such that the second payment message further includes information derived from determining the routing decision. For example, the information can be similar or identical to the decision information generated by system 203 (FIGS. 2-4) in activity 315 (FIG. 3).

Figure 7:
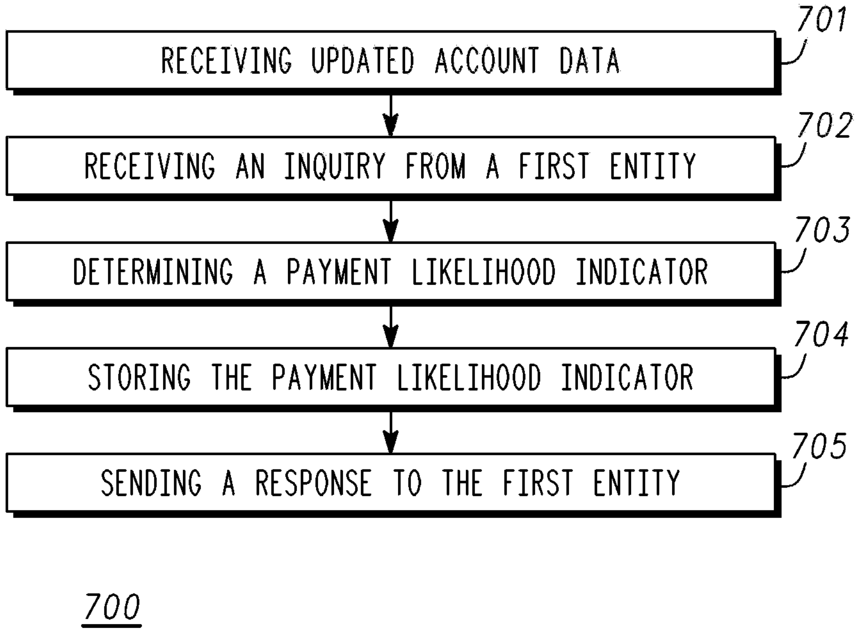
FIG. 7 illustrates an exemplary flow chart for a method to facilitate determining an availability of funds for a payment item, according to an embodiment.

Turning ahead in the drawings, FIG. 7 illustrates a flow chart for a method 700 to facilitate determining an availability of funds for a payment item, according to an embodiment. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. Method 700 can be similar or identical to the acts performed by system 203 (FIGS. 2-4) in workflow 400 (FIG. 5). In many embodiments, the payment item can include one of a check or an ACH item.

Referring to FIG. 7, method 700 can include a block 701 of receiving at least hourly updated account data comprising current statuses and current available balances of accounts maintained by one or more depository financial institutions. The financial institutions can be similar or identical to financial institutions 131-134 (FIG. 1), first financial institution 202 (FIGS. 2-4), and/or second financial institution 204 (FIGS. 2-3).

In many embodiments, method 700 additionally can include a block 702 of receiving an inquiry through a network from a first entity. The first entity can be similar or identical to first financial institution 202 (FIGS. 2-4). The network can be similar or identical to network 120 (FIG. 1). The inquiry can be similar or identical to the inquiry sent from first financial institution 202 (FIGS. 2-4) to system 203 (FIGS. 2-4) in activity 414 (FIG. 4), and block 702 can be similar or identical to activity 414 (FIG. 4). In a number of embodiments, the inquiry can be received from the first entity in real-time after the first entity receives the payment item. For example, the first entity can receive the payment item similarly or identical to first financial institution 202 (FIGS. 2-4) receiving the payment item in activity 412 (FIG. 3). In various embodiments, the payment item can specify a second entity as responsible for paying the payment item. The second entity can be similar or identical to second financial institution 204 (FIGS. 2-3). In many embodiments, the first entity can be different from the second entity. In some embodiments, the payment item can specify an account maintained by the second entity for payment of the payment item. In a number of embodiments, one of the one or more depository financial institutions can include the second entity.

In a number of embodiments, the payment item can be a check, the first entity can be a depository financial institution receiving the check for deposit, and the second entity can be a depository financial institution against which the check has been drawn. In other embodiments, the payment item can be an ACH item, the first entity can be an originating depository financial institution (ODFI) for the ACH item, and the second entity can be a receiving depository financial institution (RDFI) for the ACH item. In several embodiments, the inquiry can include a routing number of the second entity that is specified by the payment item; an account number maintained by the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and/or, if the payment item is a check, a serial number of the check.

In some embodiments, method 700 further can include a block 703 of determining a payment likelihood indicator based at least in part on a status and an available balance of the account as updated by the updated account data. The payment likelihood indicator can be similar or identical to the payment likelihood indicator determined by second financial institution 204 (FIGS. 2-3) in activity 415 (FIG. 4), and block 703 can be similar to activity 415 (FIG. 4).

In many embodiments, method 700 additionally can include a block 704 of storing the payment likelihood indicator. For example, block 704 of storing the payment likelihood indicator can be similar or identical to activity 417 (FIG. 4) of system 203 (FIGS. 2-4) storing the payment likelihood indicator.

In some embodiments, method 700 further can include a block 705 of sending a response through the network to the first entity in real-time after receiving the inquiry. The response can be similar or identical to the response sent from system 203 (FIGS. 2-4) to first financial institution 202 (FIGS. 2-4) in activity 418 (FIG. 4), and block 705 can be similar or identical to activity 418 (FIG. 4). In a number of embodiments, the response can include the payment likelihood indicator.

In various embodiments, the payment likelihood indicator can indicate a likelihood of the second entity to pay the payment item. In a number of embodiments, the payment likelihood indicator in the response can include an indication of whether or not the second entity guarantees payment of the payment item. In many embodiments, the payment likelihood indicator in the response can include a score. The score can be similar or identical to the payment likelihood score determined by system 203 (FIGS. 2-4) in activity 415 (FIG. 4). In various embodiments, the response can further include one or more reason indicators to explain the payment likelihood indicator. The reason indicators can be similar or identical to the reason indicators determined by system 203 (FIGS. 2-3) in activity 415 (FIG. 4). In various embodiments, the response can be sent within 30 seconds of receiving the inquiry.

Returning to FIG. 1, as described above, system 110 can include one or more modules, such as communications module 112, data module 113, risk engine 114, and/or likelihood calculation engine 115. System 110 and the modules therein are merely exemplary and are not limited to the embodiments presented herein. System 110 can be employed in many different embodiments or examples not specifically depicted or described herein. In some embodiments, certain elements or modules of system 110 can perform various procedures, processes, and/or acts. In other embodiments, the procedures, processes, and/or acts can be performed by other suitable elements or modules.

In many embodiments, communications module 112 can at least partially perform block 502 (FIG. 5) of receiving a first inquiry at the processing mechanism through the network from the first entity, block 504 (FIG. 5) of sending a second inquiry from the processing mechanism through the network to the second entity in real-time after receiving the first inquiry, block 505 (FIG. 5) of receiving a first response at the processing mechanism through the network from the second entity, block 507 (FIG. 5) of sending a second response from the processing mechanism through the network to the first entity in real-time after receiving the first response, block 601 (FIG. 6) of receiving a first inquiry through a network from a first entity, block 603 (FIG. 6) of sending a first response through the network to the first entity in real-time after receiving the first inquiry, block 604 (FIG. 6) of sending an informational message through the network to the second entity in real-time after receiving the first inquiry, block 605 (FIG. 6) of sending a second inquiry through the network to the second entity in real-time after receiving the first inquiry, block 606 (FIG. 6) of receiving a request for additional information through the network from the second entity, block 607 (FIG. 6) of sending an informational message through the network to the second entity in real-time after receiving the request for additional information, block 608 (FIG. 6) of receiving a second response through the network from the second entity, block 610 (FIG.

6) of sending a third response through the network to the first entity in real-time after receiving the second response, block 611 (FIG. 6) of sending an informational message through the network to the second entity including information derived from determining the routing decision, block 612 (FIG. 6) of receiving a first payment decision message through the network from the first entity that indicates whether the first entity paid the payment item, block 613 (FIG. 6) of sending a second payment decision message through the network to the second entity, block 701 (FIG. 7) of receiving at least hourly updated account data comprising current statuses and current available balances of accounts maintained by one or more depository financial institutions, block 702 (FIG. 7) of receiving an inquiry through a network from a first entity, and/or block 705 (FIG. 7) of sending a response through the network to the first entity in real-time after receiving the inquiry.

In several embodiments, data module 113 can at least partially perform block 503 (FIG. 5) of storing the first inquiry received from the first entity along with a first timestamp that indicates when the first inquiry was received from the first entity, block 506 (FIG. 5) of storing the first response received from the second entity along with a second timestamp that indicates when the first response was received from the second entity, block 609 (FIG. 6) of storing the second response received from the second entity along with a timestamp that indicates when the second response was received from the second entity, and/or block 704 (FIG. 7) of storing the payment likelihood indicator. In some embodiments, module 113 also can perform portions of block 602 (FIG. 6) and block 703 (FIG. 7).

In many embodiments, risk engine 114 can at least partially perform block 602 (FIG. 6) of determining a routing decision of whether or not to route the first inquiry to a second entity. Furthermore, as explained above for activity 320 (FIG. 3), some embodiments of risk engine 114 also can at least partially perform block 609 (FIG. 6) when block 320 (FIG. 3) refines or further determines the payment likelihood after receiving the originally determined payment likelihood from the second financial institution.

In several embodiments, likelihood calculation engine 115 can at least partially perform block 703 (FIG. 7) of determining a payment likelihood indicator based at least in part on a status and an available balance of the account as updated by the updated account data In various embodiments, the techniques described herein can beneficially connect in real-time a depository bank, an originator, or a payment acceptor with information from the paying bank about a payment item in order to deliver more intelligence as to the likelihood that the payment item will pay. These techniques can advantageously provide the paying bank with insight as to check and/or ACH items that will clear in the near term. In many embodiments, the techniques described herein can allow financial institutions to connect to a single entity (e.g., server 110 (FIG. 1) or server 203 (FIGS. 2-4) to connect to multiple financial institutions for query and responses, and/or to access fraud-prevention services.

Figure 9:
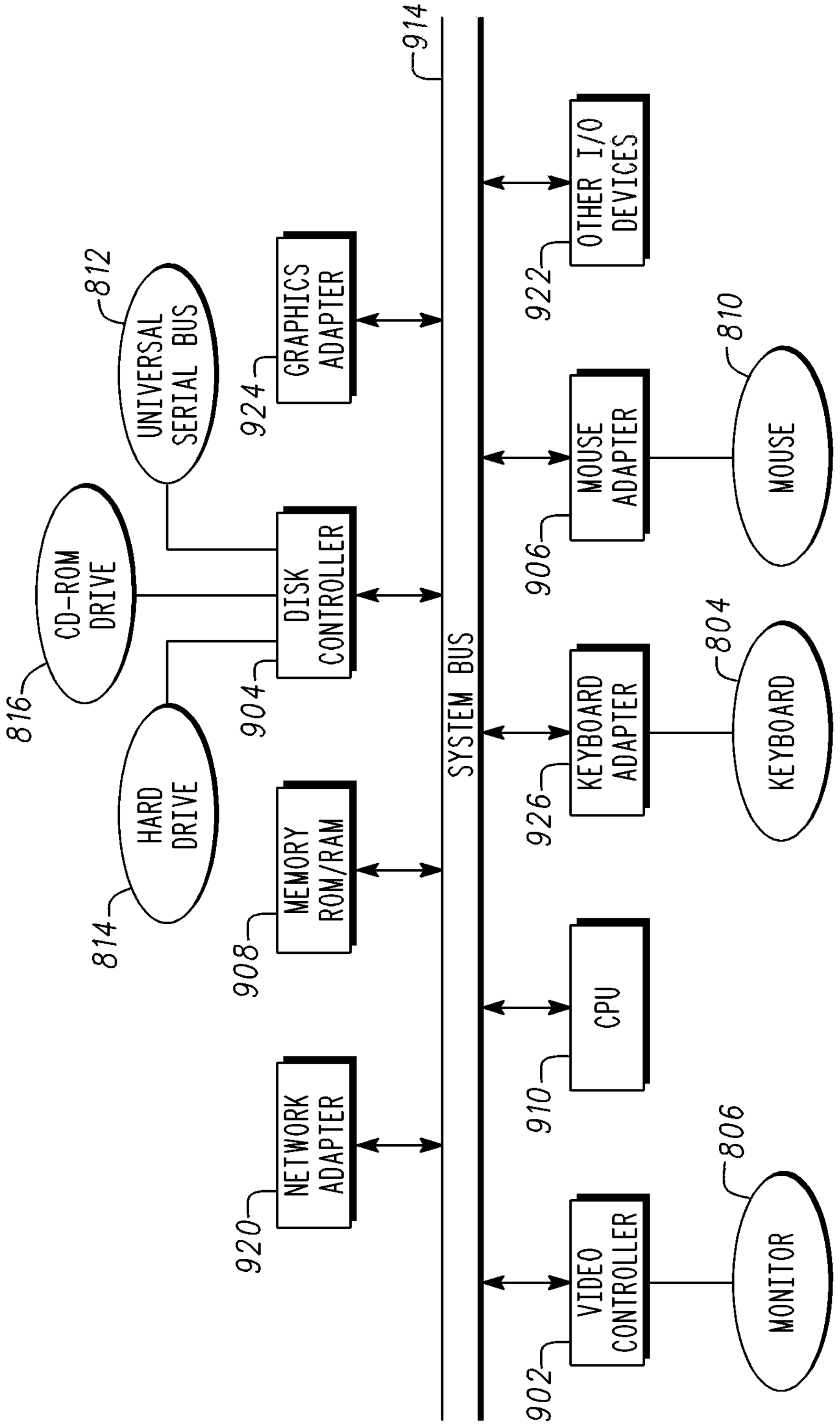
FIG. 9 illustrates a representative block diagram of an example of elements included in circuit boards inside a chassis of the computer of FIG. 8.
Figure 44:
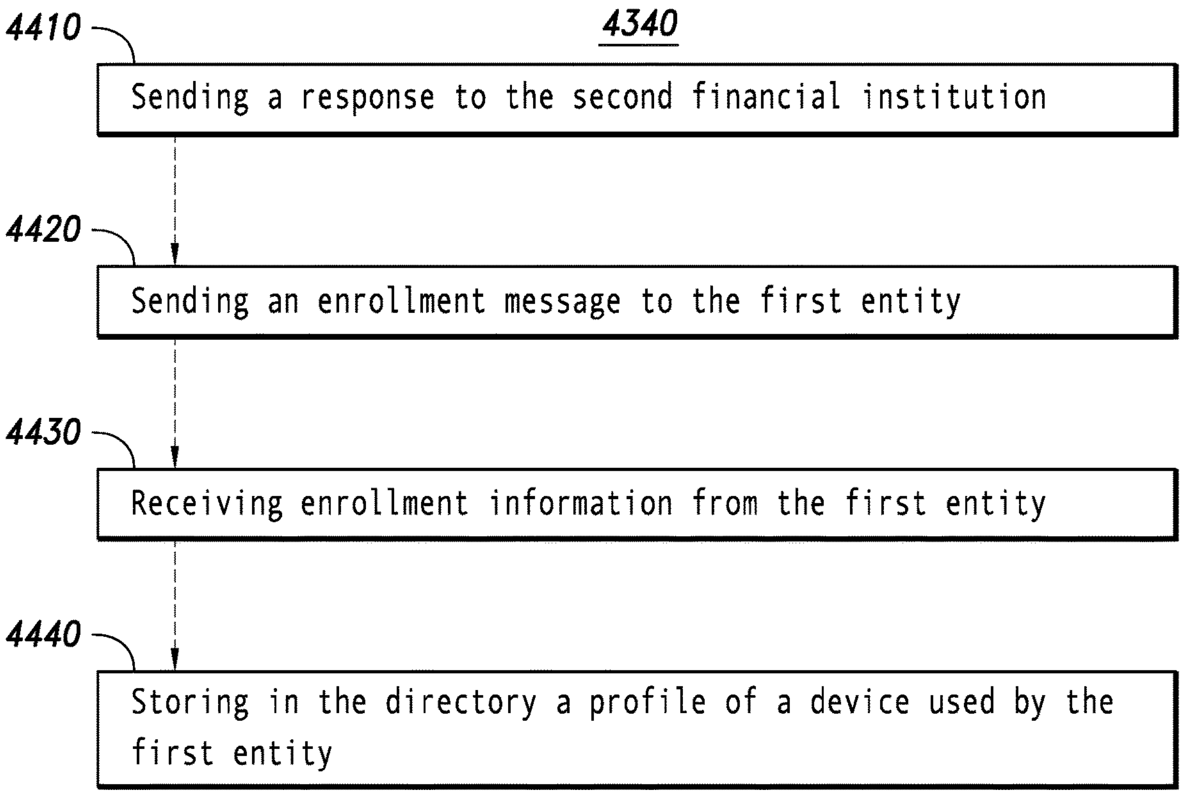
FIG. 44 illustrates a block of optional additional steps, according to the embodiment of FIG. 43.
Figure 45:
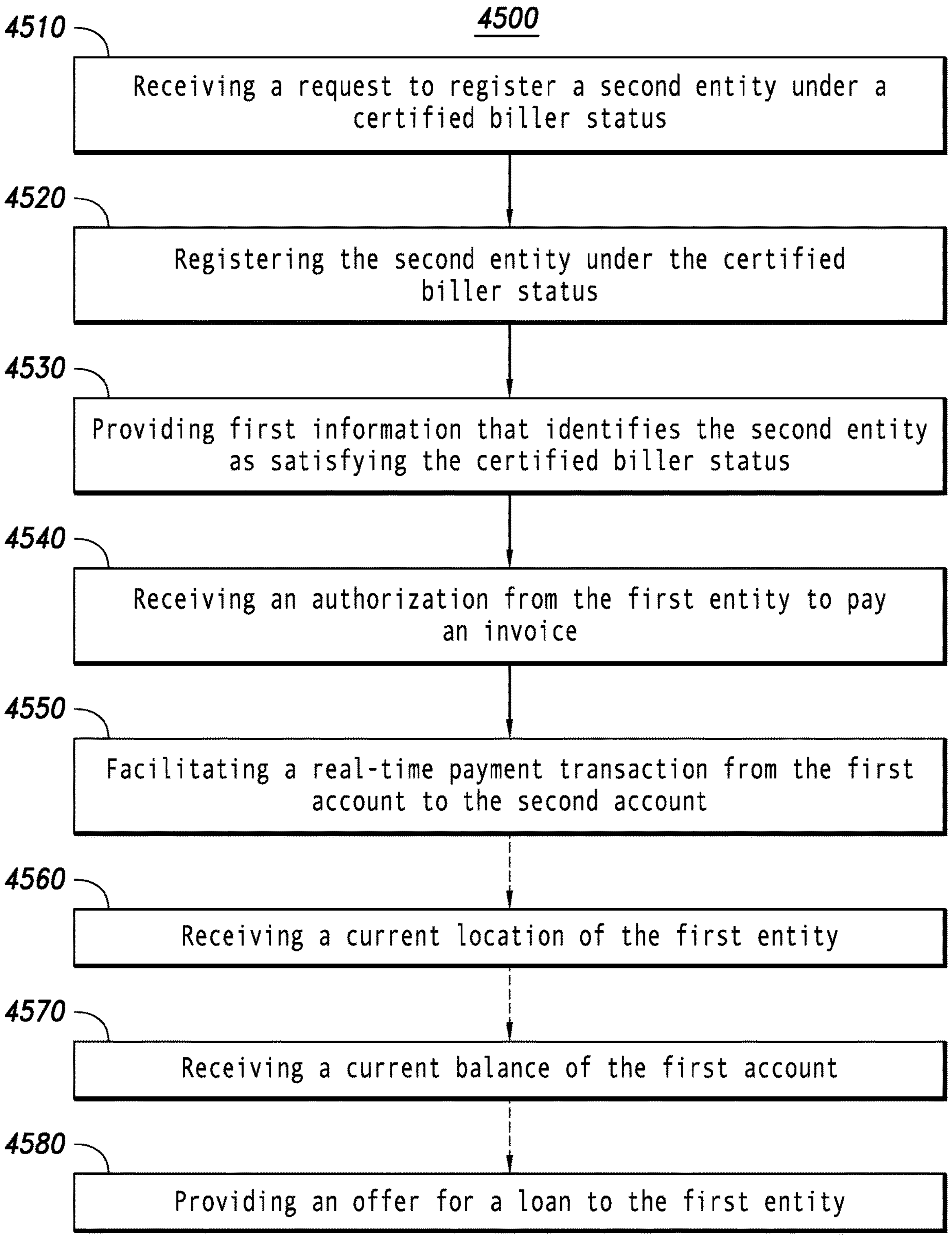
FIG. 45 illustrates a flow chart for a method, according to another embodiment.

Turning ahead in the drawings, FIG. 8 illustrates a computer 800, all of which or a portion of which can be suitable for implementing an embodiment of at least a portion of system 110 (FIG. 1), system 203 (FIGS. 2-4), system 1000 (FIGS. 10-11), system 1200 (FIG. 12); system 1300 (FIGS. 13-14), system 1500 (FIGS. 15-16), system 1700 (FIG. 17), transaction system 1050 (FIGS. 10-17, 28), sending participant (FIGS. 10-17, 28), receiving participant (FIGS. 10-17, 28), application service provider 1030 (FIGS. 10-12), application service provider 1330 (FIGS. 13-14), application service provider 1530 (FIGS. 15-17), application service provider 2830 (FIG. 28), system 2900 (FIG. 29), transaction system 2950 (FIG. 29), application service provider 2930 (FIG. 29), and/or biller system 2970 (FIG. 29), and/or the techniques described in workflow 200 (FIG. 2), workflow 300 (FIG. 3), workflow 400 (FIG. 4), method 500 (FIG. 5), method 600 (FIG. 6), method 700 (FIG. 7), method 1800 (FIG. 18), block 1801 (FIG. 19), block 1802 (FIG. 20), method 2100 (FIG. 21), method 2200 (FIG. 22), block 2201 (FIG. 23), method 2400 (FIG. 24), block 2401 (FIG. 25), method 2600 (FIG. 26), block 2601 (FIG. 27), method 4300 (FIG. 43), block 4340 (FIG. 44), method 4500 (FIG. 45). Computer 800 includes a chassis 802 containing one or more circuit boards (not shown), a USB (universal serial bus) port 812, a Compact Disc Read-Only Memory (CD-ROM) and/or Digital Video Disc (DVD) drive 816, and a hard drive 814. A representative block diagram of the elements included on the circuit boards inside chassis 802 is shown in FIG. 9. A central processing unit (CPU) 910 in FIG. 9 is coupled to a system bus 914 in FIG. 9. In various embodiments, the architecture of CPU 910 can be compliant with any of a variety of commercially distributed architecture families.

Continuing with FIG. 9, system bus 914 also is coupled to memory 908 that includes both read only memory (ROM) and random access memory (RAM). Non-volatile portions of memory storage unit 908 or the ROM can be encoded with a boot code sequence suitable for restoring computer 800 (FIG. 8) to a functional state after a system reset. In addition, memory 908 can include microcode such as a Basic Input-Output System (BIOS). In some examples, the one or more memory storage units of the various embodiments disclosed herein can comprise memory storage unit 908, a USB-equipped electronic device, such as, an external memory storage unit (not shown) coupled to universal serial bus (USB) port 812 (FIGS. 8-9), hard drive 814 (FIGS. 8-9), and/or CD-ROM or DVD drive 816 (FIGS. 8-9). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 910.

In the depicted embodiment of FIG. 9, various I/O devices such as a disk controller 904, a graphics adapter 924, a video controller 902, a keyboard adapter 926, a mouse adapter 906, a network adapter 920, and other I/O devices 922 can be coupled to system bus 914. Keyboard adapter 926 and mouse adapter 906 are coupled to a keyboard 804 (FIGS. 8 and 9) and a mouse 810 (FIGS. 8 and 9), respectively, of computer 800 (FIG. 8). While graphics adapter 924 and video controller 902 are indicated as distinct units in FIG. 9, video controller 902 can be integrated into graphics adapter 924, or vice versa in other embodiments. Video controller 902 is suitable for refreshing a monitor 806 (FIGS. 8 and 9) to display images on a screen 808 (FIG. 8) of computer 800 (FIG. 8). Disk controller 904 can control hard drive 814 (FIGS. 8 and 9), USB port 812 (FIGS. 8 and 9), and CD-ROM or DVD drive 816 (FIGS. 8 and 9). In other embodiments, distinct units can be used to control each of these devices separately.

In some embodiments, network adapter 920 can comprise and/or be implemented as a WNIC (wireless network interface controller) card (not shown) plugged or coupled to an expansion port (not shown) in computer system 800 (FIG. 8). In other embodiments, the WNIC card can be a wireless network card built into computer system 800 (FIG. 8). A wireless network adapter can be built into computer system 800 (FIG. 8) by having wireless communication capabilities integrated into the motherboard chipset (not shown), or implemented via one or more dedicated wireless communication chips (not shown), connected through a PCI (peripheral component interconnector) or a PCI express bus of computer system 800 (FIG. 8) or USB port 812 (FIG. 8). In other embodiments, network adapter 920 can comprise and/or be implemented as a wired network interface controller card (not shown).

Although many other components of computer 800 (FIG. 8) are not shown, such components and their interconnection are well known to those of ordinary skill in the art. Accordingly, further details concerning the construction and composition of computer 800 and the circuit boards inside chassis 802 (FIG. 8) need not be discussed herein.

When computer 800 in FIG. 8 is running, program instructions stored on a USB drive in USB port 812, on a CD-ROM or DVD in CD-ROM and/or DVD drive 816, on hard drive 814, or in memory 908 (FIG. 9) are executed by CPU 910 (FIG. 9). A portion of the program instructions, stored on these devices, can be suitable for carrying out all or at least part of the techniques described herein.

Although computer system 800 is illustrated as a desktop computer in FIG. 8, there can be examples where computer system 800 may take a different form factor while still having functional elements similar to those described for computer system 800. In some embodiments, computer system 800 may comprise a single computer, a single server, or a cluster or collection of computers or servers, or a cloud of computers or servers. Typically, a cluster or collection of servers can be used when the demand on computer system 800 exceeds the reasonable capability of a single server or computer. In certain embodiments, computer system 800 may comprise a portable computer, such as a laptop computer. In certain other embodiments, computer system 800 may comprise a mobile device, such as a smartphone. In certain additional embodiments, computer system 800 may comprise an embedded system.

In many embodiments, after a biller sends a bill to a customer, the customer can send a payment to the biller such that the biller can have real-time availability of funds. Various embodiments of a system for payment with real-time funds availability can include a payor (also referred to as a sender or the customer), an application service provider, a sending participant, and application sponsor, a transaction system, a receiving participant, the biller (also referred to as a recipient), and/or other suitable elements, as shown in one or more of FIGS. 10-17 and described below. In many embodiments, the transaction system can provide for real-time communication between financial institutions to facilitate real-time funds availability in payment transactions. The transaction system can be similar to system 110 (FIG. 1) or system 203 (FIGS. 2-4). The payment and payment transactions can be to pay one or more bills and/or other financial obligations.

Figure 10:
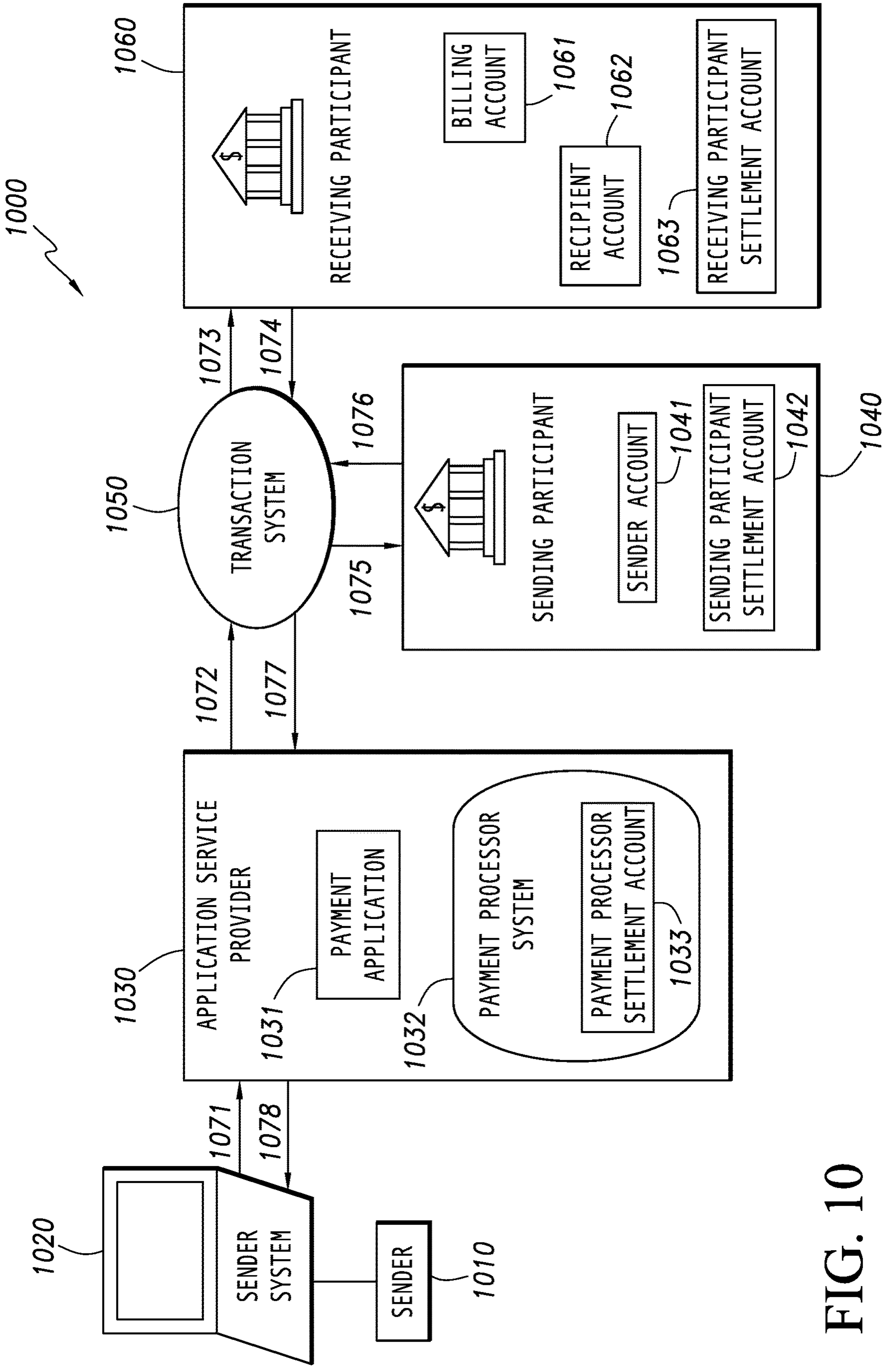
FIG. 10 illustrates a block diagram of a system in which an application service provider is in data communication with a transaction system, and showing messages for an "is account real-time capable call," according to an embodiment.
Figure 11:
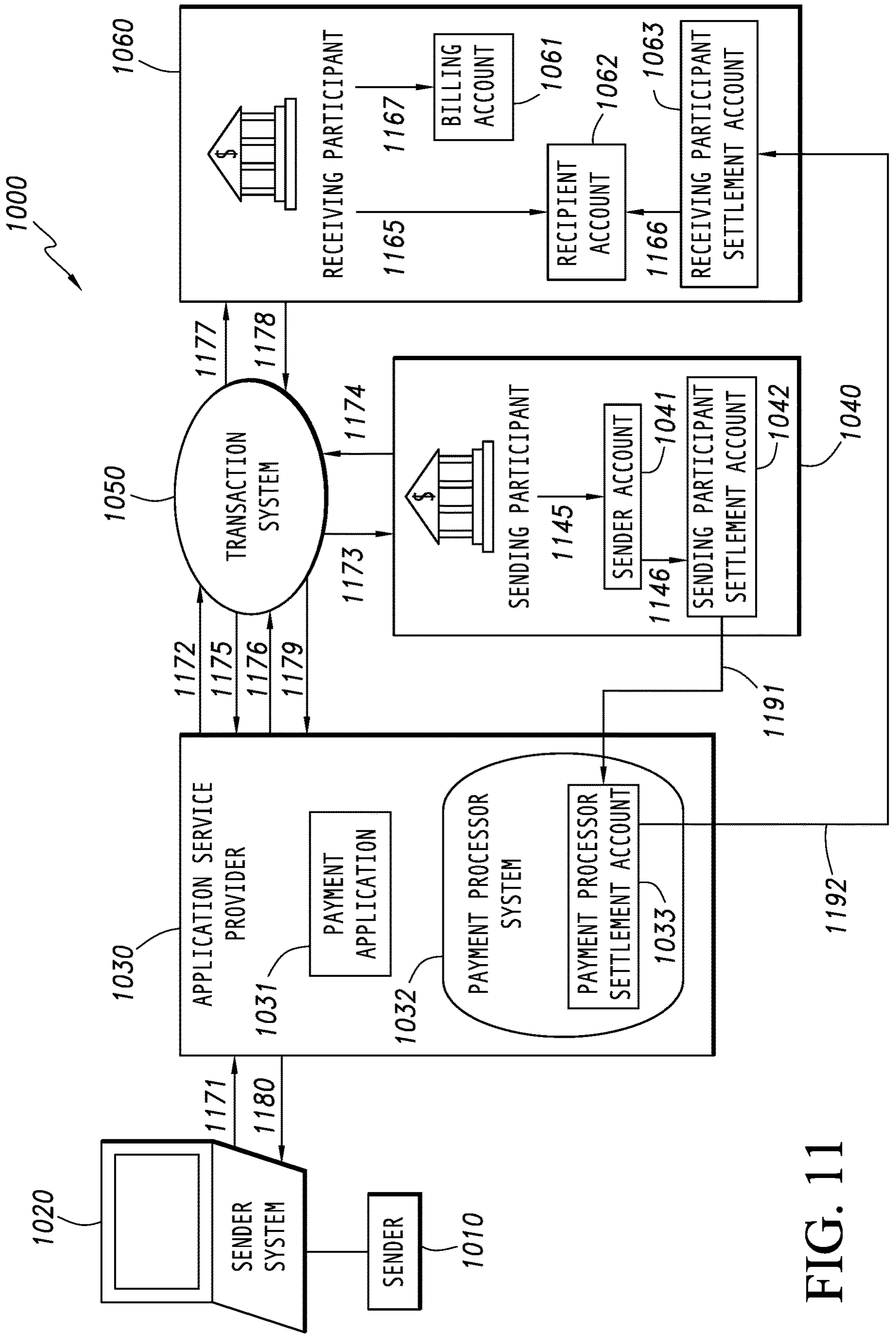
FIG. 11 illustrates a block diagram of the system of FIG. 10, showing payment messages.
Figure 12:
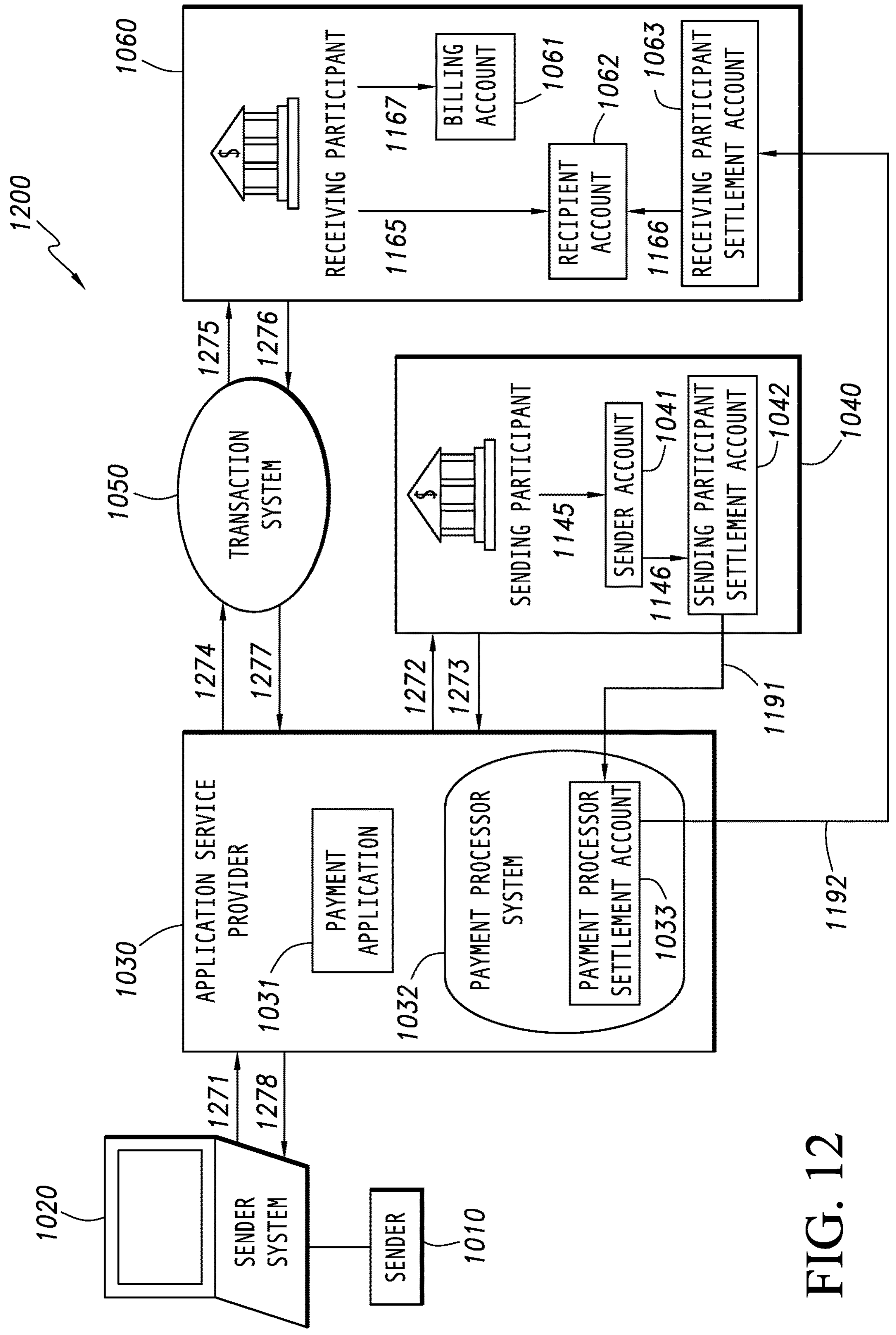
FIG. 12 illustrates a block diagram of a system that is a variation of the system of FIG. 10, in which a sending participant of FIG. 10 is in data communication with the application service provider of FIG. 10 instead of the transaction system of FIG. 10, and showing the payment messages, according to an embodiment.
Figure 13:
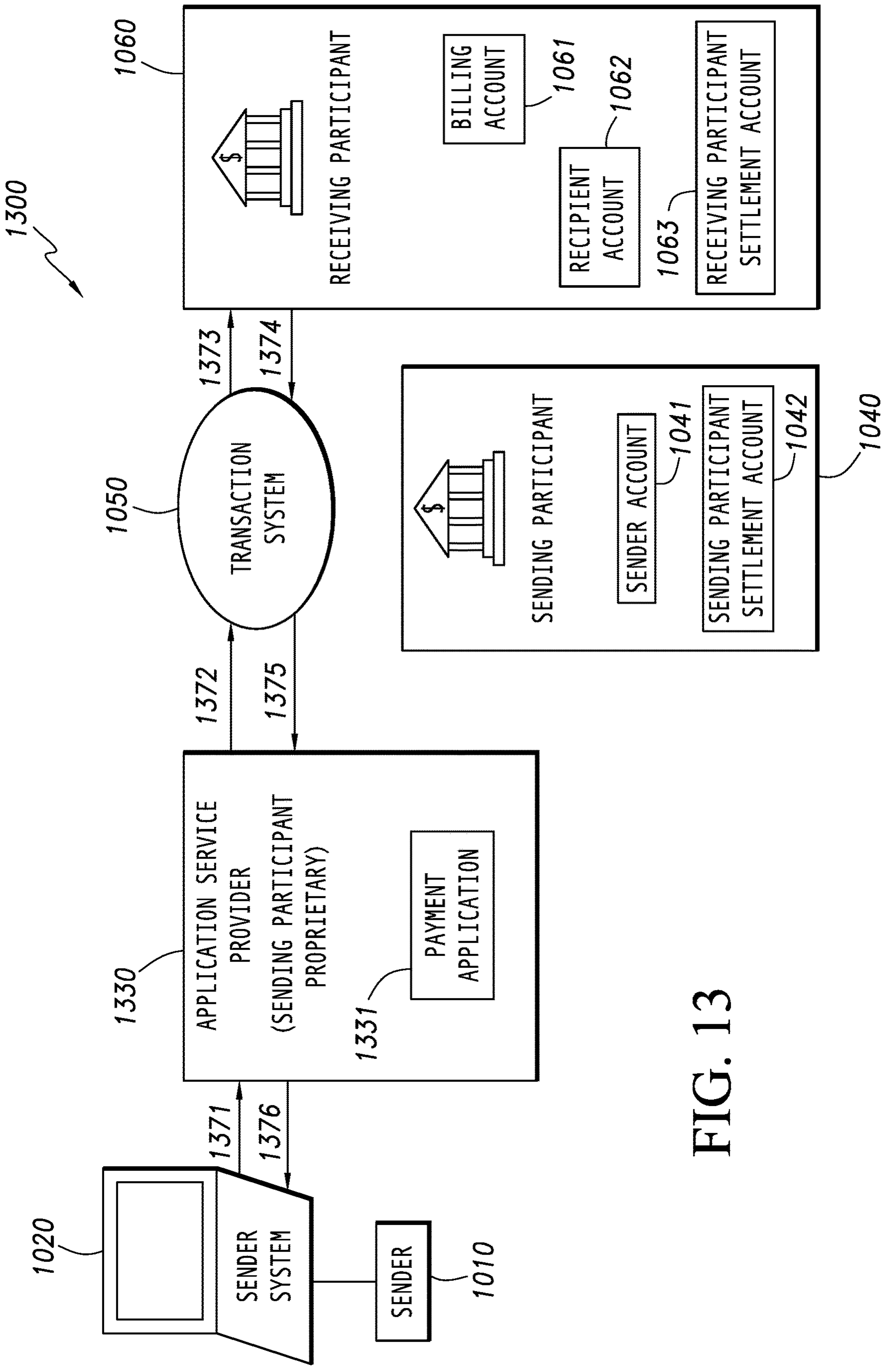
FIG. 13 illustrates a block diagram of a system that is a variation of the system of FIG. 10, showing messages for an "is account real-time capable call," according to an embodiment.
Figure 14:
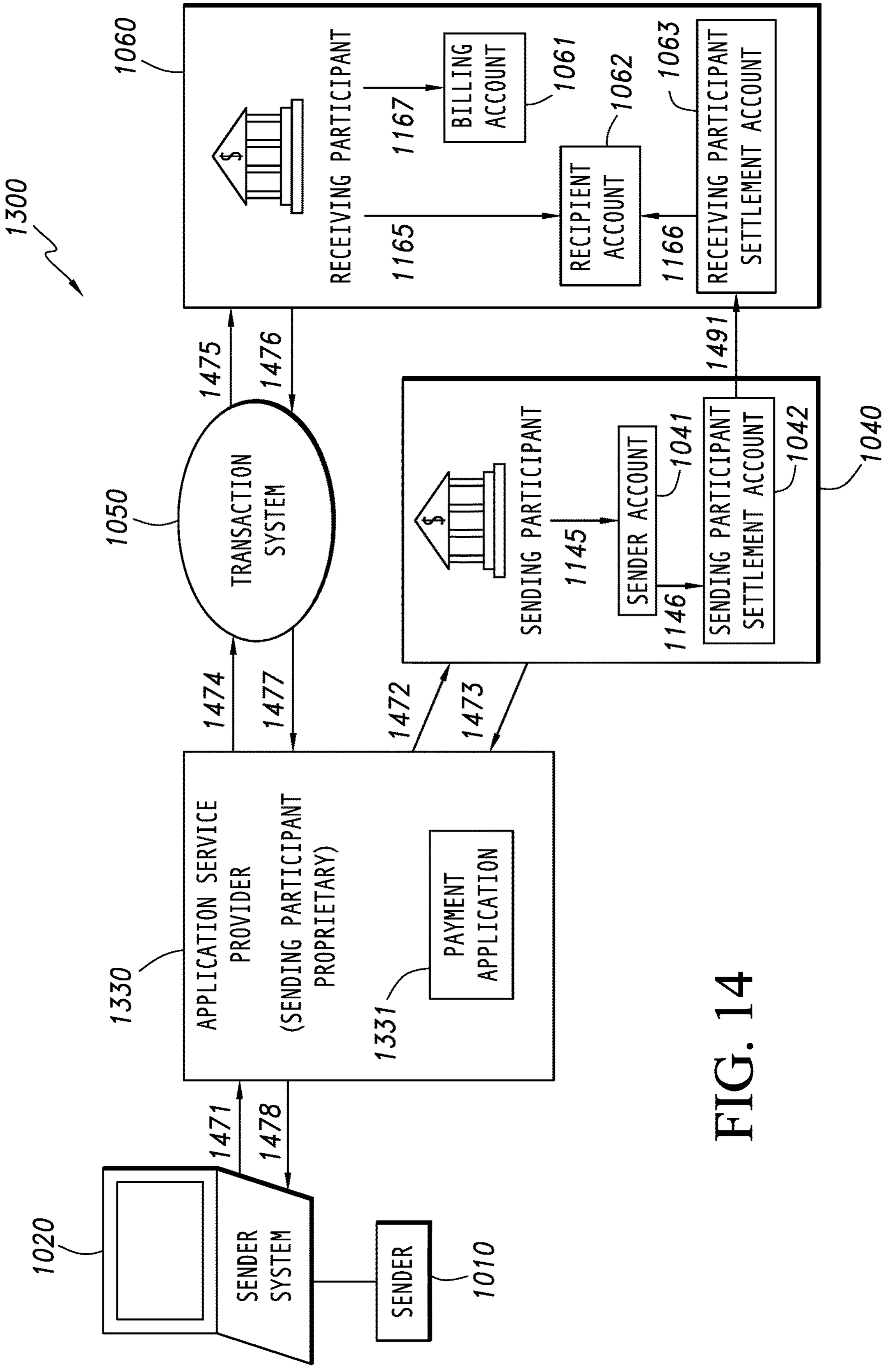
FIG. 14 illustrates a block diagram of the system of FIG. 13, showing the payment messages.
Figure 15:
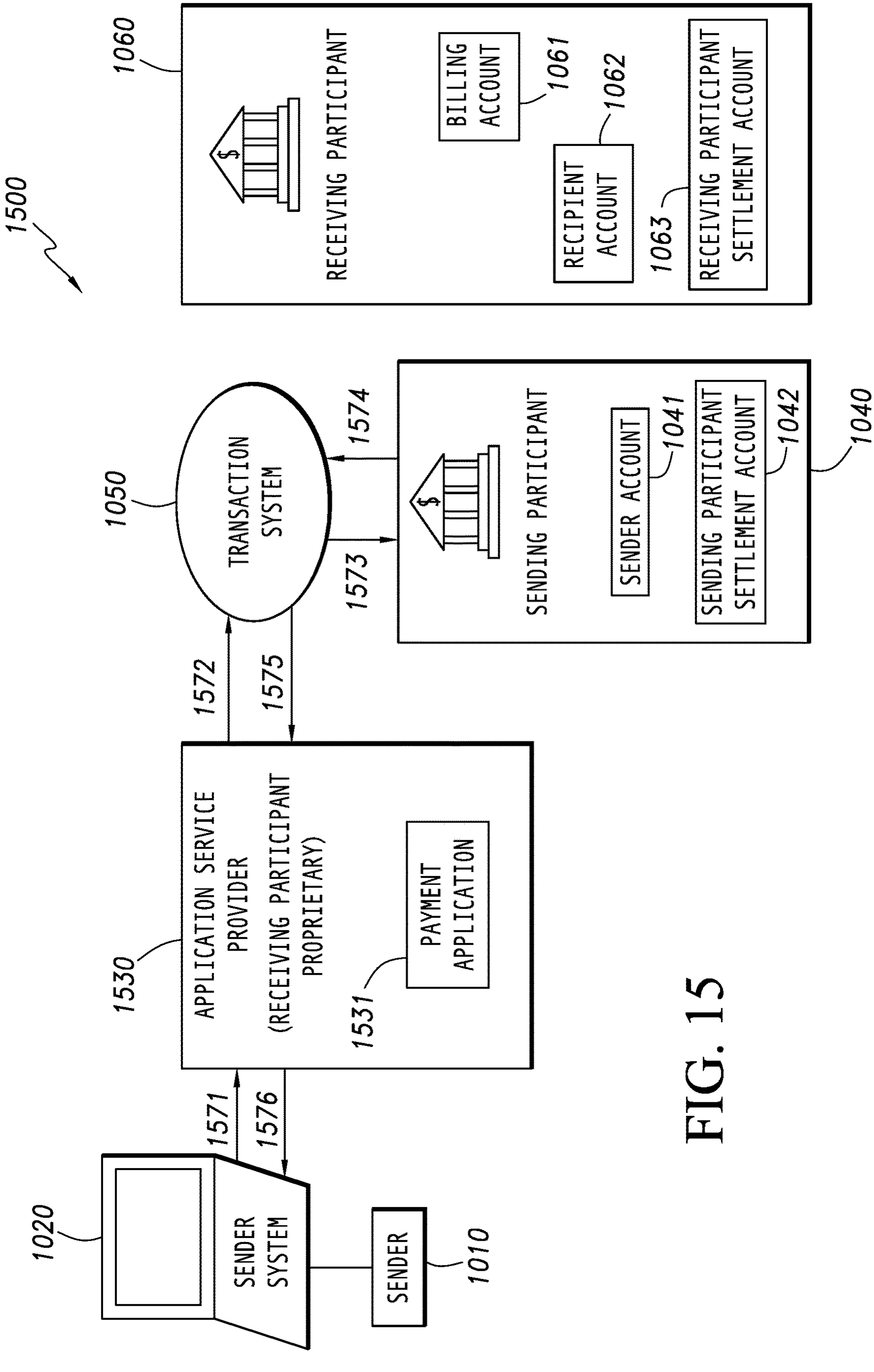
FIG. 15 illustrates a block diagram of a system that is a variation of the system of FIG. 10, in which a receiving participant of FIG. 10 is in data communication with the transaction system of FIG. 10 for credit call messages, and showing messages for an "is account real-time capable call," according to an embodiment.
Figure 16:
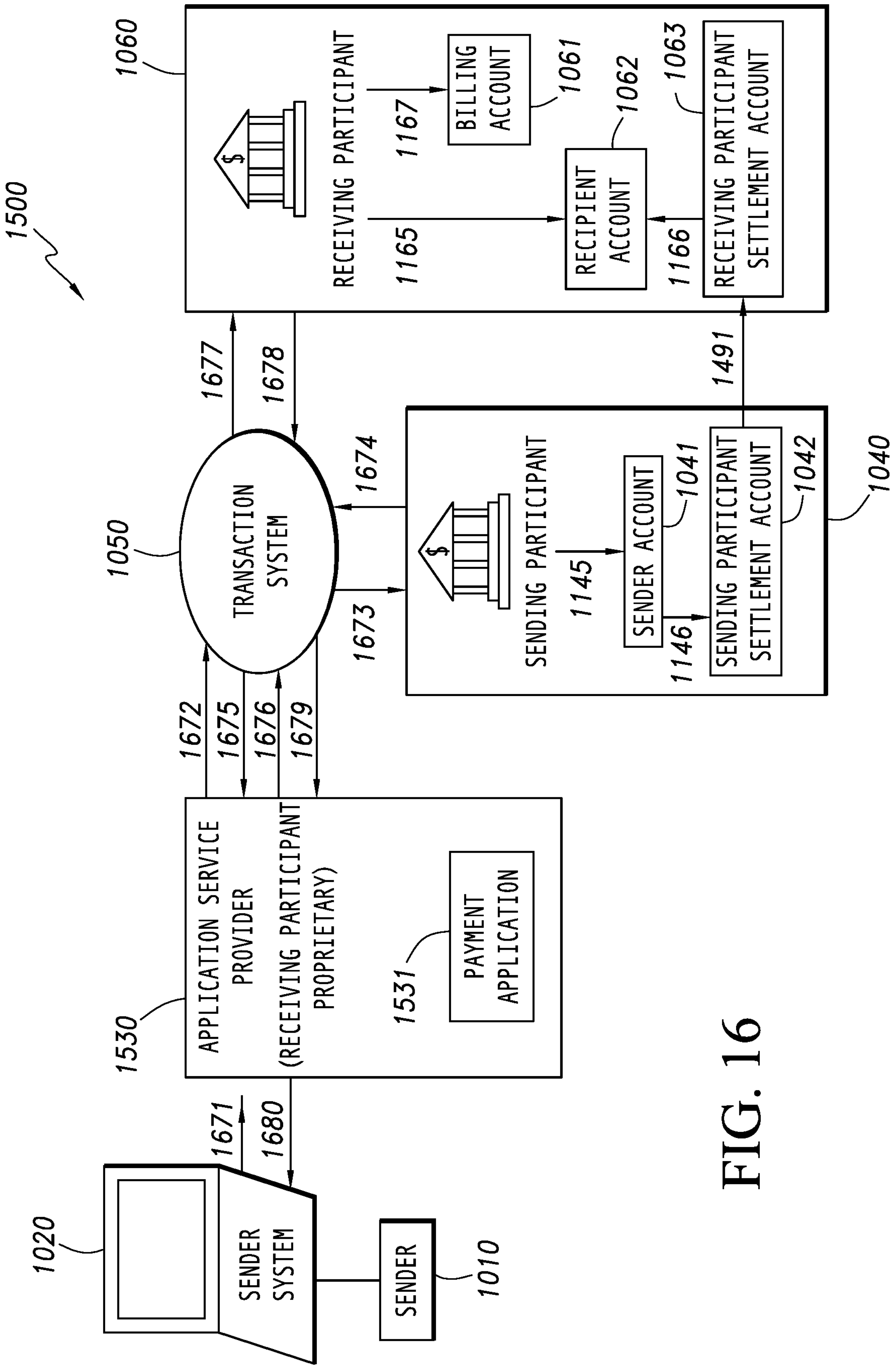
FIG. 16 illustrates a block diagram of the system of FIG. 15, showing the payment messages.
Figure 17:
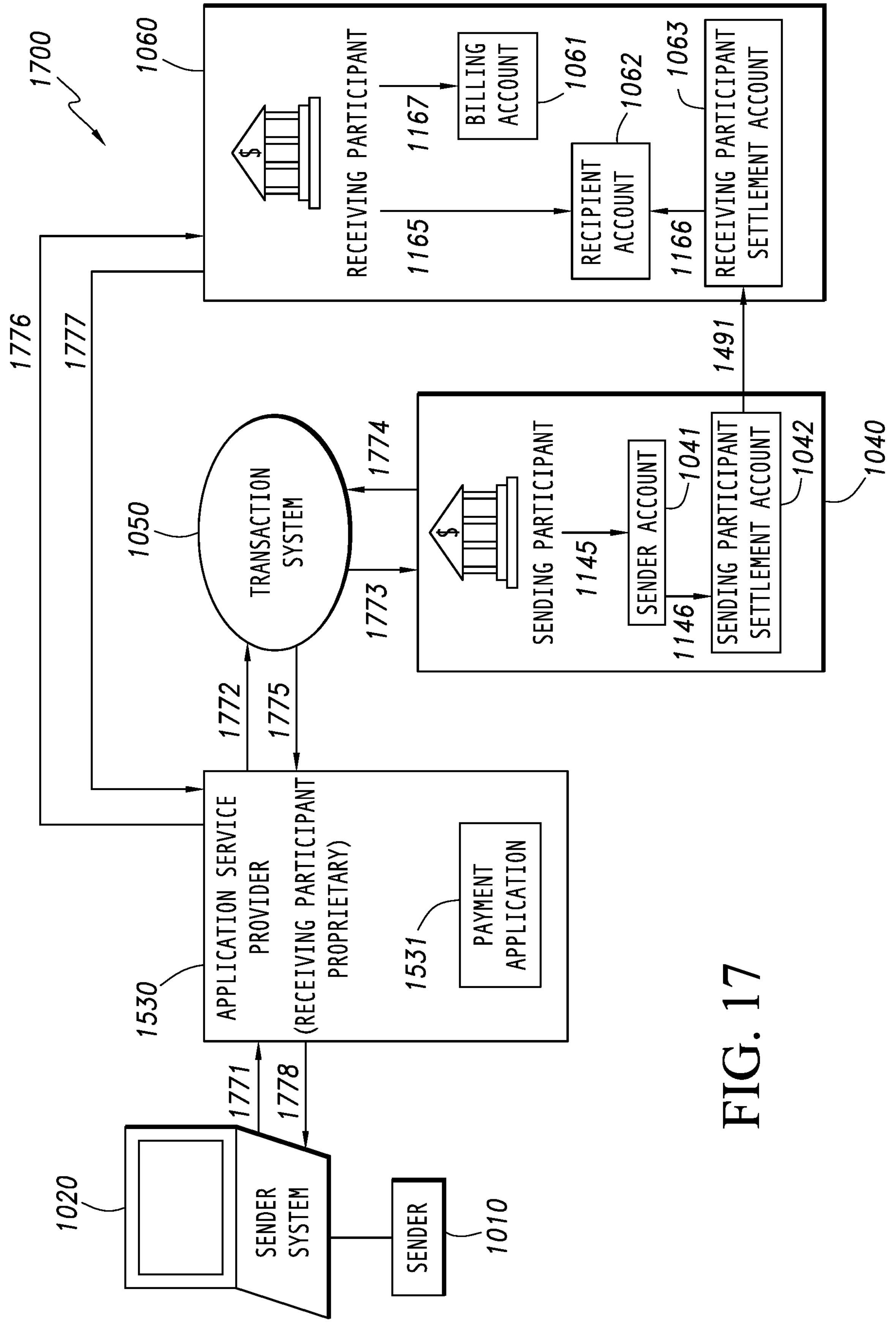
FIG. 17 illustrates a block diagram of a system that is a variation of the system of FIG. 15, in which the receiving participant of FIG. 15 (or FIG. 10) is in data communication for the credit call messages with an application service provider of FIG. 15 instead of the transaction system of FIG. 15 (or FIG. 10), and showing the payment messages, according to an embodiment.

In some embodiments, payment with real-time funds availability can be provided through a consolidated payment model, such as shown in FIGS. 10-14 and described below, where the payment model can be to pay one or more bills or other financial obligations. For example, payment transactions can be initiated at an aggregator or consolidator website, such as, in some embodiments, at a website or an application of the sending participant, such as shown in FIGS. 13-14 and described below, or, in other embodiments, at a website or an application hosted by an application service provider that is separate from the sending participant, such as shown in FIGS. 10-12 and described below. In many embodiments, the application service provider can be separate from the sending participant, but the application service provider can host a website or an application on behalf of the sending participant. In a number of embodiments, the consolidated payment model can allow the consumer to make payments to multiple different billers. In some embodiments, the billers can be pre-registered to receive payments through the application service provider. In several embodiments, payment with real-time funds availability can be provided through a biller direct model, which can allow the sender to initiate payment transactions directly through a biller that issues bills, such as through a website or an application of the biller, such as shown in FIGS. 15-17 and described below.

Turning ahead in the drawings, FIGS. 10-12 illustrate block diagrams of systems that can be employed for real-time funds availability in payment transactions in a first exemplary scenario, using the consolidated payment model, in which an application service provider is separate from the sending participant. FIG. 10 illustrates a block diagram of a system 1000 in which an application service provider 1030 is in data communication with a transaction system 1050, and showing messages for an "is account real-time capable call." FIG. 11 illustrates a block diagram of system 1000, showing payment messages. FIG. 12 illustrates a block diagram of a system 1200 that is a variation of system 1100 of FIGS. 10-11, in which a sending participant 1040 is in data communication with application service provider 1030 instead of transaction system 1050, and showing details of the payment messages.

System 1000 is merely exemplary and embodiments of the system are not limited to the embodiments presented herein. The system can be employed in many different embodiments or examples not specifically depicted or described herein. In some embodiments, certain elements or modules of system 1000 can perform various procedures, processes, and/or activities. In other embodiments, the procedures, processes, and/or activities can be performed by other suitable elements or modules of system 1000.

In many embodiments, system 1000 (FIGS. 10-11) can include a sender 1010, a sender system 1020, application service provider 1030, sending participant 1040, transaction system 1050, and/or receiving participant 1060. In many embodiments, sender 1010 can be the payor of the bill-pay transaction (e.g., the customer) and/or can be an end-user that initiates a funds transfer, such as through sender system 1020. In several embodiments, application service provider 1030 can be an entity that provides a user interface (UI) or application programming interface (API) for a payment application 1031, which can be hosted by application service provider and accessed through sender system 1020 and which can be used to pay one or more bills and/or other financial obligations. In a number of embodiments, sending participant 1040 can be a financial institution that holds a sender account 1041, which can be a funding account of sender 1010 to be debited in conjunction with a debit/payment transaction. In many embodiments, sender participant 1040 can be similar to financial institutions 131-134 (FIG. 1), first financial institution 202 (FIGS. 2-4) and/or second financial institution 204 (FIGS. 2-3). In several embodiments, sending participant 1040 can approve a debit of funds from sending account 1041. Sender account 1041 can be the funding account used by the sender to fund the transaction. In a number of embodiments, sending participant 1040 can include a sending participant settlement account 1042, which can be used by sending participant 1040 to settle fund transfers between sending participant 1040 and other financial institutions, such as receiving participant 1060.

In a number of embodiments, the application sponsor can be an entity or financial institution that approves the debit transactions from sender account 1041. In many embodiments, sending participant 1040 can serve as the application sponsor for the network funds transfers for the consolidated payment model, such as shown in FIGS. 10-14 and described herein and below. In several embodiments, the receiving participant can serve as the application sponsor for the network funds transfers for the biller direct model, such as shown in FIGS. 15-17 and described below. In a number of embodiments, receiving participant 1060 can be a financial institution that holds a recipient account 1062 to be credited in conjunction with the payment transaction. In many embodiments, receiving participant 1040 can be similar to financial institutions 131-134 (FIG. 1), first financial institution 202 (FIGS. 2-4) and/or second financial institution 204 (FIGS. 2-3). In many embodiments, the recipient can be the biller, which can receive the funds in recipient account 1062 of receiving participant 1060, and/or can be an end-user whose account is credited in conjunction with the payment transaction. In several embodiments, receiving participant 1060 can include a billing account 1061, which can be an account billed to sender 1010, and which is used by sender 1010 to fund a bill-payment or funds transfer to billing account 1061. In a number of embodiments, receiving participant 1060 can include a receiving participant settlement account 1063, which can be used by receiving participant 1060 to settle fund transfers between receiving participant 1060 and other financial institutions, such as sending participant 1040.

In a number of embodiments, the payment transaction can include various messages between various elements of the system. In some embodiments, the messages can include messages for an "is account real-time capable call," which can determine whether real-time payment is an available option for the biller/recipient, such as shown in FIGS. 10, 13, and 15, and described below. In a number of embodiments, the messages can include payment messages, which can include providing a real-time promise-to-pay to the receiving participant, such that the receiving participant can make funds available in real-time to the biller/recipient, such as shown in FIGS. 11-12, 14, and 16-17, and described below.

In the first exemplary scenario, as shown in FIGS. 10-12, a website can be hosted by application service provider 1030, which can be separate from, but on behalf of, sending participant 1040. As an example, the application service provider can be Fiserv, Inc. ("Fiserv"), of Brookfield, Wisconsin or another suitable application service provider; sending participant 1040 (and the application sponsor) can be Capital One Financial Corp. ("CapOne" or "Capital One"), of McLean, Virginia, or another suitable sending participant; and receiving participant 1060 can be United States Automotive Association Federal Savings Bank ("USAA"), of San Antonio, Texas, or another suitable receiving participant. In this exemplary scenario, a Capital One customer, such as sender 1010, can use sender system 1020 to log onto a consolidated payment website, such as payment application 1031, provided by Fiserv to initiate a payment transaction to pay a USAA credit card (e.g., billing account 1061) from a Capital One account (e.g., sender account 1041). For example, Fiserv can provide a Fiserv application to sender 1010, such as through a website accessed on sender system 1020. In many embodiments, application service provider 1030 can include payment processor system 1032, such as the NOW network of Fiserv, or another suitable payment processor system. Application service provider 1030 thus can be referred to as a payment processor. In a number of embodiments, payment processor system 1032 can include at least one payment processor settlement account 1033, which can be an account that resides at a financial institution that is used by application service provider 1030 to facilitate settlement with other financial institutions. In some embodiments, application service provider 1030 can include a payment processor settlement account 1033 for each financial institution within a network of financial institutions that use application service provider 1030 for payment processing.

In many embodiments, payment processor system 1032 of application service provider 1030 can be in data communication with transaction system 1050. In some embodiments, transaction system 1050 can be a switch and/or switch network provided by an entity separate from sending participant 1040, receiving participant 1060, and/or application service provider 1030, such as Early Warning Services, LLC, of Scottsdale, Arizona, or another suitable entity. In a number of embodiments, transaction system 1050 can be in data communication with receiving participant 1060, as shown in FIGS. 10-12. In some embodiments, sending participant 1040 can be in data communication with transaction system 1050, as shown in FIGS. 10-11. In other embodiments, sending participant 1040 can be in data communication with application service provider 1030, as shown in FIG. 12.

FIG. 10 illustrates messages for an "is account real-time capable call," which can be used to determine if application service provider 1030 should present an instant (real-time) payment option to sender 1010 for the biller, by determining if the one or more relevant accounts (i.e., sender account 1041 and recipient account 1062) are real-time capable. For example, sender 1010 can log onto Capital One's payment website hosted by Fiserv, and the sender can choose to pay a bill for the biller/recipient, which has an account with USAA. As shown in FIG. 10, in a number of embodiments, the request by sender 1010 to pay a bill sent by the biller can cause sender system 1020 to send a message 1071 to application service provider 1030 to determine if the relevant accounts are real-time capable. Application service provider 1030 can receive message 1071 from sender system 1020, and can forward message 1071 in a message 1072 to transaction system 1050 to determine if the relevant accounts are real-time capable. Transaction system 1050 receive message 1072 from application service provider

1030, and can forward message 1072 to receiving participant 1060 in a message 1073 to determine if the relevant accounts are real-time capable. Receiving participant 1060 can receive message 1073 from transaction system 1050, can determine whether recipient account 1062 is capable of handling real-time funds availability transactions, and can send a response to transaction system 1050 in a message 1074, which can indicate whether recipient account 1062 is capable of handling real-time funds availability transactions. Transaction system 1050 can receive message 1074 from receiving participant 1060, and can forward message 1072 in a message 1075 to sending participant 1040 to determine if the relevant accounts are real-time capable. Sending participant 1040 can receive message 1075 from transaction system 1050, can determine whether sender account 1041 is capable of handling real-time funds availability transactions, and can send a response to transaction system 1050 in a message 1076, which can indicate whether sender account 1041 is capable of handling real-time funds availability transactions. Transaction system 1050 can receive message 1076 from sending participant 1040. In some embodiments, messages 1073 and 1075 can be sent from transaction system 1050 in any suitable order, and messages 1074 and 1076 can be received at transaction system 1050 in any suitable order.

Transaction system 1050 can forward the responses that were received by transaction system 1050 in message 1074 and message 1076 to application service provider 1030 in a message 1077. Application service provider 1030 can receive message 1077 from transaction system 1050. If the relevant accounts are real-time capable, application service provider 1030 can present an instant payment option to sender 1010 by sending a message 1078 to sender system 1020. Sender system 1020 can receive message 1078 from application service provider 1030. If sending participant 1040 is instead in data communication with application service provider 1030 instead of transaction system 1050, application service provider 1030 can communicate with sending participant 1040, instead of transaction system 1050 communicating with sending participant 1040, to determine if sender account 1041 is capable of handling real-time funds availability transactions. In many embodiments, the "is account real-time capable call" messages (e.g., messages 1071-1078) can each individually, and/or collectively, occur in real-time.

FIG. 11 illustrates payment messages in system 1000, which is a first version of consolidated real-time payment using application service provider 1030 separate from sending participant 1040, in which sending participant 1040 is in data communication with transaction system 1050. As shown in FIG. 11, in a number of embodiments, sender 1010 can use sender system 1020 to submit payment in real-time to application service provider 1030 in a message 1171. Application service provider 1030 can receive message 1171 from sender system 1020, and can send a message 1172 to transaction system 1050 to debit sender account 1041. Transaction system 1050 can receive message 1172 from application service provider 1030, and can send a message 1173 to sending participant 1040 to debit sender account 1041 in sending participant 1040. Sending participant 1040 can receive message 1173 from transaction system 1050, can debit the funds for the payment from sender account 1041 in an activity 1145, and can credit the funds to sending participant settlement account 1042 in an activity 1146. In many embodiments, sending participant 1040 can determine whether to successfully debit sender account 1041 based on a number of factors, such as whether sender account 1041 is open and in good status (or closed), whether sender account 1041 has had recent not sufficient funds (NSF) activity, whether sender account 1041 has a stop payment order, whether sender account 1041 has sufficient funds for the debit, and/or other suitable factors.

In several embodiments, once sending participant 1040 has successfully debited sender account 1041, sending participant 1040 can send a message 1174 to transaction system 1050 that the debit of sender account 1041 was successful. Transaction system 1050 can receive message 1174 from sending participant 1040, and can forward message 1174 to application service provider 1030 in a message 1175 indicating that debiting of sender account 1041 was successful. Application service provider 1030 can receive message 1175 from transaction system 1050. Once application service provider 1030 has determined that the debit of sender account 1041 was successful, application service provider 1030 can send a message 1176 to transaction system 1050 of a promise-to-pay credit. Transaction system 1050 can receive message 1176 from application service provider 1030, and can forward message 1176 to receiving participant 1060 in a message 1177 of a promise-to-pay credit. Receiving participant 1060 can receive message 1177 from transaction system 1050, can credit the funds to recipient account 1062 in an activity 1165, and can debit the funds from receiving participant settlement account 1063 in an activity 1166, to provide real-time funds availability to the biller/recipient. In many embodiments, when recipient account 1062 has been credited, an accounts receivable (AR) system can credit the funds to billing account 1061 corresponding to sender 1010 of the biller/recipient in an activity 1167, which can indicate that sender 1010 has paid billing account 1061.

In many embodiments, once receiving participant 1060 has successfully credited recipient account 1062, receiving participant 1060 can send a message 1178 to transaction system 1050 that the credit of recipient account 1062 was successful. Transaction system 1050 can receive message 1178 from receiving participant 1060, and can forward message 1178 to application service provider 1030 in a message 1179 indicating that the credit of recipient account 1062 was successful. Application service provider 1030 can receive message 1179 from transaction system 1050, and can present a notification of success to sender 1010 to sender system 1020 in a message 1180 that the instant (real-time) payment was successful. Sender system 1020 can receive message 1180 from application service provider 1030, and can provide information to sender 1010 that the real-time payment was successful. In many embodiments, the payment messages (e.g., 1171-1180) can each individually, and/or collectively, occur in real-time.

In a number of embodiments, the settlement of funds in the various accounts (e.g., payment processor settlement account 1033, sender account 1041, sending participant settlement account 1042, billing account 1061, recipient account 1062, and receiving participant settlement account 1063) can occur through various different channels and or through various different methods. For example, in some embodiments, application service provider 1030 can act as a settlement agent, which can effectuate a pull automated clearinghouse (ACH) of the funds from sending participant settlement account 1042 to payment processor settlement account 1033 in an activity 1191. In many embodiments, application service provider 1030 can effectuate a push ACH of the funds to receiving participant settlement account 1063 from payment processor settlement account 1033 in an activity 1192. In other embodiments, the settlement of funds can occur outside of application service provider 1030. In some embodiments, the settlement of transactions can occur nightly in batches, or occasionally during the day, such as 2-5 times a day. In other embodiments, as described below, the settlement of transactions can occur for each payment transaction or regularly for small groups of transactions. In some embodiments, the settlement transactions can occur for each payment transaction in real-time. Various embodiments of settlement are described below in further detail.

In various first embodiments of settlement, settlement can occur as net settlement with batch posting of financial accounts. In such first embodiments of settlement, in activity 1145, sending participant 1040 can apply the debit of funds from sender account 1041 in real-time for providing a payment guarantee. In activity 1146, sending participant 1040 can credit sending participant settlement account 1042 after sender account 1041 is debited. Sending participant settlement account 1042 can be debited later when settlement completes, such as in activity 1191 of pulling the funds from sending participant settlement account 1042 to payment processor settlement account 1033. In activity 1167, billing account 1061 can be updated in real-time to reflect the payment in the balance and open-to-buy (OTB) amount of the USAA credit card, for example. In activity 1165, receiving participant 1060 can apply a memo post credit to recipient account 1062 in real-time when receiving participant 1060 receives the promise-to-pay (e.g., message 1177). Recipient account 1062 can be credited later when receiving participant settlement account 1063 is credited when settlement completes. In activity 1166, receiving participant 1060 can apply a memo post debit to receiving participant settlement account 1063. Receiving participant settlement account 1063 can be credited later when settlement completes. Settlement can complete when activities 1191 and 1192 occur, which can result in transfer of funds from sending participant settlement account 1042 to receiving participant settlement account 1063 through payment processor settlement account 1033.

In the first embodiments of settlement, within real-time of sender submitting payment (e.g., in message 1171), payment can be visible as posted or pending, and the USAA credit card or line of credit OTB can reflect accepted payment with funds available to spend. The account balance for sender 1010 in billing account 1061 can reflect payment in real-time upon receiving participant receiving the promise-to-pay (e.g. message 1177). Receiving participant settlement account 1063 can be debited and credited for the amount of the payment when the funds are received in receiving participant settlement account 1063 when settlement completes.

In the first embodiments of settlement, settlement can complete through the conventional ACH settlement process, such as intra-day or overnight batch processing. In some of the first embodiments of settlement, settlement completion in activities 1191 and 1192 can occur as single ACH items for each transaction. For example, during the batch posting at settlement completion, each transaction can be represented as a single ACH item. In others of the first embodiments of settlement, multiple transactions can be batched and represented as single transaction. For example, if there are multiple transactions between the same two financial institutions, those transactions can all be batched together and settled as a single batch ACH, or through a wire advice file.

In various second embodiments of settlement, settlement can occur as net settlement with batch posting of financial accounts with real-time posting of the AR system. Such second embodiments of settlement can be similar to the first embodiments of settlement. For example, in activity 1145, sending participant 1040 can apply the debit of funds from sender account 1041 in real-time for providing a payment guarantee. In activity 1146, sending participant 1040 can credit sending participant settlement account 1042 after sender account 1041 is debited. Sending participant settlement account 1042 can be debited later when settlement completes, such as in activity 1191 of pulling the funds from sending participant settlement account 1042 to payment processor settlement account 1033. In activity 1167, billing account 1061 can be updated in real-time to reflect the payment in the balance and open-to-buy (OTB) amount of the USAA credit card, for example. In activity 1166, receiving participant 1060 can apply a memo post debit to receiving participant settlement account 1063. Receiving participant settlement account 1063 can be credited later when settlement completes. Settlement can complete when activities 1191 and 1192 occur, which can result in transfer of funds from sending participant settlement account 1042 to receiving participant settlement account 1063 through payment processor settlement account 1033.

The second embodiments of settlement can be different from the first embodiments of settlement in some respects. For example, in activity 1165, receiving participant 1060 can update recipient account 1062 to apply a hard credit in real-time after receiving participant 1060 receives the promise-to-pay (e.g., message 1177). Recipient account 1062 can be credited from receiving participant settlement account 1063.

In the second embodiments of settlement, within real-time of sender submitting payment (e.g., in message 1171), payment can be visible as posted (not pending), and the USAA credit card or line of credit OTB can reflect accepted payment with funds available to spend. The account balance for sender 1010 in billing account 1061 can be updated in real-time upon receiving participant receiving the promise-to-pay (e.g., message 1177), and recipient account 1062 can be credited in real-time. Receiving participant settlement account 1063 can be debited in real-time for the amount of the payment transferred to recipient account 1062, and can be credited for the amount of the payment when the funds are received in receiving participant settlement account 1063 when settlement completes.

The second embodiments of settlement can be similar to the first embodiments of settlement for completion of settlement. For example, settlement can complete through the conventional ACH settlement process, such as intra-day or overnight batch processing. In some of the second embodiments of settlement, settlement completion in activities 1191 and 1192 can occur as single ACH items for each transaction. For example, during the batch posting at settlement completion, each transaction can be represented as a single ACH item. In others of the second embodiments of settlement, multiple transactions can be batched and represented as single transaction. For example, if there are multiple transactions between the same two financial institutions, those transactions can all be batched together and settled as a single batch ACH, or through a wire advice file.

In various third embodiments of settlement, settlement can occur as real-time settlement and real-time posting to the financial accounts and the AR system. Such third embodiments of settlement can be similar to the second embodiments of settlement. For example, in activity 1145, sending participant 1040 can apply the debit of funds from sender account 1041 in real-time for providing a payment guarantee. In activity 1167, billing account 1061 can be updated in real-time to reflect the payment in the balance and open-tobuy (OTB) amount of the USAA credit card, for example. In activity 1165, receiving participant 1060 can update recipient account 1062 to apply a hard credit in real-time after receiving participant 1060 receives the promise-to-pay (e.g., message 1177). Recipient account 1062 can be credited from receiving participant settlement account 1063.

The third embodiments of settlement can be different from the second embodiments of settlement in some respects. For example, in activity 1146, sending participant 1040 can credit in real-time when sender account 1041 is debited, and can debit sending participant settlement account 1042 in real-time through settlement that completes in real-time after sender 1010 initiates the payment (e.g., in message 1171). In activity 1166, receiving participant 1060 can apply a debit in real-time to receiving participant settlement account 1063. Receiving participant settlement account 1063 can be credited in real-time through settlement that completes in real-time after sender 1010 initiates the payment (e.g., in message 1171).

In the third embodiments of settlement, within real-time of sender submitting payment (e.g., in message 1171), payment can be visible as posted (not pending), and the USAA credit card or line of credit OTB can reflect accepted payment with funds available to spend. The account balance for sender 1010 in billing account 1061 can be updated in real-time upon receiving the promise-to-pay (e.g., message 1177), and recipient account 1062 can be credited in real-time. Receiving participant settlement account 1063 can be debited in real-time for the amount of the payment transferred to recipient account 1062, and can be credited in real-time for the amount of the payment as the funds are received in real-time receiving participant settlement account 1063.

The third embodiments of settlement can be different from the first and second embodiments of settlement for completion of settlement. In the third embodiments of settlement, real-time settlement can complete through a process that transfers funds from sending participant settlement account 1042 to receiving participant settlement account 1063 in real-time for each transaction. In some embodiments, real-time settlement completion of funds from sending participant settlement account 1042 to receiving participant settlement account 1063 can occur through payment processor settlement account 1033, through transaction system 1050, or through another suitable funds transfer mechanism.

In some of the third embodiments of settlement, activities 1191 and 1192 can occur after activity 1146 and before activity 1166. In other embodiments, activities 1191 and 1192 can occur after activities 1146 and 1166.

FIG. 11 illustrates payment messages in system 1000, which is a first version of consolidated real-time payment using application service provider 1030 separate from sending participant 1040, in which sending participant 1040 is in data communication with transaction system 1050.

FIG. 12 illustrates payment messages in a system 1200, which is a second version of consolidated real-time payment using application service provider 1030 separate from sending participant 1040, in which sending participant 1040 is in data communication with application service provider 1030, instead of sending participant 1040 being in data communication with transaction system 1050. System 1200 is merely exemplary and embodiments of the system are not limited to the embodiments presented herein. The system can be employed in many different embodiments or examples not specifically depicted or described herein. In some embodiments, certain elements or modules of system 1200 can perform various procedures, processes, and/or activities. In other embodiments, the procedures, processes, and/or activities can be performed by other suitable elements or modules of system 1200.

In many embodiments, system 1200 can include sender 1010, sender system 1020, application service provider 1030, sending participant 1040, transaction system 1050, and/or receiving participant 1060, as described above in connection with FIGS. 10-11, but sending participant 1040 can be in data communication with application service provider 1030 instead of transaction system 1050, as shown in FIG. 12.

As shown in FIG. 12, in a number of embodiments, sender 1010 can use sender system 1020 to submit payment in real-time to application service provider 1030 in a message 1271. Message 1271 can be similar or identical to message 1171 (FIG. 11). Application service provider 1030 can receive message 1271 from sender system 1020, and can send a message 1272 to sending participant 1040 to debit sender account 1041. Sending participant 1040 can receive message 1272 from application service provider 1030, can debit the funds for the payment from sender account 1041 in activity 1145, and can credit the funds to sending participant settlement account 1042 in activity 1146, as described above in connection with FIG. 11. In several embodiments, once sending participant 1040 has successfully debited sender account 1041, sending participant 1040 can send a message 1273 to application service provider 1030 indicating that the debit of sender account 1041 was successful. Application service provider 1030 can receive message 1273 from sending participant 1040.

Once application service provider 1030 has determined that the debit of sender account 1041 was successful, application service provider 1030 can send a message 1274 to transaction system 1050 of a promise-to-pay credit. Transaction system 1050 can receive message 1274 from application service provider 1030, and can forward message 1274 to receiving participant 1060 in a message 1275 of a promise-to-pay credit. Receiving participant 1060 can receive message 1275 from transaction system 1050, can credit the funds to recipient account 1062 in activity 1165, and can debit the funds from receiving participant settlement account 1063 in activity 1166, to provide real-time funds availability to the biller/recipient, as described above in connection with FIG. 11. In many embodiments, when recipient account 1062 has been credited, the accounts receivable (AR) system can credit the funds to billing account 1061 corresponding to sender 1010 of the biller/recipient in activity 1167, which can indicate that sender 1010 has paid billing account 1061, as described above in connection with FIG. 11.

In many embodiments, once receiving participant 1060 has successfully credited recipient account 1062, receiving participant 1060 can send a message 1276 to transaction system 1050 that the credit of recipient account 1062 was successful. Transaction system 1050 can receive message 1276 from receive participant 1060, and can forward message 1276 to application service provider 1030 in a message 1277 indicating that the credit of recipient account 1062 was successful. Application service provider 1030 can receive message 1277 from transaction system 1050, and can present a notification of success to sender 1010 to sender system 1020 in a message 1278 that the instant (real-time) payment was successful. Sender system 1020 can receive message 1278 from application service provider 1030, and can provide information to sender 1010 that the real-time payment was successful. In many embodiments, the payment messages (e.g., 1271-1278) can each individually, and/or collectively, occur in real-time.

In a number of embodiments, the settlement of funds in the various accounts (e.g., sender account 1041, sending participant settlement account 1042, billing account 1061, recipient account 1062, and receiving participant settlement account 1063) can be identical to the various embodiments described above in connection with FIG. 11.

Turning ahead in the drawings, FIGS. 13-14 illustrate block diagrams of a system that can be employed for real-time funds availability in payment transactions in a second exemplary scenario, using the consolidated payment model, in which the application service provider is the same as the sending participant. FIG. 13 illustrates a block diagram of a system 1300, showing messages for an "is account real-time capable call." FIG. 14 illustrates a block diagram of system 1300, showing details of the payment messages.

System 1300 is merely exemplary and embodiments of the system are not limited to the embodiments presented herein. The system can be employed in many different embodiments or examples not specifically depicted or described herein. In some embodiments, certain elements or modules of system 1300 can perform various procedures, processes, and/or activities. In other embodiments, the procedures, processes, and/or activities can be performed by other suitable elements or modules of system 1300.

In many embodiments, system 1300 (FIGS. 13-14) can include a sender 1010, a sender system 1020, an application service provider 1330, sending participant 1040, transaction system 1050, and/or receiving participant 1060. In several embodiments, application service provider 1330 can be an entity that provides a user interface (UI) or application programming interface (API) for payment application 1031, in which application service provider 1330 and/or payment application 1331 are proprietary to sending participant 1040.

In the second exemplary scenario, as shown in FIG. 13-14, sending participant 1040 can provide a payment application 1331 to sender 1010. Similar to other payment applications described above, payment application 1331 can be used to pay one or more bills and/or other financial obligations. For example, sending participant 1040, application service provider 1330, and the application sponsor can be Wells Fargo & Co. ("Wells Fargo"), of San Francisco, California; and receiving participant 1060 can be USAA. In this exemplary scenario, a Wells Fargo customer, such as sender 1010, can use sender system 1020 to log onto a consolidated payment website, such as payment application 1331, hosted by Wells Fargo to pay a USAA auto loan (e.g., billing account 1061) from a demand deposit account (DDA) (e.g., sender account 1041) of the customer (e.g., sender 1010) at Wells Fargo. In various embodiments, sending participant 1040 can provide payment application 1331, which can be accessed by sender 1010 to initiate a payment transaction. For example, Wells Fargo can provide a website. In many embodiments, sending participant 1040 can be in data communication with transaction system 1050. In a number of embodiments, transaction system 1050 can be in data communication with receiving participant 1060, as shown in FIGS. 13-14. Application service provider 1330 and payment application 1331 can be part of sending participant 1040, and can be in data communication with each other.

FIG. 13 illustrates messages for an "is account real-time capable call," which can be used to determine if application service provider 1330 should present an instant (real-time) payment option to sender 1010 for the biller, by determining if the one or more relevant accounts (i.e., sender account 1041 and recipient account 1062) are real-time capable. The "is account real-time capable call" in FIG. 13 can be similar to the "is account real-time capable call" in FIG. 10. But unlike the "is account real-time capable call" of FIG. 10, the "is account real-time capable call" in FIG. 13 is modified because application service provider 1330 is not separate from sending participant 1040. Because application service provider 1330 and sending participant 1040 are the same entity, sending participant 1040/application service provider 1330 can know when sender account 1041 at sending participant 1040 is real-time capable, so it is not necessary to send a message to sending participant 1040 to determine if sender account 1041 is real-time capable.

As shown in FIG. 13, in a number of embodiments, the request by sender 1010 to pay a bill sent by the biller can cause sender system 1020 to send a message 1371 to application service provider 1330 to determine if the relevant accounts are real-time capable. Application service provider 1330 can receive message 1371 from sender system 1020, and can forward message 1371 to transaction system 1050 in a message 1372 to determine if the relevant accounts are real-time capable. Transaction system 1050 can receive message 1372 from application service provider 1330, and can forward message 1372 to receiving participant 1060 in a message 1373 to determine if the relevant accounts are real-time capable. Receiving participant 1060 can receive message 1373 from transaction system 1050, can determine whether recipient account 1062 is capable of handling real-time funds availability transactions, and can send a response to transaction system 1050 in a message 1374, which can indicate whether recipient account 1062 is capable of handling real-time funds availability transactions.

Transaction system 1050 can receive message 1374 from receiving participant 1060, and can forward the response in message 1374 to application service provider 1330 in a message 1375 indicating whether recipient account 1062 is capable of handling real-time funds availability transactions. Application service provider 1330 can receive message 1375 from transaction system 1050. As explained above, application service provider 1330 can know whether sender account 1041 is real-time capable. If the relevant accounts are real-time capable, application service provider 1330 can present an instant payment option to sender 1010 by sending a message 1376 to sender system 1020. Sender system 1020 can receive message 1376 from application service provider 1030. In many embodiments, the "is account real-time capable call" messages (e.g., messages 1371-1376) can each individually, and/or collectively, occur in real-time.

FIG. 14 illustrates payment messages in system 1300. As shown in FIG. 14, in a number of embodiments, sender 1010 can use sender system 1020 to submit payment in real-time to application service provider 1330 in a message 1471. Message 1471 can be similar or identical to message 1171 (FIG. 11) and/or message 1271 (FIG. 12). Application service provider 1330 can receive message 1471 from sender system 1020, and can send a message 1472 internally to sending participant 1040 to debit sender account 1041. Sending participant 1040 can receive message 1472 from application service provider 1330, and can debit the funds for the payment from sender account 1041 in activity 1145 and credit the funds to sending participant settlement account 1042 in activity 1146, as described above in connection with FIG. 11. In several embodiments, once sending participant 1040 has successfully debited sender account 1041, sending participant 1040 can send a message 1473 internally to application service provider 1330 indicating that the debit of sender account 1041 was successful. Application service provider 1330 can receive message 1473 from sending participant 1040.

In several embodiments, once application service provider 1330 has determined that the debit of sender account 1041 was successful, application service provider 1330 can send a message 1474 to transaction system 1050 of a promise-to-pay credit. Transaction system 1050 can receive message 1474 from application service provider 1330, and can forward message 1474 to receiving participant 1060 in a message 1475 of a promise-to-pay credit. Receiving participant 1060 can receive message 1475 from transaction system 1050, credit the funds to recipient account 1062 in activity 1165, and can debit the funds from receiving participant settlement account 1063 in activity 1166, to provide real-time funds availability to the biller/recipient, as described above in connection with FIG. 11. In many embodiments, when recipient account 1062 has been credited, the AR system can credit the funds to billing account 1061 corresponding to sender 1010 of the biller/recipient in activity 1167, which can indicate that sender 1010 has paid billing account 1061, as described above in connection with FIG. 11.

In many embodiments, once receiving participant 1060 has successfully credited recipient account 1062, receiving participant 1060 can send a message 1476 to transaction system 1050 that the credit of recipient account 1062 was successful. Transaction system 1050 can receive message 1476 from receive participant 1060, and can forward message 1476 to application service provider 1330 in a message 1477 indicating that the credit of recipient account 1062 was successful. Application service provider 1330 can receive message 1477 from transaction system 1050, and can present a notification of success to sender 1010 to sender system 1020 in a message 1478 that the instant (real-time) payment was successful. Sender system 1020 can receive message 1478 from application service provider 1330, and can provide information to sender 1010 that the real-time payment was successful. In many embodiments, the payment messages (e.g., 1471-1478) can each individually, and/or collectively, occur in real-time.

In a number of embodiments, the settlement of funds in the various accounts (e.g., sender account 1041, sending participant settlement account 1042, billing account 1061, recipient account 1062, and receiving participant settlement account 1063) can be similar to the various embodiments described above in connection with FIG. 11, except that activities 1191 and 1192 can be replaced with an activity 1491 that does not involve payment processor settlement account 1033 (FIGS. 10-12). The first and second embodiments of settlement described above in connection with FIG. 11 can be modified such that activity 1491 can include a single ACH item for each transaction (such as an ACH push from sending participant settlement account 1042 to receiving participant settlement account 1063, or, alternatively, an ACH pull from receiving participant settlement account 1063 from sending participant settlement account 1042), or a batched transactions, such that if there are multiple transactions between the same two financial institutions, those transactions can all be batched together and settled as a single batch ACH, or through a wire advice file. The third embodiments of settlement described above in connection with FIG. 11 can be modified such that activity 1491 can include real-time settlement that can complete through a process that transfers funds from sending participant settlement account 1042 to receiving participant settlement account 1063 in real-time for each transaction after the payment has been initiated. In some of the third embodiments of settlement, activity 1491 can occur after activity 1146 and before activity 1166. In other embodiments, activity 1491 can occur after activities 1146 and 1166. In some embodiments, real-time settlement completion of funds from sending participant settlement account 1042 to receiving participant settlement account 1063 can occur through transaction system 1050, or through another suitable funds transfer mechanism.

Turning ahead in the drawings, FIGS. 15-17 illustrate block diagrams of systems that can be employed for real-time funds availability in payment transactions in a third exemplary scenario, using the biller direct model, in which the application service provider is the same entity as the receiving participant. FIG. 15 illustrates a block diagram of a system 1500, in which receiving participant 1060 is in data communication with transaction system 1050 for credit call messages, and showing messages for an "is account real-time capable call." FIG. 16 illustrates a block diagram of system 1500, showing the payment messages. FIG. 17 illustrates a block diagram of a system 1700 that is a variation of system 1500 of FIGS. 15-16, in which receiving participant 1060 is in data communication for the credit call messages with an application service provider 1530 instead of transaction system 1050, and showing the payment messages.

System 1500 is merely exemplary and embodiments of the system are not limited to the embodiments presented herein. The system can be employed in many different embodiments or examples not specifically depicted or described herein. In some embodiments, certain elements or modules of system 1500 can perform various procedures, processes, and/or activities. In other embodiments, the procedures, processes, and/or activities can be performed by other suitable elements or modules of system 1500.

In many embodiments, system 1500 (FIGS. 15-16) can include a sender 1010, a sender system 1020, an application service provider 1530, sending participant 1040, transaction system 1050, and/or receiving participant 1060. In several embodiments, application service provider 1530 can be an entity that provides a user interface (UI) or application programming interface (API) for payment application 1031, in which application service provider 1530 and/or a payment application 1531 are proprietary to receiving participant 1060.

In the third exemplary scenario, as shown in FIG. 15-17, receiving participant 1060 can provide payment application 1531 to sender 1010. Similar to other payment applications described above, payment application 1531 can be used to pay one or more bills and/or other financial obligations. For example, receiving participant 1060 and application service provider 1530 can be Capital One, and sending participant 1040 can be USAA. In this exemplary scenario, a Capital One customer, such as sender 1010, can use sender system 1020 to log onto a direct payment website, such as payment application 1531 from Capital One to pay the customer's Capital One credit card (e.g., billing account 1061) from a DDA account held by the customer at USAA (e.g., sender account 1041). In various embodiments, receiving participant 1060 can provide payment application 1531, which can be accessed by sender 1010 to initiate a payment transaction. For example, Capital One can provide a billing application layer, such as a website or an application (e.g., mobile application). In many embodiments, application service provider 1530 can be in data communication with transaction system 1050. In a number of embodiments, transaction system 1050 can be in data communication with sending participant 1040. In many embodiments, application service provider 1530 can have an internal data communication link with receiving participant 1060. In some embodiments, promise-to-pay credit call messages can be sent to and received from receiving participant 1060 through transaction system 1050, such as shown in FIG. 16 and described below. In other embodiments, promise-to-pay credit call messages can be sent to and received from receiving participant 1060 through application service provider 1530, as shown in FIG. 17 and described below.

FIG. 15 illustrates messages for an "is account real-time capable call," which can be used to determine if application service provider 1530 should present an instant (real-time) payment option to sender 1010 for the biller, by determining if the one or more relevant accounts (i.e., sender account 1041 and recipient account 1062) are real-time capable. The "is account real-time capable call" in FIG. 15 can be similar to the "is account real-time capable call" in FIGS. 10 and 13. But unlike the "is account real-time capable call" of FIGS. 10 and 13, the "is account real-time capable call" in FIG. 15 is modified because application service provider 1530 is not separate from receiving participant 1060. Because application service provider 1530 and receiving participant 1040 are the same entity, receiving participant 1060/application service provider 1530 can know when recipient account 1062 at receiving participant 1060 is real-time capable, so it can be not necessary to send a message to receiving participant 1060 to determine if recipient account 1062 is real-time capable.

As shown in FIG. 15, in a number of embodiments, the request by sender 1010 to pay a bill sent by the biller can cause sender system 1020 to send a message 1571 to application service provider 1530 to determine if the relevant accounts are real-time capable. Application service provider 1530 can receive message 1571 from sender system 1020, and can forward message 1571 to transaction system 1050 in a message 1572 to determine if the relevant accounts are real-time capable. Transaction system 1050 can receive message 1572 from application service provider 1530, and can forward message 1572 to sending participant 1040 in a message 1573 to determine if the relevant accounts are real-time capable. Sending participant 1040 can receive message 1573 from transaction system 1050, can determine whether sender account 1041 is capable of handling real-time funds availability transactions, and can send a response to transaction system 1050 in a message 1574, which can indicate whether sending account 1041 is capable of handling real-time funds availability transactions.

Transaction system 1050 can receive message 1574 from sending participant 1040, and can forward the response in message 1574 to application service provider 1530 in a message 1575 indicating whether sending account 1041 is capable of handling real-time funds availability transactions. Application service provider 1530 can receive message 1575 from transaction system 1050. As explained above, application service provider 1530 can know whether recipient account 1062 is real-time capable. If the relevant accounts are real-time capable, application service provider 1530 can present an instant payment option to sender 1010 by sending a message 1576 to sender system 1020. Sender system 1020 can receive message 1576 from application service provider 1030. In many embodiments, the "is account real-time capable call" messages (e.g., messages 1571-1576) can each individually, and/or collectively, occur in real-time.

FIG. 16 illustrates payment messages in system 1500, which is a first version of the biller direct model of real-time bill pay, in which the application service provider is the same entity as the receiving participant, and in which promise-to-pay credit call messages can be sent to and received from receiving participant 1060 through transaction system 1050. As shown in FIG. 16, in a number of embodiments, sender 1010 can use sender system 1020 to submit payment in real-time to application service provider 1530 in a message 1671. Application service provider 1530 can receive message 1671 from sender system 1020, and can send a message 1672 to transaction system 1050 to debit sender account 1041. Transaction system 1050 can receive message 1672 from application service provider 1530, and can send a message 1673 to sending participant 1040 to debit sender account 1041 in sending participant 1040. Sending participant 1040 can receive message 1673 from transaction system 1050, can debit the funds for the payment from sender account 1041 in activity 1145, and can credit the funds to sending participant settlement account 1042 in activity 1146, as described above in connection with FIG. 11.

In several embodiments, once sending participant 1040 has successfully debited sender account 1041, sending participant 1040 can send a message 1674 to transaction system 1050 that the debit of sender account 1041 was successful. Transaction system 1050 can receive message 1674 from sending participant 1040, and can forward message 1674 to application service provider 1530 in a message 1675 indicating that debiting of sender account 1041 was successful. Application service provider 1530 can receive message 1675 from transaction system 1050. Once application service provider 1530 has determined that the debit of sender account 1041 was successful, application service provider 1530 can send a message 1676 to transaction system 1050 of a promise-to-pay credit. Transaction system 1050 can receive message 1676 from application service provider 1530, and can forward message 1676 to receiving participant 1060 in a message 1677 of a promise-to-pay credit. Receiving participant 1060 can receive message 1677 from transaction system 1050, can credit the funds to recipient account 1062 in activity 1165, and can debit the funds from receiving participant settlement account 1063 in activity 1166, to provide real-time funds availability to the biller/recipient, as described above in connection with FIG. 11. In many embodiments, when recipient account 1062 has been credited, the AR system can credit the funds to billing account 1061 corresponding to sender 1010 of the biller/recipient in activity 1167, which can indicate that sender 1010 has paid billing account 1061, as described above in connection with FIG. 11.

In many embodiments, once receiving participant 1060 has successfully credited recipient account 1062, receiving participant 1060 can send a message 1678 to transaction system 1050 that the credit of recipient account 1062 was successful. Transaction system 1050 can receive message 1678 from receiving participant 1060, and can forward the response in message 1678 to application service provider 1530 in a message 1679 indicating that the credit of recipient account 1062 was successful. Application service provider 1530 can receive message 1679 from transaction system 1050, and can present a notification of success to sender 1010 to sender system 1020 in a message 1680 that the instant (real-time) payment was successful. Sender system 1020 can receive message 1680 from application service provider 1530, and can provide information to sender 1010 that the real-time payment was successful. In many embodiments, the payment messages (e.g., 1671-1680) can each individually, and/or collectively, occur in real-time.

In a number of embodiments, the settlement of funds in the various accounts (e.g., sender account 1041, sending participant settlement account 1042, billing account 1061, recipient account 1062, and receiving participant settlement account 1063) can be similar or identical to the various embodiments described above in connection with activity 1491 of FIG. 14.

FIG. 17 illustrates payment messages in system 1700, which is a second version of the biller direct model of real-time bill pay, in which the application service provider is the same entity as the receiving participant, and promise-to-pay credit call messages can be sent to and received from receiving participant 1060 through application service provider 1530.

System 1700 is merely exemplary and embodiments of the system are not limited to the embodiments presented herein. The system can be employed in many different embodiments or examples not specifically depicted or described herein. In some embodiments, certain elements or modules of system 1700 can perform various procedures, processes, and/or activities. In other embodiments, the procedures, processes, and/or activities can be performed by other suitable elements or modules of system 1700.

In many embodiments, system 1700 can include sender 1010, sender system 1020, application service provider 1530, sending participant 1040, transaction system 1050, and/or receiving participant 1060, as described above in connection with FIGS. 15-16, but promise-to-pay credit call messages can be sent to and received from receiving participant 1060 through application service provider 1530 instead of transaction system 1050.

As shown in FIG. 17, in a number of embodiments, sender 1010 can use sender system 1020 to submit payment in real-time to application service provider 1530 in a message 1771. Application service provider 1530 can receive message 1771 from sender system 1020, and can send a message 1772 to transaction system 1050 to debit sender account 1041. Transaction system 1050 can receive message 1772 from application service provider 1530, and can send a message 1773 to sending participant 1040 to debit sender account 1041 in sending participant 1040. Sending participant 1040 can receive message 1773 from sending participant 1040, can debit the funds for the payment from sender account 1041 in activity 1145, and can credit the funds to sending participant settlement account 1042 in activity 1146, as described above in connection with FIG. 11.

In several embodiments, once sending participant 1040 has successfully debited sender account 1041, sending participant 1040 can send a message 1774 to transaction system 1050 that the debit of sender account 1041 was successful. Transaction system 1050 can receive message 1774 from sending participant 1040, and can forward message 1774 to application service provider 1530 in a message 1775 indicating that debiting of sender account 1041 was successful. Application service provider 1530 can receive message 1775 from transaction system 1050. Once application service provider 1530 has determined that the debit of sender account 1041 was successful, application service provider 1530 can send a message 1776 to receiving participant 1060 of a promise-to-pay credit. Receiving participant 1060 can receive message 1776 from application service provider 1530, can credit the funds to recipient account 1062 in activity 1165, and can debit the funds from receiving participant settlement account 1063 in activity 1166, to provide real-time funds availability to the biller/recipient, as described above in connection with FIG. 11. In many embodiments, when recipient account 1062 has been credited, the AR system can credit the funds to billing account 1061 corresponding to sender 1010 of the biller/recipient in activity 1167, which can indicate that sender 1010 has paid billing account 1061, as described above in connection with FIG. 11.

In many embodiments, once receiving participant 1060 has successfully credited recipient account 1062, receiving participant 1060 can send a message 1777 to application service provider 1530, indicating that the credit of recipient account 1062 was successful. Application service provider 1530 can receive message 1777 from receiving participant 1060, and can present a notification of success to sender 1010 to sender system 1020 in a message 1778 that the instant (real-time) payment was successful. Sender system 1020 can receive message 1778 from application service provider 1530, and can provide information to sender 1010 that the real-time payment was successful. In many embodiments, the payment messages (e.g., 1771-1778) can each individually, and/or collectively, occur in real-time.

In a number of embodiments, the settlement of funds in the various accounts (e.g., sender account 1041, sending participant settlement account 1042, billing account 1061, recipient account 1062, and receiving participant settlement account 1063) can be similar or identical to the various embodiments described above in connection with activity 1491 of FIG. 14.

In some embodiments, the "is account real-time capable call" in FIGS. 10, 13, and/or 15 can validate real-time capability of accounts from both sending participant 1040 (FIGS. 10-17) and receiving participant 1060 (FIGS. 10-17). In some embodiments, the "is account real-time capable call" can determine whether the instant pay option should be presented to the sender 1010 (FIGS. 10-17) on the payment application (e.g., 1031 (FIGS. 10-12), 1331 (FIGS. 13-14), and/or 1531 (FIGS. 15-17)). The "is account real-time capable call" can verify if the funding account and/or the biller account is real-time capable.

In many embodiments, the "is account real-time capable call" in FIGS. 10, 13, and/or 15 advantageously can facilitate one or more of the following benefits, among other benefits:

a. Account validation for real-time capability: Financial institutions (e.g., sending participant 1040 (FIGS. 10-17) and/or receiving participant 1060 (FIGS. 10-17)) or the application service provider (e.g., 1030 (FIGS. 10-12), 1330 (FIGS. 13-14), and/or 1530 (FIG. 15-17) can initiate an accounts capable call in order to validate whether or not sender account 1041 (FIGS. 10-17), billing account 1061 (FIGS. 10-17), and/or recipient account 1062 (FIGS. 10-17)) are real-time capable.

b. Settlement instructions from billers: The "is account real-time capable call" response messages can be designed to carry settlement information from the biller to sending participant 1040, so that the messaging process can rely on real-time information instead of expensive directory look-ups to facilitate the remittance process. Providing the settlement instructions during the initial capability call can advantageously facilitate settlement participant 1040 not having to rely on an older directory of accounts and the assurance that the settlement account is the correct account.

c. Inform sender 1010 (FIGS. 10-17) of Settlement Expectations: The message structure can incorporate a customer settlement field where key values can be interpreted into formatted messages back to the consumer in a real-time fashion. This can provide information on settlement expectations and so forth. For example, the biller can inform the customer (e.g., sender 1010 (FIGS. 10-17)) that payment will be accepted real-time and the OTB in the billing account (e.g., billing account 1061 (FIGS. 10-17)) for the customer (e.g., sender 1010 (FIGS. 10-17)) will be increased, but that the payment may not be visible on the customer's statement for two business days (depending on the settlement type used).

d. Optional billing account information: The "is account real-time capable call" response messages can include optional fields such as current balance, last payment date, minimum amount due, and if provided, it can be displayed to the consumer (e.g., sender 1010 (FIGS. 10-17)) on the Payment UI (user interface) (e.g., payment application 1031 (FIGS. 10-12), 1331 (FIGS. 13-14), and/or 1531 (FIGS. 15-17)) at the time of payment, which can provide beneficial information to sender 1010 (FIGS. 10-17).

In several embodiments, the "is account real-time capable call" can include various elements in the inquiry messages (e.g., messages 1071-1073, 1075 (FIG. 10), 1371-1373 (FIG. 13), and/or messages 1571-1573 (FIG. 15)), such as:

a. Message wrapper fields: This section of the inquiry message can include fields, such as transaction ID, transaction date and so forth.

b. Debit block: This section of the inquiry message can provide information on the Funding Accounts. Data elements can be include ABA, account number, etc.

c. Payment item block: This section of the inquiry message can provide information on the item (e.g., on a credit card payment) for which sender 1010 (FIGS. 10-17) wishes to make a payment. Data elements can include billing account information, personally identifiable information (PII) of sender 1010 (FIGS. 10-17) such as a name, a home address, a telephone number, a social security number, a tax identification number, an age, an income level, marital status, a number of dependents, a frequent shopper identifier, shopping preferences, billing ID, etc.

d. Settlement block: This section of the inquiry message can provide the information regarding sending participant settlement account 1042 (FIGS. 10-17). Data elements can include account information such as ABA and account number.

In several embodiments, the "is account real-time capable call" can include various elements in the response messages (e.g., messages 1074, 1076-1078 (FIG. 10), 1374-1376 (FIG. 13), and/or messages 1574-1576 (FIG. 15)), such as:

a. Message wrapper fields: This section of the response message can include fields, such as transaction ID, transaction Date, etc.

b. Debit block: This section of the response message can return fields from sending participant 1040 (FIGS. 10-17) that maintains sender account 1041 (FIGS. 10-17) for sender 1010 (FIGS. 10-17). Data elements can include: a real-time capable flag, reason codes if account is not real-time capable, optional fee information, etc.

c. Payment item block: This section of the response message can return fields from receiving participant 1060 (FIGS. 10-17), which in some instances can be the biller. Data elements can include a real-time capable flag, reason codes if account is not real-time capable, a customer messaging field, payment information fields, and optional fee information field.

d. Settlement block: This section of the response message can return fields from receiving participant 1060 (FIGS. 10-17), which in some instances can be the biller. Data elements can include information about receiving participant settlement account 1063 (FIGS. 10-17), the settlement method, and any additional information on billing account 1061 (FIGS. 10-17), and/or recipient account 1062 (FIGS. 10-17).

In some embodiments, the debit call can be sent to sending participant 1040 (FIGS. 10-17), and given successful execution of the debit call, sending account 1041 (FIGS. 10-17) can be decremented. In some embodiments, the structure of the debit call can leverage the same Inquiry framework that has already been developed and used for Deposit Chek® Direct, offered by Early Warning Services, LLC.

In several embodiments, the debit call can include various elements in the inquiry messages (e.g., messages 1173 (FIG. 11), 1272 (FIG. 12), 1472 (FIG. 14), 1673 (FIG. 16), and/or 1773 (FIG. 17)). The transaction system can get this inquiry if the transaction system is in data communication with the sending recipient. Otherwise the "billing intermediary" handles this debiting. After the "debiting Inquiry" has happened, the debiting response can be received by either the transaction system or the billing intermediary. In some embodiments, various elements in the inquiry of the debit call (e.g., messages 1773 (FIG. 11), 1272 (FIG. 12), 1472 (FIG. 14), 1673 (FIG. 16), and/or 1773 (FIG. 17)) can include:

a. Message wrapper fields: This section of the inquiry message can include fields, such as transaction ID, transaction date, etc.

b. Debit block: This section of the inquiry message can provide information on sender account 1041 (FIGS. 10-17). Data elements can include ABA, account number, etc.

c. Settlement block: This section of the inquiry message can provide settlement fields from receiving participant 1060 (FIGS. 10-17), which were returned in the "is account real-time capable call" response message. Data elements can include information for receiving participant settlement account 1063 (FIGS. 10-17), the settlement method, and any additional information on billing account 1061 (FIGS. 10-17), and/or recipient account 1062 (FIGS. 10-17).

In several embodiments, the debit call can include various elements in the response messages (e.g., messages 1174 (FIG. 11), 1273 (FIG. 12), 1473 (FIG. 14), 1674 (FIG. 16), and/or 1774 (FIG. 17)). The debit response can come from the sending participant 1040 (FIGS. 10-17) in response to the payment debit inquiry. If transaction system 1050 (FIGS. 10-17) receives this response then it can be forwarded to the application service provider (e.g., 1030 (FIGS. 10-12), 1330 (FIGS. 13-14), and/or 1530 (FIGS. 15-17). However, in some embodiments, if the application service provider (e.g., 1030 (FIGS. 10-12), 1330 (FIGS. 13-14), and/or 1530 (FIGS. 15-17) receives this response, it is not forwarded to transaction system 1050 (FIGS. 10-17). In other embodiments, the response can be forwarded to transaction system 1050 (FIGS. 10-17). In some embodiments, various elements in the response (e.g., messages 1174 (FIG. 11), 1273 (FIG. 12), 1473 (FIG. 14), 1674 (FIG. 16), and/or 1774 (FIG. 17)) of the debit call can include:

a. Message wrapper fields: This section of the response message can fields, such as transaction ID, transaction date, etc.

b. Debit block: This section of the response message can return fields from sending participant 1040 (FIGS. 10-17), which maintains sender account 1041 (FIGS. 10-17) for sender 1010 (FIGS. 10-17). Data elements can include: a payment guarantee flag, a payment guarantee expiration date, and reason codes if the payment guarantee is not offered.

In some embodiments, the credit call, also known as the promise-to-pay, can be sent to receiving participant 1060 (FIGS. 10-17), after the debit call has been successfully executed and payment guarantee was offered. In some embodiments, the structure of the credit call can leverage the same Inquiry framework that has already been developed and used for Deposit Chek® Direct, offered by Early Warning Services, LLC. In a number of embodiments, the process can be handled through transaction system 1050 (FIGS. 10-17). If transaction system 1050 (FIG. 1017) does the debit call then can forward the debit call to the application service provider (e.g., 1030 (FIGS. 10-12), 1330 (FIGS. 13-14), and/or 1530 (FIGS. 15-17), and then the application service provider (e.g., 1030 (FIGS. 10-12), 1330 (FIGS. 13-14), and/or 1530 (FIGS. 15-17) can send the credit call to transaction system 1050 (FIGS. 10-17).

In several embodiments, the credit call can include various elements in the inquiry messages (e.g., messages 1176-1177 (FIG. 11), 1274-1275 (FIG. 12), 1474-1475 (FIG. 14), 1676-1677 (FIG. 16), and/or 1776 (FIG. 17)). In some embodiments, the credit call inquiry can be sent through transaction system 1050 (FIGS. 10-17). The various elements of the inquiry of the credit call (e.g., messages 1176-1177 (FIG. 11), 1274-1275 (FIG. 12), 1474-1475 (FIG. 14), 1676-1677 (FIG. 16), and/or 1776 (FIG. 17) can include:

a. Message wrapper fields: This section of the response message can fields, such as transaction ID, transaction date, etc.

b. Payment item block: This section of the inquiry message can provide information on the item (e.g., a credit card payment) for which the consumer wishes to make a payment. Data elements can include billing account information, customer PII, etc.

In several embodiments, the credit call can include various elements in the response messages (e.g., messages 1178-1180 (FIG. 11), 1276-1278 (FIG. 12), 1476-1478 (FIG. 14), 1678-1680 (FIG. 16), and/or 1777-1778 (FIG. 17)), such as:

a. Message wrapper fields: This section of the response message can fields, such as transaction ID, transaction date, etc.

b. Payment item block: This section of the response message can return fields from the receiving participant 1060 (FIGS. 10-17), which in some instances can be the biller. Data elements can include a payment credit success flag, reason codes if credit is not successful, customer message fields, customer support phone numbers, and other optional fields on billing account 1061 (FIGS. 10-17) for the customer (e.g., sender 1010 (FIGS. 10-17)).

In some embodiments, logging and monitoring can be provided in transaction system 1050 (FIGS. 10-17). In a number of embodiments, incoming and outgoing message data can be logged so that the information can be available for billing, statistical and reporting, and/or client logs, if applicable. In some embodiments, transaction system 1050 (FIGS. 10-17) can include logging, which can advantageously provide at one or more of the following advantages, among other benefits:

a. Log message data at a switch of transaction system 1050 (FIGS. 10-17) can be made available for research, corporate, and/or client reporting purposes.

b. Message validation or communication failures between transaction system 1050 (FIGS. 10-17) on one hand, and receiving sending participant 1040 (FIGS. 10-17) and/or receiving participant 1060 (FIGS. 10-17) on the other hand, can be logged to new logs so they are made available for alerting.

c. Failures can be logged at transaction system 1050 (FIGS. 10-17) for messages, which can allow alerts to be triggered based on severity. Logged data can be used for research purposes.

d. Logging can allow transaction system 1050 (FIGS. 10-17) to reconcile messages for billing (such as reversals and other types of transactions).

e. System monitoring of transactions for various issues such as excessive timeouts, invalid message formats, etc. can be provided, and alerts can be provided in real-time.

In a number of embodiments, the financial institutions, such as sending recipient 1040 (FIGS. 10-17) and/or receiving recipient 1060 (FIGS. 10-17), can include logging, which can provide pertinent detail on summary of counts and response times at transaction system 1050 (FIGS. 10-17).

In a number of embodiments, connectivity can exist between participants, such as participating financial institutions (sending recipient 1040 (FIGS. 10-17) and/or receiving recipient 1060 (FIGS. 10-17)), and application service providers, (e.g., application service provider 1030 (FIGS. 10-12)). Dedicated circuits can be implemented to establish new connections or to supplement if existing pipe capacity of transaction system 1050 (FIG. 10—is already maxed out.

In a number of embodiments, transaction system 1050 (FIGS. 10-17) can assess if connectivity with capacity already exists or new pipes need to be established to support connectivity needs. New participants, such as a new one of application service provider 1030 (FIGS. 10-12), can be provided new connectivity. In some embodiments, one or more of the following capabilities, among others, can be facilitated via the dedicated circuits:

a. Real-time messaging capability between participants supporting the following message types:
   i. Account real-time capable call
   ii. Debit call
   iii. Credit call
   iv. Reversal call b. FTP connections established for reporting and activity payment file transfer.

c. Web service connections for reporting and dashboard sharing.

In many embodiments, transaction system 1050 (FIGS. 10-17) can host and maintain a biller directory for message routing purposes. This directory can be complimentary to a biller directory of application service provider 1030 (FIGS. 10-12). This directory can link billers to financial institutions (1040 (FIGS. 10-17) and/or receiving recipient 1060 (FIGS. 10-17)), and can be updated with the "is account real-time capable call" response information.

In some of to the settlement types described above, or in addition to the settlement types described above, in various embodiments, settlement can occur between sending participant 1040 (FIGS. 10-17) and receiving participant 1060 (FIGS. 10-17) using conventional methods (e.g., existing rails) to move the money from sending participant 1040 (FIGS. 10-17) to receiving participant (FIGS. 10-17). In many embodiments, transaction system 1050 (FIGS. 10-17) can send batch files to the financial institutions (e.g., the sending participant 1040 (FIGS. 10-17) and/or the receiving participant 1060 (FIGS. 10-17)) with reconciliation information.

In a number of embodiments, application service provider 1030 (FIGS. 10-12) can serve as a third party settlement agent and send reconciliation files, and settlement can be handled by application service provider 1030 (FIGS. 10-12). In some embodiments, reconciliation information can be sent from application service provider 1030 (FIGS. 10-12) to sending participant 1040 (FIGS. 10-17) and/or receiving participant 1060 (FIGS. 10-17).

In various embodiments, a third party settlement agent can be different from application service provider 1330 (FIGS. 13-14) when application service provider is the same entity as sending participant 1040 (FIGS. 10-17). The third party settlement agent can settle the transaction without being involved in the payment messages.

In various embodiments, settlement can be handled by transaction system 1050 (FIGS. 10-17). In some embodiments, transaction system 1050 (FIGS. 10-17) can include a payment/settlement system, which can provide movement of funds between financial institutions (e.g., sending participant 1040 (FIGS. 10-17) and/or receiving participant 1060 (FIGS. 10-17)), the ability to view transactions, the ability to reconcile transactions, the posting of files to the Federal Reserve, and network fee settlement, among other benefits.

In many embodiments, in the response of the "is account real-time capable call," receiving participant 1060 (FIGS. 10-17) and/or the recipient/biller can indicate the manner in which they prefer to settle the transaction, which can be their most desired settlement method. For example, it could be through a card network, through the ACH system, or it could be through a payment/settlement system of transaction system 1050 (FIGS. 10-17). This settlement method can be included in the response message (e.g., messages 1074, 1076-1078 (FIG. 10), 1374-1376 (FIG. 13), and/or messages 1574-1576 (FIG. 15)).

In a number of embodiments, receiving participant 1060 (FIGS. 10-17) can select whether it prefers clearing and settlement for each individual item or in groups. Once the debit call process occurs, funds can be taken out of sender account 1041 (FIGS. 10-17) to pay the bill. These funds are then moved for the credit push notification. In some embodiments, the funds can be made available within a few seconds. The actual transfer of funds between the financial institutions can occur through the day, multiple times a day, such as every minute, every 5 seconds, every 3 seconds, every second, and/or for every transaction. This can occur within a few seconds up to multiple times throughout the day. Unlike conventional methods and system, in which transactions are done in batch and net settled, transaction can be individually settled. In some embodiments, the payment/settlement system of transaction system 1050 (FIGS. 10-17) can allow for single transactions to be settled in real-time. In other embodiments, debit networks or other suitable settlement rails can be used. There can be settlement instructions provided by the biller and/or receiving participant 1060 (FIGS. 10-17), indicating how they prefer the transaction to be settled.

In some embodiments, transaction system 1050 (FIGS. 10-17) can allow for a sending participant 1040 (FIGS. 10-17) or receiving participant 1060 (FIGS. 10-17) to receive a debit call success for a promise-to-pay, send a promise-to-pay, and/or transfer funds (e.g., settle funds) to or from a financial institution that is not a participant (e.g., not a sending participant 1040 (FIGS. 10-17) or receiving participant 1060 (FIGS. 10-17)). For example, transaction system 1050 (FIGS. 10-17) can convert messages to one or more other protocols for real-time funds transfer or real-time promise-to-pay, such as Visa Original Credit Transaction (OCT) transactions to push funds to a non-participating financial institution, or a Visa Account Funding Transaction (AFT) transaction to pull funds from a non-participating financial institution, or a debit transaction message, or other suitable protocols. In some embodiments, transaction system 1050 (FIGS. 10-17) can include a directory for non-participating financial institutions, which can provide transaction system 1050 (FIGS. 10-17) with information on how to connect to the non-participating financial institution. In a number of embodiments, transaction system 1050 (FIGS. 10-17) can allow for international payment in a similar manner, such as by using a suitable protocol, such as the SWIFT (Society for Worldwide Interbank Financial Telecommunication) wire network, Visa, MasterCard, PayPal, Alibaba Secure Payment, etc.

Figure 18:
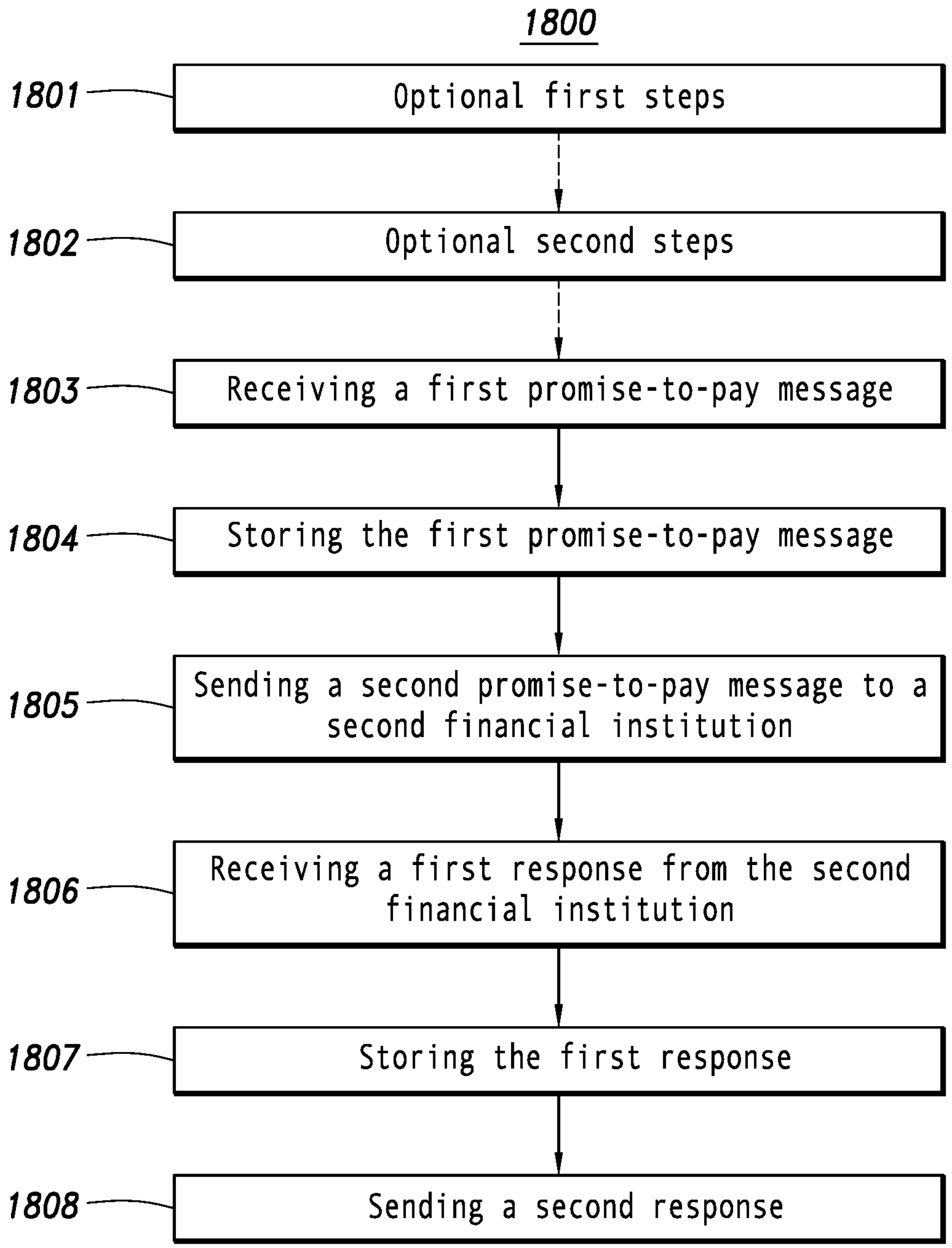
FIG. 18 illustrates a flow chart for a method to facilitate a real-time funds availability bill-pay transaction, according to an embodiment.

Turning ahead in the drawings, FIG. 18 illustrates a flow chart for a method 1800 to facilitate a real-time funds availability bill-pay transaction, according to an embodiment. Method 1800 is merely exemplary and is not limited to the embodiments presented herein. Method 1800 can be employed in many different embodiments or examples not specifically depicted or described herein. In some embodiments, the procedures, the processes, and/or the activities of method 1800 can be performed in the order presented. In other embodiments, the procedures, the processes, and/or the activities of method 1800 can be performed in any suitable order. In still other embodiments, one or more of the procedures, the processes, and/or the activities of method 1800 can be combined or skipped. In some embodiments, method 1800 can be performed by transaction system 1050 (FIGS. 10-17).

Figure 19:
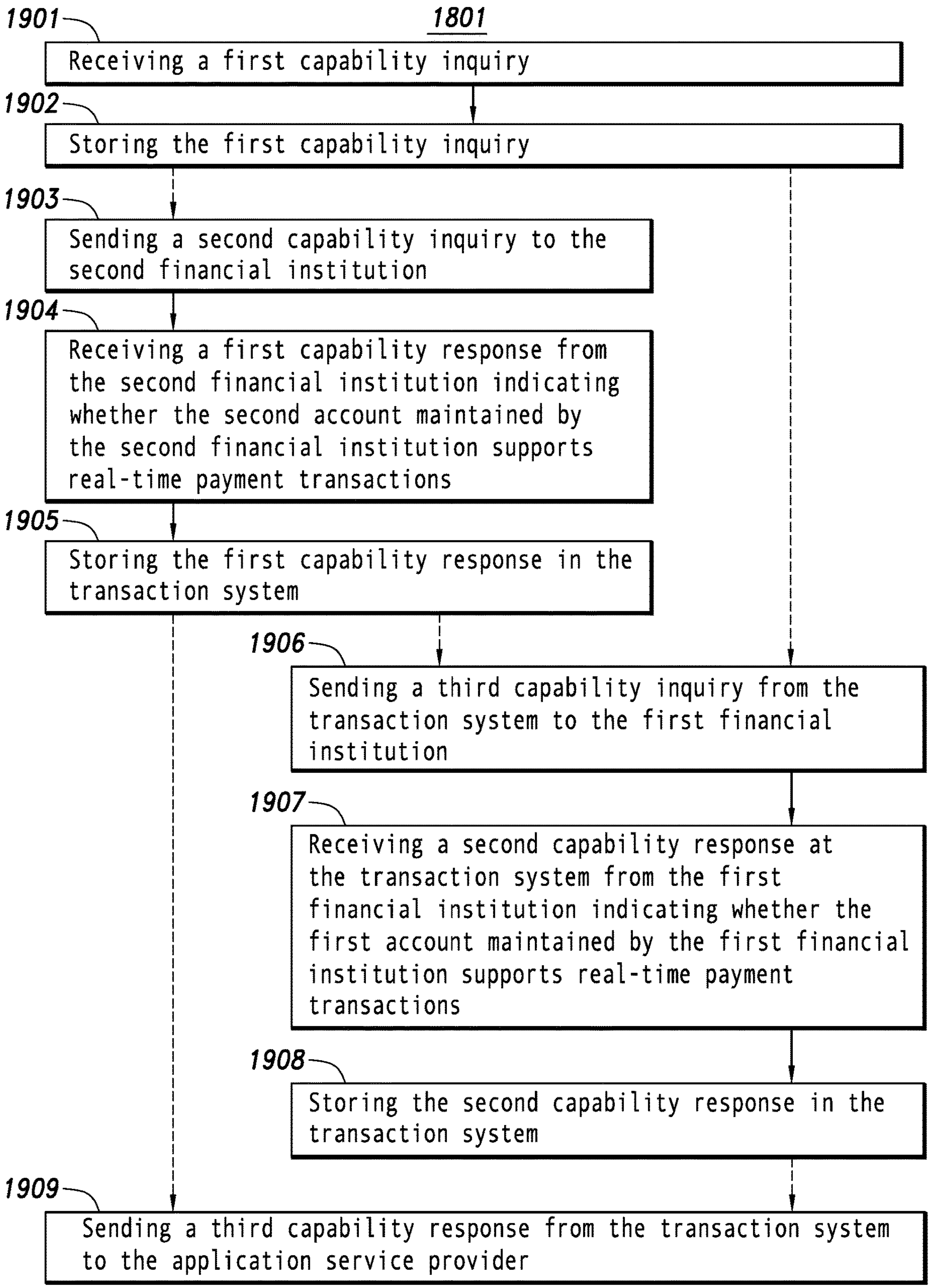
FIG. 19 illustrates a block of optional first steps, according to the embodiment of FIG. 18.

Referring to FIG. 18, method 1800 can include a block 1801 of optional first steps, as shown in FIG. 19 and described below. In some embodiments, method 1800 can skip block 1801 of optional first steps.

Figure 20:
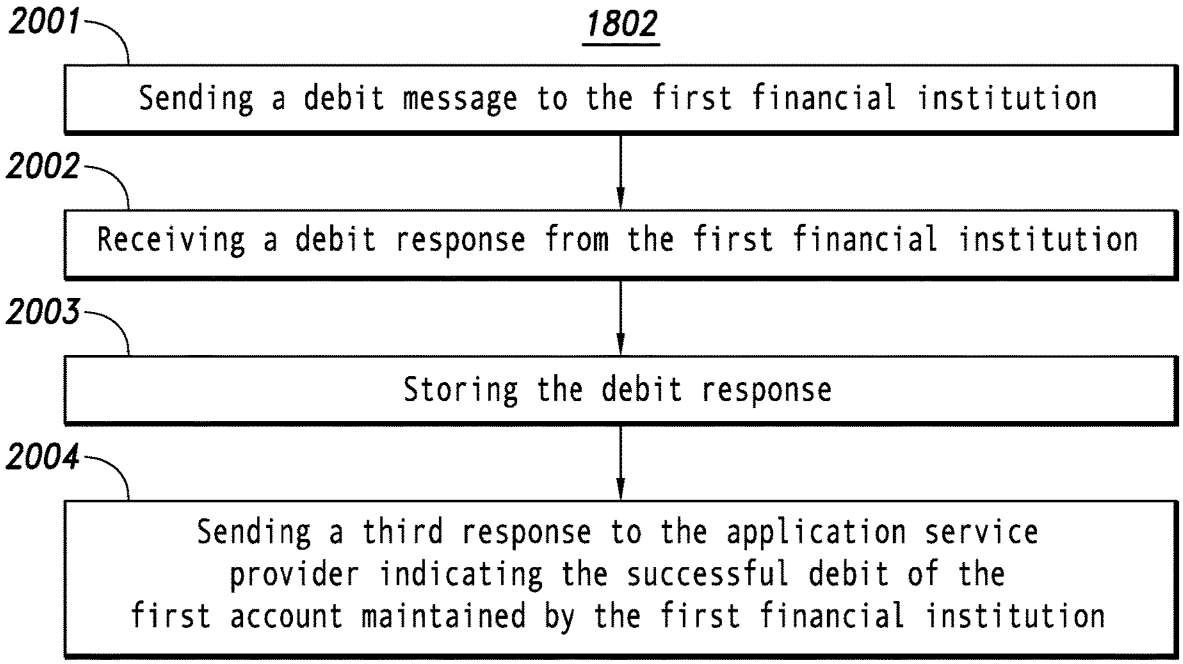
FIG. 20 illustrates a block of optional second steps, according to the embodiment of FIG. 18.

In a number of embodiments, method 1800 also can include a block 1802 of optional second steps, as shown in FIG. 20 and described below. In some embodiments, method 1800 can skip block 1802 of optional second steps.

In several embodiments, method 1800 additionally can include a block 1803 of receiving a first promise-to-pay message at a transaction system. The first promise-to-pay message can be similar or identical to messages 1176 (FIG. 11), 1274 (FIG. 12), 1474 (FIG. 14), and/or 1676 (FIG. 16). The transaction system can be similar or identical to transaction system 1050 (FIGS. 10-17). In some embodiments, the first promise-to-pay message can be based on a successful debit of a first account maintained by a first financial institution. The first financial institution can be similar or identical to sending participant 1040 (FIGS. 10-17). The first account can be similar or identical to sender account 1041 (FIGS. 10-17). The successful debit can be similar or identical to activity 1145 (FIGS. 11-12, 14, 16-17). In many embodiments, the successful debit of the first account can be based on a payment authorization made by a sender at a payment authorization time. The payment authorization can be to authorize the payment of one or more bills and/or other financial obligations. The payment authorization time can be the time in which the sender authorized the bill payment transaction. The sender can be similar or identical to sender 1010 (FIGS. 10-17), who can use sender system 1020 (FIGS. 10-17). The payment authorization can be communicated from sender system 1020 (FIGS. 10-17) in messages 1171 (FIG. 11), 1271 (FIG. 12), 1471 (FIG. 14), and/or 1671 (FIG. 16). In several embodiments, the first account can be held by the sender, such that the sender is the account holder of the first account.

In some embodiments, the first promise-to-pay message can be sent to the transaction system from an application service provider. The application service provider can be similar or identical to application service provider 1030 (FIGS. 10-12), application service provider 1330 (FIGS. 13-14), and/or application service provider 1530 (FIGS. 15-17). In many embodiments, the application service provider can host a payment application that can be accessed by the sender to perform the payment authorization. The payment application can be similar or identical to payment application 1031 (FIGS. 10-12), payment application 1331 (FIGS. 13-14), and/or payment application 1531 (FIGS. 15-17).

In a number of embodiments, method 1800 further can include a block 1804 of storing the first promise-to-pay message in the transaction system.

In several embodiments, method 1800 additionally can include a block 1805 of sending a second promise-to-pay message from the transaction system to a second financial institution. The second promise-to-pay message can be similar or identical to messages 1177 (FIG. 11), 1275 (FIG. 12), 1475 (FIG. 14), and/or 1677 (FIG. 16). The second financial institution can be similar or identical to receiving participant 1060 (FIGS. 10-17). In some embodiments, the second promise-to-pay message can be based on the first promise-to-pay message, such that the second financial institution can credit a second account maintained by the second financial institution to make funds available in the second account in real-time after the payment authorization time. The second account can be similar or identical to billing account 1061 (FIGS. 10-17) and/or recipient account 1062 (FIGS. 10-17). In various embodiments, the sender can be financially liable for the second account. In some embodiments, the first financial institution can be different from the second financial institution.

In a number of embodiments, method 1800 further can include a block 1806 of receiving a first response at the transaction system from the second financial institution indicating a successful credit of the second account maintained by the second financial institution. The first response can be similar or identical to 1178 (FIG. 11), 1276 (FIG. 12), 1476 (FIG. 14), and/or 1678 (FIG. 16). The successful credit can be similar or identical to activity 1165 (FIGS. 11-12, 14, 16-17) and/or activity 1167 (FIGS. 11-12, 14, 16-17).

In several embodiments, method 1800 additionally can include a block 1807 of storing the first response in the transaction system.

In a number of embodiments, method 1800 further can include a block 1808 of sending a second response from the transaction system indicating the successful credit of the second account maintained by the second financial institution to inform at least the sender in real-time after the payment authorization time of the successful credit of the second account maintained by the second financial institution. The second response can be similar or identical to messages 1179 (FIG. 11), 1277 (FIG. 12), 1477 (FIG. 14), and/or 1679 (FIG. 16). The sender can be informed by messages 1180 (FIG. 11), 1278 (FIG. 12), 1478 (FIG. 14), and/or 1680 (FIG. 16).

In some embodiments, the application service provider can be a different entity from the first and second financial institutions, such as application service provider 1030 (FIGS. 10-12). In other embodiments, the application service provider can be the same entity as the first financial institution, such as application service provider 1330 (FIGS. 13-14). In yet other embodiments, the application service provider can be the same entity as the second financial institution, such as application service provider 1530 (FIGS. 15-17).

In various embodiments, the first promise-to-pay message received at the transaction system from the application service provider can be based on the application service provider having sent a debit message to the first financial institution to debit the first account maintained by the first financial institution and having received a debit response from the first financial institution in real-time after the payment authorization time. The debit message can be similar or identical to message 1272 (FIG. 12) and/or 1472 (FIG. 14). The debit response can be similar or identical to message 1273 (FIG. 12) and/or message 1473 (FIG. 14). In some embodiments, the debit response can indicate the successful debit of the first account maintained by the first financial institution.

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In several embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Turning ahead in the drawings, FIG. 19 illustrates a block 1801 of optional first steps, according to an embodiment. Block 1801 is merely exemplary and is not limited to the embodiments presented herein. Block 1801 can be employed in many different embodiments or examples not specifically depicted or described herein. In some embodiments, the procedures, the processes, and/or the activities of block 1801 can be performed in the order presented. In other embodiments, the procedures, the processes, and/or the activities of block 1801 can be performed in any suitable order. In still other embodiments, one or more of the procedures, the processes, and/or the activities of block 1801 can be combined or skipped. In many embodiments, block 1801 can be performed before the payment authorization time.

Referring to FIG. 19, block 1801 can include a block 1901 of receiving a first capability inquiry at the transaction system from the application service provider. The first capability inquiry can be similar or identical to messages 1072 (FIG. 10), 1372 (FIG. 13), and/or 1572 (FIG. 15).

In a number of embodiments, block 1801 also can include a block 1902 of storing the first capability inquiry in the transaction system.

In several embodiments, block 1801 optionally can include a block 1903 of sending a second capability inquiry from the transaction system to the second financial institution to determine whether the second account maintained by the second financial institution supports real-time payment transactions. The second capability inquiry can be similar or identical to messages 1073 (FIG. 10) and/or 1373 (FIG. 13).

In a number of embodiments, block 1801 also can include, after block 1903, a block 1904 of receiving a first capability response at the transaction system from the second financial institution indicating whether the second account maintained by the second financial institution supports real-time payment transactions. The first capability response can be similar or identical to messages 1074 (FIG. 10) and/or 1374 (FIG. 13).

In several embodiments, block 1801 additionally can include, after block 1904, a block 1905 of storing the first capability response in the transaction system.

In a number of embodiments, block 1801 optionally can include, after block 1902 or block 1905, a block 1906 of sending a third capability inquiry from the transaction system to the first financial institution to determine whether the first account maintained by the first financial institution supports real-time payment transactions. The third capability inquiry can be similar or identical to messages 1075 (FIG. 10) and/or 1573 (FIG. 15).

In several embodiments, block 1801 also can include, after block 1906, a block 1907 of receiving a second capability response at the transaction system from the first financial institution indicating whether the first account maintained by the first financial institution supports real-time payment transactions. The second capability response can be similar or identical to messages 1076 (FIG. 10) and/or 1574 (FIG. 15).

In a number of embodiments, block 1801 further can include, after block 1907, a block 1908 of storing the second capability response in the transaction system.

In several embodiments, block 1801 additionally can include, after block 1905 or block 1908, a block 1909 of sending a third capability response from the transaction system to the application service provider. In some embodiments, the third capability response can indicate whether the first and second accounts support real-time payment transactions, such as in message 1077 (FIG. 11). In other embodiments, the third capability response can indicate whether the second account supports real-time payment transactions, such as in message 1375 (FIG. 13). In yet other embodiments, the third capability response can indicate whether the first account supports real-time payment transactions, such as in message 1575 (FIG. 15).

Turning ahead in the drawings, FIG. 20 illustrates a block 1802 of optional second steps, according to an embodiment. Block 1802 is merely exemplary and is not limited to the embodiments presented herein. Block 1802 can be employed in many different embodiments or examples not specifically depicted or described herein. In some embodiments, the procedures, the processes, and/or the activities of block 1802 can be performed in the order presented. In other embodiments, the procedures, the processes, and/or the activities of block 1802 can be performed in any suitable order. In still other embodiments, one or more of the procedures, the processes, and/or the activities of block 1802 can be combined or skipped. In many embodiments, block 1802 can occur before the payment authorization time. In many embodiments, block 1802 can be performed before receiving the first promise-to-pay message in block 1803 (FIG. 18).

Referring to FIG. 20, block 1802 can include a block 2001 of sending a debit message from the transaction system to the first financial institution to debit the first account maintained by the first financial institution. The debit message can be similar or identical to messages 1173 (FIG. 11) and/or 1673 (FIG. 16).

In a number of embodiments, block 1802 also can include a block 2002 of receiving a debit response at the transaction system from the first financial institution in real-time after the payment authorization time. The debit response can be similar or identical to messages 1174 (FIG. 11) and/or 1674 (FIG. 16). In some embodiments, the debit response can indicate the successful debit of the first account maintained by the first financial institution.

In several embodiments, block 1802 additionally can include a block 2003 of storing the debit response in the transaction system.

In a number of embodiments, block 1802 further can include a block 2004 of sending a third response from the transaction system to the application service provider indicating the successful debit of the first account maintained by the first financial institution. The third response can be similar or identical to messages 1175 (FIG. 11) and/or FIG. 1675 (FIG. 16).

Figure 21:
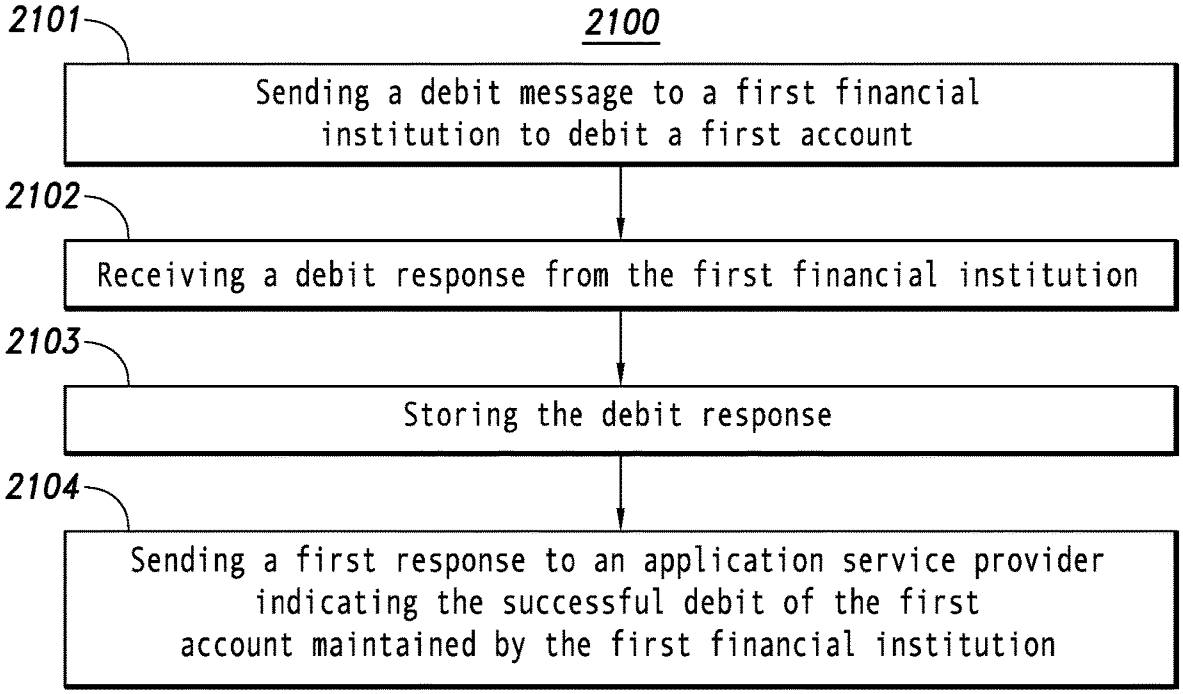
FIG. 21 illustrates a flow chart for a method to facilitate a real-time funds availability bill-pay transaction, according to another embodiment.

Proceeding to the next drawing, FIG. 21 illustrates a flow chart for a method 2100 to facilitate a real-time funds availability bill-pay transaction, according to an embodiment. Method 2100 is merely exemplary and is not limited to the embodiments presented herein. Method 2100 can be employed in many different embodiments or examples not specifically depicted or described herein. In some embodiments, the procedures, the processes, and/or the activities of method 2100 can be performed in the order presented. In other embodiments, the procedures, the processes, and/or the activities of method 2100 can be performed in any suitable order. In still other embodiments, one or more of the procedures, the processes, and/or the activities of method 2100 can be combined or skipped. In some embodiments, method 2100 can be performed by transaction system 1050 (FIGS. 10-17).

Referring to FIG. 21, method 2100 can include a block 2101 of sending a debit message from a transaction system to a first financial institution to debit a first account maintained by the first financial institution based on a payment authorization made by a sender at a payment authorization time. The debit message can be similar or identical to message 1773 (FIG. 17). The transaction system can be similar or identical to transaction system 1050 (FIGS. 10-17). The first financial institution can be similar or identical to sending participant 1040 (FIGS. 10-17). The first account can be similar or identical to sender account 1041 (FIGS. 10-17). The payment authorization time can be the time in which the sender authorized the bill payment transaction. The sender can be similar or identical to sender 1010 (FIGS. 10-17), who can use sender system 1020 (FIGS. 10-17). The payment authorization can be communicated from sender system 1020 (FIGS. 10-17) in message 1771 (FIG. 17). In many embodiments, the first account can be held by the sender, such that the sender is the account holder of the first account.

In a number of embodiments, method 2100 also can include a block 2102 of receiving a debit response at the transaction system from the first financial institution in real-time after the payment authorization time. The debit response can be similar or identical to debit response 1774 (FIG. 17). In some embodiments, the debit response can indicate a successful debit of the first account maintained by the first financial institution. The successful debit can be similar or identical to activity 1145 (FIGS. 11-12, 14, 16-17).

In several embodiments, method 2100 additionally can include a block 2103 of storing the debit response in the transaction system.

In a number of embodiments, method 2100 further can include a block 2104 of sending a first response to an application service provider indicating the successful debit of the first account maintained by the first financial institution, such that the application service provider sends a promise-to-pay message to a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The first response can be similar or identical to message 1775 (FIG. 17). The application service provider can be similar or identical to application service provider 1530 (FIGS. 15-17). The successful credit can be similar or identical to activity 1165 (FIGS. 11-12, 14, 16-17) and/or activity 1167 (FIGS. 11-12, 14, 16-17). In many embodiments, the application service provider can be the same entity as the second financial institution. The promise-to-pay message can be similar or identical to message 1776 (FIG. 17). The second financial institution can be similar or identical to receiving participant 1060 (FIGS. 10-17). The second account can be similar or identical to billing account 1061 (FIGS. 10-17) and/or recipient account 1062 (FIGS. 10-17). In various embodiments, the sender can be financially liable for the second account. In some embodiments, the first financial institution can be different from the second financial institution.

In many embodiments, the application service provider can host a payment application that is accessed by the sender to perform the payment authorization. The payment application can be similar or identical to payment application 1531 (FIGS. 15-17).

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In several embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In some embodiments, the settlement completion can occur in real-time after the payment authorization time.

Figure 22:
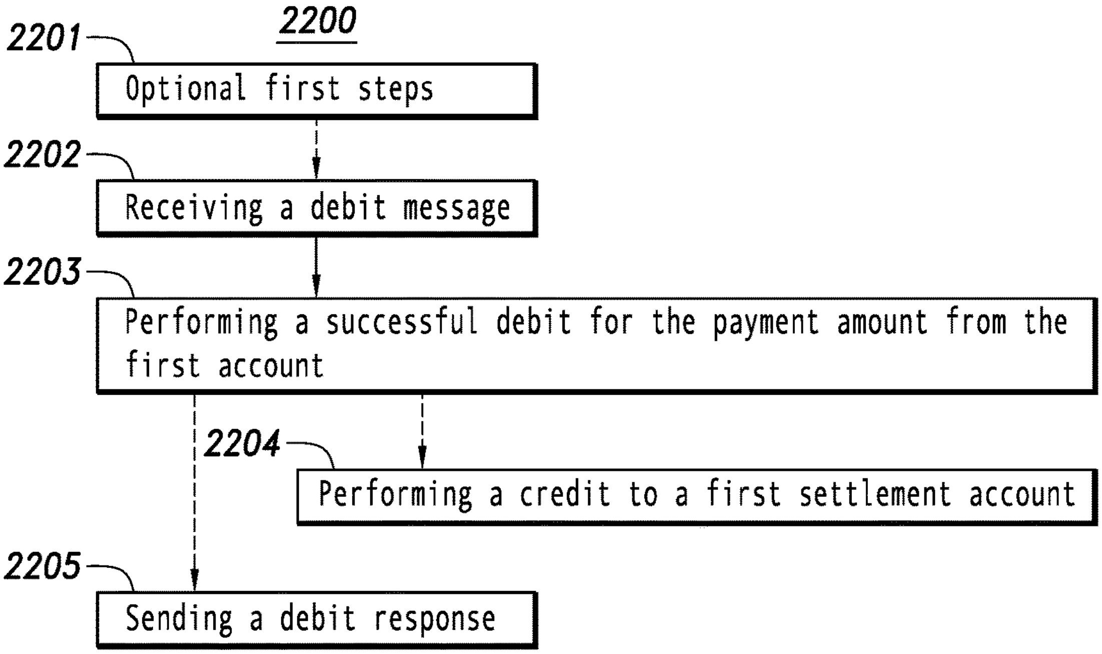
FIG. 22 illustrates a flow chart for a method to facilitate a real-time funds availability bill-pay transaction, according to another embodiment.

Turning ahead in the drawings, FIG. 22 illustrates a flow chart for a method 2200 to facilitate a real-time funds availability bill-pay transaction, according to an embodiment. Method 2200 is merely exemplary and is not limited to the embodiments presented herein. Method 2200 can be employed in many different embodiments or examples not specifically depicted or described herein. In some embodiments, the procedures, the processes, and/or the activities of method 2200 can be performed in the order presented. In other embodiments, the procedures, the processes, and/or the activities of method 2200 can be performed in any suitable order. In still other embodiments, one or more of the procedures, the processes, and/or the activities of method 2200 can be combined or skipped. In some embodiments, method 2200 can be performed by first financial institution 1040 (FIGS. 10-17).

Figure 23:
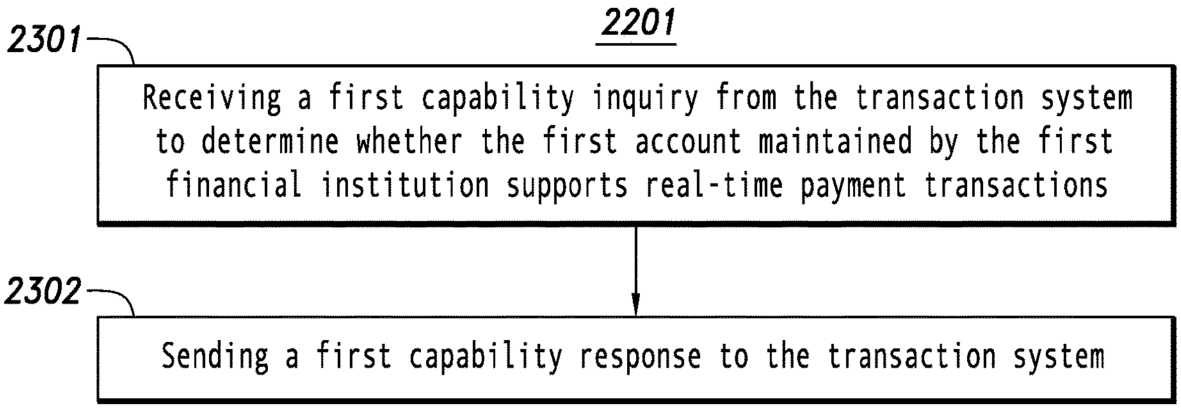
FIG. 23 illustrates a block of optional first steps, according to the embodiment of FIG. 22.

Referring to FIG. 22, method 2200 can include a block 2201 of optional first steps, as shown in FIG. 23 and described below. In some embodiments, method 2200 can skip block 2201 of optional first steps.

In a number of embodiments, method 2200 also can include a block 2202 of receiving a debit message at a first financial institution to debit a first account maintained by the first financial institution based on a payment authorization for a payment amount made by a sender at a payment authorization time. The debit message can be similar or identical to messages 1173 (FIG. 11), 1272 (FIG. 12), 1472 (FIG. 14), 1673 (FIG. 16), and/or 1773 (FIG. 17). The first financial institution can be similar or identical to sending participant 1040 (FIGS. 10-17). The first account can be similar or identical to sender account 1041 (FIGS. 10-17). The payment authorization time can be the time in which the sender authorized the bill payment transaction. The sender can be similar or identical to sender 1010 (FIGS. 10-17), who can use sender system 1020 (FIGS. 10-17). The payment authorization can be communicated from sender system 1020 (FIGS. 10-17) in messages 1171 (FIG. 11), 1271 (FIG. 12), 1471 (FIG. 14), 1671 (FIG. 16), and/or 1771 (FIG. 17). In several embodiments, the first account can be held by the sender, such that the sender is the account holder of the first account.

In several embodiments, method 2200 additionally can include a block 2203 of performing a successful debit for the payment amount from the first account maintained by the first financial institution in real-time after the payment authorization time. The successful debit can be similar or identical to activity 1145 (FIGS. 11-12, 14, 16-17).

In a number of embodiments, method 2200 optionally can include a block 2204 of performing a credit for the payment amount to a first settlement account maintained by the first financial institution to account for the successful debit of the first account maintained by the first financial institution. The first settlement account can be similar or identical to sending participant settlement account 1042 (FIGS. 10-17). The credit can be similar or identical to activity 1146 (FIGS. 11-12, 14, 16-17).

In a several embodiments, method 2200 further can include, after block 2203 or block 2204, a block 2205 of sending a debit response from the first financial institution in real-time after the payment authorization time. The debit response can be similar or identical to messages 1174 (FIG. 11), 1273 (FIG. 12), 1473 (FIG. 14), 1674 (FIG. 16), and/or 1774 (FIG. 17). In many embodiments, the debit response can indicate the successful debit of the first account maintained by the first financial institution, such that an application service provider sends a first promise-to-pay message for a second financial institution to credit a second account maintained by the second financial institution to make funds available in the second account in real-time after the payment authorization time, and such that the application service provider informs the sender in real-time after the payment authorization time of a successful credit of the second account maintained by the second financial institution.

The application service provider can be similar or identical to application service provider 1030 (FIGS. 10-12), application service provider 1330 (FIGS. 13-14), and/or application service provider 1530 (FIGS. 15-17). The first promise-to-pay messages can be similar or identical to messages 1176 (FIG. 11), 1274 (FIG. 12), 1474 (FIG. 14), 1676 (FIG. 16), and/or 1776 (FIG. 17). The second financial institution can be similar or identical to receiving participant 1060 (FIGS. 10-17). The second account can be similar or identical to billing account 1061 (FIGS. 10-17) and/or recipient account 1062 (FIGS. 10-17). The successful credit can be similar or identical to activity 1165 (FIGS. 11-12, 14, 16-17) and/or activity 1167 (FIGS. 11-12, 14, 16-17). The sender can be informed by messages 1180 (FIG. 11), 1278 (FIG. 12), 1478 (FIG. 14), 1680 (FIG. 16), and/or 1778 (FIG. 17). In various embodiments, the sender can be financially liable for the second account. In some embodiments, the first financial institution can be different from the second financial institution.

In some embodiments, the first promise-to-pay message can be sent to a transaction system from the application service provider. The transaction system can be similar or identical to transaction system 1050 (FIGS. 10-17). In many embodiments, the transaction system can send a second promise-to-pay message to the second financial institution based on the first promise-to-pay message. The second promise-to-pay message can be similar or identical to messages 1176 (FIG. 11), 1274 (FIG. 12), 1474 (FIG. 14), and/or 1676 (FIG. 16).

In other embodiments, the first promise-to-pay message can be sent from the application service provider to the second financial institution after the application service provider receives a second debit response indicating the successful debit of the first account maintained by the first financial institution. The second debit response can be similar or identical to message 1775 (FIG. 17).

In many embodiments, the application service provider can host a payment application that can be accessed by the sender to perform the payment authorization. The payment application can be similar or identical to payment application 1031 (FIGS. 10-12), payment application 1331 (FIGS. 13-14), and/or payment application 1531 (FIGS. 15-17).

In some embodiments, the application service provider can be a different entity from the first and second financial institutions, such as application service provider 1030 (FIGS. 10-12). In other embodiments, the application service provider can be the same entity as the first financial institution, such as application service provider 1330 (FIGS. 13-14). In yet other embodiments, the application service provider can be the same entity as the second financial institution, such as application service provider 1530 (FIGS. 15-17).

In some embodiments, the debit message can be received from the transaction system, such as in messages 1173 (FIG. 11), 1673 (FIG. 16), and/or 1773 (FIG. 17), and the debit response can be sent to the transaction system, such as in messages 1174 (FIG. 11), 1674 (FIG. 16), and/or 1774 (FIG. 17). In other embodiments, the debit message can be received from the application service provider, such as in messages 1272 (FIG. 12) and/or 1472 (FIG. 14), and the debit response can be sent to the transaction system, such as in messages 1273 (FIG. 12) and/or 1473 (FIG. 14).

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In many embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Proceeding to the next drawing, FIG. 23 illustrates a block 2201 of optional first steps, according to an embodiment. Block 2201 is merely exemplary and is not limited to the embodiments presented herein. Block 2201 can be employed in many different embodiments or examples not specifically depicted or described herein. In some embodiments, the procedures, the processes, and/or the activities of block 2201 can be performed in the order presented. In other embodiments, the procedures, the processes, and/or the activities of block 2201 can be performed in any suitable order. In still other embodiments, one or more of the procedures, the processes, and/or the activities of block 2201 can be combined or skipped. In many embodiments, block 2201 can be performed before the payment authorization time.

Referring to FIG. 23, block 2201 can include a block 2301 of receiving a first capability inquiry at receiving a first capability inquiry at the first financial institution from the transaction system to determine whether the first account maintained by the first financial institution supports real-time payment transactions. The first capability inquiry can be similar or identical to messages 1075 (FIG. 10) and/or 1573 (FIG. 15).

In a number of embodiments, block 2201 also can include a block 2302 of sending a first capability response from the first financial institution to the transaction system indicating whether the first account maintained by the first financial institution supports real-time payment transactions, such that the transaction system sends a second capability response to the application service provider indicating whether the first account supports real-time payment transactions. The first capability response can be similar or identical to messages 1076 (FIG. 10) and/or 1574 (FIG. 15). The second capability response can be similar or identical to messages 1077 (FIG. 10) and/or 1575 (FIG. 15).

Figure 24:
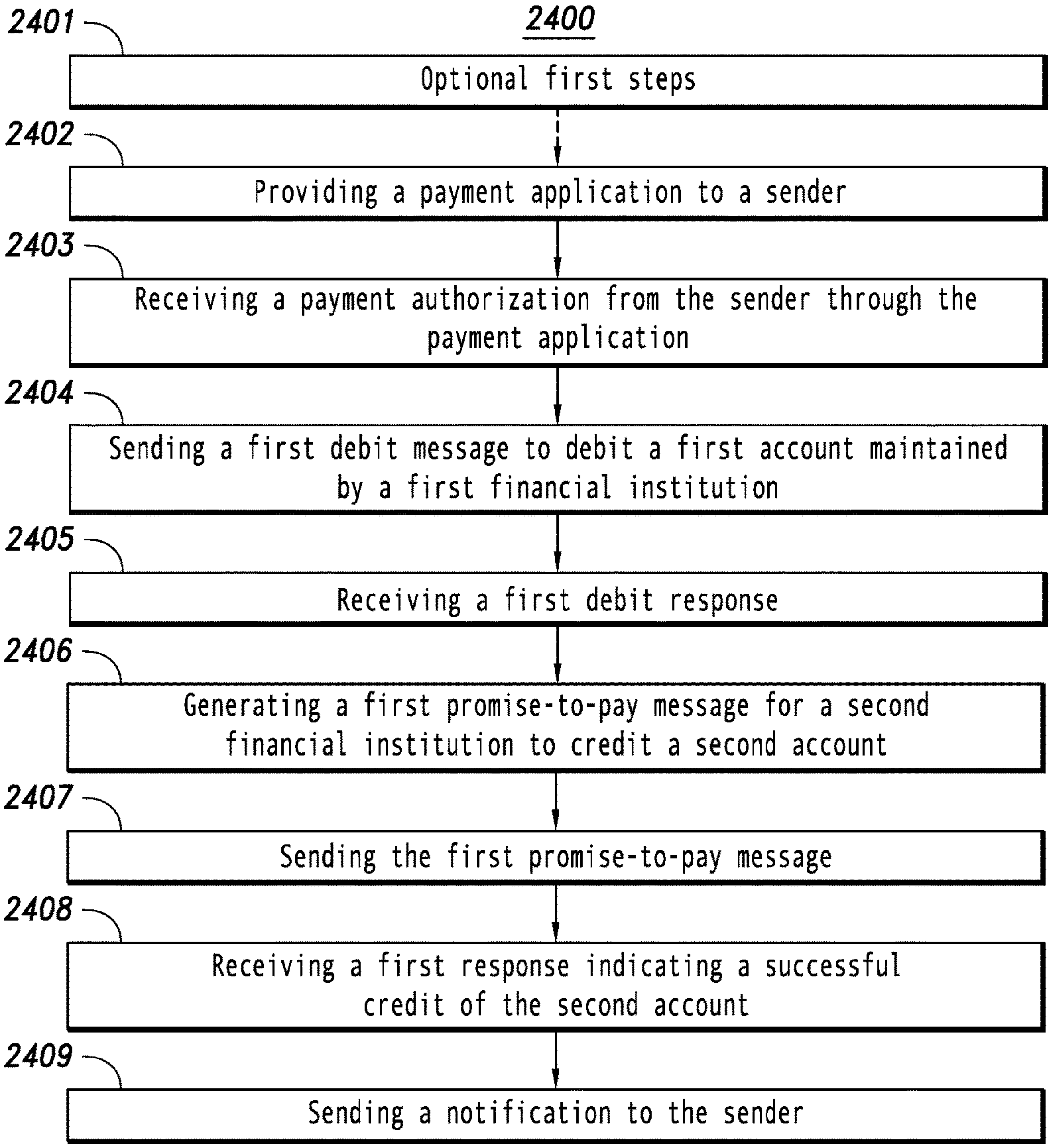
FIG. 24 illustrates a flow chart for a method to facilitate a real-time funds availability bill-pay transaction, according to another embodiment.

Turning ahead in the drawings, FIG. 24 illustrates a flow chart for a method 2400 to facilitate a real-time funds availability bill-pay transaction, according to an embodiment. Method 2400 is merely exemplary and is not limited to the embodiments presented herein. Method 2400 can be employed in many different embodiments or examples not specifically depicted or described herein. In some embodiments, the procedures, the processes, and/or the activities of method 2400 can be performed in the order presented. In other embodiments, the procedures, the processes, and/or the activities of method 2400 can be performed in any suitable order. In still other embodiments, one or more of the procedures, the processes, and/or the activities of method 2400 can be combined or skipped. In some embodiments, method 2400 can be performed by application service provider 1030 (FIGS. 10-12), application service provider 1330 (FIGS. 13-14), and/or application service provider 1530 (FIGS. 15-17).

Figure 25:
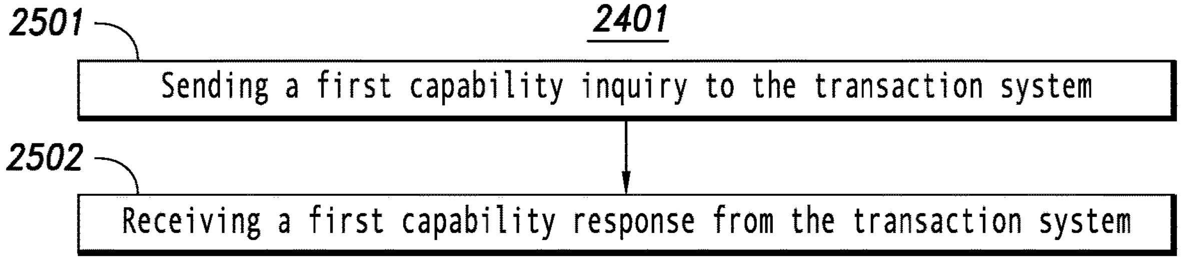
FIG. 25 illustrates a block of optional first steps, according to the embodiment of FIG. 24.

Referring to FIG. 24, method 2400 can include a block 2401 of optional first steps, as shown in FIG. 25 and described below. In some embodiments, method 2400 can skip block 2401 of optional first steps.

In a number of embodiments, method 2400 also can include a block 2402 of providing a payment application to a sender from an application service provider. The payment application can be similar or identical to payment application 1031 (FIGS. 10-12), payment application 1331 (FIGS. 13-14), and/or payment application 1531 (FIGS. 15-17). The sender can be similar or identical to sender 1010 (FIGS. 10-17), who can use sender system 1020 (FIGS. 10-17).

In several embodiments, method 2400 additionally can include a block 2403 of receiving a bill payment authorization from the sender through the payment application. The payment authorization can be communicated from sender system 1020 (FIGS. 10-17) in messages 1171 (FIG. 11), 1271 (FIG. 12), 1471 (FIG. 14), 1671 (FIG. 16), and/or 1771 (FIG. 17). In many embodiments, the bill payment authorization can be made by the sender at a payment authorization time. The payment authorization time can be the time in which the sender authorized the bill payment transaction.

In a number of embodiments, method 2400 further can include a block 2404 of sending a first debit message from the application service provider to debit a first account maintained by a first financial institution based on the bill payment authorization. The first debit message can be similar or identical to messages 1172 (FIG. 11), 1272 (FIG. 12), 1472 (FIG. 14), 1672 (FIG. 16), and/or 1772 (FIG. 17). The first account can be similar or identical to sender account 1041 (FIGS. 10-17). The first financial institution can be similar or identical to sending participant 1040 (FIGS. 10-17). In many embodiments, the first account can be held by the sender, such that the sender is the account holder of the first account.

In a several embodiments, method 2400 further can include a block 2405 of receiving a first debit response at the application service provider in real-time after the payment authorization time. The first debit response can be similar or identical to messages 1175 (FIG. 11), 1273 (FIG. 12), 1473 (FIG. 14), 1675 (FIG. 16), and/or 1775 (FIG. 17). In many embodiments, the debit response can indicate a successful debit of the first account maintained by the first financial institution. The successful debit can be similar or identical to activity 1145 (FIGS. 11-12, 14, 16-17).

In a number of embodiments, method 2400 further can include a block 2406 of generating a first promise-to-pay message for a second financial institution to credit a second account maintained by the second financial institution to make funds available in the second account in real-time after the payment authorization time. The first promise-to-pay message can be similar or identical to messages 1176 (FIG. 11), 1274 (FIG. 12), 1474 (FIG. 14), 1676 (FIG. 16), and/or 1776 (FIG. 17). The second financial institution can be similar or identical to receiving participant 1060 (FIGS. 10-17). The second account can be similar or identical to billing account 1061 (FIGS. 10-17) and/or recipient account 1062 (FIGS. 10-17). In various embodiments, the sender can be financially liable for the second account. In many embodiments, the first promise-to-pay message can be based on the successful debit of the first account maintained by the first financial institution. In many embodiments, the first financial institution can be different from the second financial institution.

In a several embodiments, method 2400 further can include a block 2407 of sending the first promise-to-pay message. In some embodiments, the first promise-to-pay message can be sent from the application service provider to a transaction system, such as in messages 1176 (FIG. 11), 1274 (FIG. 12), 1474 (FIG. 14), and/or 1676 (FIG. 16). In many embodiments, a second promise-to-pay message can be sent by the transaction system to the second financial institution based on the first promise-to-pay message. The second promise-to-pay message can be similar or identical to 1177 (FIG. 11), 1275 (FIG. 12), 1475 (FIG. 14), and/or 1677 (FIG. 16). In other embodiments, the first promise-to-pay message can be sent from the application service provider to the second financial institution, such as in message 1776 (FIG. 17).

In a number of embodiments, method 2400 further can include a block 2408 of receiving a first response at the application service provider indicating a successful credit of the second account maintained by the second financial institution. The first response can be similar or identical to messages 1179 (FIG. 11), 1277 (FIG. 12), 1477 (FIG. 14), 1679 (FIG. 16), and/or 1777 (FIG. 17). The successful credit can be similar or identical to activity 1165 (FIGS. 11-12, 14, 16-17) and/or activity 1167 (FIGS. 11-12, 14, 16-17).

In some embodiments, the first response, such a messages 1179 (FIG. 11), 1277 (FIG. 12), 1477 (FIG. 14), 1679 (FIG. 16), can be received at the application service provider from the transaction system based on a second response that was received at the transaction system from the second financial institution indicating the successful credit of the second account maintained by the second financial institution. The second response can be similar or identical to messages 1177 (FIG. 11), 1276 (FIG. 12), 1476 (FIG. 14), and/or 1678 (FIG. 16). In other embodiments, the first response can be received at the application service provider from the second financial institution, such as in message 1777 (FIG. 17).

In a several embodiments, method 2400 further can include a block 2409 of sending a notification to the sender from the application service provider in real-time after the payment authorization time of the successful credit of the second account maintained by the second financial institution. The notification can be similar or identical to messages 1180 (FIG. 11), 1278 (FIG. 12), 1478 (FIG. 14), 1680 (FIG. 16), and/or 1778 (FIG. 17).

In some embodiments, the application service provider can be a different entity from the first and second financial institutions, such as application service provider 1030 (FIGS. 10-12). In other embodiments, the application service provider can be the same entity as the first financial institution, such as application service provider 1330 (FIGS. 13-14). In yet other embodiments, the application service provider can be the same entity as the second financial institution, such as application service provider 1530 (FIGS. 15-17).

In some embodiments, the first debit message, such as messages 1172 (FIG. 11), 1672 (FIG. 16), and/or 1772 (FIG. 17), can be sent from the application service provider to the transaction system to be forwarded by the transaction system to the first financial institution as a second debit message that is based on the first debit message. The second debit message can be similar or identical to messages 1173 (FIG. 11), 1673 (FIG. 16), and/or 1773 (FIG. 17). The first debit response, such as messages 1175 (FIG. 11), 1675 (FIG. 16), and/or 1775 (FIG. 17), can be received at the application service provider from the transaction system based on a second debit response that was received at the transaction system from the first financial institution indicating the successful debit of the first account maintained by the first financial institution. The second debit response can be similar or identical to messages 1174 (FIG. 11), 1674 (FIG. 16), and/or 1774 (FIG. 17).

In other embodiments, the first debit message, such as messages 1272 (FIG. 12 and/or 1472 (FIG. 14), can be sent from the application service provider to the first financial institution. The first debit response, such as messages 1273 (FIG. 12) and/or 1473 (FIG. 14) can be received at the application service provider from the first financial institution.

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In several embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Proceeding to the next drawing, FIG. 25 illustrates a block 2401 of optional first steps, according to an embodiment. Block 2401 is merely exemplary and is not limited to the embodiments presented herein. Block 2401 can be employed in many different embodiments or examples not specifically depicted or described herein. In some embodiments, the procedures, the processes, and/or the activities of block 2401 can be performed in the order presented. In other embodiments, the procedures, the processes, and/or the activities of block 2401 can be performed in any suitable order. In still other embodiments, one or more of the procedures, the processes, and/or the activities of block 2401 can be combined or skipped. In many embodiments, block 2401 can be performed before the payment authorization time.

Referring to FIG. 25, block 2401 can include a block 2501 of sending a first capability inquiry from the application service provider to the transaction system. The first capability inquiry can be similar or identical to messages 1072 (FIG. 10), 1372 (FIG. 13), and/or 1572 (FIG. 15).

In a number of embodiments, block 2401 also can include a block 2502 of receiving a second capability response at the application service provider from the transaction system. The second capability response can be similar or identical to messages 1077 (FIG. 10), 1375 (FIG. 13), and/or 1575 (FIG. 15). In some embodiments, the second capability response can indicate whether the first and second accounts support real-time payment transactions, such as in message 1077 (FIG. 10). In other embodiments, the second capability response can indicate whether the second account supports real-time payment transactions, such as in message 1375 (FIG. 13). In yet other embodiments, the second capability response can indicate whether the first account supports real-time payment transactions, such as in message 1575 (FIG. 15).

Figure 26:
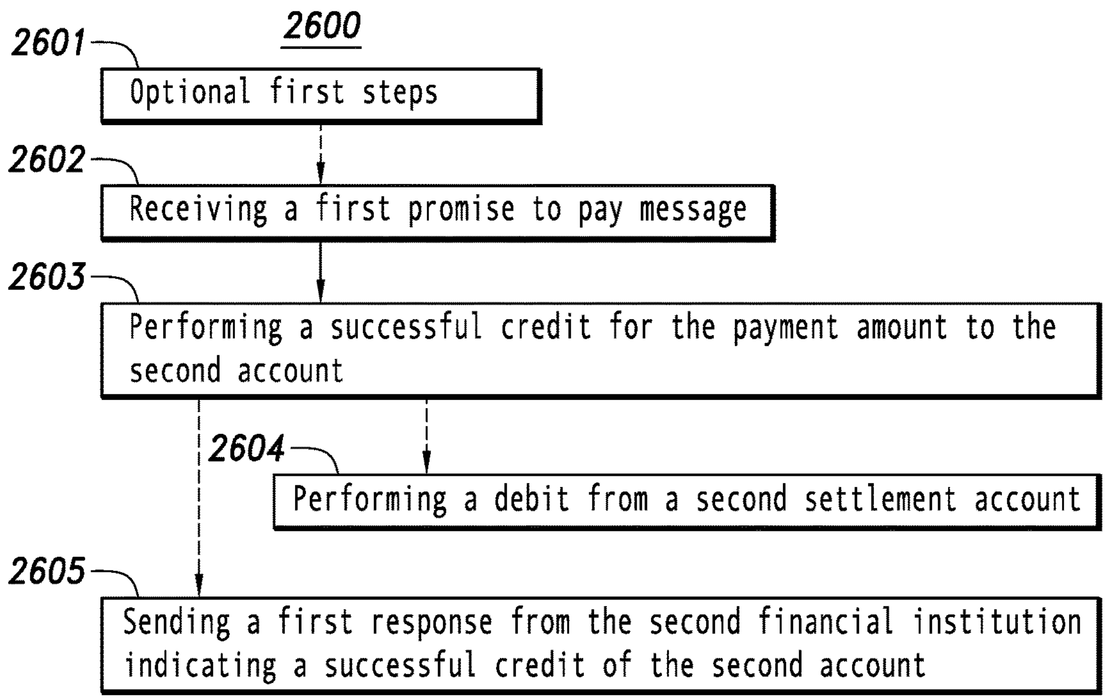
FIG. 26 illustrates a flow chart for a method to facilitate a real-time funds availability bill-pay transaction, according to another embodiment.

Turning ahead in the drawings, FIG. 26 illustrates a flow chart for a method 2600 to facilitate a real-time funds availability bill-pay transaction, according to an embodiment. Method 2600 is merely exemplary and is not limited to the embodiments presented herein. Method 2600 can be employed in many different embodiments or examples not specifically depicted or described herein. In some embodiments, the procedures, the processes, and/or the activities of method 2600 can be performed in the order presented. In other embodiments, the procedures, the processes, and/or the activities of method 2600 can be performed in any suitable order. In still other embodiments, one or more of the procedures, the processes, and/or the activities of method 2600 can be combined or skipped. In some embodiments, method 2600 can be performed by second financial institution 1060 (FIGS. 10-17).

Figure 27:
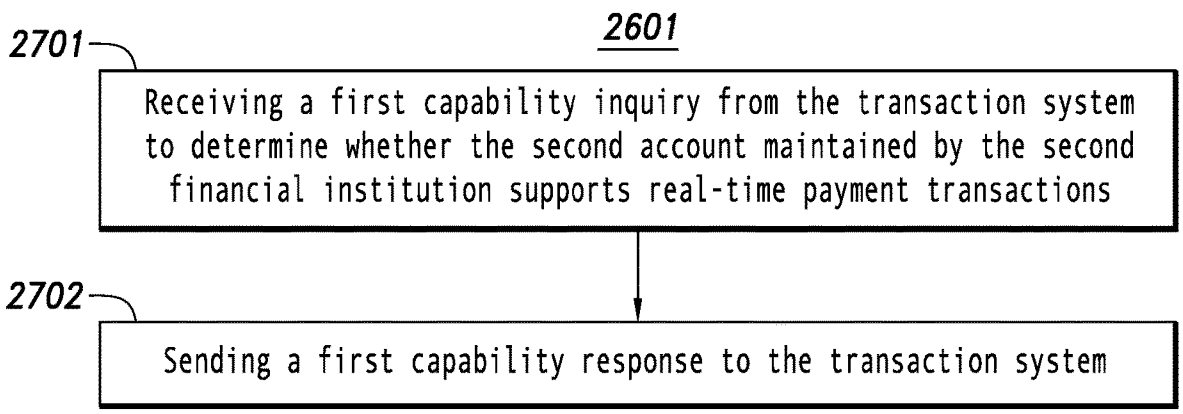
FIG. 27 illustrates a block of optional first steps, according to the embodiment of FIG. 26.

Referring to FIG. 26, method 2600 can include a block 2601 of optional first steps, as shown in FIG. 27 and described below. In some embodiments, method 2600 can skip block 2601 of optional first steps.

In a number of embodiments, method 2600 also can include a block 2602 of receiving a first promise-to-pay message at a second financial institution. The first promise-to-pay messages can be similar or identical to messages 1177 (FIG. 11), 1275 (FIG. 12), 1475 (FIG. 14), 1677 (FIG. 16), and/or 1776 (FIG. 17). The second financial institution can be similar or identical to receiving participant 1060 (FIGS. 10-17). In many embodiments, the first promise-to-pay message can be based on a successful debit of a first account maintained by a first financial institution. The successful debit can be similar or identical to activity 1145 (FIGS. 11-12, 14, 16-17). The first financial institution can be similar or identical to sending participant 1040 (FIGS. 10-17). The first account can be similar or identical to sender account 1041 (FIGS. 10-17). In many embodiments, the successful debit of the first account can be based on a bill payment authorization for a payment amount made by a sender at a payment authorization time. The payment authorization can be communicated from sender system 1020 (FIGS. 10-17) in messages 1171 (FIG. 11), 1271 (FIG. 12), 1471 (FIG. 14), 1671 (FIG. 16), and/or 1771 (FIG. 17). The sender can be similar or identical to sender 1010 (FIGS. 10-17), who can use sender system 1020 (FIGS. 10-17). The payment authorization time can be the time in which the sender authorized the bill payment transaction. In several embodiments, the first account can be held by the sender, such that the sender is the account holder of the first account. In some embodiments, the first financial institution can be different from the second financial institution.

In several embodiments, method 2600 additionally can include a block 2603 of performing a successful credit for the payment amount to a second account maintained by the second financial institution to make funds available in the second account in real-time after the payment authorization time. The successful credit can be similar or identical to activity 1165 (FIGS. 11-12, 14, 16-17) and/or activity 1167 (FIGS. 11-12, 14, 16-17). The second account can be similar or identical to billing account 1061 (FIGS. 10-17) and/or recipient account 1062 (FIGS. 10-17). In various embodiments, the sender can be financially liable for the second account.

In a number of embodiments, method 2600 optionally can include a block 2604 of performing a debit for the payment amount from a second settlement account maintained by the second financial institution to account for the successful credit of the second account maintained by the second financial institution. The second settlement account can be similar or identical to receiving participant settlement account 1063 (FIGS. 10-17). The debit can be similar or identical to activity 1166 (FIGS. 11-12, 14, 16-17).

In a several embodiments, method 2600 further can include, after block 2603 or block 2604, a block 2605 of sending a first response from the second financial institution indicating the successful credit of the second account maintained by the second financial institution to inform at least the sender in real-time after the payment authorization time of the successful credit of the second account maintained by the second financial institution. The first response can be similar or identical to messages 1178 (FIG. 11), 1276 (FIG. 12), 1476 (FIG. 14), 1678 (FIG. 16), and/or 1777 (FIG. 17). The sender can be informed by messages 1180 (FIG. 11), 1278 (FIG. 12), 1478 (FIG. 14), 1680 (FIG. 16), and/or 1778 (FIG. 17).

In some embodiments, the first promise-to-pay message, such as messages 1177 (FIG. 11), 1275 (FIG. 12), 1475 (FIG. 14), and/or 1677 (FIG. 16), can be received at the second financial institution from a transaction system based on a second promise-to-pay message sent from an application service provider to the transaction system. The transaction system can be similar or identical to transaction system 1050 (FIGS. 10-17). The second promise-to-pay message can be similar or identical to 1176 (FIG. 11), 1274 (FIG. 12), 1474 (FIG. 14), and/or 1676 (FIG. 16). The application service provider can be similar or identical to application service provider 1030 (FIGS. 10-12), application service provider 1330 (FIGS. 13-14), and/or application service provider 1530 (FIGS. 15-17). In other embodiments, the first promise-to-pay message, such as message 1776 (FIG. 17), can be sent from the application service provider to the second financial institution after the application service provider receives a first debit response from the transaction system indicating the successful debit of the first account maintained by the first financial institution. The first debit response can be similar or identical to message 1775 (FIG. 17).

In some embodiments, the first response, such as messages 1178 (FIG. 11), 1276 (FIG. 12), 1476 (FIG. 14), and/or 1678 (FIG. 16) can be sent from the second financial institution to the transaction system from the transaction system, such that a second response is sent from the transaction system to the application service provider indicating the successful credit of the second account maintained by the second financial institution, and such that the application service provider informs the sender in real-time after the payment authorization time of the successful credit of the second account maintained by the second financial institution. The second response can be similar or identical to 1179 (FIG. 11), 1277 (FIG. 12), 1477 (FIG. 14), and/or 1679 (FIG. 16). In other embodiments, the first response can be sent from the second financial institution to the application service provider, such as in message 1777 (FIG. 17). In some embodiments, the second response can be essentially the same as the first response, such as a forward of the first response. In other embodiments, the second response can include information from the first response, and/or can include additional information.

In some embodiments, the application service provider can be a different entity from the first and second financial institutions, such as application service provider 1030 (FIGS. 10-12). In other embodiments, the application service provider can be the same entity as the first financial institution, such as application service provider 1330 (FIGS. 13-14). In yet other embodiments, the application service provider can be the same entity as the second financial institution, such as application service provider 1530 (FIGS. 15-17).

In a number of embodiments, the second promise-to-pay message, such as messages 1176 (FIG. 11) and/or 1676 (FIG. 16), can be sent from the application service provider to the transaction system after the application service provider receives a first debit response from the transaction system indicating the successful debit of the first account maintained by the first financial institution. The first debit response can be similar or identical to messages 1175 (FIG. 11) and/or 1675. In other embodiments, the second promise-to-pay message, such as messages 1274 (FIG. 12) and/or 1474 (FIG. 14), can be sent from the application service provider to the transaction system after the application service provider receives a first debit response from the first financial institution indicating the successful debit of the first account maintained by the first financial institution. The first debit response can be similar or identical to messages 1273 (FIG. 12) and/or 1473 (FIG. 14).

In some embodiments, the first debit response, such as messages 1175 (FIG. 11), 1675 (FIG. 16), and/or 1775 (FIG. 17), received at the application service provider can be based on a second debit response that was received at the transaction system from the first financial institution indicating the successful debit of the first account maintained by the first financial institution. The second debit response can be similar or identical to messages 1174 (FIG. 11), 1674 (FIG. 16), and/or 1774 (FIG. 17). In some embodiments, the first debit response can be essentially the same as the second debit response, such as a forward of the second debit response. In other embodiments, the first debit response can include information from the second debit response, and/or can include additional information.

In many embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In many embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Proceeding to the next drawing, FIG. 27 illustrates a block 2601 of optional first steps, according to an embodiment. Block 2601 is merely exemplary and is not limited to the embodiments presented herein. Block 2601 can be employed in many different embodiments or examples not specifically depicted or described herein. In some embodiments, the procedures, the processes, and/or the activities of block 2601 can be performed in the order presented. In other embodiments, the procedures, the processes, and/or the activities of block 2601 can be performed in any suitable order. In still other embodiments, one or more of the procedures, the processes, and/or the activities of block 2601 can be combined or skipped. In many embodiments, block 2601 can be performed before the payment authorization time.

Referring to FIG. 27, block 2601 can include a block 2701 of receiving a first capability inquiry at the second financial institution from the transaction system to determine whether the second account maintained by the second financial institution supports real-time payment transactions. The first capability inquiry can be similar or identical to messages 1073 (FIG. 10) and/or 1373 (FIG. 13).

In a number of embodiments, block 2601 also can include a block 2702 of sending a first capability response from the second financial institution to the transaction system indicating whether the second account maintained by the second financial institution supports real-time payment transactions, such that the transaction system sends a second capability response to the application service provider indicating whether the first and second accounts support real-time payment transactions. The first capability response can be similar or identical to 1074 (FIG. 10) and/or 1374 (FIG. 15). The second capability response can be similar or identical to messages 1077 (FIG. 10) and/or 1375 (FIG. 15). In some embodiments, the second capability response can be essentially the same as the first capability response, such as a forward of the first capability response. In other embodiments, the second capability response can include information from the first capability response, and/or can include additional information.

Figure 28:
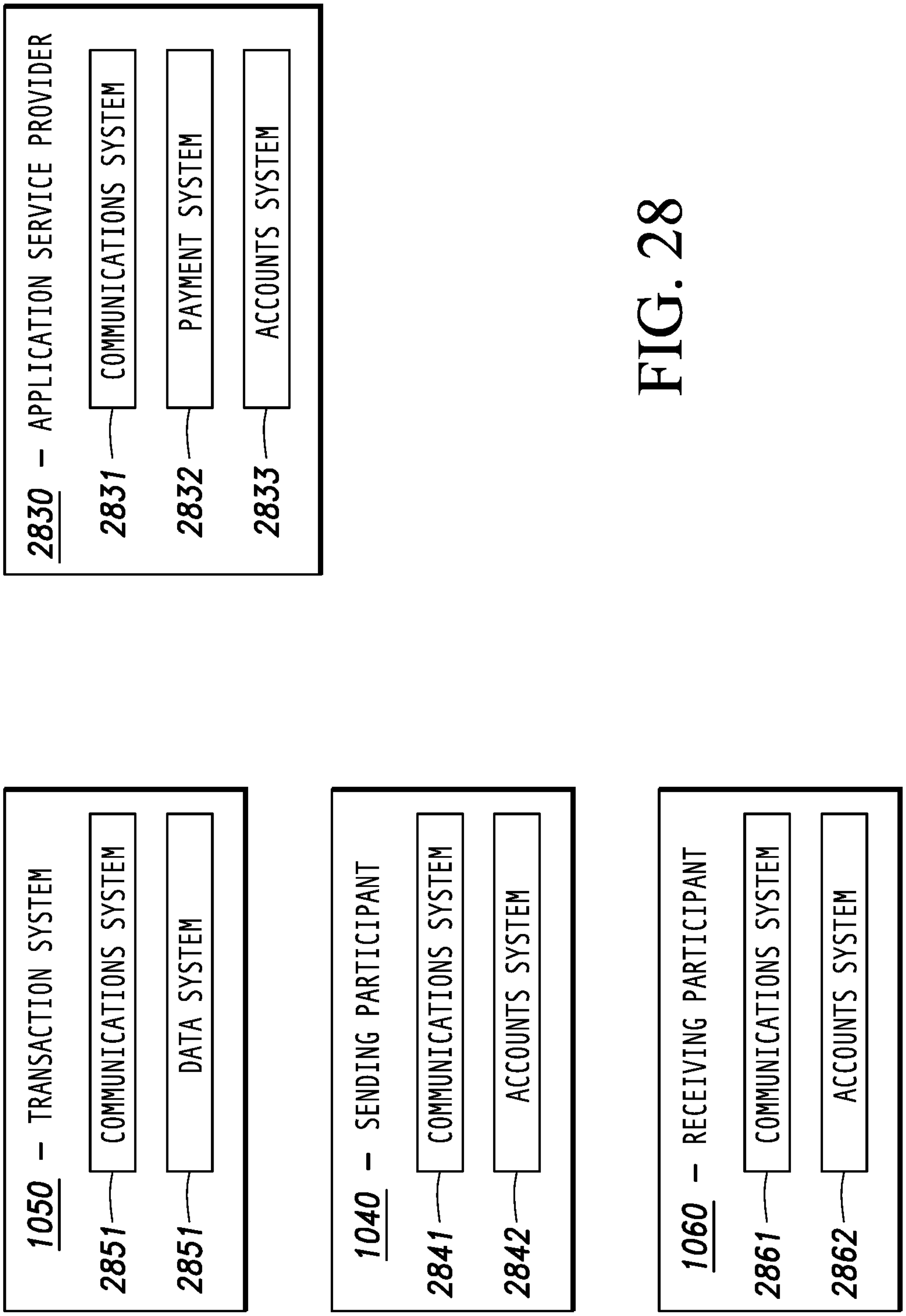
FIG. 28 illustrates a block diagram of systems that can be employed for facilitating a real-time funds availability bill-pay transaction.

Turning ahead in the drawings, FIG. 28 illustrates a block diagram of systems that can be employed for facilitating a real-time funds availability bill-pay transaction, according to an embodiment. The systems shown in FIG. 28, which include transaction system 1050, sending participant 1040, receiving participant 1060, and an application service provider, 2830, are merely exemplary and embodiments of the system are not limited to the embodiments presented herein. The system can be employed in many different embodiments or examples not specifically depicted or described herein. In some embodiments, certain elements or modules of the systems shown in FIG. 28 can perform various procedures, processes, and/or activities. In other embodiments, the procedures, processes, and/or activities can be performed by other suitable elements or modules of the systems shown in FIG. 28.

In several embodiments, transaction system 1050 can include one or more systems, such as a communications system 2851, and/or a data system 2852.

In many embodiments, communications system 2851 can at least partially perform block 1803 (FIG. 18) of receiving a first promise-to-pay message at a transaction system; block 1805 (FIG. 18) of sending a second promise-to-pay message from the transaction system to a second financial institution; block 1806 (FIG. 18) of receiving a first response at the transaction system from the second financial institution indicating a successful credit of the second account maintained by the second financial institution; block 1807 (FIG. 18) of storing the first response in the transaction system; block 1808 (FIG. 18) of sending a second response from the transaction system indicating the successful credit of the second account maintained by the second financial institution to inform at least the sender in real-time after the payment authorization time of the successful credit of the second account maintained by the second financial institution; block 1901 (FIG. 19) of receiving a first capability inquiry at the transaction system from the application service provider; block 1903 (FIG. 19) of sending a second capability inquiry from the transaction system to the second financial institution to determine whether the second account maintained by the second financial institution supports real-time payment transactions; block 1904 (FIG. 19) of receiving a first capability response at the transaction system from the second financial institution indicating whether the second account maintained by the second financial institution supports real-time payment transactions; block 1906 (FIG. 19) of sending a third capability inquiry from the transaction system to the first financial institution to determine whether the first account maintained by the first financial institution supports real-time payment transactions; block 1907 (FIG. 19) of receiving a second capability response at the transaction system from the first financial institution indicating whether the first account maintained by the first financial institution supports real-time payment transactions; block 1909 (FIG. 19) of sending a third capability response from the transaction system to the application service provider; block 2001 (FIG. 20) of sending a debit message from the transaction system to the first financial institution to debit the first account maintained by the first financial institution; block 2002 (FIG. 20) of receiving a debit response at the transaction system from the first financial institution in real-time after the payment authorization time; block 2004 (FIG. 20) of sending a third response from the transaction system to the application service provider indicating the successful debit of the first account maintained by the first financial institution; a block 2101 (FIG. 21) of sending a debit message from a transaction system to a first financial institution to debit a first account maintained by the first financial institution based on a bill payment authorization made by a sender at a payment authorization time; block 2102 (FIG. 21) of receiving a debit response at the transaction system from the first financial institution in real-time after the payment authorization time; and/or block 2104 (FIG. 21) of sending a first response to an application service provider indicating the successful debit of the first account maintained by the first financial institution.

In a number of embodiments, data system 2852 can at least partially perform block 1804 (FIG. 18) of storing the first promise-to-pay message in the transaction system; block 1902 (FIG. 19) of storing the first capability inquiry in the transaction system; block 1905 (FIG. 19) of storing the first capability response in the transaction system; block 1908 (FIG. 19) of storing the second capability response in the transaction system; block 2003 (FIG. 20) of storing the debit response in the transaction system; and/or block 2103 (FIG. 21) of storing the debit response in the transaction system.

In several embodiments, sending participant system 1040 can include one or more systems, such as a communications system 2841, and/or an accounts system 2842.

In many embodiments, communications system 2841 can at least partially perform block 2202 (FIG. 22) of receiving a debit message at a first financial institution to debit a first account maintained by the first financial institution based on a bill payment authorization for a payment amount made by a sender at a payment authorization time; block 2205 (FIG. 22) of sending a debit response from the first financial institution in real-time after the payment authorization time; block 2301 (FIG. 23) of receiving a first capability inquiry at receiving a first capability inquiry at the first financial institution from the transaction system to determine whether the first account maintained by the first financial institution supports real-time payment transactions; and/or block 2302 (FIG. 23) of sending a first capability response from the first financial institution to the transaction system indicating whether the first account maintained by the first financial institution supports real-time payment transactions.

In a number of embodiments, accounts system 2842 can at least partially perform activity 1145 (FIGS. 11-12, 14, 16-17); activity 1146 (FIGS. 11-12, 14, 16-17); activity 1191 (FIGS. 11-12); activity 1491 (FIGS. 14, 16-17); block 2203 (FIG. 22) of performing a successful debit for the payment amount from the first account maintained by the first financial institution in real-time after the payment authorization time; and/or block 2204 (FIG. 22) of performing a credit for the payment amount to a first settlement account maintained by the first financial institution to account for the successful debit of the first account maintained by the first financial institution.

In several embodiments, receiving participant system 1060 can include one or more systems, such as a communications system 2861, and/or an accounts system 2862.

In many embodiments, communications system 2861 can at least partially perform block 2602 (FIG. 26) of receiving a first promise-to-pay message at a second financial institution; block 2605 (FIG. 26) of sending a first response from the second financial institution indicating the successful credit of the second account maintained by the second financial institution to inform at least the sender in real-time after the payment authorization time of the successful credit of the second account maintained by the second financial institution; block 2701 (FIG. 27) of receiving a first capability inquiry at the second financial institution from the transaction system to determine whether the second account maintained by the second financial institution supports real-time payment transactions; and/or block 2702 (FIG. 27) of sending a first capability response from the second financial institution to the transaction system indicating whether the second account maintained by the second financial institution supports real-time payment transactions.

In a number of embodiments, accounts system 2862 can at least partially perform activity 1165 (FIGS. 11-12, 14, 16-17); activity 1166 (FIGS. 11-12, 14, 16-17); activity 1167 (FIGS. 11-12, 14, 16-17); activity 1192 (FIGS. 11-12); activity 1491 (FIGS. 14, 16-17); block 2603 (FIG. 26) of performing a successful credit for the payment amount to a second account maintained by the second financial institution to make funds available in the second account in real-time after the payment authorization time; and/or block 2604 (FIG. 26) of performing a debit for the payment amount from a second settlement account maintained by the second financial institution to account for the successful credit of the second account maintained by the second financial institution.

In several embodiments, application service provider 2830 can be similar or identical to application service provider 1030 (FIGS. 10-12, application service provider 1330 (FIGS. 13-14), and/or application service provider 1530 (FIGS. 15-17). In a number of embodiments, application service provider 2830 can include one or more systems, such as a communications system 2831 and/or a payment system 2832. In some embodiments, such as when application service provider 2830 is similar or identical to application service provider 1030 (FIGS. 10-12), application service provider 2830 can include an accounts system 2833. In other embodiments, such as when application service provider 2830 is similar or identical to application service provider 1330 (FIGS. 13-14) and/or application service provider 1530 (FIGS. 15-17), application service provider 2830 can be devoid of accounts system 2833. In a number of embodiments, accounts system 2863 can at least partially perform activities 1191 (FIGS. 11-12) and/or 1192 (FIGS. 11-12). Similar to other payment systems described above, payment system 2832 can be used to pay one or more bills and/or other financial obligations.

In many embodiments, communications system 2861 can at least partially perform block 2403 (FIG. 24) of receiving a bill payment authorization from the sender through the payment application; block 2404 (FIG. 24) of sending a first debit message from the application service provider to debit a first account maintained by a first financial institution based on the bill payment authorization; block 2405 (FIG. 24) of receiving a first debit response at the application service provider in real-time after the payment authorization time; block 2407 (FIG. 24) of sending the first promise-to-pay message; block 2408 (FIG. 24) of receiving a first response at the application service provider indicating a successful credit of the second account maintained by the second financial institution; block 2409 (FIG. 24) of sending a notification to the sender from the application service provider in real-time after the payment authorization time of the successful credit of the second account maintained by the second financial institution; block 2501 (FIG. 25) of sending a first capability inquiry from the application service provider to the transaction system; and/or block 2502 (FIG. 25) of receiving a second capability response at the application service provider from the transaction system.

In a number of embodiments, payment system 2832 can at least partially perform block 2402 (FIG. 24) of providing a payment application to a sender from an application service provider; and/or block 2406 (FIG. 24) of generating a first promise-to-pay message for a second financial institution to credit a second account maintained by the second financial institution to make funds available in the second account in real-time after the payment authorization time.

Figure 29:
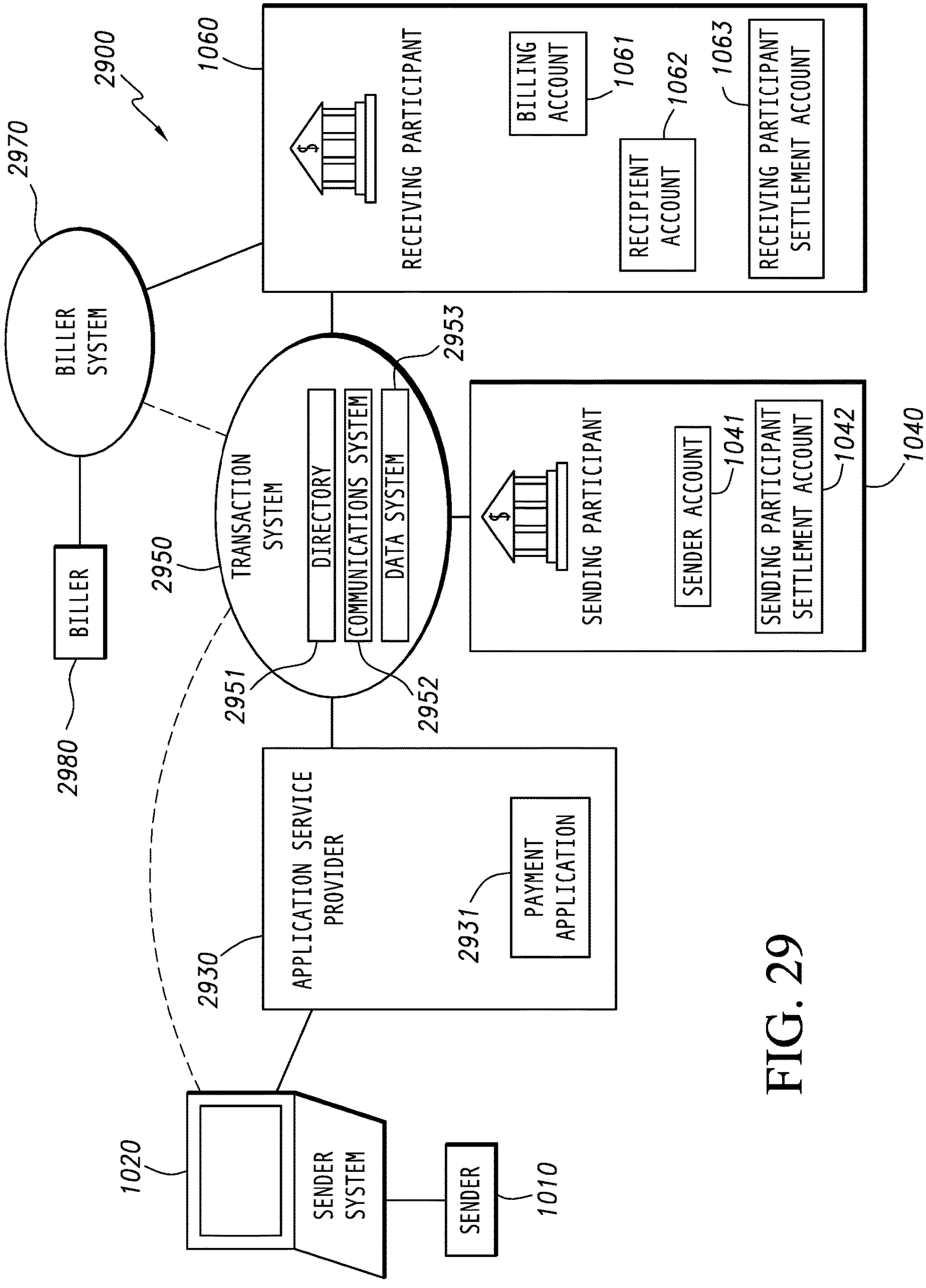
FIG. 29 illustrates a block diagram of a system that can be employed for real-time invoicing and payment, according to an embodiment.

Turning ahead in the drawings, FIG. 29 illustrates a block diagram of a system 2900, which can be employed for real-time payment transactions. System 2900 is merely exemplary, and embodiments of the system are not limited to the embodiments presented herein. The system can be employed in many different embodiments or examples not specifically depicted or described herein. In some embodiments, certain elements or modules of system 2900 can perform various procedures, processes, and/or activities. In other embodiments, the procedures, processes, and/or activities can be performed by other suitable elements or modules of system 2900. In many embodiments, system 2900 can include can include sender 1010, sender system 1020, an application service provider 2930, sending participant 1040, a transaction system 2950, receiving participant 1060, a biller system 2970, and/or a biller 2980.

Application service provider 2930 can be similar or identical to application service provider 1030 (FIGS. 10-12), application service provider 1330 (FIGS. 13-14), and/or application service provider 1530 (FIGS. 15-17), and various elements of application service provider 2930 can be similar or identical to various elements of application service provider 1030 (FIGS. 10-12), application service provider 1330 (FIGS. 13-14), and/or application service provider 1530 (FIGS. 15-17). In several embodiments, application service provider 2930 can provide a user interface (UI) or application programming interface (API) for a payment application 2931. Payment application 2931 can be similar or identical to payment application 1031 (FIGS. 10-12), payment application 1331 (FIGS. 13-14), and/or payment application 1531 (FIGS. 15-17). For example, payment application 2931 can be part of a payment processor system, such as payment application 1031 (FIGS. 10-12) in payment processor system 1032 (FIGS. 10-12), can be proprietary to sending participant 1040, similar to payment application 1331 (FIGS. 13-14), or can be proprietary to receiving participant 1060, similar to payment application 1531 (FIGS. 15-17). In some embodiments, application service provider 2930 and/or payment application 2931 can be provided by the same entity as transaction system 2950, and in certain embodiments, can be integral with, or part of, transaction system 2950. In various embodiments, application service provider 2930 and/or payment application 2931 can be a mobile wallet provider for a mobile wallet application running on sender system 1020. For example, sender system 1020 can be a mobile device running a mobile wallet application that interfaces with application service provider 2930 and/or payment application 2931.

Transaction system 2950 can be similar or identical to system 110 (FIG. 1), systems 203 (FIGS. 2-4), and/or transaction system 1050 (FIGS. 10-17), and various elements of transaction system 2950 can be similar or identical to various elements of system 110 (FIG. 1), systems 203 (FIGS. 2-4), and/or transaction system 1050 (FIGS. 10-17).

In several embodiments, biller 2980 can invoice/bill and collect payments from customers, such as sender 1010, through real-time payment transactions. In many embodiments, system 2900 can facilitate real-time payment transactions by sending invoices in real-time from biller system 2970 to a customer, such as sender 1010. In a number of embodiments, system 2900 can facilitate real-time payment transactions by collecting payment from the customer, such as sender 1010, and providing availability of funds in real-time to biller 2980, or in real-time after a schedule payment time. In some embodiments, biller 2980 can offer incentives to customers, such as sender 1010, to encourage the customer (e.g., sender 1010) to use real-time payment transactions.

In a number of embodiments, the real-time payment transactions can include various messages between various elements of the system, similarly as described above in system 1000 (FIGS. 10-12), system 1300 (FIGS. 13-14), and/or system 1500 (FIGS. 15-17). In some embodiments, the messages can include messages for an "is account real-time capable call," which can determine whether real-time payment is an available option for an account of biller 2980 (e.g., the recipient), such as shown in FIGS. 10, 13, and 15, and described above. In a number of embodiments, the messages can include payment messages, which can include providing a real-time promise-to-pay to receiving participant 1060, such that receiving participant 1060 can make funds available in real-time to biller 2980, such as shown in FIGS. 11-12, 14, and 16-17, and described above with respect to receiving participant 1060 making the funds available to the receiver.

In many embodiments, transaction system 2950 can be in data communication with financial institutions, such as sending participant 1040 and/or receiving participant 1060, can route messages between financial institutions in real-time, can facilitate payments with real-time-funds availability, and/or can facilitate real-time settlement. In many embodiments, transaction system 2950 can include a directory 2951, a communications system 2952, and/or a data system 2953. In several embodiments, directory 2951 can include related information, such as identification of accounts maintained by the financial institutions connected to the network switch, individuals holding those accounts, and/or personally identifiable information and/or contact information for the individuals holding the accounts, and/or other suitable information, as described below in further detail. In a number of embodiments, directory 2951 can include information about whether an account at a financial institution (e.g., sender account 1041 at sender participant 1040) is available to be used for real-time payment transactions with transaction system 2950. In many embodiments, directory 2951 can include public identifiers (e.g., email address, phone number, etc.) of senders (e.g., sender 1010) and/or billers (e.g., biller 2980) that are registered with transaction system 2950. In several embodiments, directory 2951 can include information about billers (e.g., 2980) that are registered with transaction system 2950 under a certified biller status, as described below in further detail. In many embodiments, directory 2951 can be implemented using one or more suitable databases. Communications system 2952 and data system 2953 are described below in further detail.

In various embodiments, transaction system 2950 can be used by one or more billers, such as biller 2980, to invoice a customer, such as sender 1010, and receive payment with real-time funds availability. In many embodiments, biller 2980 can be a merchant, a utility company, a bank, a school, a government, a service provider, or another suitable provider of goods and/or services. In several embodiments, biller 2980 can hold an account, such as recipient account 1062 and/or billing account 1061, also known as the "biller account," at a financial institution, such as receiving participant 1060, also known as the "biller financial institution." In many embodiments, recipient account 1062 and/or billing account 1061 can be capable of handling real-time payment transactions.

In a number of embodiments, sender 1010 can be a customer, student, member, company, etc., which received (or will receive) the goods and/or services provided by biller 2980, resulting in a financial obligation, which can be invoiced by biller 2980 through transaction system 2950. Sender 1010 also can be referred to as the customer or the payor. Sender 1010 can hold one or more accounts, which can be referred to as the sender account(s), the customer account(s), or the payor account(s). These accounts can be maintained at one or more financial institutions, which can be referred to as the sender financial institution(s), the payor financial institution(s), the customer financial institution(s), and/or the sending participant (e.g., sending participant 1040). For example, one of the sender account(s) can be sender account 1041 at sending participant 1040. In many embodiments, the payor financial institution(s), such as sending participant 1040, can be connected to transaction system 2950, and the payor accounts (e.g., sender account 1041) can be capable of handling real-time payment transactions. In many embodiments, the biller financial institution (e.g., receiving participant 1060) can be different from the payor financial institution (e.g., sending participant 1040).

In some embodiments, in order for a biller (e.g., 2980) to be registered for real-time payment transactions with transaction system 2950, the biller (e.g., 2980) can send a request to register to transaction system 2950. The request can be sent from biller system 2970 directly to transaction system 2950, or can be sent from biller system 2970 through the biller financial institution (e.g., receiving participant 1060) to transaction system 2950. In many embodiments, the request to register can be a request to register under a certified biller status. In a number of embodiments, the request can include a public identifier of the biller (e.g., 2980). The public identifier can be an email address, a phone number, or other identifier by which the biller (e.g., 2980) can be uniquely identifier to the public. In many embodiments, the public identifiers can be used in transaction system 2950 to present to the senders (e.g., 1010) the other entities to which payments can be made, and/or to allow the senders (e.g., 1010) to identify an entity to pay based on the public identifier of that entity. In a number of embodiments, the request can include account information of the biller account (e.g., recipient account 1062 and/or billing account 1061). In other embodiments, such as when the request is sent through receiving participant, the request can instead include a private identifier, which can be a token that represents the account information of the biller account (e.g., recipient account 1062 and/or billing account 1061). For example, the private identifier can be created by the biller financial institution (e.g., receiving participant 1060) to prevent the account information of the biller account (e.g., recipient account 1062 and/or billing account 1061) from being shared outside of the biller financial institution (e.g., receiving participant 1060).

In several embodiments, in order for the biller (e.g., 2980) to satisfy and/or qualify for the certified biller status, the request can be evaluated to ensure that the public identifier provided in the request actually belongs to the purported biller (e.g., 2980), and that the biller account (e.g., recipient account 1062 and/or billing account 1061) provided in the request actually belongs to the purported biller (e.g., 2980). For example, due diligence can be performed by the entity operating transaction system 2950, by the biller financial institution (e.g., receiving participant 1060), and/or by a third-party processor to vet the purported biller (e.g., 2980) to ensure that the request is legitimate. For example, if a request to register purports to be from Verizon, due diligence can be performed to ensure that the public identifier, contact information, and the biller account provided in the request are legitimately associated with Verizon. In some embodiments, transaction system 2950 can provide an interface or application that can allow the biller financial institution (e.g., receiving participant 1060) to vet and approve a biller for certified biller status. Once transaction system 2950 has received confirmation that the public identifier and the biller account (e.g., recipient account 1062) are legitimately associated with the purported biller (e.g., 2980), transaction system 2950 can register the biller (e.g., 2980) under the certified biller status.

In many embodiments, once a biller (e.g., 2980) has been registered under the certified biller status, transaction system 2950 can identify the biller (e.g., 2980) as a certified biller and can publish the public identifier of the biller (e.g., 2980) to senders (e.g., sender 1010), to allow the senders (e.g., sender 1010) to make payments to the biller (e.g., 2980). In some embodiments, a logo can be associated with certifier biller status to identify the biller (e.g., 2980) as having qualified for certified biller status. In many embodiments, the certified biller status and/or logo can be presented through application service provider 2930 and/or payment application 2931 to senders (e.g., sender 1010). In a number of embodiments, the certified biller status can represent a security status for the biller (e.g., biller 2980) to potential senders (e.g., sender 1010). In many embodiments, the certified biller status can advantageously prevent fraudsters from impersonating legitimate billers and receiving bill payments from senders (e.g., sender 1010) that are intended for the legitimate billers.

In several embodiments, a series of messages can be sent through transaction system 2950: (a) to determine which accounts of payors (e.g., sender account 1041) are capable of using payment transactions, (b) to enroll customers (e.g., sender 1010) for use of real-time payment transactions, and/or (c) to invoice customers (e.g., sender 1010). For example, confirmation messages can be routed through and/or processed within transaction system 2950 to determine the accounts belonging to payors (e.g., sender account 1041) that are available for real-time payments. As another example, enrollment messages can be routed through and/or processed within transaction system 2950 to enroll payors (e.g., sender 1010) for real-time payment transactions. As a further example, invoice messages can be routed through and/or processed within transaction system 2950 to invoice customers (e.g., sender 1010), receive authorization for payment from the customer (e.g., sender 1010), and/or process real-time payment. As yet another example, transaction system 2950 can facilitate routing of other suitable messages, such as promotional and/or informational messages from one or more billers (e.g., biller 2980) to one or more customers (e.g., sender 1010), or from a customer (e.g., 1010) to a biller (e.g., 1980). These messages are described below in further detail.

In many embodiments, the confirmation messages can be initiated by biller 2980 and/or biller system 2970 to determine if customers (e.g., sender 1010) of biller 2980 have accounts at financial institutions connected to transaction system 2950 that allow for real-time payment transactions. In some embodiments, the determination of account availability can be similar to the determination of whether real-time payment is an available option, as shown in FIGS. 10, 13, and 15 and described above. In a number of embodiments, biller 2980 can provide one or more payor identifiers (e.g., public identifier of sender 1010) to the biller financial institution (e.g., receiving participant 1060). For example, the list of payor identifiers can represent payors (e.g., sender 1010) that biller 2980 would like to invoice through transaction system 2950. In several embodiments, the biller financial institution (e.g., receiving participant 1060) can send a confirmation message, on behalf of biller 2980, to transaction system 2950. In other embodiments, biller 2980 can communicate directly with transaction system 2950 and send the confirmation message directly to transaction system 2950. In many embodiments, this message can be sent through biller system 2970, which can be a computing device, such as a smart phone, a desktop computer, or a tablet computer, similar to computer system 800 (FIG. 8). In some embodiments, the message can be sent from biller system 2970 to transaction system 2950 through a text message (e.g., SMS (Short Message Service), MMS (multimedia messages (MMS), etc.), an email, a custom messaging application, a website hosted by transaction system 2950, or by another suitable message delivery method.

In other embodiments, the biller financial institution (e.g., receiving participant 1060) can analyze the payments made previously to the biller account (e.g., recipient account 1062 and/or billing account 1061) to determine the customers (e.g., sender 1010) of biller 2980. In many embodiments, the biller financial institution (e.g., receiving participant 1060) can send the confirmation messages to determine if the customers (e.g., sender 1010) of biller 2980 have accounts at financial institutions connected to transaction system 2950 that allow for real-time payment transactions. In some embodiments, the determination of account availability can be similar to the determination of whether real-time payment is an available option, as shown in FIGS. 10, 13, and 15 and described above.

In many embodiments, transaction system 2950 can match the payor identifiers to information in directory 2951 of transaction system 2950 to determine accounts that correspond to the payors (e.g., sender account 1041). The payor identifiers can be one or more pieces of information that can be used to identify the payor (e.g., sender 1010) and/or the payor account (e.g., sender account 1041) at the payor financial institution (e.g., sending participant 1040). For example, the payor identifiers can include the first and last name of the payor (e.g., sender 1010), an address (e.g., mailing, residential, business, etc.) of the payor (e.g., sender 1010), a phone number (e.g., cell phone number, home phone number, business phone number, FAX (facsimile) number) of the payor (e.g., sender 1010), an email address of the payor (e.g., sender 1010), a social security number of the payor (e.g., sender 1010), a tax identification number of the payor (e.g., sender 1010), a birthdate of the payor (e.g., sender 1010), tokenized account information for the payor's account (e.g., sender account 1041) at the payor financial institution (e.g., sending participant 1040), an identifier associated to the payor account (e.g., sender account 1041), a routing and transit number for the payor account (sender account 1041), biometric information for the payor (e.g., sender 1010) (e.g., fingerprint, voice print, etc.), secure element technology (e.g., Apple Secure Element) information, host card emulation (HCE) technology information, another information related to another suitable security method, such as out-of-band authentication (OOBA) or key pairs, and/or other suitable payor or payor account information (e.g., account number of sender account 1041). Directory 2951 in transaction system 2950 can be used to associate the payor identifiers with the payor account (e.g., sender account 1041) held by the payor (e.g., sender 1010), as identified by the payor information. For example, director 2950 can be implemented in a database or other data store that includes a mapping of one or more payor identifiers (e.g., name, phone number, email address, social security number, etc.) to information about the payor account (e.g., sender account 1041), such as account number. In some embodiments, the information in directory 2951 can be populated from information provided to transaction system 2950 from financial institutions (e.g., sending participant 1040, receiving participant 1060), billers (e.g., biller 2980), phone services providers (e.g., cell phone service provider), and/or other suitable sources of information, and, in a number of embodiments, can be updated as additional information is provided.

In many embodiments, after transaction system 2950 has determined if the payor (e.g., 1010) has an account maintained by a financial institution connected to transaction system 2950, such as sender account 1041 maintained at sending participant 1040, transaction system 2950 can continue to validate the payor identifier by determining whether the payor account (e.g., sender account 1041) is real-time payment capable, similarly as shown in FIGS. 10, 13, and 15, and described above.

In some embodiments, transaction system 2950 can determine if the payor (e.g., sender 1010) has opted in to using real-time payments through transaction system 2950. After determining if the payor account (e.g., sender account 1041) can be used for real-time payment transactions, transaction system 2950 can send a confirmation response message back to the biller financial institution (e.g., receiving participant 1060) and/or the biller (e.g., biller 2980 and/or biller system 2970), which can validate that the payor account (e.g., sender account 1041) belongs to the payor (e.g., sender 1010) and that the account is real-time capable.

In other embodiments, a payor (e.g., sender 1010) can initiate the confirmation message by communicating with transaction system 2950 directly, or through application service provider 2930, which in some embodiments can be provided by the payor financial institution (e.g., sending participant 1040), to indicate to biller 2980, biller system 2970, and/or the biller financial institution (e.g., receiving participant 1060) that the payor (e.g., sender 1010) has an account (e.g., sender account 1041) that is capable of real-time payment through transaction system 2950. In yet other embodiments, the payor (e.g., sender 1010) can communicate with biller system 2970, such as by text message, email, a voice-based service (e.g., Amazon Echo, etc.), after which biller system 2970 can send the confirmation message, such as described above. In still other embodiments, the payor financial institution (e.g., sending participant 1040) can initiate the confirmation message by communicating with transaction system 2950 to indicate to biller 2980, biller system 2970, and/or the biller financial institution (e.g., receiving participant 1060) that the payor (e.g., sender 1010) has an account (e.g., sender account 1041) that is capable of real-time payment through transaction system 2950.

In some embodiments, after receiving the confirmation response, the biller financial institution (e.g., receiving participant 1060) can communicate with the payor financial institution (e.g., sending participant 1040) through transaction 2950 system to confirm and/or validate that the payor account (e.g., sender account 1041) is online, open and active, and able to use transaction system 2950 for real-time payment transactions. In other embodiments, transaction system 2950 can communicate with the payor financial institution (e.g., sending participant 1040) to validate the payor account (e.g., sender account 1041) before sending the confirmation response. In many embodiments, the biller accounts (e.g., recipient account 1062, billing account 1061) can be capable of accepting real-time payments.

In a number of embodiments, after the confirmation messages have been sent and responses received, indicating the payor accounts (e.g., sender account 1041) that are capable of real-time payment transactions, biller 2980, biller system 2970, and/or the biller financial institution (e.g., receiving participant 1060) can send an enrollment message through transaction system 2950 to the payors (e.g., sender 1010) that have accounts capable of real-time payment transactions, such as by sending the enrollment message to sender system 1020. In many embodiments, the biller accounts (e.g., recipient account 1062, billing account 1061) can be capable of accepting real-time payments. In some embodiments, the enrollment messages can notify the payor (e.g., sender 1010) of the opportunity to enroll in real-time payment transactions. In various embodiments, the enrollment message can be delivered to the payor (e.g., sender 1010) in the form of a text message, an email message, a push notification in a mobile application, or by using another suitable messaging method. In some embodiments, the message can include a hyperlink that can be selected by the payor (e.g., sender 1010) to open an interface (e.g., a web interface, application interface, etc.), such as in sender system 1020, to enroll. In other embodiments, the message can include another suitable enrollment method or enrollment instructions. For example, the message can include instructions on how to sign up through a webpage or instructions to send a response message with the text, "CONFIRM."

In other embodiments, transaction system 2950 can initiate the enrollment message to payors (e.g., sender 1010) that have accounts (e.g., sender account 1041) that are real-time capable and that are known to be customers of the billers (e.g., biller 2980) that have accounts (e.g., recipient account 1062, billing account 1061) at the biller financial institutions (e.g., receiving participant 1060) connected to transaction system 2950. For example, the payors (e.g., sender 1010) can be known to transaction system 2950 to be customers of certain billers (e.g., biller 2980) based on the confirmation messages, based on information provided by the biller financial institution (e.g., receiving participant 1060), based on information provided by the payor financial institution (e.g., sending participant 1040), and/or based on information provided by application service provider 2930, such as a mobile wallet provider or an application running within or alongside the mobile wallet in sender system 1020. In many embodiments, the biller financial institution (e.g., receiving participant 1060), and/or payor financial institution (e.g., sending participant 1040) can determine that the payor (e.g., 1010) is a customer of a certain biller (e.g., biller 2980) based on payments previously made from the payor's account (e.g., sender account 1041) to the biller account (e.g., recipient account 1062, billing account 1061). In a number of embodiments, these previous payments were made through conventional methods and not through real-time payment transactions. For example, the biller financial institution (e.g., receiving participant 1060) can determine that a first payor (e.g., sender 1010) has sent payments to an electric company (e.g., biller 2980) out of sender account 1041 to recipient account 1062 in the past, and the biller financial institution (e.g., receiving participant 1060) can send this information to transaction system 2950, which can send an enrollment message to the first payor (e.g., sender 1010) to notify the first payor (e.g., sender 1010) that the electric company (e.g., biller 2980) is available to be paid through real-time payment transactions. As another example, if a second payor (e.g., sender 1010) does not have a relationship with the electric company (e.g., biller 2980), based on the second payor (e.g., sender 1010) having no previous payments to the electric company (e.g., 2980), then, in some embodiments, an enrollment message for the electric company (e.g., biller) will not be sent to the second payor (e.g., sender 1010).

In other embodiments, biller 2980, biller system 2970, the biller financial institution (e.g., receiving participant 1060), transaction system 2950, and/or the payor financial institution (e.g., sending participant 1040) can initiate the enrollment message to payors (e.g., sender 1010) that that have accounts (e.g., sender account 1041) that are real-time capable and that are in the proximity of the biller (e.g., biller 2980). In many embodiments, the payor (e.g., sender 1010) can be in the proximity of the biller (e.g., biller 2980) if the payor (e.g., sender 1010 (FIG. 29)) is within a threshold distance (e.g., 5 miles, 10 miles, 20 miles, 50 miles, or another suitable distance) of the biller (e.g., biller 2980), or within the same city, county, state, etc., of the biller (e.g., biller 2980), or another suitable proximity method. In a number of embodiments, the location of the payor (e.g., sender 1010) can be based on a residential or business address of the payor (e.g., sender 1010), or a current location of the payor (e.g., sender 1010), such as determined by the location of sender system 1020. In several embodiments, the location of the biller (e.g., biller 2980) can be based on a residential or business address of the biller (e.g., biller 2980), a current location of the biller (e.g., biller 2980), such as determined by the location of biller system 2970, or a service region of the biller (e.g., 2980). In some embodiments, the service region of the biller (e.g., 2980) can defined by the biller (e.g., 2980), by governmental regulations, or by market considerations.

In a number of embodiments, the enrollment message received by the payor (e.g., sender 1010) can identify the biller (e.g., biller 2980) by name, logo, public identifier, and/or in another suitable manner. In many embodiments, the biller (e.g., 2980) can be identified in the enrollment message as satisfying and/or qualifying for the certified biller status. In some embodiments, the enrollment message can involve presenting the biller (e.g., 2980) to senders (e.g., sender 1010) in a list of potential billers.

In some embodiments, the enrollment process for a payor (e.g., sender 1010) can involve the payor (e.g., sender 1010) entering information to enroll, such as account number and routing number, debit card information, personally identifiable information, and/or other suitable information. In many embodiments, transaction system 2950 can implement authentication procedures during enrollment, such as authentication procedures similar to those used in setting up ClearXchange (CXC) P2P (person-to-person) payments, which can, for example, verify the identity of the payor (e.g., sender 1010) and/or setup security information for future verification (e.g., password, biometric information, tokens, encryption keys, etc.). In several embodiments, transaction system 2950 can add this additional information to directory 2951 during the enrollment process. In many embodiments, if the payor (e.g., sender 1010) has already been provided the enrollment information and/or the security information to transaction system 2950, such as by having already been enrolled in real-time payment transactions for another biller (e.g., 2980) through transaction system 2950, the enrollment process can add the new biller (e.g., 2980) without entering the information again.

In several embodiments, during or after enrollment of the payor (e.g., sender 1010), the sender system (e.g., 1020) used by the payor (e.g., sender 1010) can be recognized and a device "fingerprint" can be enrolled in transaction system 2950. This device "fingerprint" for sender system 1020 can be used for authenticating the payor (e.g., sender 1010) in the future. In several embodiments, information about sender system 1020 can be used to verify that the purported user is actually associated with sender system 1020 that is being used by the purported payor. For example, a device ID (identifier), SIM (subscriber identification module) card information, mobile network carrier information, phone number, etc., can be gathered by transaction system 2950 to authenticate the identity of payor (e.g., sender 1010) and setup a device fingerprint. In some embodiments, the identity of the payor (e.g., sender 1010) and the payor's association with the payor account (e.g., sender account 1041) can be authenticated by the payor financial institution (e.g., sending participant 1040), and the status of this authentication can be sent to transaction system 2950. In several embodiments, the association of sender system 1020 with the payor (e.g., sender 1010) can be authenticated by the payor financial institution (e.g., sending participant 1040) and sent to transaction system 2950. In other embodiments, transaction system 2950 can authenticate sender system 1020.

In a number of embodiments, such as when enrolling a payor (e.g., sender 1010) that is a business customer of biller 2980, the payor (e.g., sender 1010) can provide additional information to interface with accounting software (e.g., Quicken, etc.) of the payor (e.g., sender 1010). In some embodiments, biller 2980 can provide information to the payor (e.g., sender 1010) in the enrollment message to identify the types of services, dates of services, location of services, and/or other information that can help the payor (e.g., sender 1010) identify the services that correspond to the bills to be paid through real-time payment transactions.

In some embodiments, when the payor (e.g., sender 1010) initiates the use of real-time payment transactions, various authentication portions of the enrollment can be performed at the time the payor initially signs up with transaction system 2950. In some embodiments, the payor (e.g., sender 1010) can enroll with transaction system 2950 through the payor financial institution (e.g., sending participant 1040), which can be performed in some embodiments by application service provide 2930 that is proprietary to sending participant 1040. In other embodiments, the payor (e.g., sender 1010) can enroll directly with the transaction system 2950. In some embodiments, the payor (e.g., sender 1010) can interface with transaction system 2950 through a mobile application or webpage, such as through sender system 1020 accessing payment application 2931 provided by application service provider 2930.

Figure 30:
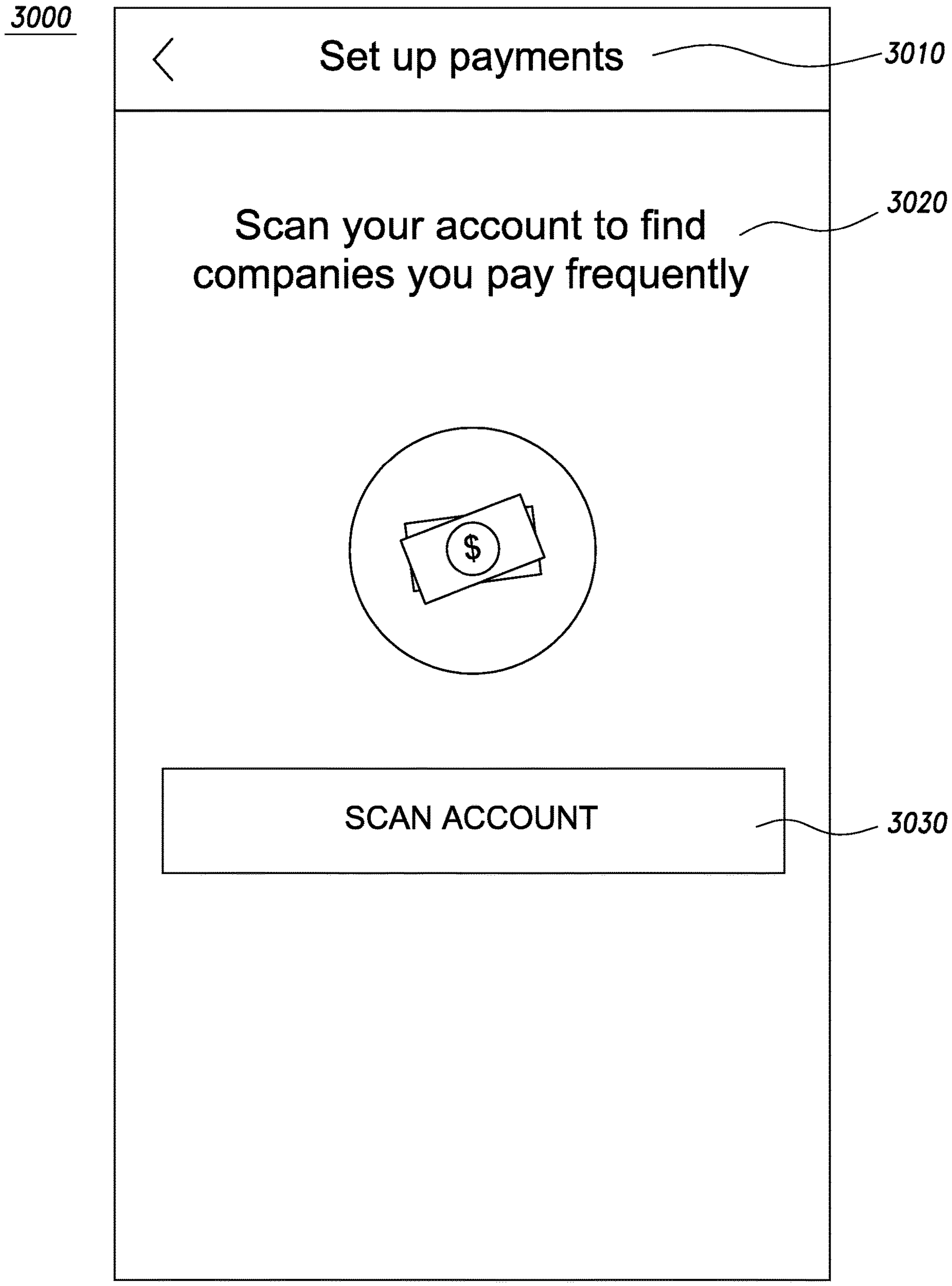
FIG. 30 illustrates an exemplary display screen to allow the sender of FIG. 29 to setup payments, according to an embodiment.

Turning ahead in the drawings, FIG. 30 illustrates an exemplary display screen 3000 to allow the payor (e.g., sender 1010 (FIG. 29)) to setup payments. Display screen 3000 is merely exemplary, and embodiments of the display screen are not limited to the embodiments presented herein. The display screen can be employed in many different embodiments or examples not specifically depicted or described herein, and can include other suitable elements. In many embodiments, transaction system 2950 (FIG. 29) can provide an interface for display on sender system 1020 (FIG. 29), which can include display screen 3000. In a number of embodiments, the interface can allow sender 1010 (FIG. 29) to setup payments, such as by interfacing with display screen 3000.

In a number of embodiments, display screen 3000 can include a title bar 3010, a descriptor 3020, and a selection button 3030. In many embodiments, title bar 3010 can indicate in general terms the subject of the one or more actions that can be performed using the interface, such as "Set up payments." In a number of embodiments, descriptor 3020 can provide additional information about the one or more actions that can be performed using the interface, such as "Scan your account to find companies you pay frequently." In several embodiments, selection button 3030 can include a description of the action that is taken by selecting selection button 3030, such as "Scan Account."

Upon the payor (e.g., sender 1010 (FIG. 29)) choosing to "scan account" by selecting selection button 3030, transaction system 2950 (FIG. 29) and/or payor financial institution (e.g., sending participant 1040 (FIG. 29)) can scan the account associated with the payor (e.g., sender account 1041 (FIG. 29)) to determine the billers (e.g., biller 2980 (FIG. 29)) that have been paid in the past using the account (e.g., sender account 1041 (FIG. 29)). The billers (e.g., biller 2980 (FIG. 29)) can be those billers that have accounts at the biller financial institutions (e.g., receiving account 1062 (FIG. 29) and/or billing account 1061 (FIG. 29) at receiving participant 1060 (FIG. 29)) connected to transaction system 2950 (FIG. 29), and which are capable of receiving real-time payments.

Figure 31:
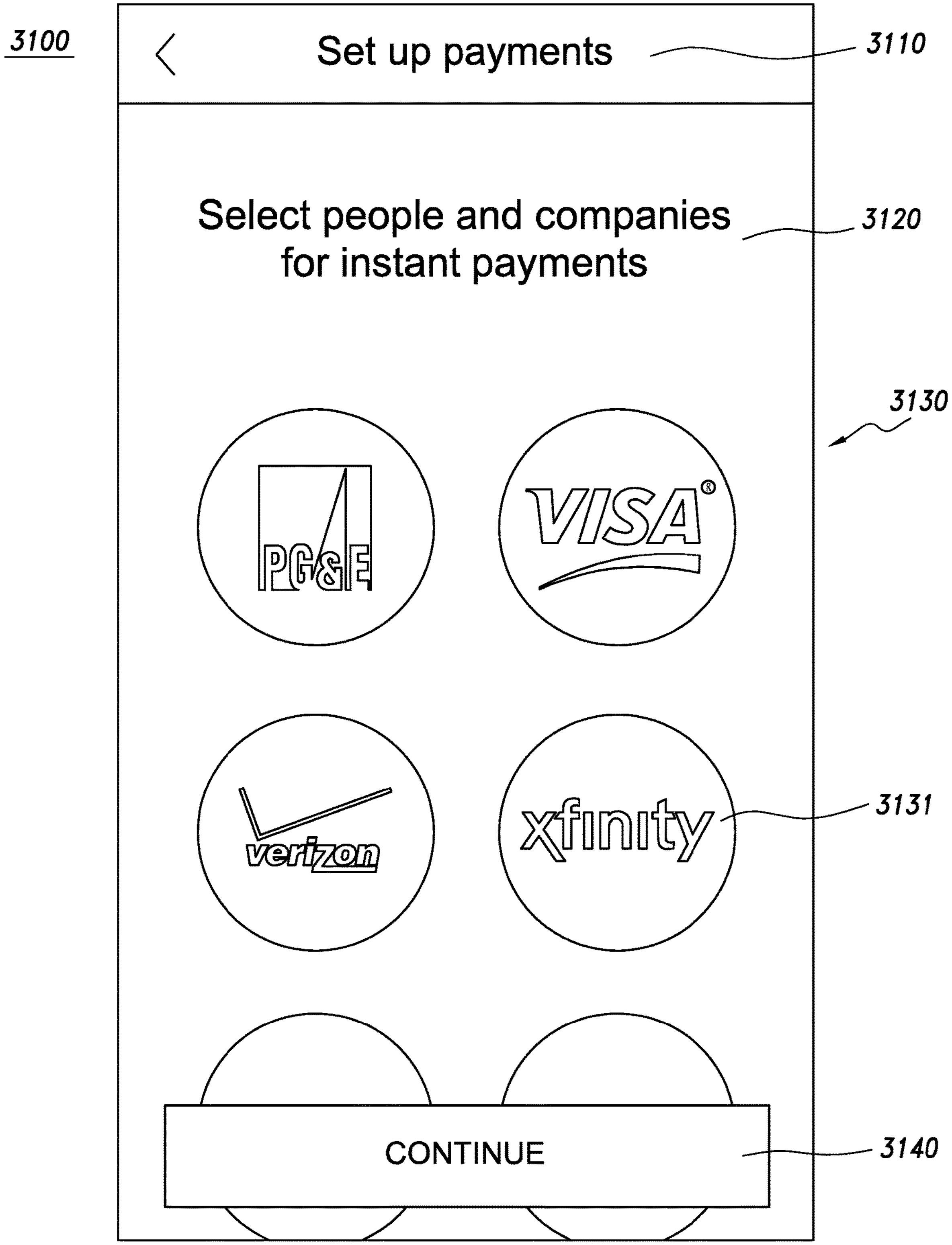
FIG. 31 illustrates an exemplary display screen to allow the sender of FIG. 29 to setup payments, according to an embodiment.

Turning ahead in the drawings, FIG. 31 illustrates an exemplary display screen 3100 to allow the payor (e.g., sender 1010 (FIG. 29)) to setup payments. Display screen 3100 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 3100.

In a number of embodiments, display screen 3100 can include a title bar 3110, a descriptor 3120, a list of billers 3130, such as a biller 3131, and a selection button 3140. In many embodiments, title bar 3110 can indicate in general terms the subject of the one or more actions that can be performed using the interface, such as "Set up payments." In a number of embodiments, descriptor 3120 can provide additional information about the one or more actions that can be performed using the interface, such as "Select people and companies for instant payments." In various embodiments, list of billers 3130 can display the billers that have been paid historically through the payor account (e.g., sender account 1041 (FIG. 29)), and can allow sender 1010 (FIG. 29) to select those billers. In the same or other embodiments, list of billers 3130 can include billers (e.g., biller 2980 (FIG. 29)) that are in the proximity of the payor (e.g., sender 1010 (FIG. 29)). In many embodiments, sender 1010 (FIG. 29) can select one or more of the billers in list of billers 3130, such as biller 3131 (e.g., xfinity, as shown in FIG. 31). In several embodiments, selection button 3130 can include a description of the action that is taken by selecting selection button 3130, such as "Continue," which can allow sender 1010 (FIG. 29) to proceed with the selections made in list of billers 3130. In a number of embodiments, sender 1010 (FIG. 29) can be enrolled in real-time payment transactions with respect to those billers selected, if not previously done.

Once the payor (e.g., sender 1010 (FIG. 29)) is enrolled, invoices, special offers, payments, and/or other suitable messages can occur through transaction system 2950 (FIG. 29). In a number of embodiments, the payor (e.g., sender 1010 (FIG. 29)) can select the preferred communication method of messages (e.g., email, text, push notification, etc.), invoices, and/or other notifications. In many embodiments, biller 2980 (FIG. 29) can initiate invoices, which can be sent as a message from biller system 2970 (FIG. 29) through transaction system 2950 (FIG. 29) to the payor (e.g., sender 1010 (FIG. 29)). For example, the invoice information can be sent in one or more files, messages, or other suitable formats to transaction system 2950 (FIG. 29) to be forwarded to the payors (e.g., sender 1010 (FIG. 29)). In a number of embodiments, transaction system 2950 (FIG. 29) can ensure sender system 1020 (FIG. 29) is authenticated before sender 1010 (FIG. 29) uses sender system 1020 (FIG. 29) to send and/or receive invoice messages and payment messages. In many embodiments, transaction system 2950 (FIG. 29) can provide an API to biller system 2970 (FIG. 29) to allow biller 2980 (FIG. 29) to configure the invoice sent to the payor (e.g., sender 1010 (FIG. 29)).

Figure 32:
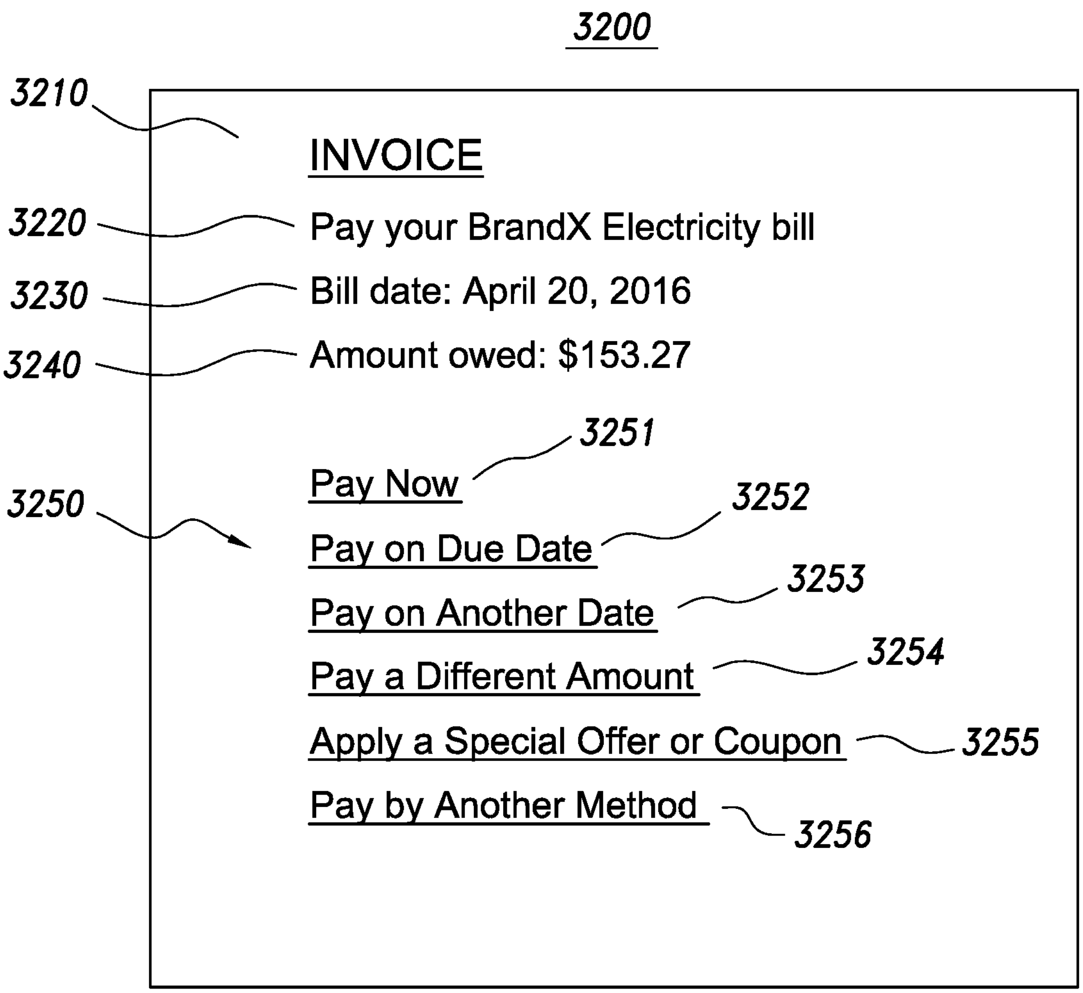
FIG. 32 illustrates an exemplary display screen to allow the sender of FIG. 29 to view an interactive invoice through an email message, according to an embodiment.

Turning ahead in the drawings, FIG. 32 illustrates an exemplary display screen 3200 to allow the payor (e.g., sender 1010 (FIG. 29)) to view an interactive invoice through an email message. Display screen 3200 is merely exemplary, and embodiments of the display screen are not limited to the embodiments presented herein. The display screen can be employed in many different embodiments or examples not specifically depicted or described herein, and can include other suitable elements. In many embodiments, an invoice message provided by transaction system 2950 (FIG. 29) to sender 1010 (FIG. 29) can be displayed on sender system 1020 (FIG. 29) as display screen 3200.

In a number of embodiments, the invoice message can be sent as an email message. Display screen 3200 is an example of an invoice message that can be displayed in an email message that send to a payor (e.g., sender 1010 (FIG. 29)) from a biller 2980 (FIG. 29). In many embodiments, display screen 3200 can include a heading 3210, such as "Invoice." In several embodiments, display screen 3200 can include invoicing information, such as an invoice descriptor 3220, billing date information 3230, and/or amount information 3240. For example, invoice descriptor 3220 can include an identification of biller 2980 (FIG. 29) (e.g., BrandX) and the services/goods (e.g., electricity). Billing date information 3230 can include the date of the bill and/or the due date of the bill. Amount information 3240 can include a statement of the amount owed under the bill. In many embodiments, display screen 3200 can include hyperlinks 3250 for sender 1010 to allow sender 1010 to select from various response options. For example, as shown in FIG. 32, these response options can include a hyperlink 3251 to allow the payor (e.g., sender 1010 (FIG. 29)) to choose to pay in full immediately, a hyperlink 3252 to allow the payor (e.g., sender 1010 (FIG. 29)) to pay in full on the due date, a hyperlink 3253 to allow the payor (e.g., sender 1010 (FIG. 29)) to pay in full on another date, a hyperlink 3254 to allow the payor (e.g., sender 1010 (FIG. 29)) to pay a different amount that the full payment, a hyperlink 3255 to allow the payor (e.g., sender 1010 (FIG. 29)) to apply a special offer or coupon, a hyperlink 3256 to allow the payor (e.g., sender 1010 (FIG. 29)) to pay by another method than the payment method (e.g., the payor account (e.g., sender account 1041 (FIG. 29))) that was originally setup (such as using a different debit or credit card, or different account), and/or other suitable payment options.

In some embodiments, special offers, incentives, rewards, and/or coupons can be described in the invoice message displayed in display screen 3200. For example, if the payor (e.g., sender 1010 (FIG. 29)) has earned points that can be applied to the bill, the invoice message displayed in display screen 3200 can include information about the points and how the points can be applied to the bill. To illustrate further, if a first payor (e.g., sender 1010 (FIG. 29)) receives an invoice message displayed in display screen 3200 for an electric bill from an electric company (e.g., biller 2980), and the first payor (e.g., sender 1010 (FIG. 29)) has 100 points, which equates to $10, the invoice message displayed in display screen 3200 can display the option to apply the $10 to help pay the bill. In many embodiments, these incentives, rewards, and/or coupons can originate from biller 2980 (FIG. 29), biller system 2970 (FIG. 29), the biller financial institution (e.g., receiving participant 1060 (FIG. 29)), transaction system 2950 (FIG. 29), and/or the payor financial institution (e.g., sending participant 1040 (FIG. 29)). For example, rewards earned by the payor (e.g., sender 1010 (FIG. 29)) at the payor financial institution (e.g., sending participant 1040 (FIG. 29)), such as credit card rewards, can be included in the invoice message displayed in display screen 3200. In other embodiments, the details of the special offers, incentives, rewards, and/or coupons can be accessed by selecting hyperlink 3255. In some embodiments, these special offers, incentives, rewards, and/or coupons can be applied in a manner other than by helping to pay for the bill. For example, the rewards can be applied to upgrade account status, to apply the cash value to the payor account (e.g., sender account 1041 (FIG. 29)), to pay for other goods or services, and/or in another suitable manner.

In some embodiments, the invoice message displayed in display screen 3200 can include additional information, or can provide one or more hyperlinks to additional information. In many embodiments, this additional information can be provided and/or customized by biller 2980 (FIG. 29). For example, the additional information can include information on the previous balance, the most recent payment made, any discounts applied, the balance forwarded from the previous bill, new charges during the current billing cycle, current usage amounts, current rates, descriptions of goods or services, taxes, fees, total amount due, an fee charged by biller 2980 (FIG. 29) for participating in real-time payment transactions, and/or other suitable billing information. In a number of embodiments, such as when the payor (e.g., sender 1010 (FIG. 29)) is a business customer, for example, the invoice can include information such as invoice number or purchase order number, date of service, description of services or explanation of benefits (e.g., for health care services), remittance details, and/or other suitable information.

In some embodiments, the invoice can be presented with check boxes that allow the payor (e.g., sender 1010 (FIG. 29)) to select which items the payor (e.g., sender 1010 (FIG. 29)) would like to pay. In several embodiments, the invoice can allow images to be attached. In a number of embodiments, biller 2980 (FIG. 29) can indicate the manner in which biller 2980 (FIG. 29) would like to be paid. In various embodiments, additional links can be included with the invoice that can allow the payor (e.g., sender 1010 (FIG. 29)) to dispute the invoice, contact customer service, see a history of past invoices and/or payments, request reimbursement for overpayment, and/or access or request other suitable information. In some embodiments, if the customer (e.g., sender 1010 (FIG. 29)) contests or disputes the bill, transaction system 2950 (FIG. 29) can serve as a dispute resolution interface for biller 2980 (FIG. 29). In other embodiments, the dispute resolution process can be handled directly by biller 2980 (FIG. 29).

Figure 33:
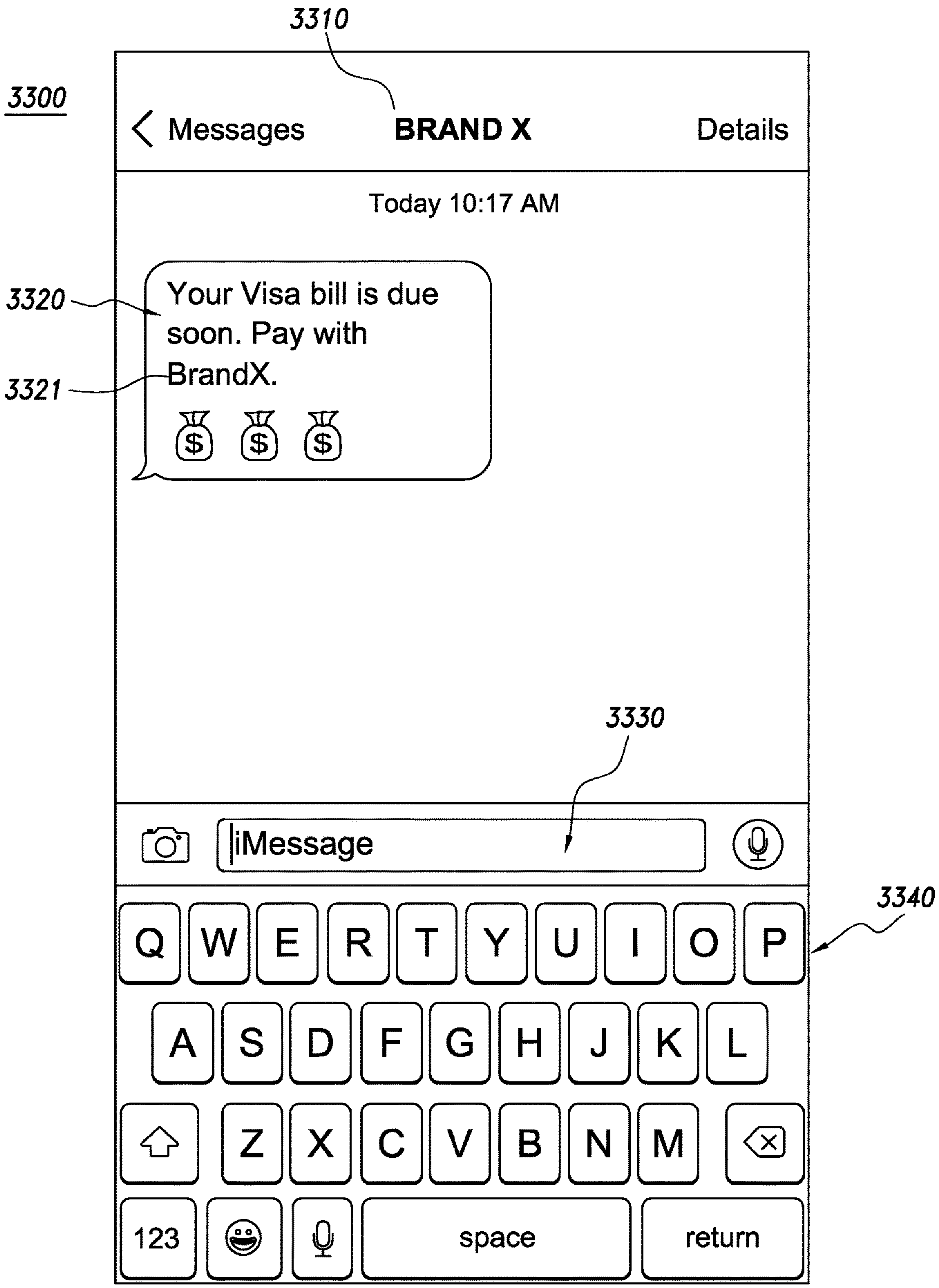
FIG. 33 illustrates an exemplary display screen to allow the sender of FIG. 29 to view an interactive invoice through a text message, according to an embodiment.

Turning ahead in the drawings, FIG. 33 illustrates an exemplary display screen 3300 to allow the payor (e.g., sender 1010 (FIG. 29)) to view an interactive invoice through a text message. Display screen 3300 is merely exemplary, and embodiments of the display screen are not limited to the embodiments presented herein. The display screen can be employed in many different embodiments or examples not specifically depicted or described herein, and can include other suitable elements. In many embodiments, an invoice message provided by transaction system 2950 (FIG. 29) to sender 1010 (FIG. 29) can be displayed on sender system 1020 (FIG. 29) as display screen 3400.

Figure 34:
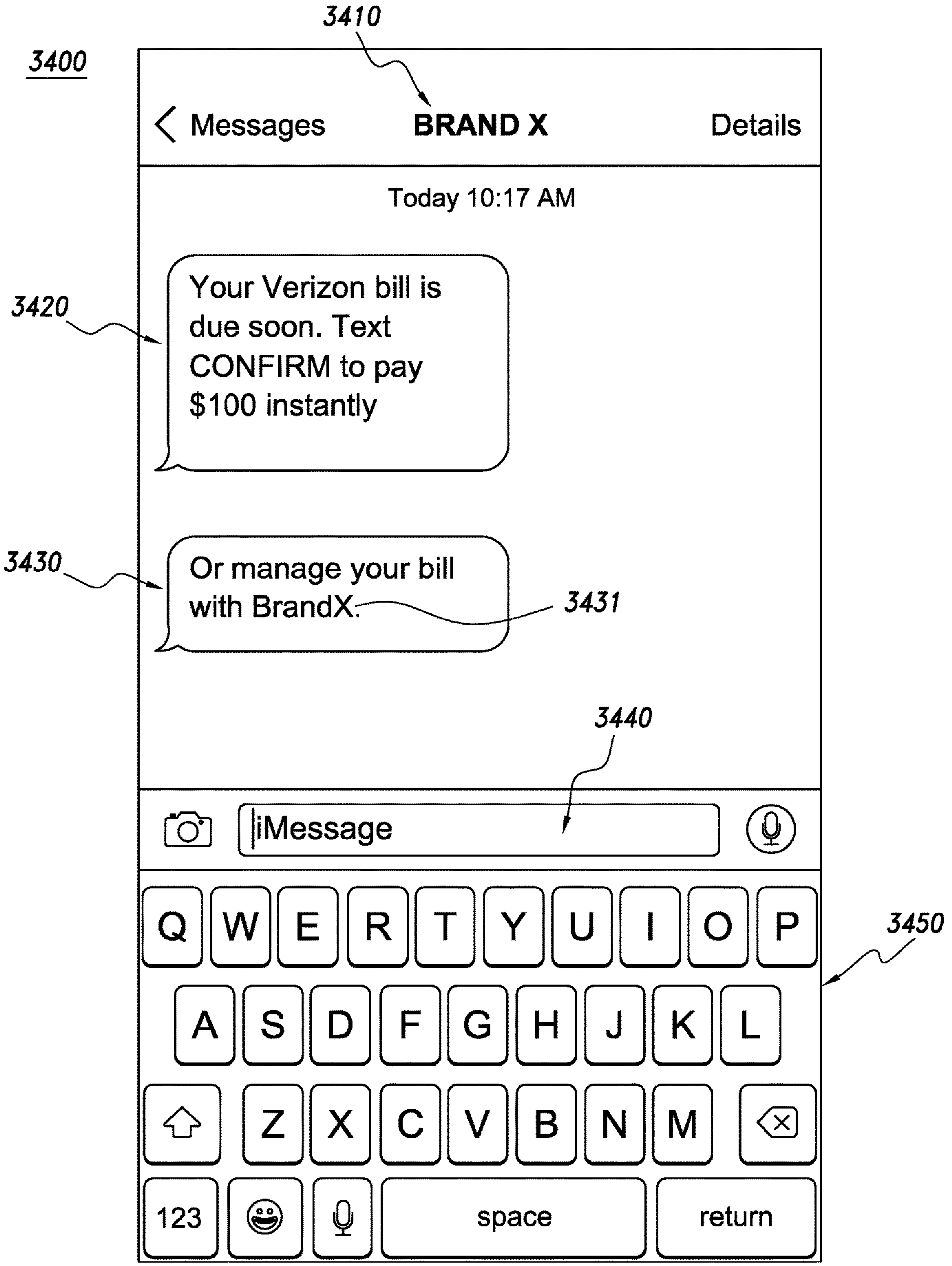
FIG. 34 illustrates an exemplary display screen to allow the sender of FIG. 29 to view an interactive invoice through a text message, according to an embodiment.

In a number of embodiments, the invoice message can be sent as a text message. Display screen 3300 is an example of an invoice message that can be displayed in a text message (e.g., SMS (Short Message Service) message, MMS (Multimedia Messaging Service) message) that is sent to a payor (e.g., sender 1010 (FIG. 29)). In various embodiments, the invoice message sent to the payor (e.g., sender 1010 (FIG. 29)), as displayed in display screen 3300, can be a short message, without billing details, that simply notifies the payor (e.g., sender 1010 (FIG. 29)) of the invoice and/or reminds the payor (e.g., sender 1010 (FIG. 29)) to pay the invoice. For example, display screen 3300 can include a message source 3310, such as "BrandX." In several embodiments, display screen 3300 can include a message 3320, which can inform the payor (e.g., sender 1010 (FIG. 29)) that an invoice is available and the bill is due soon, such as by stating "Your Visa bill is due soon. Pay with BrandX." In various embodiments, message 3320 can include a hyperlink 3321, such as the "BrandX" hyperlink shown in FIG. 33, which can allow the payor (e.g., sender 1010 (FIG. 29)) can click hyperlink 3321 to navigate to one or more screens with additional invoice information, such as the invoice information and/or the response options shown in FIG. 32 and described above. In various embodiments, the payor (e.g., sender 1010 (FIG. 29)) can respond to message 3320 by composing a response message 3330 using on-screen keyboard 3340. In some embodiments, response message 3330 can be handled, similarly as shown in FIG. 34 and described below. In other embodiments, response message 3330 is not handled, and the payor (e.g., sender 1010 (FIG. 29)) can respond by using hyperlink 3321.

Turning ahead in the drawings, FIG. 34 illustrates an exemplary display screen 3400 to allow the payor (e.g., sender 1010 (FIG. 29)) to view an interactive invoice through a text message. Display screen 3400 is merely exemplary, and embodiments of the display screen are not limited to the embodiments presented herein. The display screen can be employed in many different embodiments or examples not specifically depicted or described herein, and can include other suitable elements. In many embodiments, an invoice message provided by transaction system 2950 (FIG. 29) to sender 1010 (FIG. 29) can be displayed on sender system 1020 (FIG. 29) as display screen 3400.

In a number of embodiments, the invoice message can be sent as a text message with instructions for interactive response through text messaging. Display screen 3400 is an example of an invoice message that can be displayed in a text message (e.g., SMS message, MMS message) that is sent to a payor (e.g., sender 1010 (FIG. 29)). In various embodiments, the invoice message sent to the payor (e.g., sender 1010 (FIG. 29)), as displayed in display screen 3400, can be a message that includes an amount due and provides instruction on how to pay through a response text message. For example, display screen 3400 can include a message source 3410, such as "BrandX." In several embodiments, display screen 3400 can include a message 3420, which can inform the payor (e.g., sender 1010 (FIG. 29)) that a bill from a biller (e.g., biller 2980 (FIG. 29)), which is Verizon in the example shown in FIG. 34, is due soon for the payment amount (e.g., $100), and can provide the payor (e.g., sender 1010 (FIG. 29)) with the option to pay immediately by responding to the text message with a message that includes the text, "CONFIRM." In various embodiments, the payor (e.g., sender 1010 (FIG. 29)) can respond to message 3420 by composing a response message 3440 (e.g., "CONFIRM") using on-screen keyboard 3450.

In some embodiments, display screen 3400 can include a message 3430, which can provide the option to manage the bill by clicking a hyperlink 3431, such as the "BrandX" hyperlink shown in FIG. 34 which can be similar to hyperlink 3321 (FIG. 33). For example, payor (e.g., sender 1010 (FIG. 29)) can click hyperlink 34321 to navigate to one or more screens with additional invoice information, such as the invoice information and/or the response options shown in FIG. 32 and described above.

Figure 35:
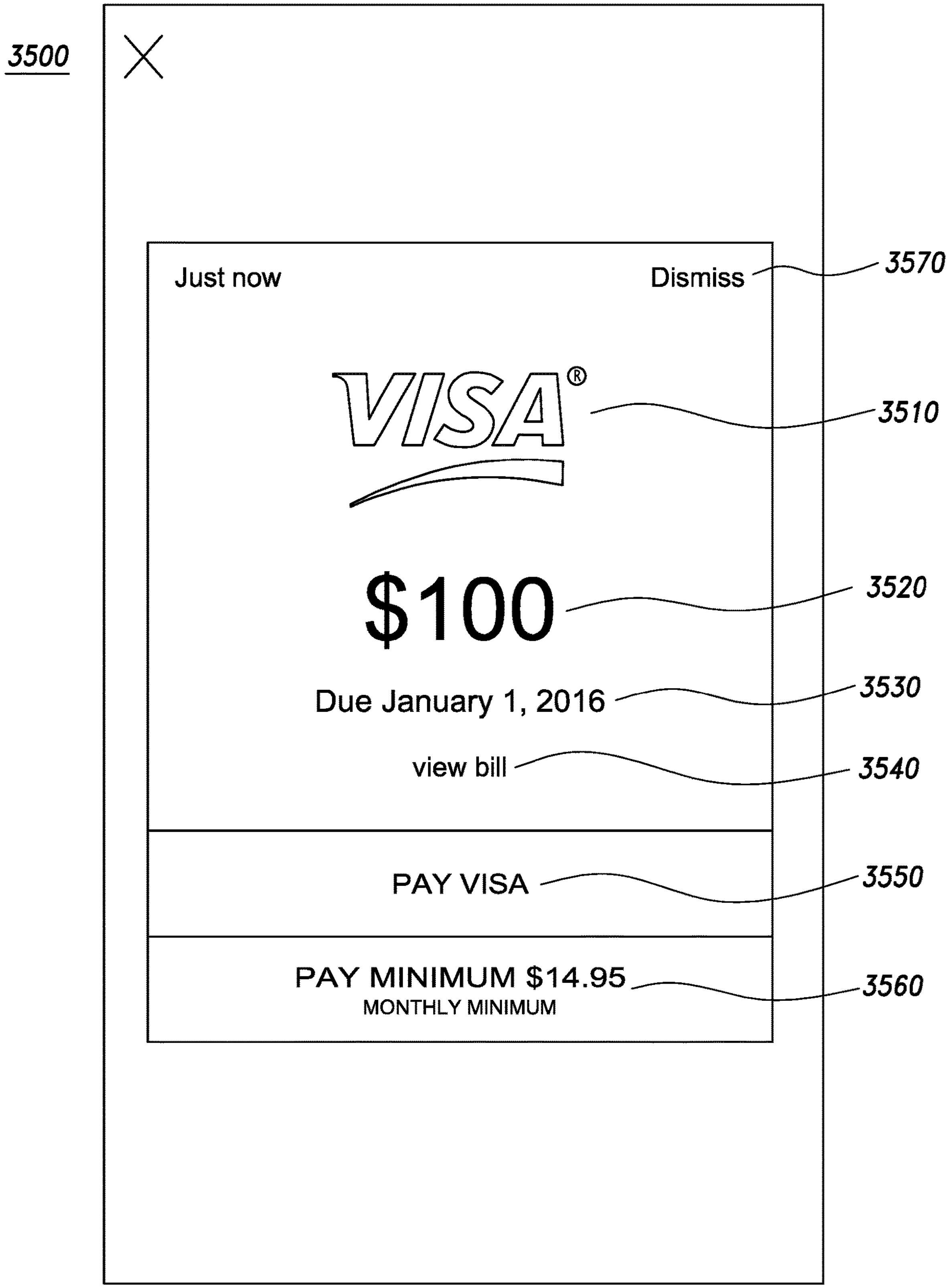
FIG. 35 illustrates an exemplary display screen to allow the sender of FIG. 29 to view an interactive invoice through a push notification, according to an embodiment.

Turning ahead in the drawings, FIG. 35 illustrates an exemplary display screen 3500 to allow the payor (e.g., sender 1010 (FIG. 29)) to view an interactive invoice through a push notification. Display screen 3500 is merely exemplary, and embodiments of the display screen are not limited to the embodiments presented herein. The display screen can be employed in many different embodiments or examples not specifically depicted or described herein, and can include other suitable elements. In many embodiments, an invoice message provided by transaction system 2950

(FIG. 29) to sender 1010 (FIG. 29) can be displayed on sender system 1020 (FIG. 29) as display screen 3500.

In a number of embodiments, the invoice message can be sent as a push notification in an app. Display screen 3500 is an example of an invoice message that can be displayed in a push notification that is sent to a payor (e.g., sender 1010 (FIG. 29)) in which the payor (sender 1010 (FIG. 29)) owes $100 on a VISA credit card. In some embodiments, display screen 3500 can include a biller identifier 3510, which can indicate that the biller (e.g., biller 2890 (FIG. 29)) is VISA, for example. In several embodiments, display screen 3500 can include amount information 3520, which can indicate that the amount due is $100. In many embodiments, display screen 3500 can include date information 3530, which can indicate a due date for the bill, such as Jan. 1, 2016, and/or the date of the bill. In many embodiments, display screen 3500 can include a hyperlink 3540 to view the bill, such as to view additional billing information. In several embodiments, display screen 3500 can include a selection button 3550 to pay the bill, and/or a selection button 3560 to pay a minimum payment for the bill, such as a monthly minimum payment on a credit card bill. In a number of embodiments, display screen 3500 can include a closing button 3570 to close and/or dismiss the push notification.

In some embodiments, before sending the invoice message, transaction system 2950 (FIG. 29) can first verify that the payor account (e.g., sender account 1041 (FIG. 29)) is open and available for payment, and, in various embodiments, can verify that the payor account (e.g., sender account 1041 (FIG. 29)) has available funds. In a number of embodiments, transaction system 2950 (FIG. 29) can verify the status of the payor account (e.g., sender account 1041 (FIG. 29)) and/or the availability of sufficient funds in the payor account (e.g., sender account 1041 (FIG. 29)). For example, transaction system 2950 (FIG. 29) can use account status information this is stored in transaction system 2950 (FIG. 29), and which can be updated by the payor financial institution (e.g., sending participant 1040 (FIG. 29)) on a regular basis (e.g., nightly, intraday, etc.). In the same or other embodiments, transaction system 2950 (FIG. 29) can inquire with the payor financial institution (e.g., sending participant 1040 (FIG. 29)) about the account status.

In several embodiments, if the payor account (e.g., sender account 1041 (FIG. 29)) does not have sufficient funds to pay the payment amount in the invoice, the invoice message can indicate that there are insufficient funds in the payor account (e.g., sender account 1041 (FIG. 29)). In some embodiments, transaction system 2950 (FIG. 29) can notify the payor (e.g., sender 1010 (FIG. 29)) later when sufficient funds become available, such as through periodic polling (e.g., daily, weekly, etc.) of the available balance, or can offer for the payor financial institution (e.g., sending participant 1040 (FIG. 29)) to make a real-time loan, similar to an overdraw loan. In various embodiments, the loan can be part of the payment, and the payor (e.g., sender 1010 (FIG. 29)) can use available funds to pay another part of the payment. For example, the payor (e.g., sender 1010 (FIG. 29)) can pay $75 down, and the payor financial institution (e.g., sending participant 1040 (FIG. 29)) can make a real-time loan for $200 to cover the remainder of a $275 bill. In other embodiments, the payor (e.g., sender 1010 (FIG. 29)) can choose to use another account (e.g., a "backup account") to satisfy all or a portion of the bill.

In some embodiments, if a payor (e.g., sender 1010 (FIG. 29)) has received a paper invoice from a biller (e.g., biller 2980 (FIG. 29)), and the biller (e.g., biller 2980 (FIG. 29)) is capable of receiving real-time payment, the payor (e.g., sender 1010 (FIG. 29)) can take a picture of the invoice and upload it to transaction system 2950 (FIG. 29). Transaction system 2950 (FIG. 29) can send payment options, similarly as described above, which the payor (e.g., sender 1010 (FIG. 29)) can use to select a real-time payment option.

Figure 36:
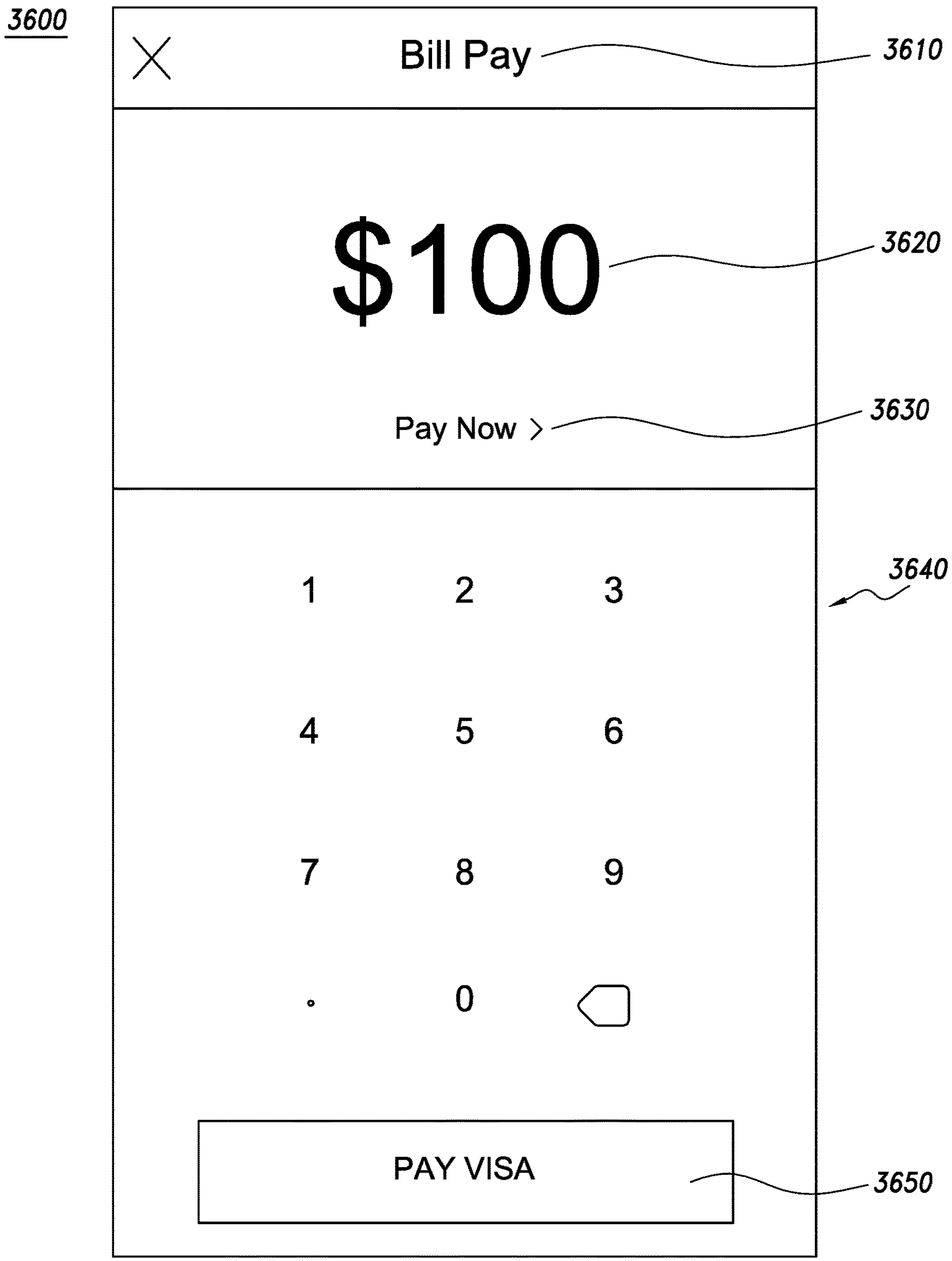
FIG. 36 illustrates an exemplary display screen to allow the sender of FIG. 29 to enter a payment amount for paying a bill, according to an embodiment.

Turning ahead in the drawings, FIG. 36 illustrates an exemplary display screen 3600 to allow the payor (e.g., sender 1010 (FIG. 29)) to enter a payment amount for paying a bill. Display screen 3600 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 3600.

In a number of embodiments, display screen 3600 can include a title bar 3610, a payment amount selection 3620, a payment selection button 3630, a payment input area 3640, and/or a payment selection button 3650. In many embodiments, title bar 3610 can indicate in general terms the subject of the one or more actions that can be performed using the interface, such as "Bill Pay." In a number of embodiments, the payor (e.g., sender 1010 (FIG. 29)) can select a payment amount using payment input area 3640, and the payment amount entered can be displayed in payment amount selection 3620. In some embodiments, payment amount selection 3620 can default to the full amount due, and this amount can be altered using payment input area 3640. In several embodiments, payment for the payment amount entered in payment amount selection 3620 can be confirmed using payment selection button 3630 and/or payment selection button 3650. By selecting payment selection button 3630, the payor (e.g., sender 1010 (FIG. 29)) can choose to have the payment made immediately. By selecting payment selection button 3650, the payor (e.g., sender 1010 (FIG. 29)) can be presented with further options for when the payment will be made, as shown in FIG. 37 and described below.

Figure 37:
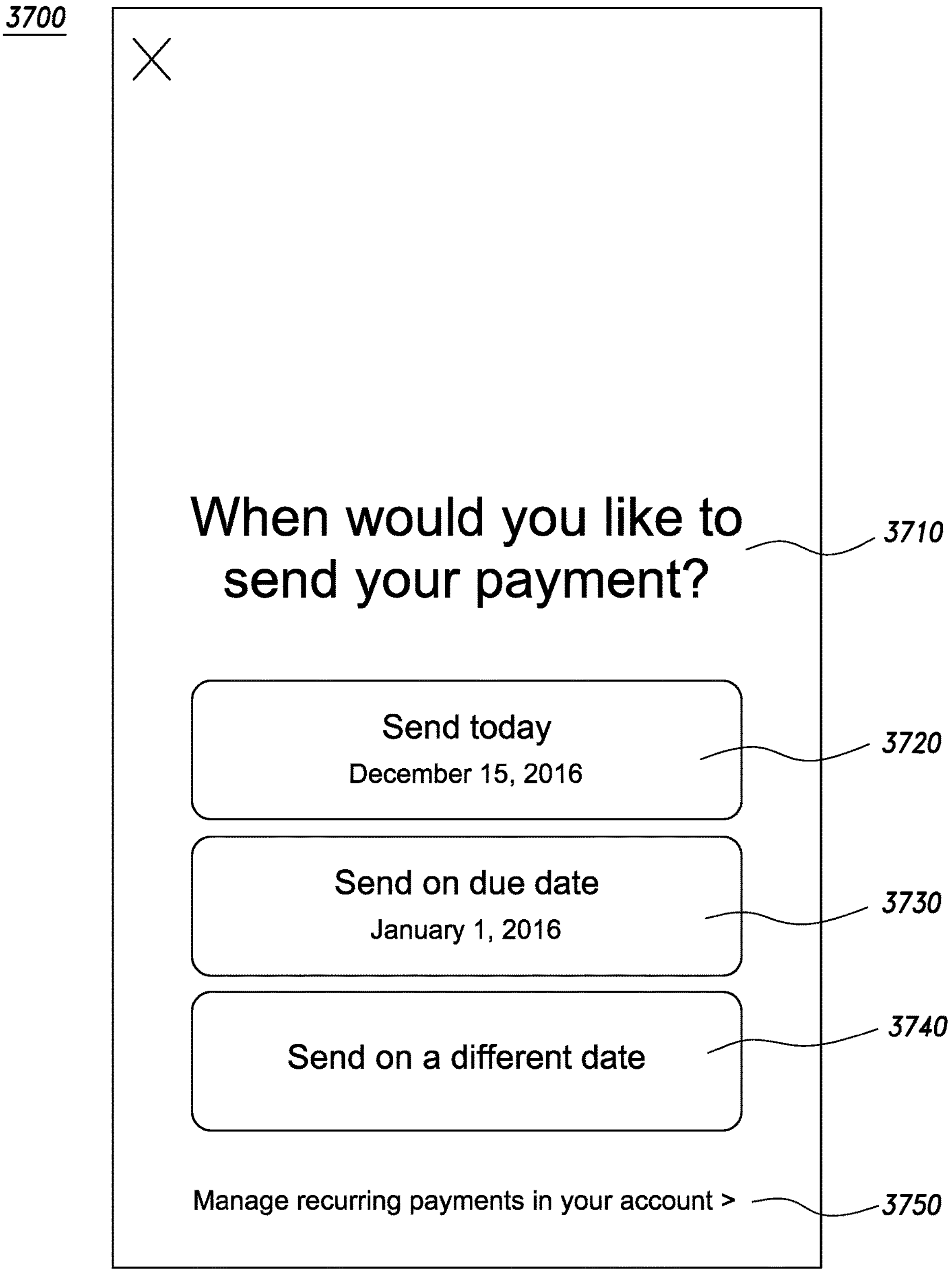
FIG. 37 illustrates an exemplary display screen to allow the sender of FIG. 29 to choose when the payment will be made, according to an embodiment.

Turning ahead in the drawings, FIG. 37 illustrates an exemplary display screen 3700 to allow the payor (e.g., sender 1010 (FIG. 29)) to choose when the payment will be made. Display screen 3700 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 3700.

In a number of embodiments, display screen 3700 can include a descriptor 3710, a payment selection button 3720, a payment selection button 3730, a payment selection button 3740, and/or a manage payments selector 3750. In many embodiments, descriptor 3710 can describe and/or prompt for the actions that can be performed using the interface, such as "When would you like to send your payment?" In many embodiments, payment selection button 3720, payment selection button 3730, payment selection button 3740, and/or manage payments selector 3750 can be used by the payor (e.g., sender 1010 (FIG. 29)) to choose when the payment should be made, and/or manage the schedule for recurring payments. For example, the payor (e.g., sender 1010 (FIG. 29)) can select payment selection button 3720 to send payment today, the payor (e.g., sender 1010 (FIG. 29))

can select payment selection button 3730 to send on the due date, or the payor (e.g., sender 1010 (FIG. 29)) can select payment selection button 3740 to send on a different date. In some embodiments, the payor (e.g., sender 1010 (FIG. 29)) can select manage payments selector 3750 to setup recurring payments to be made automatically on a recurring basis on a certain schedule (e.g., the 21st day of every month).

Figure 38:
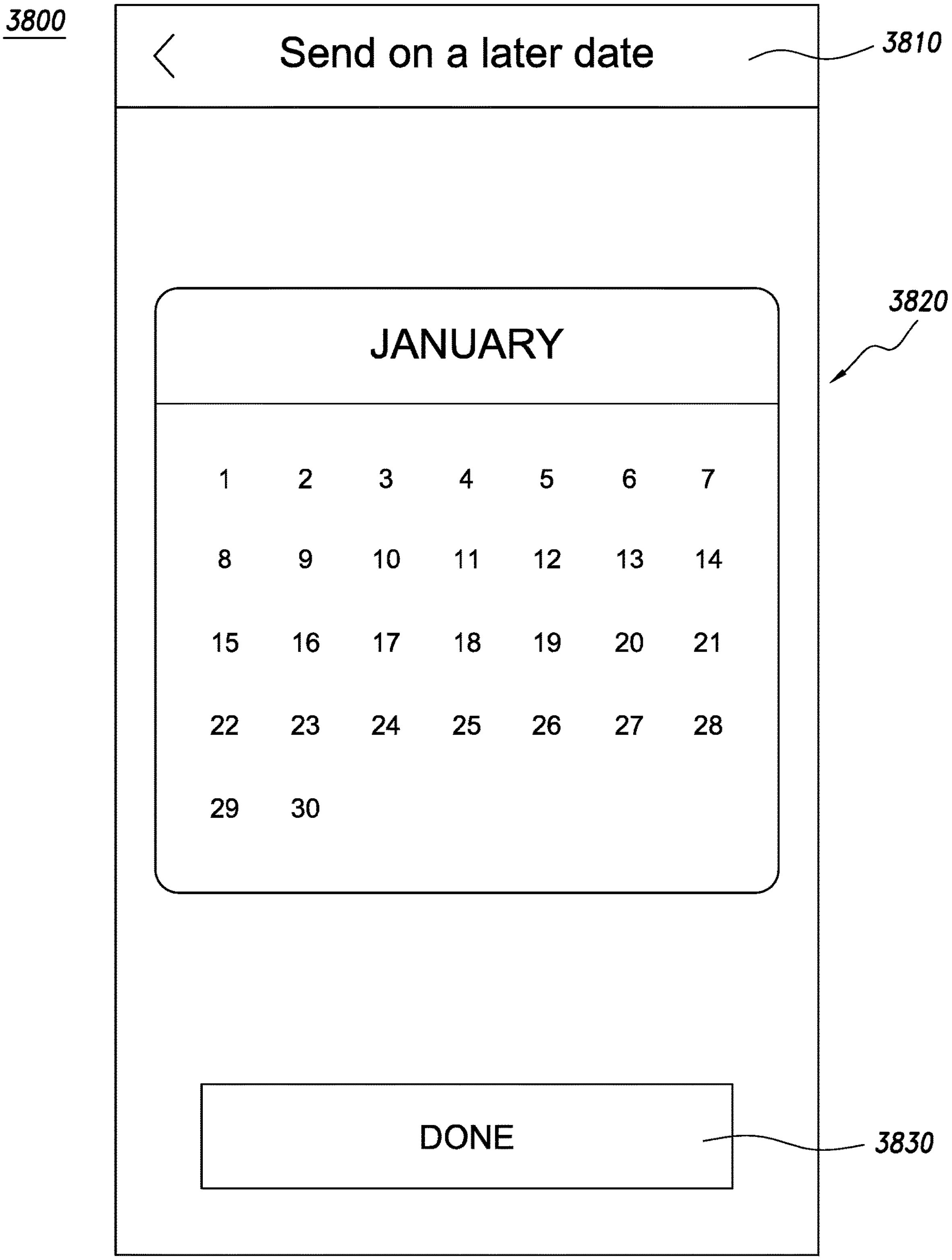
FIG. 38 illustrates an exemplary display screen to allow the sender of FIG. 29 to choose a date on which the payment will be made, according to an embodiment.

Turning ahead in the drawings, FIG. 38 illustrates an exemplary display screen 3800 to allow the payor (e.g., sender 1010 (FIG. 29)) to choose a date on which the payment will be made. Display screen 3800 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 3800.

In many embodiments, display screen 3800 can be presented to the payor (e.g., sender 1010 (FIG. 29)) if payment selection button 3740 (FIG. 37) was selected in display screen 3700 (FIG. 37). In a number of embodiments, display screen 3800 can include a title bar 3810, a calendar selection area 3820, and/or a selection button 3830. In many embodiments, title bar 3810 can indicate in general terms the subject of the one or more actions that can be performed using the interface, such as "Send on a later date." In several embodiments, the payor (e.g., sender 1010 (FIG. 29)) can select a date using calendar selection area 3820, and can confirm the selection using selection button 3830.

Figure 39:
FIG. 39 illustrates an exemplary display screen to present the sender of FIG. 29 with a confirmation of the payment in the amount selected that will be paid to the biller of FIG. 29, according to an embodiment.

Turning ahead in the drawings, FIG. 39 illustrates an exemplary display screen 3900 to present the payor (e.g., sender 1010 (FIG. 29)) with a confirmation of the payment in the amount selected that will be paid to the biller (e.g., biller 2980 (FIG. 29). Display screen 3900 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 3900.

In many embodiments, display screen 3900 can be presented to the payor (e.g., sender 1010 (FIG. 29)) after the payment has been scheduled. In a number of embodiments, display screen 3900 can include a biller identifier 3910, which can indicate that the biller (e.g., biller 2890 (FIG. 29)) is VISA, for example. In several embodiments, display screen 3900 can include amount information 3920, which can indicate that the amount to be paid is $100. In many embodiments, display screen 3900 can include date information 3930, which can indicate the date on which the payment will be made, such as Jan. 25, 2016. In many embodiments, display screen 3900 can include a cancel selector 3940 to allow the payor (e.g., sender 1010 (FIG. 29)) to cancel the scheduled payment and optionally to view the bill if, for example, the payor (e.g., sender 1010 (FIG. 29)) decides to change the payment details (e.g., the date of the payment).

In many embodiments, a send payment response can be sent from the payor (e.g., sender 1010 (FIG. 29)) to transaction system, which can capture the details of the payment scheduled by the payor (e.g., sender 1010 (FIG. 29)). Transaction system 2950 (FIG. 29) can effectuate a payment with real-time funds availability at the time selected by the payor (e.g., sender 1010 (FIG. 29)). If the selected time is immediate or same day, the payment can be performed within real-time after the payor (e.g., sender 1010 (FIG. 29)) authorizes the payment by sending the payment response. If the selected time is at a later time, the payment can be performed at that later time in real-time.

In various embodiments, transaction system 2950 (FIG. 29) can facilitate the payment with real-time funds availability, similarly to the real-time payment shown in FIGS. 11-12, 14, and 16-17, and described above. For example, in some embodiments, transaction system 2950 (FIG. 29) can send a message to the payor financial institution (e.g., sending participant 1040 (FIG. 29)) to debit the payment from the payor account (e.g., sender account 1041 (FIG. 29)) at the payor financial institution (e.g., sending participant 1040 (FIG. 29)). The payor financial institution (e.g., sending participant 1040 (FIG. 29)) then can debit the payment amount from the payor account (e.g., sender account 1041 (FIG. 29)), and send a promise-to-pay message to transaction system 2950 (FIG. 29). Transaction system 2950 (FIG. 29) then can forward the promise-to-pay message received from the payor financial institution (e.g., sending participant 1040 (FIG. 29)) to the biller financial institution (e.g., receiving participant 1060 (FIG. 29)). The biller financial institution (e.g., receiving participant 1060 (FIG. 29)) then can credit the biller account (recipient account 1062 (FIG. 29) and/or billing account 1061 (FIG. 29)) and/or biller 2980 (FIG. 29) can update the accounts receivable (AR) system, such that the funds are available to biller 2980 (FIG. 29) in real-time. In many embodiments, biller 2980 (FIG. 29) can be notified of the payment and the availability of funds. The biller financial institution (e.g., receiving participant 1060 (FIG. 29)) can send a confirmation response to transaction system 2950 (FIG. 29) indicating that the credit of the biller account (recipient account 1062 (FIG. 29) and/or billing account 1061 (FIG. 29)) is complete. In many embodiments, transaction system 2950 (FIG. 29) can notify the payor (e.g., sender 1010 (FIG. 29)) that the payment was made and/or that funds were made available to biller 2980 (FIG. 29).

Figure 40:
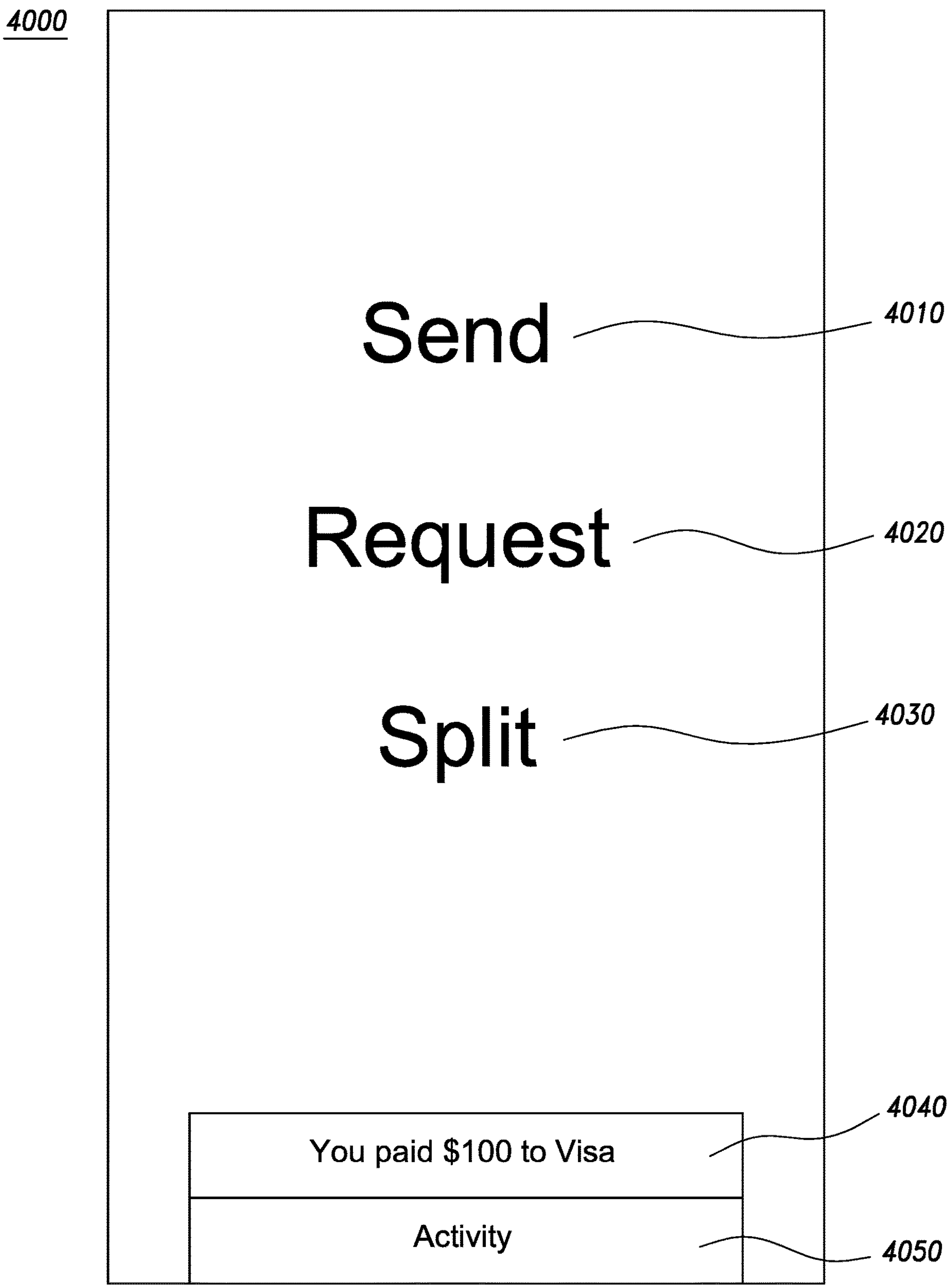
FIG. 40 illustrates an exemplary display screen to present additional options to the sender of FIG. 29 after a payment has been made, according to an embodiment.

Turning ahead in the drawings, FIG. 40 illustrates an exemplary display screen 4000 to present additional options to the payor (e.g., sender 1010 (FIG. 29)) after a payment has been made. Display screen 4000 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 4000.

In a number of embodiments, display screen 4000 can include a payment completion indicator 4040, which can indicate that the payment has been successfully made. In some embodiments, display screen 4000 can display additional options. For example, display screen can include a selector 4010 to send another payment, a selector 4020 to request another bill, a selector 4030 to split a payment, and/or selector 4050 to view billing activity through transaction system 2950 (FIG. 29), as described below in further detail.

In some embodiments, the interface used by the payor (e.g., sender 1010 (FIG. 29)) can be hosted by transaction system 2950 (FIG. 29). In other embodiments, the interface can be hosted by application service provider 2930 connected to transaction system 2950 (FIG. 29), such as a bill payment consolidator (e.g., Fiserv). Although FIGS. 30-40 and 46-48 are described above in terms of transaction system 2950 (FIG. 29) providing the display screens to sender system 1020 (FIG. 29), application service provider 2930 can provide the display screens to sender system 1020 (FIG. 29). In yet other embodiments, the interface can be hosted by the payor financial institution (e.g., sending participant 1040 (FIG. 29)), which can communicate, as necessary, with transaction system 2950 (FIG. 29) for information and/or to communicate with the biller financial institution (e.g., receiving participant 1060 (FIG. 29)) through transaction system 2950 (FIG. 29). For examples, application service provider 2930 can be a proprietary interface of sending recipient 1040 (FIG. 29) or receiving participant 1060 (FIG. 29).

In many embodiments, a settlement account can be used at each of the payor financial institution (e.g., sending participant 1040 (FIG. 29)) and the biller financial institution (e.g., receiving participant 1060 (FIG. 29)) to settle the payment, as described above. For example, the payor financial institution (e.g., sending participant 1040 (FIG. 29)) can include sending participant settlement account 1042 (FIG. 29), which can be credited when the payor account (e.g., sender account 1041 (FIG. 29)) is debited, and the biller financial institution (e.g., receiving participant 1060 (FIG. 29)) can include receiving participant settlement account 1063 (FIG. 29), which can be debited when the billing account is credited. The settlement accounts (e.g., sending participant settlement account 1042 (FIG. 29), receiving participant settlement account 1063 (FIG. 29)) can be settled later through ACH (Automated Clearing House) settlement, such as through intraday or overnight ACH batch processing. In other embodiments, the settlement can occur in real-time for each transaction among the settlement accounts (e.g., sending participant settlement account 1042 (FIG. 29), receiving participant settlement account 1063 (FIG. 29)). In yet other embodiments, the settlement can occur through credit card systems, wire transfers, or other suitable methods.

Figure 41:
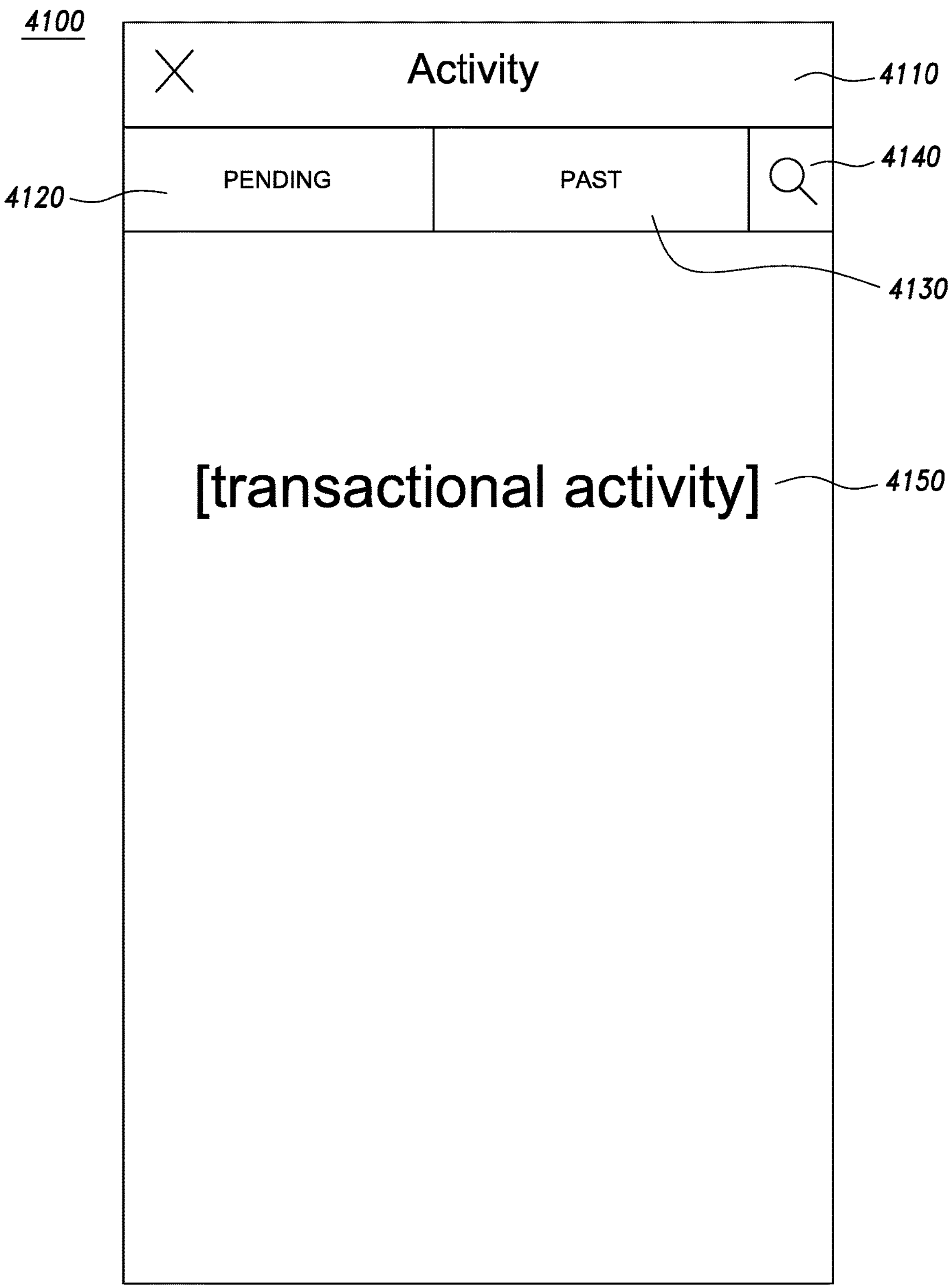
FIG. 41 illustrates an exemplary display screen to allow the sender of FIG. 29 to view billing activity through the transaction system of FIG. 29, according to an embodiment.

Turning ahead in the drawings, FIG. 41 illustrates an exemplary display screen 4100 to allow the payor (e.g., sender 1010 (FIG. 29)) to view billing activity through transaction system 2950 (FIG. 29). Display screen 4100 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 4100.

In many embodiments, display screen 4100 can include a title bar 4110, a pending selector 4120, a past selector 4130, a search selector 4140, and/or an activity listing 4150. In many embodiments, title bar 4110 can indicate in general terms the subject of the one or more actions that can be performed using the interface, such as "Activity." In several embodiments, the payor (e.g., sender 1010 (FIG. 29)) can choose to view pending activity, such as payments scheduled to be made at a later time, using pending selector 4120. In a number of embodiments, the payor (e.g., sender 1010 (FIG. 29)) can choose to view past activity, such as invoices that were send in the past and/or payments that were made in the past, using past selector 4130. In many embodiments, the activity can be displayed in activity listing 4150. In several embodiments, the payor (e.g., sender 1010 (FIG. 29)) can search the activity by selecting search selector 4140.

Figure 42:
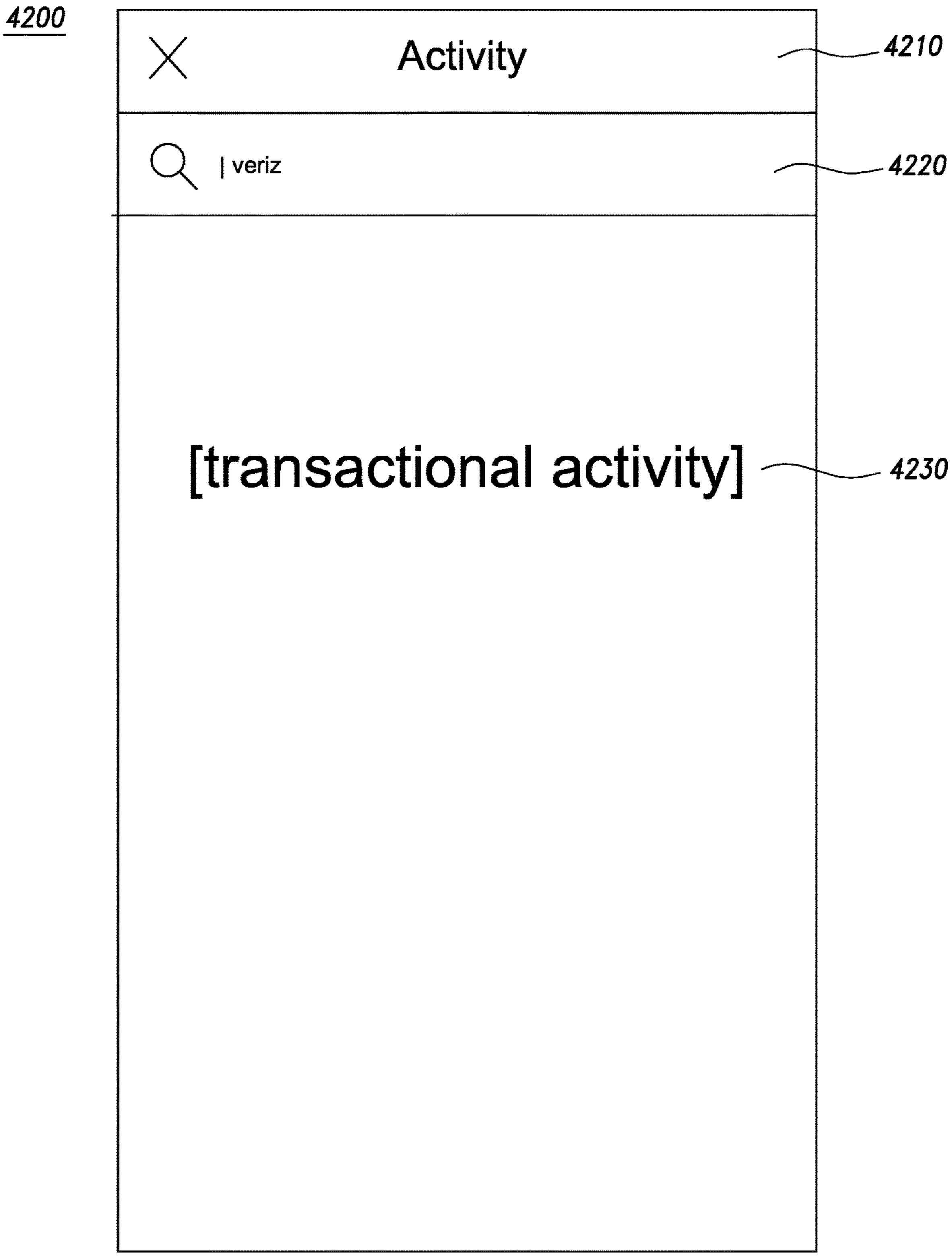
FIG. 42 illustrates an exemplary display screen to allow the sender of FIG. 29 to search activity through the transaction system of FIG. 29, according to an embodiment.

Turning ahead in the drawings, FIG. 42 illustrates an exemplary display screen 4200 to allow the payor (e.g., sender 1010 (FIG. 29)) to search activity through transaction system 2950 (FIG. 29). Display screen 4200 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 4200.

In many embodiments, display screen 4200 can be presented to the payor (e.g., sender 1010 (FIG. 29)) if search selector 4140 (FIG. 41) was selected in display screen 4100 (FIG. 41). In some embodiments, display screen 4200 can include a title bar 4210, a search bar 4220, and/or an activity listing 4230. In many embodiments, title bar 4210 can indicate in general terms the subject of the one or more actions that can be performed using the interface, such as "Activity." In several embodiments, the payor (e.g., sender 1010 (FIG. 29)) can enter search terms in search bar 4220. In a number of embodiments, transaction system can interactively search for activity that matches the search terms entered in search bar 4220, and the activity can be displayed in activity listing 4230. For example, the payor (e.g., sender 1010 (FIG. 29)) can search for payments made to a specific biller (e.g., biller 2980 (FIG. 29)), which is Verizon in the example shown in FIG. 42.

In some embodiments, transaction system 2950 (FIG. 29) can facilitate additional messages, other than invoice and payment messages, between biller 2980 (FIG. 29) and/or the biller financial institution (e.g., receiving participant 1060 (FIG. 29)), on the one hand, and the payor (e.g., sender 1010 (FIG. 29)), on the other hand. For example, biller 2980 (FIG. 29) can communicate special offers to the payor (e.g., sender 1010 (FIG. 29)) through the communication interface provided by transaction system 2950 (FIG. 29). In other embodiments, special offers can be included with the invoice message, such as incentives for using real-time payments through transaction system 2950 (FIG. 29) and paying within a set time of receiving the invoice (e.g., within an hour, within a day, etc.). For example, incentives can include an upgrade to a service, a free movie, and/or a discount on the current or future bill.

In many embodiments, transaction system 2950 (FIG. 29) can facilitate other communication between biller 2980 (FIG. 29) and the payor (e.g., sender 1010 (FIG. 29)), such as for contacting customer services, sending reminders for when the next payment is due, sending and/or responding to surveys, advertising a new service, sending promotional trial offers for friends of the payor (e.g., sender 1010 (FIG. 29)), changing levels of service, receiving and/or tracking points, and/or other suitable communication activities.

In some embodiments, transaction system 2950 (FIG. 29) can track purchases made as a result of communications and can provide biller 2980 (FIG. 29) with data analytics on the results of the communications. For example, biller 2980 (FIG. 29) can view real-time purchase information that results from the communications from biller 2980 (FIG. 29). In many embodiments, purchases tracked can include real-time payments made through the transaction payment system and, in some embodiments, also can include payments made outside transaction system 2950 (FIG. 29), based on information provided to transaction system 2950 (FIG. 29) by financial institutions. In many embodiments, the data analytics can identify for billers various trends, such as who pays, who returns, who accepts special offers, etc., which can be used by biller 2980 (FIG. 29) to further tailor its services and/or marketing campaigns.

In various embodiments, the invoice message can be sent by biller 2980 (FIG. 29) to a delivery or service person that delivers goods or services to a customer (e.g., sender 1010 (FIG. 29)). The delivery/service person can present the invoice message on an electronic device, such as a mobile device, to the customer (e.g., sender 1010 (FIG. 29)), and the customer (e.g., sender 1010 (FIG. 29)) can enroll and pay the invoice with real-time payments while the delivery/service person is with the customer (e.g., sender 1010 (FIG. 29)).

In a number of embodiments, transaction system 2950 (FIG. 29) can be integrated with a voice-based service (e.g., Amazon Echo "Alexa," etc.) to allow the payor (e.g., sender 1010 (FIG. 29)) to send payments using the service in which the payments are processed in real-time. In other embodiments, other payment services (e.g., Facebook Messenger Payments, etc.) can be integrated with transaction system 2950 (FIG. 29) in order to process the payments in real time.

In many embodiments, transaction system 2950 (FIG. 29) with real-time payment transactions can beneficially provide for paperless billing and collection. In several embodiments, the invoice message and the payment response can be associated such that biller 2980 (FIG. 29) does not need to associate a payment received to an outstanding invoice. In several embodiments, real-time payment transactions using transaction system 2950 (FIG. 29) can provide real-time information to biller 2980 (FIG. 29) about which customers (e.g., sender 1010 (FIG. 29)) of biller 2980 (FIG. 29) can pay in real-time. In many embodiments, transaction system 2950 (FIG. 29) can advantageously reduce sharing of sensitive information between billers (e.g., biller 2980 (FIG. 29)) and payors (e.g., sender 1010 (FIG. 29)), as the payor (e.g., sender 1010 (FIG. 29)) can be setup to have real-time payment transactions with biller 2980 (FIG. 29) without biller 2980 (FIG. 29) knowing the account information of the payor account (e.g., sender account 1041 (FIG. 29)). For example, biller 2980 (FIG. 29) may know the cell phone number, email address, home address, or other information of the payor (e.g., sender 1010 (FIG. 29)), but not the payor account information (e.g., account number of sender account 1041 (FIG. 29)), in some embodiments. In several embodiments, transaction system 2950 (FIG. 29) can eliminate the need for billers (e.g., biller 2980 (FIG. 29)) to maintain directories of sensitive information, such as payor account information, Tax ID Number, etc. Further, in many embodiments, transaction system 2950 (FIG. 29) can reduce or eliminate the need for billers (e.g., biller 2980 (FIG. 29)) to share the account information (e.g., account number) of the biller account (recipient account 1062 (FIG. 29) and/or billing account 1061 (FIG. 29)) with payors (e.g., sender 1010 (FIG. 29)). In many embodiments, by decreasing the sharing and storing of information, transaction system 2950 (FIG. 29) can decrease the ability of thieves to steal sensitive data, such as account information or other sensitive information. In several embodiments, the certified biller status can beneficially provide a certified security status to prevent payments being made to fraudsters.

In a number of embodiments, transaction system 2950 (FIG. 29) can place the financial institutions at the center of the payment process, as trusted parties to ensure safety and soundness of the system. In several embodiments, transaction system 2950 (FIG. 29) can reduce costs for payors (e.g., sender 1010 (FIG. 29)) and billers (e.g., biller 2980 (FIG. 29)) associated with mailed paper invoices and payments.

Figure 43:
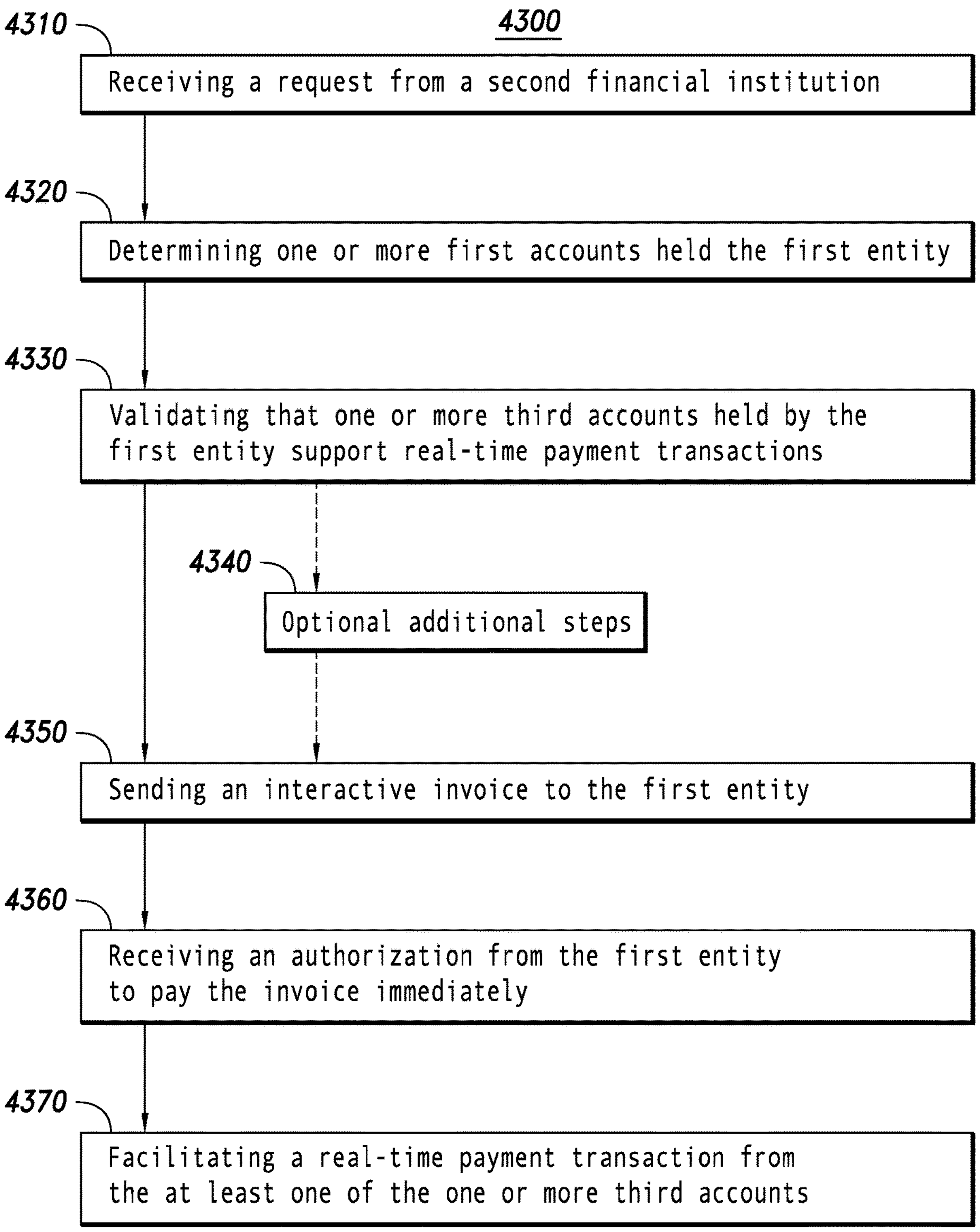
FIG. 43 illustrates a flow chart for a method, according to another embodiment.

Turning ahead in the drawings, FIG. 43 illustrates a flow chart for a method 4300, according to an embodiment. Method 4300 is merely exemplary and is not limited to the embodiments presented herein. Method 4300 can be employed in many different embodiments or examples not specifically depicted or described herein. In some embodiments, the procedures, the processes, and/or the activities of method 4300 can be performed in the order presented. In other embodiments, the procedures, the processes, and/or the activities of method 4300 can be performed in any suitable order. In still other embodiments, one or more of the procedures, the processes, and/or the activities of method 4300 can be combined or skipped. In many embodiments, method 4300 can be a method of providing secure electronic billing and collection with real-time funds availability. In some embodiments, method 4300 can be performed by transaction system 2950 (FIG. 29). In some embodiments, method 4300 and other blocks in method 4300 can include using a distributed network including distributed memory architecture to perform the associated activity. This distributed architecture can reduce the impact on the network and system resources to reduce congestion in bottlenecks while still allowing data to be accessible from a central location.

Referring to FIG. 43, method 4300 can include a block 4310 of receiving a request from a second financial institution to determine whether any accounts held by a first entity support real-time payment transactions. The second financial institution can be similar or identical to receiving participant 1060 (FIG. 29). The first entity can be similar or identical to sender 1010 (FIG. 29). In many embodiments, the second financial institution can maintain a second account held by a second entity. The second account can be similar or identical to billing account 1061 (FIG. 29) and/or recipient account 1062 (FIG. 29). The second entity can be similar or identical to biller 2980 (FIG. 29). In some embodiments, the second entity can be a biller. In various embodiments, the request can include an identifier of the first entity. The identifier can be similar or identical to the payor identifiers described above. In many embodiments, the first entity can be a payor that is subject to a financial obligation to the second entity. In many embodiments, the request can be at least part of the confirmation message described above.

In a number of embodiments, method 4300 also can include a block 4320 of determining one or more first accounts held by the first entity using a directory and the identifier of the first entity. The one or more first accounts can be similar or identical to sender account 1041 (FIG. 29). The directory can be similar or identical to directory 2951 (FIG. 29). In many embodiments, the directory can include account information for accounts maintained at a plurality of financial institutions. In some embodiments, the plurality of financial institutions can include the one or more first financial institutions and the second financial institution. For example, the plurality of financial institutions can include sending participant 1040 (FIG. 29) and receiving participant 1060 (FIG. 29), among others.

In several embodiments, method 4300 additionally can include a block 4330 of validating that one or more third accounts held by the first entity support real-time payment transactions. The one or more third accounts can be similar or identical to sender account 1041 (FIG. 29). In many embodiments, the one or more third accounts can be any of the one or more first accounts that support real-time payment transactions. In many embodiments, the one or more first accounts can include the one or more third accounts. In several embodiments, block 4330 of validating that one or more third accounts held by the first entity support real-time payment transactions can include sending an inquiry to one or more financial institutions that maintain the one or more first accounts to determine if the one or more first accounts support real-time payment transactions. In the same or other embodiments, block 4330 of validating that one or more third accounts held by the first entity support real-time payment transactions can include determining whether the one or more first accounts support real-time payment transactions from the directory, such as using information already stored in the directory about whether the one or more first accounts support real-time payment transactions. In some embodiments, at least some of the one or more first accounts held by the first entity do not support real-time payment transactions. In other embodiments, each of the one or more first accounts held by the first entity support real-time payment transactions.

In a number of embodiments, method 4300 optionally can include a block 4340 of optional additional steps, as shown in FIG. 44 and described below.

In several embodiments, method 4300 also can include a block 4350 of sending an interactive invoice to the first entity. In many embodiments, the interactive invoice can be similar or identical to the invoice message shown in display screen 3200 (FIG. 32), display screen 3300 (FIG. 33), display screen 3400 (FIG. 34), and/or display screen 3500 (FIG. 35). In some embodiments, the interactive invoice can include an option to pay the financial obligation immediately using at least one of the one or more third accounts. In several embodiments, the at least one of the one or more third accounts can be maintained by one or more first financial institutions. The one or more first financial institutions can be similar or identical to sending participant 1040 (FIG. 29). In various embodiments, the one or more first financial institutions can be different from the second financial institution. In other embodiments, the one or more first financial institutions can be the same as the second financial institution. For example, the second financial institution can be Capital One, which manages a credit card account for a customer, and sends a bill to the customer for that credit card, and one of the one or more first financial institutions can be Capital One, which maintains a direct deposit account for the customer from which the customer can pay the bill. In a number of embodiments, block 4350 of sending the interactive invoice to the first entity can be performed after the first entity has enrolled in real-time payment transactions. In many embodiments, the interactive invoice further can include information about an incentive in exchange for payment within a predetermined time period. For example, the interactive invoice can provide a discount on the next bill if the current bill is paid within the first three days.

In a number of embodiments, method 4300 further can include a block 4360 of receiving an authorization from the first entity to pay the invoice immediately using at least one of the one or more third accounts. For example, the first entity can select hyperlink 3251 (FIG. 32) to pay in full immediately, can text message response message 3440 (FIG. 34) of "CONFIRM" in response to message 3420 (FIG. 34), or can select payment selection button 3630 (FIG. 36) to have the payment made immediately.

In several embodiments, method 4300 additionally can include a block 4370 of facilitating a real-time payment transaction from the at least one of the one or more third accounts maintained by the one or more first financial institutions to the second account maintained by the second financial institution. In some embodiments, the real-time payment transaction can involve a promise-to-pay message sent to the second financial institution from the one or more first financial institutions after a successful debit of the at least one of the one or more third accounts for a payment amount. In a number of embodiments, the second financial institution can perform a successful credit for the payment amount to the second account to make funds available in the second account in real-time after the authorization from the first entity to pay the invoice immediately. In many embodiments, paying the invoice "immediately" can mean paying the invoice in real-time, as defined above.

In many embodiments, the first financial institution can maintain a first settlement account. The first settlement account can be similar or identical to sending participant settlement account 1042 (FIG. 29). In several embodiments, the first settlement account can be credited to account for the successful debit of the one or more third accounts maintained by the first financial institution. In a number of embodiments, the second financial institution can maintain a second settlement account. The second settlement account can be similar or identical to receiving participant settlement account 1063 (FIG. 29). In various embodiments, the second settlement account can be debited to account for the successful credit of the second account maintained by the second financial institution. In a number of embodiments, funds can be transferred from the first settlement account to the second settlement account in a settlement completion. The settlement completion can be a settlement later through ACH settlement, such as through intraday or overnight ACH batch processing, settlement in real-time for each transaction among the settlement accounts, and/or settlement through credit card systems, wire transfers, or other suitable methods.

Turning ahead in the drawings, FIG. 44 illustrates a block 4340 of optional additional steps, according to an embodiment. Block 4340 is merely exemplary and is not limited to the embodiments presented herein. Block 4340 can be employed in many different embodiments or examples not specifically depicted or described herein. In some embodiments, the procedures, the processes, and/or the activities of block 4340 can be performed in the order presented. In other embodiments, the procedures, the processes, and/or the activities of block 4340 can be performed in any suitable order. In still other embodiments, one or more of the procedures, the processes, and/or the activities of block 4340 can be combined or skipped. In many embodiments, one or more of the blocks of block 4340 can be performed after block 4330 (FIG. 43) and/or before block 4350 (FIG. 43). In other embodiments, one or more of the blocks of block 4340 can be performed in another suitable order with respect to the blocks of method 4300 (FIG. 43).

Referring to FIG. 44, block 4340 can include a block 4410 of sending a response to the second financial institution indicating that one or more accounts held by the first entity support real-time payment transactions. For example, if one or more third accounts held by the first entity are validated as supporting real-time payment transactions, transaction system 2950 (FIG. 29) can send a response (e.g., in response to the request receiving in block 4310 (FIG. 43)) that responds affirmatively that one or more accounts held by the first entity support real-time payment transactions. In many embodiments, the response can be at least part of the response to the confirmation message described above.

In a number of embodiments, block 4340 optionally can include a block 4420 of sending an enrollment message to the first entity that invites the first entity to enroll in real-time payment transactions. In many embodiments, the enrollment by the first entity can be different for each second entity from which the first entity would like to receive real-time payment transactions. In other embodiments, the first entity can enroll in real-time payment transactions for multiple second entities in a single enrollment.

In several embodiments, block 4340 further optionally can include a block 4430 of receiving enrollment information from the first entity to enroll the first entity in real-time payment transactions. In some embodiments, block 4430 of receiving enrollment information from the first entity to enroll the first entity in real-time payment transactions can be performed after block 4420 of sending an enrollment message to the first entity that invites the first entity to enroll in real-time payment transactions. In many embodiments, the enrollment information can include account number, routing number, debit card information, personally identifiable information, and/or the security information described above.

In a number of embodiments, block 4340 still further optionally can include a block 4440 of storing in the directory a profile of a device used by the first entity to enroll in real-time payment transactions. In many embodiments, the device can be similar or identical to sender system 1020 (FIG. 29). In many embodiments, the profile can be similar to the device fingerprint described above.

Turning ahead in the drawings, FIG. 45 illustrates a flow chart for a method 4500, according to an embodiment. Method 4500 is merely exemplary and is not limited to the embodiments presented herein. Method 4500 can be employed in many different embodiments or examples not specifically depicted or described herein. In some embodiments, the procedures, the processes, and/or the activities of method 4500 can be performed in the order presented. In other embodiments, the procedures, the processes, and/or the activities of method 4500 can be performed in any suitable order. In still other embodiments, one or more of the procedures, the processes, and/or the activities of method 4500 can be combined or skipped. In many embodiments, method 4500 can be a method of providing secure electronic billing and collection with real-time funds availability. In some embodiments, method 4500 can be performed by transaction system 2950 (FIG. 29). In some embodiments, method 4500 and other blocks in method 4500 can include using a distributed network including distributed memory architecture to perform the associated activity. This distributed architecture can reduce the impact on the network and system resources to reduce congestion in bottlenecks while still allowing data to be accessible from a central location.

Referring to FIG. 45, method 4500 can include a block 4510 of receiving a request to register a second entity under a certified biller status using a second account maintained at a second financial institution. The second entity can be similar or identical to biller 2980 (FIG. 29). The second account can be similar or identical to billing account 1061 (FIG. 29) and/or recipient account 1062 (FIG. 29). The second financial institution can be similar or identical to receiving participant 1060 (FIG. 29). In many embodiments, the request can be at least part of the confirmation message described above. In some embodiments, the request can include a public identifier for the second entity.

In a number of embodiments, method 4500 also can include a block 4520 of registering the second entity under the certified biller status after receiving confirmation that the public identifier corresponds to the second entity and that the second account is held by the second entity. In many embodiments, the confirmation can be based on due diligence performed by due diligence can be performed by the entity operating transaction system 2950 (FIG. 29), by receiving participant 1060 (FIG. 29), and/or by a third-party processor to vet the second entity to ensure that the request is legitimately from the second entity. In many embodiments, the second entity can be registered under the certified biller status in directory 2951 (FIG. 29).

In several embodiments, method 4500 additionally can include a block 4530 of providing, to a first entity, first information that identifies the second entity as satisfying the certified biller status. In many embodiments, the first entity can be a payor that is subject to a financial obligation to the second entity. The first entity can be similar or identical to sender 1010 (FIG. 29). In a number of embodiments, the first entity has enrolled a first account maintained at a first financial institution in real-time payment transactions. The first account can be similar or identical to sender account 1041 (FIG. 29). The first financial institutions can be similar or identical to sending participant 1040 (FIG. 29).

In some embodiments, the first information that identifies the second entity as satisfying the certified biller status can also identify the second entity as one of recommended billers for the first entity based on the first entity having previously paid a bill to the second entity in a manner. The recommended billers can be similar or identical to billers 3131 (FIG. 31) in list of billers 3130 (FIG. 31). In many embodiments, the second entity can be identified as one of the recommended billers for the first entity based on second information received from the first financial institution about the bill having been previously paid to the second entity. In other embodiments, the second entity can be identified as one of the recommended billers for the first entity based on information received from the second entity and/or the second financial institution about the bill having been previously paid to the second entity. In many embodiments, the bill having been previously paid was paid using method other than through real-time invoicing and payment. In a number of embodiments, the first information that identifies the second entity as satisfying the certified biller status also can identify the second entity as one of the recommended billers for the first entity based on a proximity of the first entity to the second entity. The proximity of the first entity to the second entity can be similar or identical to the proximity of the payor (e.g., sender 1010 (FIG. 29)) to the biller (e.g., 2980 (FIG. 29)) described above. In a number of embodiments, the first information can be included in the enrollment message described above in the description of FIG. 29.

In a number of embodiments, method 4500 further can include a block 4540 of receiving an authorization from the first entity to pay an invoice using the first account. In many embodiments, the invoice can be similar or identical to the invoice message shown in display screen 3200 (FIG. 32), display screen 3300 (FIG. 33), display screen 3400 (FIG. 34), and/or display screen 3500 (FIG. 35). In many embodiments, the invoice can originate from the second entity. In several embodiments, the invoice can include an interactive invoice originating from the second entity. In the same or other embodiments, the interactive invoice can originate at least in part from the second financial institution, the first financial institution, or another entity. In various embodiments, the interactive invoice can include an option to pay the invoice immediately. In many embodiments, the interactive invoice can include information about an incentive in exchange for paying the invoice within a predetermined time period, as described above in further detail. In some embodiments, the interactive invoice can include information about a reward that can be applied toward paying the invoice. For example, the reward can be similar or identical to the special offers, incentives, rewards, and/or coupons described above in the description of FIG. 32.

In several embodiments, method 4500 also can include a block 4550 of facilitating a real-time payment transaction from the first account maintained by the first financial institution to the second account maintained by the second financial institution. In some embodiments, the real-time payment transaction can involve a promise-to-pay message sent to the second financial institution from the first financial institution after a successful debit of the first account for a payment amount. In a number of embodiments, the second financial institution can perform a successful credit for the payment amount to the second account to make funds available in the second account in real-time after the authorization from the first entity to pay the invoice immediately. In many embodiments, paying the invoice "immediately" can mean paying the invoice in real-time, as defined above.

In many embodiments, the first financial institution can maintain a first settlement account. The first settlement account can be similar or identical to sending participant settlement account 1042 (FIG. 29). In several embodiments, the first settlement account can be credited to account for the successful debit of the one or more third accounts maintained by the first financial institution. In a number of embodiments, the second financial institution can maintain a second settlement account. The second settlement account can be similar or identical to receiving participant settlement account 1063 (FIG. 29). In various embodiments, the second settlement account can be debited to account for the successful credit of the second account maintained by the second financial institution. In a number of embodiments, funds can be transferred from the first settlement account to the second settlement account in a settlement completion. The settlement completion can be a settlement later through ACH settlement, such as through intraday or overnight ACH batch processing, settlement in real-time for each transaction among the settlement accounts, and/or settlement through credit card systems, wire transfers, or other suitable methods.

In a number of embodiments, method 4500 optionally can include a block 4560 of receiving a current location of the first entity. In many embodiments, the current location of the first entity can be determined based on the location of a mobile device used by the first entity. The mobile device can be similar or identical to sender system 1020 (FIG. 29). In several embodiments, location of the mobile device can be determined using global positioning system (GPS), wireless local area networking, Bluetooth, or another suitable method to determine the location of the mobile device. In many embodiments, determining the location of the mobile device can include determining that the mobile device is at a biller (e.g., 2980 (FIG. 29)) or an establishment of a provider or goods and/or services. For example, the mobile device, the first financial institution, and/or the transaction system (e.g., 2950 (FIG. 29)) can determine that the first entity is currently at a certain auto dealership.

In several embodiments, method 4500 further optionally can include a block 4570 of receiving a current balance of the first account. In many embodiments, the current balance of the first account can be determined by querying the first financial institution to determine the current balance of the first account. In other embodiments, the current balance of the first account can be based on information provided from the first financial institution on a periodic basis.

In several embodiments, method 4500 also optionally can include a block 4580 of providing, to the first entity, an offer for a loan that is based on the current location of the first entity. For example, if the location of the first entity is determined to be an auto dealership, the first financial institution can initiate an offer for an auto loan or lease to the first entity, such as through a notification on the mobile device. The first entity can see the offer, execute it, and the funds can be provided to the first account of the first entity at the first financial institution to pay for an automobile at the auto dealership. In many embodiments, the offer can be sent to the mobile through the transaction system (e.g., 2950 (FIG. 29)) from the first financial institution. In other embodiments, the offer can be sent directly to the mobile device from the first financial institution.

In a number of embodiments, the offer for the loan can be based on the current balance of the first account. For example, the amount of the offer, or the range in amounts of the offer, can be based on the current balance of the first account. In many embodiments, the offer presented to the first entity can include information about the loan, such as how much time it will take to pay back the loan, monthly minimum payment amounts, how quickly the first entity could pay back the loan based on the current balance and/or the current cash flow in the first account, or other suitable information. In some embodiments, the offer can be for something other than a loan. For example, the offer can be for another type of financial product or service, such as an investment opportunity.

In a number of embodiments, the offer can be based wholly, or at least in part, on information other than the current location of the first entity. In some embodiments, the offer can be based on web search activity on the mobile device by the first entity. In many embodiments, the offer can be based on the current balance of the first account and bills that are due within a predetermined time period, such as the next 3 days, the next week, or another suitable time period. For example, if an invoice sent through real-time invoicing and payment is due in the next 3 days, or a bill that was not sent through real-time invoicing and payment but is known to the first financial institution to be paid every month is due in the next 3 days, and the current balance of the first account is insufficient to cover the bill, the first financial institution can offer a loan, such as a short-term micro-loan to cover the bill.

Figure 46:
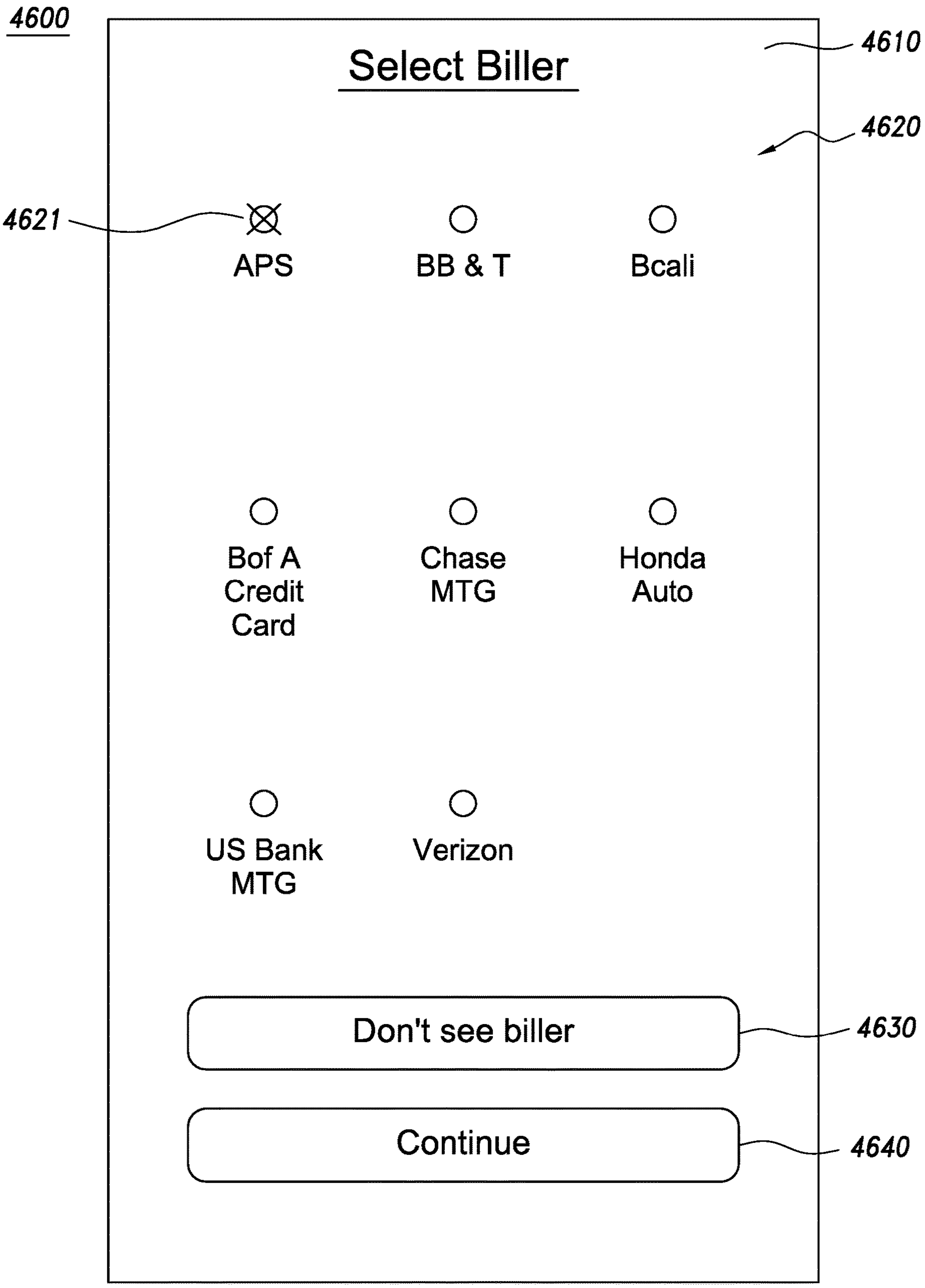
FIG. 46 illustrates an exemplary display screen to allow the customer to select a biller to which to send a payment, such as a native or unscheduled payment.

Turning ahead in the drawings, FIG. 46 illustrates an exemplary display screen 4600 to allow the customer (e.g., sender 1010 (FIG. 29)) to select a biller (e.g., 2980 (FIG. 29)) to which to send a payment, such as a native or unscheduled payment. Display screen 4600 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 4600.

Figure 48:
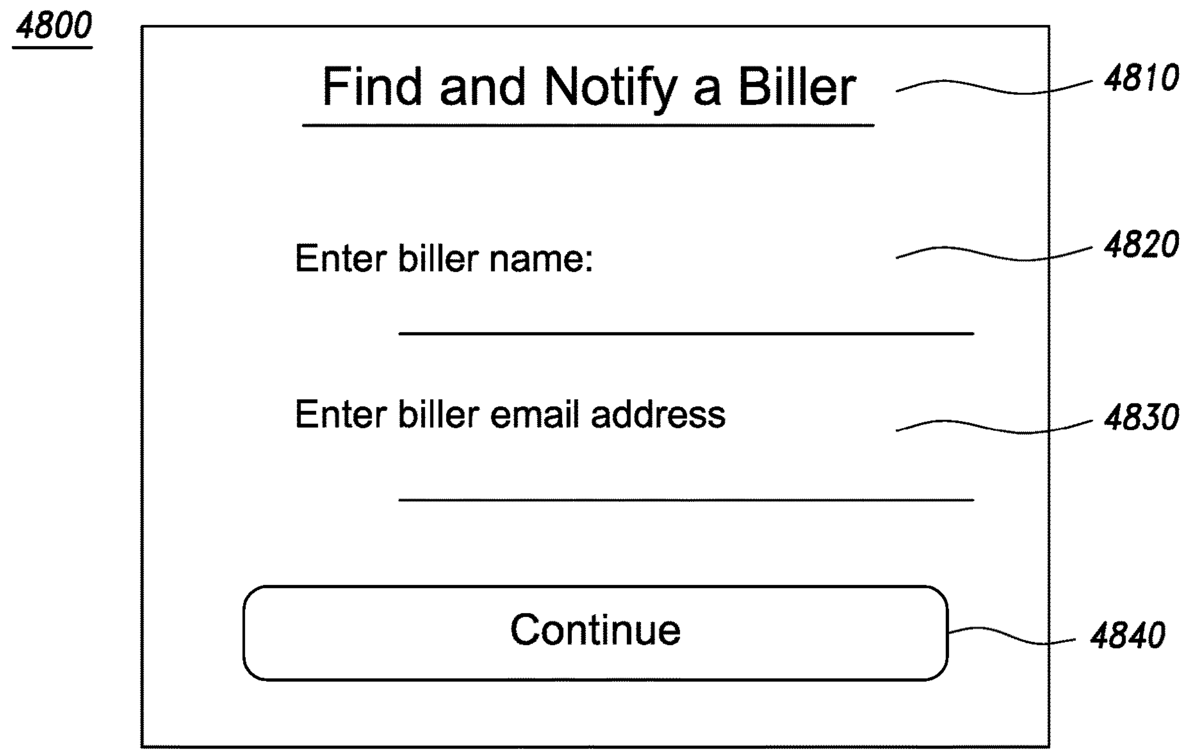
FIG. 48 illustrates an exemplary display screen to allow the customer to enter information about the biller or the bill to be paid.

In a number of embodiments, display screen 4600 can include a title bar 4610, a list of billers 4620, such as a biller 4621, and a first selection button 4630, and/or a second selection button 4640. In many embodiments, title bar 4610 can indicate in general terms the subject of the one or more actions that can be performed using the interface, such as "Select Biller." In various embodiments, list of billers 4620 can display the billers (e.g., 2980 (FIG. 29)) that have been paid historically through the customer account (e.g., sender account 1041 (FIG. 29)), and can allow sender 1010 (FIG. 29) to select one of those billers. In the same or other embodiments, list of billers 4620 can include billers (e.g., biller 2980 (FIG. 29)) that are in the proximity of the customer (e.g., sender 1010 (FIG. 29)). In many embodiments, sender 1010 (FIG. 29) can select one of the billers in list of billers 4620, such as biller 4621 (e.g., (APS (Arizona Public Service), as shown in FIG. 46). In several embodiments, first selection button 4630 can include a description of the action that is taken by selecting first selection button 4630, such as "Don't see biller," which can allow sender 1010 (FIG. 29) to indicate that the desired biller is not listed, which can result in sender 1010 (FIG. 29) being presented with a display screen to enter a biller, such as shown in FIG. 48, described below. In several embodiments, second selection button 4640 can include a description of the action that is taken by selecting second selection button 4640, such as "Continue," which can allow sender 1010 (FIG. 29) to proceed with the selection made in list of billers 4620.

In some embodiments, transaction system 2950 (FIG. 29) does not include a biller directory that links billers (e.g., 2980 (FIG. 29)) to their customers (e.g., sender 1010 (FIG. 29)), but the biller (e.g., 2980 (FIG. 29)) has already sent a request for payment previously to the customer (e.g., sender 1010 (FIG. 29)) through transaction system 2950 (FIG. 29). The bills and requests for payments are stored in transaction system 2950 (FIG. 29). As used herein, "native" can refer to a customer (e.g., sender 1010 (FIG. 29)) initiating a payment procedure other than by directly responding to a request for payment (e.g., invoice) received from the biller (e.g., 2980 (FIG. 29)). For example, a customer (e.g., sender 1010 (FIG. 29)) can use payment application 2931 (FIG. 29) to select "send/make a payment," such as by using selector 4010 (FIG. 40) of display screen 4000 (FIG. 40). The selection can be sent to transaction system 2950 (FIG. 29), which can retrieve a list of the billers that have previously sent bills or requests of payment (RFPs) to the customer (e.g., sender 1010 (FIG. 29)). The list of billers that have previously sent bills or requests of payment to the customer (e.g., sender 1010 (FIG. 29)) can be displayed to the customer (e.g., sender 1010 (FIG. 29)) in the payment application 2931 (FIG. 29). The customer (e.g., sender 1010 (FIG. 29)) can use the payment application 2931 (FIG. 29) to select the biller to be paid, such as biller 4621 identified as APS.

Figure 47:
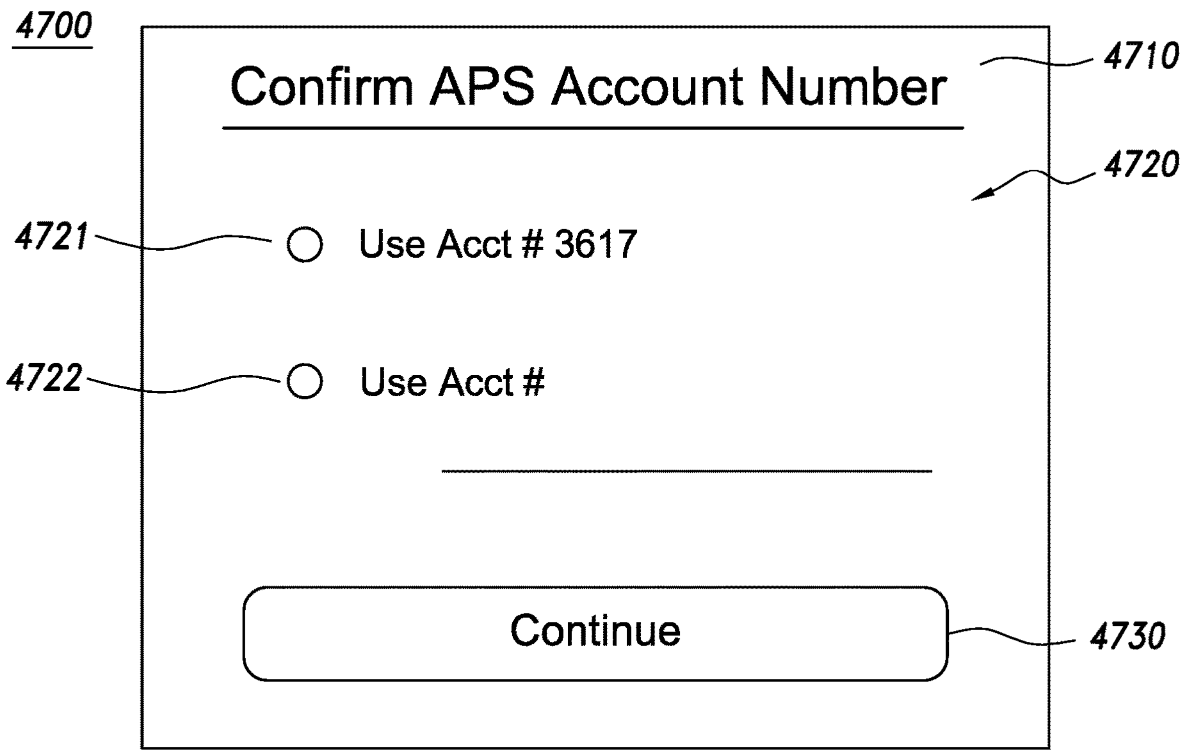
FIG. 47 illustrates an exemplary display screen to allow the customer to confirm or enter the customer account number at the biller to be used for the payment.

Turning ahead in the drawings, FIG. 47 illustrates an exemplary display screen 4700 to allow the customer (e.g., sender 1010 (FIG. 29)) to confirm or enter the customer account number at the biller to be used for the payment. Display screen 4700 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 4700. In many embodiments, after biller 4621 (FIG. 46) in display screen 4600 (F(G. 46), was selected, display screen 4700 can be displayed to allow the customer (e.g., sender 1010 (FIG. 29)) to enter information about the customer account at the biller to be paid.

In a number of embodiments, display screen 4700 can include a title bar 4710, a list of accounts 4720, and a selection button 4730. In many embodiments, title bar 4710 can indicate in general terms the subject of the one or more actions that can be performed using the interface, such as "Confirm APS Account Number." In various embodiments, list of accounts 4720 can display the accounts at the biller (e.g., 2980 (FIG. 29)) that have been paid historically through the customer account at financial institution 1040 (FIG. 29) (e.g., sender account 1041 (FIG. 29)), and can allow sender 1010 (FIG. 29) to select one of those accounts at the biller, such as an account 4721, which indicates a customer account at the biller ending in 3617. In the same or other embodiments, list of accounts 4720 can allow the customer (e.g., sender 1010 (FIG. 29)) to enter another customer account at the biller that is not listed, such as in account field 4722. In some embodiments, no customer accounts are listed in list of accounts 4720, and account field 4722 can be used to enter a customer account. In several embodiments, selection button 4730 can include a description of the action that is taken by selecting selection button 4730, such as "Continue," which can allow sender 1010 (FIG. 29) to proceed with the selection made in list of accounts 4720. In many embodiments, display screen 4700 can present the customer (e.g., sender 1010 (FIG. 29)) with the opportunity to confirm which customer account maintained at the biller is to be paid, in order to handle instances in which the customer (e.g., sender 1010 (FIG. 29)) has multiple accounts at the biller (e.g., 2980 (FIG. 29)). The customer account number that have been used previously used in requests for payment can be displayed in the payment application 2931 (FIG. 29) for confirmation, and the customer (e.g., sender 1010 (FIG. 29)) can be presented with the option to enter a different account number. The customer account number at the biller can be an account identifier that is used by the biller (e.g., 2980 (FIG. 29)) to identify the customer account maintained by the biller. For example, for biller APS, the customer (e.g., sender 1010 (FIG. 29)) can subscribe to electricity service, and the customer account can be the account that tracks the amount the customer (e.g., sender 1010 (FIG. 29)) owes for the electricity service.

Turning ahead in the drawings, FIG. 48 illustrates an exemplary display screen 4800 to allow the customer (e.g., sender 1010 (FIG. 29)) to enter information about the biller (e.g., 2980 (FIG. 29)) or the bill to be paid. Display screen 4800 is merely exemplary, and embodiments of the display screen are not limited to the embodiments presented herein. The display screen can be employed in many different embodiments or examples not specifically depicted or described herein, and can include other suitable elements. In many embodiments, the interface provided by transaction system 2950 (FIG. 29) that is displayed on sender system 1020 (FIG. 29) can include display screen 4800.

In a number of embodiments, display screen 4800 can include a title bar 4810, a biller name field 4820, a biller contact field 4830, and a selection button 4840. In many embodiments, title bar 4810 can indicate in general terms the subject of the one or more actions that can be performed using the interface, such as "Find and Notify a Biller." In various embodiments, biller name field 4820 can allow the customer (e.g., sender 1010 (FIG. 29)) to enter a name of a biller to pay. In several embodiments, biller contact field 4830 can allow the customer (e.g., sender 1010 (FIG. 29)) to enter contact information for the biller to pay, such as an email address or other suitable contact information. In several embodiments, selection button 4840 can include a description of the action that is taken by selecting selection button 4840, such as "Continue," which can allow sender 1010 (FIG. 29) to proceed with the information entered in biller name field 4820 and biller contact field 4830. In many embodiments, display screen 4800 can present the customer (e.g., sender 1010 (FIG. 29)) with the opportunity to enter a biller, such as "AT&T," and can enter the email address of the biller. In some embodiments, the customer (e.g., sender 1010 (FIG. 29)) can enter the account number of the customer account maintained by the biller. In yet other embodiments, the customer account number can be entered using a separate display screen such as display screen 4700 (FIG. 47). In other embodiments, the customer (e.g., sender 1010 (FIG. 29)) can scan a paper bill that was received from the biller, from which the biller, biller contact information, and/or customer account number at the biller can be determined. In many embodiments, after sender 1010 (FIG. 29)) selects selection button 4840, transaction system 2950 (FIG. 29) can send a message to the biller (e.g., 2980 (FIG. 29)) notifying the biller (e.g., 2980 (FIG. 29)) that the customer (e.g., sender 1010 (FIG. 29)) would like to pay the biller (e.g., 2980 (FIG. 29)) through transaction system 2950 (FIG. 29). The biller (e.g., 2980 (FIG. 29)) can then enroll as a biller in transaction system 2950 (FIG. 29), as described above. Once the biller is enrolled, the payment can be made similar to making a native payment to other enrolled billers, as described above and below in further detail.

In many embodiments, once the customer account identifier is selected, the customer (e.g., sender 1010 (FIG. 29)) can enter a payment amount, which can be similar to display screen 3600 (FIG. 36), described above. In some embodiments, the customer (e.g., sender 1010 (FIG. 29)) can then be presented with a review screen (not shown) on the payment application 2931 (FIG. 29) to confirm the payment to the biller (e.g., 2980 (FIG. 29)) for the selected payment amount. After the customer (e.g., sender 1010 (FIG. 29)) has confirmed the payment amount through the payment application 2931 (FIG. 29) and after the customer (e.g., sender 1010 (FIG. 29)) has authorized the transaction (e.g., confirmed a preauthorization), transaction system 2950 (FIG. 29) can send a request to the biller (e.g., 2980 (FIG. 29)) to invoke a request for payment (e.g., invoice). In a number of embodiments, the biller (e.g., 2980 (FIG. 29)) can send the request for payment to transaction system 2950 (FIG. 29). The request for payment can include the payment amount, the account information, and/or other suitable information. In cases in which a request for payment was sent previously to transaction system 2950 (FIG. 29), the biller (e.g., 2980 (FIG. 29)) can send a second request for payment. In cases in which no request for payment was previously sent, the request for payment sent from the biller (e.g., 2980 (FIG. 29)) can be a first RFP sent to transaction system 2950 (FIG. 29) for this bill. In several embodiments, the request for payment can include billing details that can be beneficial to transaction system 2950 (FIG. 29) in preventing fraudulent transactions. In many embodiments, transaction system 2950 (FIG. 29) can facilitate the payment being made in real-time from an account (e.g., sender account 1041 (FIG. 29)) of the customer (e.g., sender 1010 (FIG. 29)) at first financial institution 1040 (FIG. 29) to an account (e.g., recipient account 1062 (FIG. 29) and/or billing account 1061 (FIG. 29)) of the biller (e.g., 2980 (FIG. 29)) at second financial institution 1060 (FIG. 29), as described above in further detail. In many embodiments, the request for payment invoked by transaction system 2950 (FIG. 29) after receiving the authorization from the customer (e.g., sender 1010 (FIG. 29)) can be performed "behind the scenes," such that payment proceeds without the customer (e.g., sender 1010 (FIG. 29)) being presented with the request for payment or receiving an additional authorization from the customer (e.g., sender 1010 (FIG. 29)) beyond the preauthorization received before transaction system 2950 (FIG. 29) received the request for payment that was invoked by transaction system 2950 (FIG. 29). Once the payment has been made, the payment application 2931 (FIG. 29) can display a notification that the payment has completed successfully, which can be similar to display screen 3900 (FIG. 39) and/or display screen 4000 (FIG. 40).

In many embodiments, the invocation from transaction system 2950 (FIG. 29) to the biller (e.g., 2980 (FIG. 29)) for the request for payment can be received at the biller (e.g., 2980 (FIG. 29)) with information, such as information that a customer, e.g., Bob Jones, wants to pay a bill for a payment amount, e.g., $1,435.00. In many embodiments, the invocation can include a token of the customer (e.g., sender 1010 (FIG. 29)), such as the email address or phone number of the customer (e.g., sender 1010 (FIG. 29)), which can be used by the biller (e.g., 2980 (FIG. 29)) to assist in identifying the customer (e.g., sender 1010 (FIG. 29)). In a number of embodiments, the biller (e.g., 2980 (FIG. 29)) can look up the customer (e.g., sender 1010 (FIG. 29)), such as by using the token (e.g., email or phone number) of the customer (e.g., sender 1010 (FIG. 29)), and determine the bill to which the payment should be applied. In several embodiments, the biller (e.g., 2980 (FIG. 29)) can perform various checks to ensure that the customer account maintained by the biller is open and not delinquent. In several embodiments, the biller (e.g., 2980 (FIG. 29)) can determine information to enable the payment to be posted to the customer account maintained by the biller, and this information can be added to the request for payment generated by the biller (e.g., 2980 (FIG. 29)). For example, the information can include the account number of the customer account maintained by the biller, an invoice number, a purchase order number, an amount due, a due date, a discount if paid by a certain time, other promotional information, adjustments, taxes, and/or other suitable information.

In a number of embodiments, the biller (e.g., 2980 (FIG. 29)) can send the request for payment to transaction system 2950 (FIG. 29). In many embodiments, transaction system 2950 (FIG. 29) can facilitate the payment being made in real-time from an account (e.g., sender account 1041 (FIG. 29)) of the customer (e.g., sender 1010 (FIG. 29)) at first financial institution 1040 (FIG. 29) to an account (e.g., recipient account 1062 (FIG. 29), billing account 1061 (FIG. 29)) of the biller at second financial institution 1060 (FIG. 29), as described above in further detail. As described above, in many embodiments, the request for payment invoked by transaction system 2950 (FIG. 29) after receiving the authorization from the customer (e.g., sender 1010 (FIG. 29)) can be performed "behind the scenes," such that the customer (e.g., sender 1010 (FIG. 29)) is not presented with the request for payment. Once the payment has been made and the funds are received by the biller (e.g., 2980 (FIG. 29)), the biller (e.g., 2980 (FIG. 29)) can apply the payment to the customer account maintained by the biller, and/or can display that the payment has been received by the biller (e.g., 2980 (FIG. 29)), such as on a biller website or a biller application that displays information about the customer account maintained by the biller when the customer (e.g., sender 1010 (FIG. 29)) logs in to the biller website of biller application.

Figure 49:
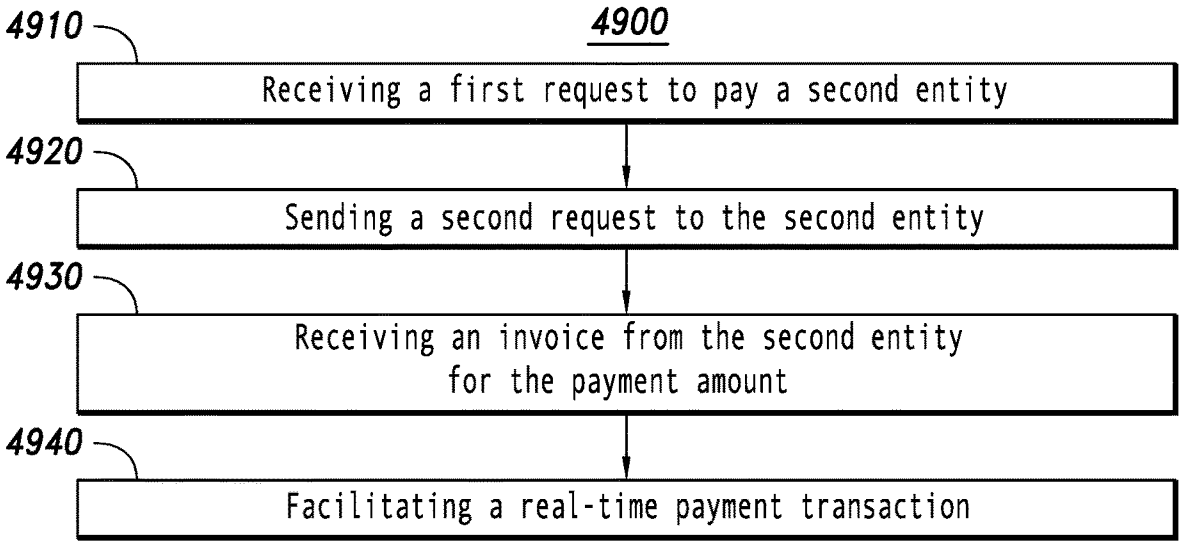
FIG. 49 illustrates a flow chart for a method, according to another embodiment.

Turning ahead in the drawings, FIG. 49 illustrates a flow chart for a method 4900, according to an embodiment. Method 4900 is merely exemplary and is not limited to the embodiments presented herein. Method 4900 can be employed in many different embodiments or examples not specifically depicted or described herein. In some embodiments, the procedures, the processes, and/or the activities of method 4900 can be performed in the order presented. In other embodiments, the procedures, the processes, and/or the activities of method 4900 can be performed in any suitable order. In still other embodiments, one or more of the procedures, the processes, and/or the activities of method 4900 can be combined or skipped. In many embodiments, method 4900 can be a method of providing secure electronic billing with real-time funds availability. In some embodiments, method 4900 can be performed by transaction system 2950 (FIG. 29). In some embodiments, method 4900 and other blocks in method 4900 can include using a distributed network including distributed memory architecture to perform the associated activity. This distributed architecture can reduce the impact on the network and system resources to reduce congestion in bottlenecks while still allowing data to be accessible from a central location.

Referring to FIG. 49, method 4900 can include a block 4910 of receiving, from a first entity, a first request to pay a second entity. The first entity can be similar or identical to sender 1010 (FIG. 29). The second entity can be similar or identical to biller 2980 (FIG. 29). In some embodiments, the first entity can be a payor that is subject to a financial obligation to the second entity. In a number of embodiments, the first request can include an account identifier of an account of the first entity at the second entity, a payment amount, and a preauthorization by the first entity to pay the payment amount the second entity. The account of the first entity at the second entity can be similar or identical to the customer account at the biller described above. The preauthorization by the first entity to pay the second entity can be an authorization by the customer to pay the biller without further authorization from the customer and, despite the customer not having received an invoice from the biller associated with the first request to pay the biller.

In some embodiments, the first request can be received in a single communication from the first entity. In other embodiments, the first request can be received in multiple communications from the first entity.

In many embodiments, the first request can be a native payment request. In some embodiments, the first entity can be devoid of having received any invoices from the second entity through the system.

In a number of embodiments, the first entity can have received one or more prior invoices from the second entity through the system. In several of these embodiments, however, the payment amount of the first request can be different from the invoice amount(s) of the prior invoice(s).

In a number of embodiments, method 4900 also can include a block 4920 of sending a second request to the second entity based on the first request. For example, the second request can include the account identifier of the account of the first entity at the second entity, the payment amount, and the first entity's preauthorization to pay the second entity for the payment amount. In many embodiments, the first request can include a public identifier of the first entity. In many embodiments, the public identifier of the first entity can be a token, such as an email address or a phone number of the first entity, which can be used by the second entity to identify the first entity. In several embodiments, the second request can be a request from the second entity to invoke a request for payment (or an invocation of an invoice) of the payment amount that is directed to the first entity.

In several embodiments, method 4900 additionally can include a block 4930 of receiving, from the second entity, an invoice for the first entity for the payment amount. The invoice can be a request for payment from the second entity directed to the first entity.

In many embodiments, the invoice can be similar or identical to the invoices described above, such as the invoice message shown in display screen 3200 (FIG. 32), display screen 3300 (FIG. 33), display screen 3400 (FIG. 34), and/or display screen 3500 (FIG. 35). In many embodiments, the invoice can originate from the second entity. In a number of embodiments, however, the invoice can be a "behind the scenes" invoice that is not sent to the first entity.

In a number of embodiments, method 4900 further can include a block 4940 of facilitating a real-time payment transaction from a first account of the first entity at a first financial institution to a second account of the second entity at a second financial institution without transmitting the invoice to the first entity, without receiving an authorization from the first entity after receiving the invoice from the second entity, and based on the preauthorization of the first request. In a number of embodiments, the first entity has enrolled the first account of the first entity at a first financial institution in real-time payment transactions. The first account can be similar or identical to sender account 1041 (FIG. 29). The first financial institution can be similar or identical to sending participant 1040 (FIG. 29). The second account can be similar or identical to billing account 1061 (FIG. 29) and/or recipient account 1062 (FIG. 29). The second financial institution can be similar or identical to receiving participant 1060 (FIG. 29). In several embodiments, the first financial institution can be different from the second financial institution.

In some embodiments, the real-time payment transaction can involve a promise-to-pay message sent to the second financial institution from the first financial institution after a successful debit of the first account for the payment amount. In many embodiments, the second financial institution can perform a successful credit for the payment amount to the second account to make funds available in the second account in real-time after the preauthorization from the first entity. In several embodiments, the real-time payment transaction can be credited to the account of the first entity at the second entity in real-time after the preauthorization from the first entity based on the successful credit for the payment amount to the second account.

In a number of embodiments, the first financial institution can maintain a first settlement account. The first settlement account can be similar or identical to sending participant settlement account 1042 (FIGS. 10-17). In a number of embodiments, the first settlement account can be credited to account for the successful debit of the first account maintained by the first financial institution, such as in activity 1146 (FIGS. 11-12, 14, 16-17).

In several embodiments, the second financial institution can maintain a second settlement account. The second settlement account can be similar or identical to receiving participant settlement account 1063 (FIGS. 10-17). The second settlement account can be debited to account for the successful credit of the second account maintained by the second financial institution, such as in activity 1166 (FIGS. 11-12, 14, 16-17).

In a number of embodiments, funds can be transferred from the first settlement account to the second settlement account in a settlement completion. The settlement completion can be similar or identical to activities 1191 (FIGS. 11-12), 1192 (FIGS. 11-12), and/or 1491 (FIGS. 14, 16-17). In some embodiments, the settlement completion can be part of a net settlement as a single item ACH. In other embodiments, the settlement completion can be part of a net settlement as part of a batch ACH. In yet other embodiments, the settlement completion can be part of a net settlement as part of a wire advice file. In some embodiments, the successful credit of the second account maintained by the second financial institution can involve a hard credit to the second account in real-time after the payment authorization time. In various embodiments, the settlement completion can involve the funds being transferred through a third settlement account of a payment processor. The third settlement account can be similar or identical to payment processor settlement account 1033 (FIGS. 10-12). In some embodiments, the settlement completion can occur in real-time after the payment authorization time.

Returning in the drawings to FIG. 29, as described above, transaction system 2950 can include one or more systems, such as communications system 2952 and/or data system 2953, which can perform various functions of transaction system 2950. In many embodiments, the systems of transaction system 2950 can be implemented in software, hardware, or a combination of software and hardware. Communications system 2952 can be similar or identical to communications system 2851 (FIG. 28), and various functions performed by communications system 2952 can perform similar or identical to various functions performed by communications system 2851 (FIG. 28). Data system 2953 can be similar or identical to data system 2852 (FIG. 28), and various functions performed by data system 2953 can perform similar or identical to various functions performed by data system 2852 (FIG. 28).

In many embodiments, communications system 2952 can at least partially perform block 4310 (FIG. 43) of receiving a request from a second financial institution to determine whether any accounts held by a first entity support real-time payment transactions, block 4330 (FIG. 43) of validating that one or more third accounts held by the first entity support real-time payment transactions, block 4350 (FIG. 43) of sending an interactive invoice to the first entity, block 4360 (FIG. 43) of receiving an authorization from the first entity to pay the invoice immediately using at least one of the one or more third accounts, block 4370 (FIG. 43) of facilitating a real-time payment transaction from the at least one of the one or more third accounts maintained by the one or more first financial institutions to the second account maintained by the second financial institution, block 4410 (FIG. 44) of sending a response to the second financial institution indicating that one or more accounts held by the first entity support real-time payment transactions, block 4420 (FIG. 44) of sending an enrollment message to the first entity that invites the first entity to enroll in real-time payment transactions, block 4430 (FIG. 44) of receiving enrollment information from the first entity to enroll the first entity in real-time payment transactions, block 4510 (FIG. 45) of receiving a request to register a second entity under a certified biller status using a second account maintained at a second financial institution, block 4530 (FIG. 45) of providing, to a first entity, first information that identifies the second entity as satisfying the certified biller status, block 4540 (FIG. 45) of receiving an authorization from the first entity to pay an invoice using the first account, block 4550 (FIG. 45) of facilitating a real-time payment transaction from the first account maintained by the first financial institution to the second account maintained by the second financial institution, block 4560 (FIG. 45) of receiving a current location of the first entity, block 4570 (FIG. 45) of receiving a current balance of the first account, block 4580 (FIG. 45) of providing, to the first entity, an offer for a loan that is based on the current location of the first entity, block 4910 (FIG. 49) of receiving, from a first entity, a first request to pay a second entity, block 4920 (FIG. 49) of sending a second request to the second entity based on the first request, block 4930 (FIG. 49) of receiving, for the second entity, an invoice for the first entity for the payment amount, and/or block 4940 (FIG. 49) of facilitating a real-time payment transaction from a first account of the first entity at a first financial institution to a second account of the second entity at a second financial institution without transmitting the invoice to the first entity, without receiving an authorization from the first entity to pay the invoice or the payment amount to the second entity after receiving the invoice from the second entity, and based on the preauthorization of the first request.

In a number of embodiments, data system 2953 can interface with directory 2951 to access information stored within transaction system 2950. In several embodiments, data system 2953 can at least partially perform block 4320 (FIG. 43) of determining one or more first accounts held by the first entity using a directory and the identifier of the first entity, block 4330 (FIG. 43) of validating that one or more third accounts held by the first entity support real-time payment transactions, block 4370 (FIG. 43) of facilitating a real-time payment transaction from the at least one of the one or more third accounts maintained by the one or more first financial institutions to the second account maintained by the second financial institution, block 4440 (FIG. 44) of storing in the directory a profile of a device used by the first entity to enroll in real-time payment transactions, block 4520 (FIG. 45) of registering the second entity under the certified biller status after receiving confirmation that the public identifier corresponds to the second entity and that the second account is held by the second entity, block 4550 (FIG. 45) of facilitating a real-time payment transaction from the first account maintained by the first financial institution to the second account maintained by the second financial institution block 4920 (FIG. 49) of sending a second request to the second entity based on the first request, and/or block 4940 (FIG. 49) of facilitating a real-time payment transaction from a first account of the first entity at a first financial institution to a second account of the second entity at a second financial institution without transmitting the invoice to the first entity, without receiving an authorization from the first entity to pay the invoice or the payment amount to the second entity after receiving the invoice from the second entity, and based on the preauthorization of the first request.

Various embodiments include a method to facilitate determining an availability of funds for a payment item. The method can include providing a processing mechanism in data communication through a network with a first entity and a plurality of depository financial institutions. The plurality of depository financial institutions can include a second entity. The method also can include receiving a first inquiry at the processing mechanism through the network from the first entity. The first inquiry can be received from the first entity in real-time after the first entity receives the payment item. The method further can include storing the first inquiry received from the first entity. The method additionally can include sending a second inquiry from the processing mechanism through the network to the second entity in real-time after receiving the first inquiry. The second inquiry can be based at least in part on the first inquiry. The method further can include receiving a first response at the processing mechanism through the network from the second entity. The first response can be sent by the second entity in real-time in response to receiving the second inquiry. The method additionally can include storing the first response received from the second entity. The method further can include sending a second response from the processing mechanism through the network to the first entity in real-time after receiving the first response. The second response can be based at least in part on the first response. The second entity can be specified by the payment item as being responsible for paying the payment item. The first entity can be different from the second entity. The first and second responses each can include a payment likelihood indicator provided by the second entity that indicates a likelihood of the second entity to pay the payment item. The payment likelihood indicator can be based at least in part on a current status and a current available balance of an account maintained by the second entity that is specified by the payment item for payment of the payment item.

A number of embodiments include a system to facilitate determining an availability of funds for a payment item. The system can include one or more processing modules in data communication through a network with a first entity and a plurality of depository financial institutions. The plurality of depository financial institutions can include a second entity. The system also can include one or more non-transitory memory storage modules storing computing instructions configured to run on the one or more processing modules and perform one or more acts. The one or more acts can include receiving a first inquiry at the processing mechanism through the network from the first entity. The first inquiry can be received from the first entity in real-time after the first entity receives the payment item. The one or more acts also can include storing the first inquiry received from the first entity. The one or more acts additionally can include sending a second inquiry from the processing mechanism through the network to the second entity in real-time after receiving the first inquiry. The second inquiry can be based at least in part on the first inquiry. The one or more acts further can include receiving a first response at the processing mechanism through the network from the second entity. The first response can be sent by the second entity in real-time in response to receiving the second inquiry. The one or more acts additionally can include storing the first response received from the second entity. The one or more acts further can include sending a second response from the processing mechanism through the network to the first entity in real-time after receiving the first response. The second response can be based at least in part on the first response. The second entity can be specified by the payment item as being responsible for paying the payment item. The first entity can be different from the second entity. The first and second responses each can include a payment likelihood indicator provided by the second entity that indicates a likelihood of the second entity to pay the payment item. The payment likelihood indicator can be based at least in part on a current status and a current available balance of an account maintained by the second entity that is specified by the payment item for payment of the payment item.

Some embodiments can include a method to facilitate determining an availability of funds for a payment item. The method can be implemented via execution of computer instructions configured to run at one or more processing modules and configured to be stored at one or more non-transitory memory storage modules. The method can include receiving a first inquiry through a network from a first entity. The first inquiry can be received from the first entity in real-time after the first entity receives the payment item. the method also can include determining a routing decision of whether or not to route the first inquiry to a second entity. The second entity can be a depository financial institution that is specified by the payment item as responsible for paying the payment item. The routing decision can be based at least in part on a risk of non-payment of the payment item by the second entity. The method further can include, if the routing decision is to not route the first inquiry to the second entity, sending a first response through the network to the first entity in real-time after receiving the first inquiry. The method additionally can include, if the routing decision is to route the first inquiry to the second entity, sending a second inquiry through the network to the second entity in real-time after receiving the first inquiry. The second inquiry can be based at least in part on the first inquiry. The method further can include, if the routing decision is to route the first inquiry to the second entity, receiving a second response through the network from the second entity. The second response can be sent by the second entity in real-time in response to receiving the second inquiry. The method additionally can include, if the routing decision is to route the first inquiry to the second entity, storing the second response received from the second entity. The method further can include, if the routing decision is to route the first inquiry to the second entity, sending a third response through the network to the first entity in real-time after receiving the second response. The third response can be based at least in part on the second response. The first entity can be different from the second entity.

Many embodiments can include a system to facilitate determining an availability of funds for a payment item. The system can include one or more processing modules in data communication through a network with a first entity and a second entity. The system also can include one or more non-transitory memory storage modules storing computing instructions configured to run on the one or more processing modules and perform one or more acts. The one or more acts can include receiving a first inquiry through a network from a first entity. The first inquiry can be received from the first entity in real-time after the first entity receives the payment item. the one or more acts also can include determining a routing decision of whether or not to route the first inquiry to a second entity. The second entity can be a depository financial institution that is specified by the payment item as responsible for paying the payment item. The routing decision can be based at least in part on a risk of non-payment of the payment item by the second entity. The one or more acts further can include, if the routing decision is to not route the first inquiry to the second entity, sending a first response through the network to the first entity in real-time after receiving the first inquiry. The one or more acts additionally can include, if the routing decision is to route the first inquiry to the second entity, sending a second inquiry through the network to the second entity in real-time after receiving the first inquiry. The second inquiry can be based at least in part on the first inquiry. The one or more acts further can include, if the routing decision is to route the first inquiry to the second entity, receiving a second response through the network from the second entity. The second response can be sent by the second entity in real-time in response to receiving the second inquiry. The one or more acts additionally can include, if the routing decision is to route the first inquiry to the second entity, storing the second response received from the second entity. The one or more acts further can include, if the routing decision is to route the first inquiry to the second entity, sending a third response through the network to the first entity in real-time after receiving the second response. The third response can be based at least in part on the second response. The first entity can be different from the second entity.

Further embodiments can include a method to facilitate determining an availability of funds for a payment item. The method can be implemented via execution of computer instructions configured to run at one or more processing modules and configured to be stored at one or more non-transitory memory storage modules. The method can include receiving at least hourly updated account data comprising current statuses and current available balances of accounts maintained by one or more depository financial institutions. The method also can include receiving an inquiry through a network from a first entity. The inquiry can be received from the first entity in real-time after the first entity receives the payment item. The payment item can specify a second entity as responsible for paying the payment item. The payment item can specify an account maintained by the second entity for payment of the payment item. The one or more depository financial institutions can include the second entity. The method additionally can include determining a payment likelihood indicator based at least in part on a status and an available balance of the account as updated by the updated account data. The payment likelihood indicator can indicate a likelihood of the second entity to pay the payment item. The method further can include storing the payment likelihood indicator. The method additionally can include sending a response through the network to the first entity in real-time after receiving the inquiry. The response can include the payment likelihood indicator. The first entity can be different from the second entity.

In certain embodiments of the method, the payment item can include a check. The first entity can be a depository financial institution receiving the check for deposit. The second entity can be a depository financial institution against which the check has been drawn.

In certain embodiments of the method, the payment item can include an ACH item. The first entity can be an originating depository financial institution. The second entity can be a receiving depository financial institution. In some embodiments, the first entity can be a processor or a third party acting on behalf of the originating depository financial institution. In a number of embodiments, the second entity can be a processor or a third party acting on behalf of the receiving depository financial institution.

In certain embodiments of the method, the inquiry can include a routing number of the second entity that is specified by the payment item; an account number of the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and if the payment item is a check, a serial number of the check.

In certain embodiments of the method, the payment likelihood indicator in the response can include an indication of whether or not the second entity guarantees payment of the payment item.

In certain embodiments of the method, the payment likelihood indicator in the response can include a score.

In certain embodiments of the method, the response further can include one or more reason indicators to explain the payment likelihood indicator.

In certain embodiments of the method, the response can be sent within 30 seconds of receiving the inquiry. The payment item can include one of a check or an ACH item.

Still further embodiments can include a system to facilitate determining an availability of funds for a payment item. The system can include one or more processing modules in data communication through a network with a first entity and one or more depository financial institutions. The one or more depository financial institutions can include a second entity. The system also can include one or more non-transitory memory storage modules storing computing instructions configured to run on the one or more processing modules and perform one or more acts. The one or more acts can include receiving at least hourly updated account data comprising current statuses and current available balances of accounts maintained by one or more depository financial institutions. The one or more acts also can include receiving an inquiry through a network from a first entity. The inquiry can be received from the first entity in real-time after the first entity receives the payment item. The payment item can specify a second entity as responsible for paying the payment item. The payment item can specify an account maintained by the second entity for payment of the payment item. The one or more depository financial institutions can include the second entity. The one or more acts additionally can include determining a payment likelihood indicator based at least in part on a status and an available balance of the account as updated by the updated account data. The payment likelihood indicator can indicate a likelihood of the second entity to pay the payment item. The one or more acts further can include storing the payment likelihood indicator. The one or more acts additionally can include sending a response through the network to the first entity in real-time after receiving the inquiry. The response can include the payment likelihood indicator. The first entity can be different from the second entity.

In certain embodiments of the system, the payment item can include a check. The first entity can be a depository financial institution receiving the check for deposit. The second entity can be a depository financial institution against which the check has been drawn.

In certain embodiments of the system, the payment item can include an ACH item. The first entity can be an originating depository financial institution. The second entity can be a receiving depository financial institution.

In certain embodiments of the system, the inquiry can include a routing number of the second entity that is specified by the payment item; an account number of the second entity that is specified by the payment item; a payment amount that is specified by the payment item; an identifier of the first entity; a transaction channel identifier that indicates the channel through which a transacting entity presented the payment item to the first entity; a payment distribution method identifier that indicates how the transacting entity requested to be paid for the payment item by the first entity; an account number of the first entity associated with the transacting entity; and if the payment item is a check, a serial number of the check.

In certain embodiments of the system, the payment likelihood indicator in the response can include an indication of whether or not the second entity guarantees payment of the payment item.

In certain embodiments of the system, the payment likelihood indicator in the response can include a score.

In certain embodiments of the system, the response further can include one or more reason indicators to explain the payment likelihood indicator.

In certain embodiments of the system, the response can be sent within 30 seconds of receiving the inquiry. The payment item can include one of a check or an ACH item.

In various embodiments, a system includes one or more processing modules and one or more non-transitory memory storage modules storing computing instructions configured to run on the one or more processing modules and perform certain acts. The acts can include receiving a first promise-to-pay message at a transaction system. The first promise-to-pay message can be based on a successful debit of a first account maintained by a first financial institution. The successful debit of the first account can be based on a bill payment authorization made by a sender at a payment authorization time. The first account can be held by the sender. The acts also can include storing the first promise-to-pay message in the transaction system. The acts additionally can include sending a second promise-to-pay message from the transaction system to a second financial institution. The second promise-to-pay message can be based on the first promise-to-pay message, such that the second financial institution credits a second account maintained by the second financial institution to make funds available in the second account in real-time after the payment authorization time. The sender can be financially liable for the second account. The acts further can include receiving a first response at the transaction system from the second financial institution indicating a successful credit of the second account maintained by the second financial institution. The acts additionally can include storing the first response in the transaction system. The acts further can include sending a second response from the transaction system indicating the successful credit of the second account maintained by the second financial institution to inform at least the sender in real-time after the payment authorization time of the successful credit of the second account maintained by the second financial institution. The first financial institution can be different from the second financial institution.

In a number of embodiments, a method can be implemented via execution of computer instructions configured to run at one or more processing modules and configured to be stored at one or more non-transitory memory storage modules. The method can include receiving a first promise-to-pay message at a transaction system. The first promise-to-pay message can be based on a successful debit of a first account maintained by a first financial institution. The successful debit of the first account can be based on a bill payment authorization made by a sender at a payment authorization time. The first account can be held by the sender. The method also can include storing the first promise-to-pay message in the transaction system. The method additionally can include sending a second promise-to-pay message from the transaction system to a second financial institution. The second promise-to-pay message can be based on the first promise-to-pay message, such that the second financial institution credits a second account maintained by the second financial institution to make funds available in the second account in real-time after the payment authorization time. The sender can be financially liable for the second account. The method further can include receiving a first response at the transaction system from the second financial institution indicating a successful credit of the second account maintained by the second financial institution. The method additionally can include storing the first response in the transaction system. The method further can include sending a second response from the transaction system indicating the successful credit of the second account maintained by the second financial institution to inform at least the sender in real-time after the payment authorization time of the successful credit of the second account maintained by the second financial institution. The first financial institution can be different from the second financial institution.

In various embodiments, a system includes one or more processing modules and one or more non-transitory memory storage modules storing computing instructions configured to run on the one or more processing modules and perform certain acts. The acts can include sending a debit message from a transaction system to a first financial institution to debit a first account maintained by the first financial institution based on a bill payment authorization made by a sender at a payment authorization time. The first account can be held by the sender. The acts also can include receiving a debit response at the transaction system from the first financial institution in real-time after the payment authorization time. The debit response can indicate a successful debit of the first account maintained by the first financial institution. The acts additionally can include storing the debit response in the transaction system. The acts further can include sending a first response to an application service provider indicating the successful debit of the first account maintained by the first financial institution, such that the application service provider sends a promise-to-pay message to a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The sender can be financially liable for the second account. The first financial institution can be different from the second financial institution. The application service provider can be the same entity as the second financial institution.

In a number of embodiments, a method can be implemented via execution of computer instructions configured to run at one or more processing modules and configured to be stored at one or more non-transitory memory storage modules. The method can include sending a debit message from a transaction system to a first financial institution to debit a first account maintained by the first financial institution based on a bill payment authorization made by a sender at a payment authorization time. The first account can be held by the sender. The method also can include receiving a debit response at the transaction system from the first financial institution in real-time after the payment authorization time. The debit response can indicate a successful debit of the first account maintained by the first financial institution. The method additionally can include storing the debit response in the transaction system. The method further can include sending a first response to an application service provider indicating the successful debit of the first account maintained by the first financial institution, such that the application service provider sends a promise-to-pay message to a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The sender can be financially liable for the second account. The first financial institution can be different from the second financial institution. The application service provider can be the same entity as the second financial institution.

In various embodiments, a system includes one or more processing modules and one or more non-transitory memory storage modules storing computing instructions configured to run on the one or more processing modules and perform certain acts. The acts can include receiving a debit message at a first financial institution to debit a first account maintained by the first financial institution based on a bill payment authorization for a payment amount made by a sender at a payment authorization time. The first account can be held by the sender. The acts also can include performing a successful debit for the payment amount from the first account maintained by the first financial institution in real-time after the payment authorization time. The acts additionally can include sending a debit response from the first financial institution in real-time after the payment authorization time. The debit response can indicate the successful debit of the first account maintained by the first financial institution, such that an application service provider sends a first promise-to-pay message for a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The sender can be financially liable for the second account. The first financial institution can be different from the second financial institution.

In a number of embodiments, a method can be implemented via execution of computer instructions configured to run at one or more processing modules and configured to be stored at one or more non-transitory memory storage modules. The method can include receiving a debit message at a first financial institution to debit a first account maintained by the first financial institution based on a bill payment authorization for a payment amount made by a sender at a payment authorization time. The first account can be held by the sender. The method also can include performing a successful debit for the payment amount from the first account maintained by the first financial institution in real-time after the payment authorization time. The method additionally can include sending a debit response from the first financial institution in real-time after the payment authorization time. The debit response can indicate the successful debit of the first account maintained by the first financial institution, such that an application service provider sends a first promise-to-pay message for a second financial institution to credit a second account maintained by the second financial institution to make funds available in the second account in real-time after the payment authorization time, and such that the application service provider informs the sender in real-time after the payment authorization time of a successful credit of the second account maintained by the second financial institution. The sender can be financially liable for the second account. The first financial institution can be different from the second financial institution.

In various embodiments, a system includes one or more processing modules and one or more non-transitory memory storage modules storing computing instructions configured to run on the one or more processing modules and perform certain acts. The acts can include providing a payment application to a sender from an application service provider. The acts also can include receiving a bill payment authorization from the sender through the payment application. The bill payment authorization can be made by the sender at a payment authorization time. The acts additionally can include sending a first debit message from the application service provider to debit a first account maintained by a first financial institution based on the bill payment authorization. The first account can be held by the sender. The acts further can include receiving a first debit response at the application service provider in real-time after the payment authorization time. The debit response can indicated a successful debit of the first account maintained by the first financial institution. The acts additionally can include generating a first promise-to-pay message for a second financial institution to credit a second account maintained by the second financial institution to make funds available in the second account in real-time after the payment authorization time. The sender can be financially liable for the second account. The first promise-to-pay message can be based on the successful debit of the first account maintained by the first financial institution. The acts further can include sending the first promise-to-pay message. The acts additionally can include receiving a first response at the application service provider indicating a successful credit of the second account maintained by the second financial institution. The acts further can include sending a notification to the sender from the application service provider in real-time after the payment authorization time of the successful credit of the second account maintained by the second financial institution. The first financial institution can be different from the second financial institution.

In a number of embodiments, a method can be implemented via execution of computer instructions configured to run at one or more processing modules and configured to be stored at one or more non-transitory memory storage modules. The method can include receiving a bill payment authorization from the sender through the payment application. The bill payment authorization can be made by the sender at a payment authorization time. The acts additionally can include sending a first debit message from the application service provider to debit a first account maintained by a first financial institution based on the bill payment authorization. The first account can be held by the sender. The acts further can include receiving a first debit response at the application service provider in real-time after the payment authorization time. The debit response can indicated a successful debit of the first account maintained by the first financial institution. The acts additionally can include generating a first promise-to-pay message for a second financial institution to credit a second account maintained by the second financial institution to make funds available in the second account in real-time after the payment authorization time. The sender can be financially liable for the second account. The first promise-to-pay message can be based on the successful debit of the first account maintained by the first financial institution. The acts further can include sending the first promise-to-pay message. The acts additionally can include receiving a first response at the application service provider indicating a successful credit of the second account maintained by the second financial institution. The acts further can include sending a notification to the sender from the application service provider in real-time after the payment authorization time of the successful credit of the second account maintained by the second financial institution. The first financial institution can be different from the second financial institution.

In various embodiments, a system includes one or more processing modules and one or more non-transitory memory storage modules storing computing instructions configured to run on the one or more processing modules and perform certain acts. The acts can include receiving a first promise-to-pay message at a second financial institution. The first promise-to-pay message can be based on a successful debit of a first account maintained by a first financial institution.

The successful debit of the first account can be based on a bill payment authorization for a payment amount made by a sender at a payment authorization time. The first account can be held by the sender. The acts also can include performing a successful credit for the payment amount to a second account maintained by the second financial institution to make funds available in the second account in real-time after the payment authorization time. The sender can be financially liable for the second account. The acts additionally can include sending a first response from the second financial institution indicating the successful credit of the second account maintained by the second financial institution to inform at least the sender in real-time after the payment authorization time of the successful credit of the second account maintained by the second financial institution. The first financial institution can be different from the second financial institution.

In a number of embodiments, a method can be implemented via execution of computer instructions configured to run at one or more processing modules and configured to be stored at one or more non-transitory memory storage modules. The method can include receiving a first promise-to-pay message at a second financial institution. The first promise-to-pay message can be based on a successful debit of a first account maintained by a first financial institution. The successful debit of the first account can be based on a bill payment authorization for a payment amount made by a sender at a payment authorization time. The first account can be held by the sender. The acts also can include performing a successful credit for the payment amount to a second account maintained by the second financial institution to make funds available in the second account in real-time after the payment authorization time. The sender can be financially liable for the second account. The acts additionally can include sending a first response from the second financial institution indicating the successful credit of the second account maintained by the second financial institution to inform at least the sender in real-time after the payment authorization time of the successful credit of the second account maintained by the second financial institution. The first financial institution can be different from the second financial institution.

Additional embodiments include a system including one or more processors, a directory including account information for accounts maintained at a plurality of financial institution, wherein the plurality of financial institutions comprise one or more first financial institutions and a second financial institution, and one or more non-transitory computer-readable media storing computing instructions configured to run on the one or more processors and perform various acts. The acts can include receiving a request from the second financial institution to determine whether any accounts held by a first entity support real-time payment transactions. The second financial institution can maintain a second account held by a second entity. The second entity can be a biller. The request can include an identifier of the first entity. The first entity can be a payor that is subject to a financial obligation to the second entity. The acts also can include determining one or more first accounts held by the first entity using the directory and the identifier of the first entity. The acts additionally can include validating that one or more third accounts held by the first entity support real-time payment transactions. The one or more first accounts can include the one or more third accounts. The acts further can include, after the first entity has enrolled in real-time payment transactions, sending an interactive invoice to the first entity, the interactive invoice comprising an option to pay the financial obligation immediately using at least one of the one or more third accounts. The at least one of the one or more third accounts can be maintained by the one or more first financial institutions. The acts additionally can include receiving an authorization from the first entity to pay the invoice immediately using at least one of the one or more third accounts. The acts further can include facilitating a real-time payment transaction from the at least one of the one or more third accounts maintained by the one or more first financial institutions to the second account maintained by the second financial institution.

A number of embodiments include a method. The method can be implemented via execution of computer instructions configured to run at one or more processors and configured to be stored at one or more non-transitory computer-readable media. The method can include receiving a request from a second financial institution to determine whether any accounts held by a first entity support real-time payment transactions. The second financial institution can maintain a second account held by a second entity. The second entity can be a biller. The request can include an identifier of the first entity. The first entity can be a payor that is subject to a financial obligation to the second entity. The method also can include determining one or more first accounts held the first entity using the directory and the identifier of the first entity. The directory can include account information for accounts maintained at a plurality of financial institutions. The plurality of financial institutions can include one or more first financial institutions and the second financial institution. The method additionally can include validating that one or more third accounts held by the first entity support real-time payment transactions. The one or more first accounts can include the one or more third accounts. The method further can include, after the first entity has enrolled in real-time payment transactions, sending an interactive invoice to the first entity, the interactive invoice comprising an option to pay the financial obligation immediately using at least one of the one or more third accounts. The at least one of the one or more third accounts can be maintained by the one or more first financial institutions. The method additionally can include receiving an authorization from the first entity to pay the invoice immediately using at least one of the one or more third accounts. The method further can include facilitating a real-time payment transaction from the at least one of the one or more third accounts maintained by the one or more first financial institutions to the second account maintained by the second financial institution.

Additional embodiments include a system including one or more processors and one or more non-transitory computer-readable media storing computing instructions configured to run on the one or more processors and perform various acts. The acts can include receiving a request to register a second entity under a certified biller status using a second account maintained at a second financial institution. The request can include a public identifier for the second entity. The acts also can include registering the second entity under the certified biller status after receiving confirmation that the public identifier corresponds to the second entity and that the second account is held by the second entity. The acts additionally can include providing, to a first entity, first information that identifies the second entity as satisfying the certified biller status. The first entity can have enrolled a first account maintained at a first financial institution in real-time payment transactions. The acts further can include receiving an authorization from the first entity to pay an invoice using the first account. The invoice can originate from the second entity. The acts additionally can include facilitating a real-time payment transaction from the first account maintained by the first financial institution to the second account maintained by the second financial institution.

A number of embodiments include a method. The method can be implemented via execution of computer instructions configured to run at one or more processors and configured to be stored at one or more non-transitory computer-readable media. The method can include receiving a request to register a second entity under a certified biller status using a second account maintained at a second financial institution. The request can include a public identifier for the second entity. The method also can include registering the second entity under the certified biller status after receiving confirmation that the public identifier corresponds to the second entity and that the second account is held by the second entity. The method additionally can include providing, to a first entity, first information that identifies the second entity as satisfying the certified biller status. The first entity can have enrolled a first account maintained at a first financial institution in real-time payment transactions. The method further can include receiving an authorization from the first entity to pay an invoice using the first account. The invoice can originate from the second entity. The method additionally can include facilitating a real-time payment transaction from the first account maintained by the first financial institution to the second account maintained by the second financial institution.

Additional embodiments include a system including one or more processors and one or more non-transitory computer-readable media storing computing instructions configured to run on the one or more processors and perform various acts. The acts can include receiving, from a first entity, a first request to pay a second entity. The first request can include (a) an account identifier of an account of the first entity at the second entity, (b) a payment amount, and (c) a preauthorization by the first entity to pay the payment amount to the second entity. The acts also can include sending a second request to the second entity based on the first request. The acts additionally can include receiving, from the second entity, an invoice for the first entity for the payment amount. The acts further can include facilitating a real-time payment transaction from a first account of the first entity at a first financial institution to a second account of the second entity at a second financial institution without transmitting the invoice to the first entity, without receiving an authorization from the first entity to pay the invoice or the payment amount to the second entity after receiving the invoice from the second entity, and based on the preauthorization of the first request.

A number of embodiments include a method. The method can be implemented via execution of computer instructions configured to run at one or more processors and configured to be stored at one or more non-transitory computer-readable media. The method can include receiving, from a first entity, a first request to pay a second entity. The first request can include (a) an account identifier of an account of the first entity at the second entity, (b) a payment amount, and (c) a preauthorization by the first entity to pay the payment amount to the second entity. The method also can include sending a second request to the second entity based on the first request. The method additionally can include receiving, from the second entity, an invoice for the first entity for the payment amount. The method further can include facilitating a real-time payment transaction from a first account of the first entity at a first financial institution to a second account of the second entity at a second financial institution without transmitting the invoice to the first entity, without receiving an authorization from the first entity to pay the invoice or the payment amount to the second entity after receiving the invoice from the second entity, and based on the preauthorization of the first request.

Although secure electronic billing and collection with real-time funds availability has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-49 may be modified, and that the foregoing discussion of certain of these embodiments does not necessarily represent a complete description of all possible embodiments. For example, one or more of the procedures, processes, or activities of FIGS. 2-7, 10-27, 43-45, and 49 may include different procedures, processes, and/or activities and be performed by many different modules, in many different orders, and/or one or more of the procedures, processes, or activities of FIGS. 2-7, 10-27, 43-45, and 49 may include one or more of the procedures, processes, or activities of another different one of FIGS. 2-7, 10-27, 43-45, and 49.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:

one or more processors; and one or more non-transitory computer-readable media storing computing instructions configured to run on the one or more processors and perform:

receiving, at the system from a sender, a first request to pay a biller, the first request comprising (a) an account identifier of an account of the sender at the biller, (b) a payment amount, and (c) a preauthorization by the sender to pay the payment amount to the biller, the system being in data communication with a first financial institution and a second financial institution, an entity operating the system being different from the first financial institution, the second financial institution, and the biller, and the first request being initiated in a mobile application running on a mobile device of the sender and associated with the system by the sender (a) selecting the biller on a first display screen of the mobile application that displays a list of billers that are within a proximity threshold of the sender based on a location of the mobile device determined using GPS, (b) entering the account identifier of the account of the sender at the biller on a second display screen of the mobile application, and (c) selecting a button on a third display screen of the mobile application to confirm the preauthorization by the sender to pay the payment amount to the biller without the sender being presented with a request for payment from the biller;

sending a second request from the system to the biller based on the first request, the second request invoking the biller to send to the system an invoice for the sender to pay the payment amount to the biller, the second request comprising a token of the sender, and the token of the sender comprising one of an email address of the sender or a phone number of the sender;

receiving, at the system from the biller, the invoice for the sender to pay the payment amount to the biller, the invoice being sent from the biller after the biller performs a verification of the account of the sender at the biller, and the invoice comprising (a) the account identifier of the account of the sender, (b) an invoice number for the invoice, (c) the payment amount, and (d) a due date for the invoice;

based on receiving the preauthorization by the sender in the first request from the sender and receiving the invoice from the biller, facilitating, by the system, a real-time payment transaction for the payment amount from a first account of the sender at the first financial institution to a second account of the biller at the second financial institution, wherein the real-time payment transaction is facilitated without transmitting the invoice to the sender, wherein the real-time payment transaction is facilitated based on the preauthorization by the sender without receiving an authorization from the sender to pay the invoice or the payment amount to the biller after receiving the invoice from the biller, and wherein the real-time payment transaction is facilitated based on the preauthorization by the sender of the first request; and sending a notification to the mobile device to cause the notification to be displayed on the mobile application on a fourth display screen of the mobile application, the notification indicating that the real-time payment transaction has completed successfully, and the notification being displayed on the mobile application without the mobile application having asked for an authorization from the sender to pay the invoice, wherein:

the system comprises a cloud of a plurality of servers in a distributed network and a distributed memory architecture to perform the computing instructions to reduce congestion from exceeded capacity on fewer servers than the plurality of servers;

the preauthorization is an authorization by the sender to pay the biller without the sender having received the invoice;

the sender does not receive an account number of the second account of the biller at the second financial institution to increase security of the second account and to decrease fraud;

the biller does not receive an account number of the first account of the sender at the first financial institution to increase security of the first account and to decrease fraud;

the system stores a device fingerprint of the mobile device during enrollment;

the device fingerprint comprises at least one of a device identifier, SIM card information, or mobile network carrier information; and the system authenticates the sender by verifying the device fingerprint before facilitating the real-time payment transaction.

2. The system of claim 1, wherein the first request is a native payment request.

3. The system of claim 1, wherein the sender is devoid of having received any invoices from the biller through the system.

4. The system of claim 1, wherein the real-time payment transaction involves a promise-to-pay message sent to the second financial institution from the first financial institution after a successful debit of the first account for the payment amount.

5. The system of claim 4, wherein the second financial institution performs a successful credit for the payment amount to the second account to make funds available in the second account in real-time after the preauthorization from the sender.

6. The system of claim 5, wherein the real-time payment transaction is credited to the account of the sender at the biller in real-time after the preauthorization from the sender based on the successful credit for the payment amount to the second account.

7. The system of claim 5, wherein:

the first financial institution maintains a first settlement account;

the first settlement account is credited to account for the successful debit of the first account at the first financial institution;

the second financial institution maintains a second settlement account; and the second settlement account is debited to account for the successful credit to the second account at the second financial institution.

8. The system of claim 7, wherein funds are transferred from the first settlement account to the second settlement account in a settlement completion that occurs after the successful credit is made to the second account.

9. The system of claim 1, wherein the first financial institution is different from the second financial institution.

10. The system of claim 1, wherein:

the sender received a prior invoice from the biller through the system; and the payment amount of the first request is different from and invoice amount of the prior invoice.

11. A method being implemented via execution of computing instructions configured to run at one or more processors and configured to be stored at one or more non-transitory computer-readable media, the method comprising:

receiving, at a system from a sender, a first request to pay a biller, the first request comprising (a) an account identifier of an account of the sender at the biller, (b) a payment amount, and (c) a preauthorization by the sender to pay the payment amount to the biller, the system being in data communication with a first financial institution and a second financial institution, an entity operating the system being different from the first financial institution, the second financial institution, and the biller, and the first request being initiated in a mobile application running on a mobile device of the sender and associated with the system by the sender (a) selecting the biller on a first display screen of the mobile application that displays a list of billers that are within a proximity threshold of the sender based on a location of the mobile device determined using GPS, (b) entering the account identifier of the account of the sender at the biller on a second display screen of the mobile application, and (c) selecting a button on a third display screen of the mobile application to confirm the preauthorization by the sender to pay the payment amount to the biller without the sender being presented with a request for payment from the biller;

sending a second request from the system to the biller based on the first request, the second request invoking the biller to send to the system an invoice for the sender to pay the payment amount to the biller, the second request comprising a token of the sender, and the token of the sender comprising one of an email address of the sender or a phone number of the sender;

receiving, at the system from the biller, the invoice for the sender to pay the payment amount to the biller, the invoice being sent from the biller after the biller performs a verification of the account of the sender at the biller, and the invoice comprising (a) the account identifier of the account of the sender, (b) an invoice number for the invoice, (c) the payment amount, and (d) a due date for the invoice;

based on receiving the preauthorization by the sender in the first request from the sender and receiving the invoice from the biller, facilitating, by the system, a real-time payment transaction for the payment amount from a first account of the sender at the first financial institution to a second account of the biller at the second financial institution, wherein the real-time payment transaction is facilitated without transmitting the invoice to the sender, wherein the real-time payment transaction is facilitated based on the preauthorization by the sender without receiving an authorization from the sender to pay the invoice or the payment amount to the biller after receiving the invoice from the biller, and wherein the real-time payment transaction is facilitated based on the preauthorization by the sender of the first request; and sending a notification to the mobile device to cause the notification to be displayed on the mobile application on a fourth display screen of the mobile application, the notification indicating that the real-time payment transaction has completed successfully, and the notification being displayed on the mobile application without the mobile application having asked for an authorization from the sender to pay the invoice, wherein:

the system comprises a cloud of a plurality of servers in a distributed network and a distributed memory architecture to perform the computing instructions to reduce congestion from exceeded capacity on fewer servers than the plurality of servers;

the preauthorization is an authorization by the sender to pay the biller without the sender having received the invoice;

the sender does not receive an account number of the second account of the biller at the second financial institution to increase security of the second account and to decrease fraud;

the biller does not receive an account number of the first account of the sender at the first financial institution to increase security of the first account and to decrease fraud;

the system stores a device fingerprint of the mobile device during enrollment;

the device fingerprint comprises at least one of a device identifier, SIM card information, or mobile network carrier information; and the system authenticates the sender by verifying the device fingerprint before facilitating the real-time payment transaction.

12. The method of claim 11, wherein the first request is a native payment request.

13. The method of claim 11, wherein the sender is devoid of having received any invoices from the biller through the system.

14. The method of claim 11, wherein the real-time payment transaction involves a promise-to-pay message sent to the second financial institution from the first financial institution after a successful debit of the first account for the payment amount.

15. The method of claim 14, wherein the second financial institution performs a successful credit for the payment amount to the second account to make funds available in the second account in real-time after the preauthorization from the sender.

16. The method of claim 15, wherein the real-time payment transaction is credited to the account of the sender at the biller in real-time after the preauthorization from the sender based on the successful credit for the payment amount to the second account.

17. The method of claim 15, wherein:

the first financial institution maintains a first settlement account;

the first settlement account is credited to account for the successful debit of the first account at the first financial institution;

the second financial institution maintains a second settlement account; and the second settlement account is debited to account for the successful credit to the second account at the second financial institution.

18. The method of claim 17, wherein funds are transferred from the first settlement account to the second settlement account in a settlement completion that occurs after the successful credit is made to the second account.

19. The method of claim 11, wherein the first financial institution is different from the second financial institution.

20. The method of claim 11, wherein:

the sender received a prior invoice from the biller through the system; and the payment amount of the first request is different from and invoice amount of the prior invoice.

* * * * *